US008080101B2

(12) United States Patent
Eichhorn et al.

(10) Patent No.: US 8,080,101 B2
(45) Date of Patent: Dec. 20, 2011

(54) AZO REACTIVE DYES AND MIXTURES OF FIBER-REACTIVE AZO DYES, THEIR PREPARATION AND THEIR USE

(75) Inventors: Joachim Eichhorn, Frankfurt (DE); Stefan Meier, Frankfurt (DE); Werner Hubert Russ, Floersheim-Wicker (DE)

(73) Assignee: DyStar Colours Deutschland GmbH (DE)

( * ) Notice: Subject to any disclaimer, the term of this patent is extended or adjusted under 35 U.S.C. 154(b) by 402 days.

(21) Appl. No.: 12/089,439

(22) PCT Filed: Sep. 29, 2006

(86) PCT No.: PCT/EP2006/066911

§ 371 (c)(1), (2), (4) Date: Jul. 28, 2008

(87) PCT Pub. No.: WO2007/039573

PCT Pub. Date: Apr. 12, 2007

(65) Prior Publication Data

US 2008/0295732 A1 Dec. 4, 2008

(30) Foreign Application Priority Data

Oct. 5, 2005 (DE) ......................... 10 2005 047 391

(51) Int. Cl.
*C09D 11/02* (2006.01)
*C09B 62/447* (2006.01)
*C09B 33/12* (2006.01)

(52) U.S. Cl. ......... 106/31.52; 8/549; 534/617; 534/761; 534/809

(58) Field of Classification Search ............... 106/31.52, 106/31.47; 8/549; 534/617, 761, 809, 815–816, 534/831–837

See application file for complete search history.

(56) References Cited

U.S. PATENT DOCUMENTS

| | | | | |
|---|---|---|---|---|
| 3,234,204 | A | 2/1966 | Benz et al. | |
| 4,760,134 | A | 7/1988 | Corso et al. | |
| 5,817,779 | A | 10/1998 | Deitz et al. | |
| 5,849,887 | A | 12/1998 | Lehmann et al. | |
| 6,086,639 | A * | 7/2000 | Steckelberg et al. | 8/549 |
| 6,537,332 | B1 | 3/2003 | Tzikas et al. | |
| 7,060,114 | B2 | 6/2006 | Eichhorn et al. | |
| 7,429,279 | B2 * | 9/2008 | Meier et al. | 8/641 |
| 7,455,699 | B2 * | 11/2008 | Eichhorn et al. | 8/641 |
| 7,637,964 | B2 * | 12/2009 | Meier et al. | 8/687 |
| 7,708,786 | B2 * | 5/2010 | Eichhorn et al. | 8/641 |
| 2005/0034252 | A1 | 2/2005 | Meier et al. | |

(Continued)

FOREIGN PATENT DOCUMENTS

CN 1511885 A 7/2004

(Continued)

OTHER PUBLICATIONS

Hrdina et al., "Iron complexes of reactive azo dyes", Advances in Colour Science and Technology, vol. 7, No. 1, Jan. 2004.

*Primary Examiner* — Helene Klemanski

(74) *Attorney, Agent, or Firm* — Connolly Bove Lodge & Hutz LLP

(57) ABSTRACT

The present invention relates to dye mixtures which comprise at least one dye of the formula (I), at least one dye of the formula (II) and optionally at least one dye of the formula (III) and/or optionally at least one dye of the formula (IV) in which $D^1$ to $D^7$, $R^{201}$ to $R^{203}$, $R^0$, R* and R, T, M, v and f are as defined in claim 1**, to dyes of the formula (II), to processes for their preparation, and to their use for dyeing and printing hydroxyl- and carboxamido-containing materials.

(I)

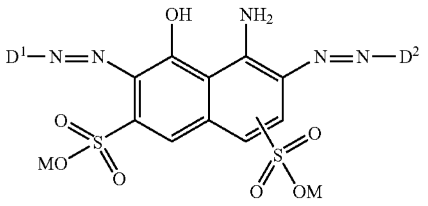

(II)

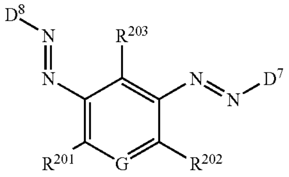

(III)

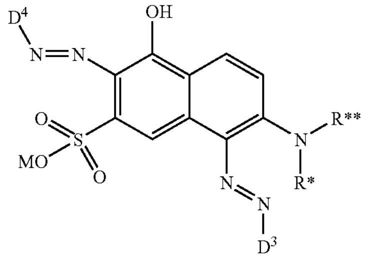

(IV)

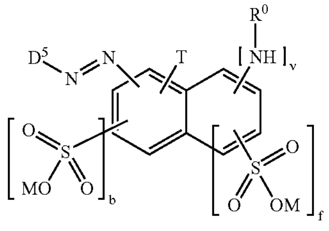

20 Claims, No Drawings

U.S. PATENT DOCUMENTS

| | | | | |
|---|---|---|---|---|
| 2005/0034253 | A1 | 2/2005 | Meier et al. | |
| 2006/0112504 | A1 | 6/2006 | Huang et al. | |
| 2007/0271711 | A1 * | 11/2007 | Russ et al. | 534/617 |

FOREIGN PATENT DOCUMENTS

| | | | |
|---|---|---|---|
| CN | 1616551 | A | 5/2005 |
| CN | 1730565 | A | 2/2006 |
| EP | 0212627 | A1 | 3/1987 |
| EP | 0785237 | A1 | 7/1997 |
| EP | 0870807 | A1 | 10/1998 |
| EP | 0974621 | A1 | 1/2000 |
| EP | 0976792 | A1 | 2/2000 |
| EP | 1508596 | A1 | 2/2005 |
| EP | 1508598 | A1 | 2/2005 |
| WO | WO-00/06652 | A2 | 2/2000 |
| WO | WO-02/098989 | A1 | 12/2002 |
| WO | WO-2004/069937 | A1 | 8/2004 |
| WO | WO-2005/080508 | A1 | 9/2005 |

* cited by examiner

AZO REACTIVE DYES AND MIXTURES OF FIBER-REACTIVE AZO DYES, THEIR PREPARATION AND THEIR USE

RELATED APPLICATIONS

This application is a national stage application (under 35 U.S.C. 371) of PCT/EP2006/066911 filed Sep. 29, 2006, which claims benefit of German application 10 2005 047 391.1 filed Oct. 5, 2005.

The invention is situated in the technical field of fiber-reactive azo dyes.

Mixed fiber-reactive azo dyes and their use for dyeing hydroxyl- and carboxamido-containing material in black shades are known for example from documents U.S. Pat. No. 5,445,654, U.S. Pat. No. 5,611,821, KR 94-2560, Sho 58-160362, EP 0 870 807 A1 and WO2004/069937. These dye mixtures, however, possess certain performance defects, such as an overly great dependence of the color yield on varying dyeing parameters in the dyeing operation, for example, or an inadequate or unlevel buildup of color on cotton (effective color buildup results from the ability of a dye to produce a proportionally stronger dyeing from a higher concentration in the dyebath). Consequences of these deficiencies may include, for example, poor reproducibility of the dyeings obtainable, which ultimately affects the economics of the dyeing operation. As a result of this there continues to be a need for new reactive dyes and reactive-dye mixtures having improved properties, such as high substantivity in tandem with the ability for unfixed fractions to be easily washed off and low propensity for staining adjacent fabric, particularly adjacent fabric of polyamide. The dyes and dye mixtures must, furthermore, exhibit good dyeing yields and possess a high reactivity, a particular intention being to yield dyeings having high degrees of fixation.

With the present invention, dye mixtures have now been found which possess these above-described properties to a high extent. The new dye mixtures are notable in particular for high fixing yields and color strengths in combination with fractions not fixed on the fiber that are easy to wash off, and with a low level of polyamide staining. In addition the dyeings exhibit good all-round fastness properties, such as high lightfastness and very good wetfastness properties, for example.

The invention accordingly provides dye mixtures which comprise one or more dyes of formula (I), (I)

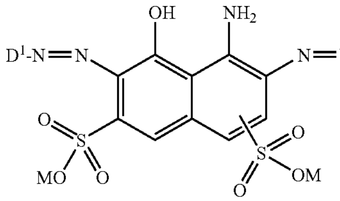

one or more dyes of the formula (II)

(II)

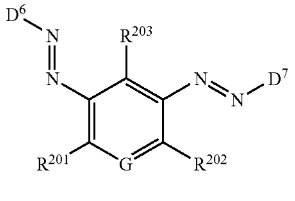

and optionally one or more dyes of the formula (III)

(III)

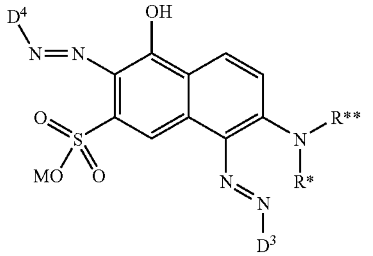

and/or optionally one or more dyes of the formula (IV)

(IV)

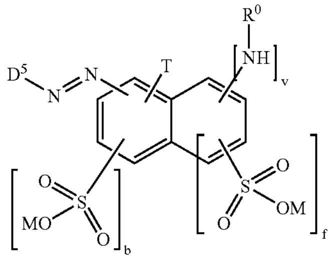

in which:

$D^1$, $D^2$, $D^3$, $D^4$, $D^6$, $D^6$ and $D^7$ are independently of one another a group of the formula (I)

(1)

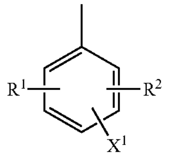

in which $R^1$ and $R^2$ independently of one another are hydrogen, $(C_1$-$C_4)$-alkyl, $(C_1$-$C_4)$-alkoxy, hydroxyl, sulfo, carboxyl, cyano, nitro, amido, ureido or halogen; and $X^1$ is hydrogen or a group of the formula $-SO_2-Z$, where Z is $-CH{=}CH_2$, $-CH_2CH_2Z^1$ or hydroxyl, in which $Z^1$ is hydroxyl or a group which can be eliminated under the action of alkali; or $D^1$, $D^2$, $D^3$, $D^4$, $D^5$, $D^6$ and $D^7$ are independently of one another a naphthyl group of the formula (2)

(2)

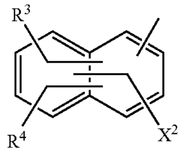

in which $R^3$ and $R^4$ independently of one another are hydrogen, ($C_1$-$C_4$)-alkyl, ($C_1$-$C_4$)-alkoxy, hydroxyl, sulfo, carboxyl, cyano, nitro, amido, ureido or halogen; and $X^2$ has one of the definitions of $X^1$; or $D^1$, $D^2$, $D^3$, $D^4$, $D^5$, $D^6$ and $D^7$ are independently of one another a group of the formula (3)

(3)

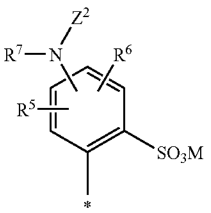

in which $R^5$ and $R^6$ independently of one another have one of the definitions of $R^1$ and $R^2$;

$R^7$ is hydrogen, ($C_1$-$C_4$)-alkyl, or phenyl which is unsubstituted or substituted by ($C_1$-$C_4$)-alkyl, ($C_1$-$C_4$)-alkoxy, sulfo, halogen or carboxyl; and $Z^2$ is a group of the formula (4) or (5) or (6)

(4)

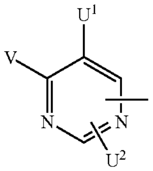

(5)

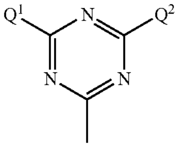

(6)

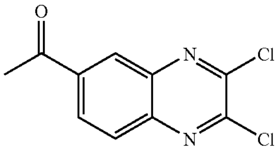

in which

V is fluorine or chlorine;

$U^1$ and $U^2$ independently of one another are fluorine, chlorine or hydrogen; and $Q^1$ and $Q^2$ independently of one another are chlorine, fluorine, cyanamido, hydroxyl, ($C_1$-$C_6$)-alkoxy, phenoxy, sulfophenoxy, mercapto, ($C_1$-$C_6$)-alkylmercapto, pyridino, carboxypyridino, carbamoylpyridino or a group of the formula (7) or (8)

(7)

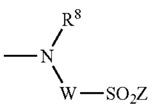

-continued (8)

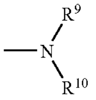

in which $R^8$ is hydrogen or ($C_1$-$C_6$)-alkyl, sulfo-($C_1$-$C_6$)-alkyl or phenyl which is unsubstituted or substituted by ($C_1$-$C_4$)-alkyl, ($C_1$-$C_4$)-alkoxy, sulfo, halogen, carboxyl, acetamido or ureido;

$R^9$ and $R^{10}$ have independently of one another one of the definitions of $R^8$, or form a cyclic ring system of the formula $—(CH_2)_j—$ where j is 4 or 5, or alternatively $—(CH_2)_2$-E-$(CH_2)_2—$, where E is oxygen, sulfur, sulfonyl or $—NR^{11}$ with $R^{11}$=($C_1$-$C_6$)-alkyl;

W is phenylene which is unsubstituted or substituted by 1 or 2 substituents, such as ($C_1$-$C_4$)-alkyl, ($C_1$-$C_4$)-alkoxy, carboxyl, sulfo, chlorine or bromine, or is ($C_1$-$C_4$)-alkylene-arylene or ($C_2$-$C_6$)-alkylene which is interrupted by oxygen, sulfur, sulfonyl, amino, carbonyl or carboxamido, or is phenylene-CONH-phenylene which is unsubstituted or substituted by ($C_1$-$C_4$)-alkyl, ($C_1$-$C_4$)-alkoxy, hydroxyl, sulfo, carboxyl, amido, ureido or halogen, or is naphthylene which is unsubstituted or substituted by one or two sulfo groups; and Z is as defined above; or $D^1$, $D^2$, $D^3$, $D^4$, $D^5$, $D^6$ and $D^7$ are independently of one another a group of the formula (9)

(9)

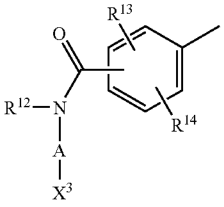

in which $R^{12}$ is hydrogen, ($C_1$-$C_4$)-alkyl, aryl or a substituted aryl radical;

$R^{13}$ and $R^{14}$ independently of one another are hydrogen, ($C_1$-$C_4$)-alkyl, ($C_1$-$C_4$)-alkoxy, hydroxyl, sulfo, carboxyl, cyano, nitro, amido, ureido or halogen; and A is a phenylene group of the formula (10)

(10)

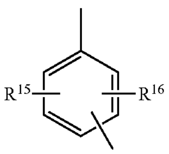

in which $R^{15}$ and $R^{16}$ independently of one another are hydrogen, ($C_1$-$C_4$)-alkyl, ($C_1$-$C_4$)-alkoxy, hydroxyl, sulfo, carboxyl, cyano, nitro, amido, ureido or halogen; or A is a naphthylene group of the formula (11)

(11)

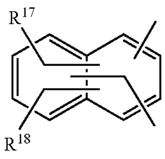

in which $R^{17}$ and $R^{18}$ independently of one another are hydrogen, $(C_1$-$C_4)$-alkyl, $(C_1$-$C_4)$-alkoxy, hydroxyl, sulfo, carboxyl, cyano, nitro, amido, ureido or halogen; or A is a polymethylene group of the formula (12)

$$—(CR^{19}R^{20})k- \quad (12)$$

in which k is an integer greater than 1; and $R^{19}$ and $R^{20}$ independently of one another are hydrogen, $(C_1$-$C_4)$-alkyl, $(C_1$-$C_4)$-alkoxy, hydroxyl, cyano, amido, halogen or aryl; and $X^3$ has one of the definitions of $X^1$; and $R^0$ is a group of the formula (4) or (5) or is a group of the formula (13)

(13)

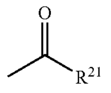

in which $R^{21}$ is $(C_1$-$C_6)$-alkyl, sulfo-$(C_1$-$C_6)$-alkyl, carboxy-$(C_1$-$C_6)$-alkyl or phenyl which is unsubstituted or substituted by $(C_1$-$C_4)$-alkyl, $(C_1$-$C_4)$-alkoxy, sulfo, halogen, carboxyl, acetamido or ureido;

G is C—$R^{200}$ or N, in which $R^{200}$ is hydrogen, $C_1$-$C_6$-alkyl, which is unsubstituted or substituted by amino, $(C_1$-$C_4)$-alkylamino, hydroxyl, $(C_1$-$C_4)$-alkoxy, sulfo, halogen, carboxyl, acetamido or ureido, or is phenyl which is unsubstituted or substituted by $(C_1$-$C_4)$-alkyl, $(C_1$-$C_4)$-alkoxy, sulfo, halogen, carboxyl, acetamido or ureido, or is sulfo, carboxyl, cyano or halogen, or is a group of the formula (100);

$$—N{=}N\text{-}D^8 \quad (100)$$

in which $D^8$ possesses one of the definitions of $D^1$ or is a group of the formula (101)

(101)

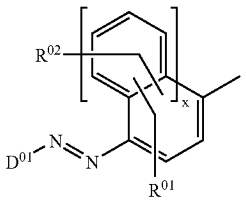

in which $D^{01}$ possesses one of the definitions of $D^1$;

$R^{01}$ and $R^{02}$ independently of one another are hydrogen, $C_1$-$C_6$-alkyl, amino, $(C_1$-$C_4)$-alkylamino, hydroxyl, $(C_1$-$C_4)$-alkoxy, acetamido, ureido, sulfo or carboxyl;

x is 0 or 1;

$R^{201}$ and $R^{202}$ independently of one another are amino, hydroxyl, $(C_1$-$C_4)$-alkylamino, $(C_1$-$C_4)$-alkoxy or mercapto; or one of the radicals $R^{201}$ and $R^{202}$ is hydrogen and the other has one of the aforementioned definitions;

$R^{203}$ is hydrogen, $C_1$-$C_6$-alkyl, which is unsubstituted or substituted by amino, $(C_1$-$C_4)$-alkylamino, hydroxyl, $(C_1$-$C_4)$-alkoxy, sulfo, halogen, carboxyl, acetamido or ureido, or is phenyl which is unsubstituted or substituted by $(C_1$-$C_4)$-alkyl, $(C_1$-$C_4)$-alkoxy, sulfo, halogen, carboxyl, acetamido or ureido, or is amino, $(C_1$-$C_4)$-alkylamino, hydroxyl, $(C_1$-$C_4)$-alkoxy, sulfo, carboxyl, cyano, halogen, nitro, amido or ureido;

b, f and v independently of one another are 0 or 1;

R* and R** independently of one another are hydrogen, $(C_1$-$C_4)$-alkyl or a group of the formula (14)

$$—CH_2—SO_3M \quad (14);$$

T is hydroxyl or $NH_2$, and if T is $NH_2$ v is 0; and

M is hydrogen, an alkali metal or one equivalent of an alkaline earth metal;

where the dyes of the formulae (I) to (IV) contain at least one fiber-reactive group of the formula —$SO_2$—Z or —$Z^2$; and where mixtures comprising dyes where $R^{201}$ and $R^{202}$ are both amino, $R^{203}$ is carboxyl, G is C—$R^{200}$ and $R^{200}$ is hydrogen and $D^6$ and $D^7$ are both a radical of the formula (1-2) or one of the radicals $D^6$ and $D^7$ is a radical of the formula (1-1) and the other is a radical of the formula (1-2); or the dye where $R^{201}$ and $R^{202}$ are both amino, $R^{203}$ is carboxyl, G is C—$R^{200}$ and $R^{200}$ is hydrogen and the radicals $D^6$ and $D^7$ are both a radical of the formula (1-6); or the dye where $R^{201}$ and $R^{202}$ are both amino, $R^{203}$ is carboxyl, G is C—$R^{200}$ and $R^{200}$ is hydrogen and one of the radicals $D^6$ and $D^7$ is a radical of the formula (1-1) and the other is a radical of the formula (1-6); or the dye where $R^{201}$ and $R^{202}$ are both amino, $R^{203}$ is carboxyl, G is C—$R^{200}$ and $R^{200}$ is hydrogen and one of the radicals $D^6$ and $D^7$ is a radical of the formula (1-7) and the other is a radical of the formula (1-8); or the dye where $R^{201}$ and $R^{202}$ are both amino, $R^{203}$ is hydrogen, G is C—$R^{200}$ and $R^{200}$ is hydrogen and $D^6$ and $D^7$ are both a radical of the formula (1-1)

(1-1)

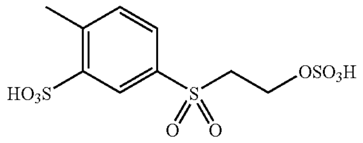

(1-2)

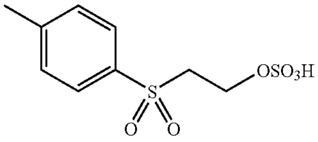

(1-6)

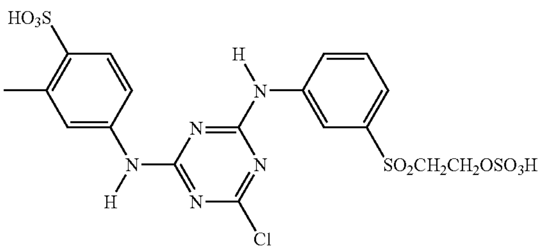

(1-7)

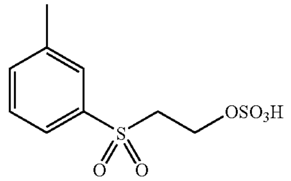

-continued (1-8)

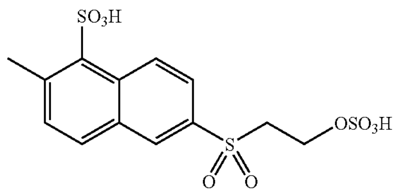

are excluded.

In the general formulae above and below, the individual formula members, both of different and of identical designation, may have definitions which are the same as or different than one another within the bounds of their definition.

$(C_1-C_4)$-Alkyl groups may be straight-chain or branched and are in particular methyl, ethyl, n-propyl, isopropyl, n-butyl, isobutyl, sec-butyl and tert-butyl. Methyl and ethyl are preferred. Similar comments apply to $(C_1-C_4)$-alkoxy groups.

Aryl groups are in particular the phenyl group. A substituted aryl group $R^8$ to $R^{10}$, $R^{12}$ or $R^{21}$ is in particular a phenyl group substituted by one, two or three independent groups from the series $(C_1-C_4)$-alkyl, $(C_1-C_4)$-alkoxy, hydroxyl, sulfo, carboxyl, amido or halogen.

Halogen is in particular fluorine, chlorine and bromine, preference being given to fluorine and chlorine.

Alkali-eliminable substituents $Z^1$ in the β position of the ethyl group of Z are, for example, halogen atoms, such as chlorine and bromine, ester groups of organic carboxylic and sulfonic acids, such as alkylcarboxylic acids, unsubstituted or substituted benzenecarboxylic acids and unsubstituted or substituted benzenesulfonic acids, such as the alkanoyloxy groups of 2 to 5 carbon atoms, more particularly acetyloxy, benzoyloxy, sulfobenzoyloxy, phenylsulfonyloxy and tolylsulfonyloxy, and additionally acidic ester groups of inorganic acids, such as of phosphoric acid, sulfuric acid and thiosulfuric acid (phosphate, sulfato and thiosulfato groups), and also dialkylamino groups having alkyl groups each of 1 to 4 carbon atoms, such as dimethylamino and diethylamino.

Z is preferably vinyl or β-chloroethyl and with particular preference is β-sulfatoethyl.

The groups "sulfo", "carboxyl", "thiosulfato", "phosphato", and "sulfato" include not only their acid form but also their salt form. Accordingly, sulfo groups are groups of the formula $-SO_3M$, thiosulfato groups are groups of the formula $-S-SO_3M$, carboxyl groups are groups of the formula $-COOM$, phosphato groups are groups of the formula $-OPO_3M_2$, and sulfato groups are groups of the formula $-OSO_3M$, each with M in the abovementioned definition.

Within the definition of Z, the dyes of the formula (I) to (IV) may possess different fiber-reactive groups $-SO_2Z$. In particular the fiber-reactive groups $-SO_2Z$ may be on the one hand vinylsulfonyl groups and on the other groups $-CH_2CH_2Z^1$, preferably β-sulfatoethylsulfonyl groups. Where the dyes of the formula (I) to (IV) in part contain vinylsulfonyl groups, the fraction of the respective dye with the vinylsulfonyl group is up to about 30 mol %, based on the respective amount of total dye.

Alkali metal M is, in particular, lithium, sodium and potassium. Preferably M is hydrogen or sodium.

In the formula (II), if G denotes $C-R^{200}$, the radical $R^{200}$ is preferably hydrogen, methyl, sulfo, carboxyl or is a radical of the formula (100), particular preference being given to hydrogen and a radical of the formula (100) in which $D^8$ possesses one of the definitions of $D^1$.

The radical $R^{203}$ is preferably hydrogen, methyl, hydroxymethyl, amino, hydroxyl, methoxy, sulfo or carboxyl, particular preference being given to hydrogen, hydroxyl or carboxyl.

The radicals $R^{201}$ and $R^{202}$ independently of one another are preferably amino and hydroxyl, more preferably amino. Preferably, furthermore, none of the radicals $R^{201}$ and $R^{202}$ is hydrogen. Still preferably, the radicals $R^{201}$ and $R^{202}$ are not both hydroxy.

In one embodiment of the present invention, in case $R^{201}$ and $R^{202}$ are both amino, $R^{203}$ is preferably not carboxy and is especially preferably not carboxy if in addition G denotes $C-R^{200}$ and $R^{200}$ is a radical of the formula (100) or if in addition G denotes $C-R^{200}$ and $R^{200}$ is hydrogen and $D^6$ and $D^7$ both stand for a group of the formula (I), (2) or (3) which contains a fiber-reactive group of the formula $-SO_2-Z$ or $-Z^2$.

In a further embodiment of the present invention, in case $R^{201}$ and $R^{202}$ are both amino and G denotes $C-R^{200}$ and $R^{200}$ is hydrogen, $R^{203}$ is preferably not hydrogen and is especially preferably not hydrogen if in addition $D^6$ and $D^7$ both stand for a group of the formula (I), which contains a fiber-reactive group of the formula $-SO_2-Z$.

The radicals R* and R** in the formula (III) are, independently of one another, preferably hydrogen, methyl or a group of the formula (14), particular preference being given to hydrogen or a group of the formula (14).

The radicals $R^1$ to $R^6$, $R^{13}$, $R^{14}$, $R^{17}$ and $R^{18}$ are preferably other than nitro.

The radicals $R^1$ and $R^2$ are preferably hydrogen, $(C_1-C_4)$-alkyl groups, $(C_1-C_4)$-alkoxy groups, sulfo or carboxyl and more preferably hydrogen, methyl, methoxy or sulfo.

The radicals $R^3$ to $R^6$ and $R^{12}$ to $R^{20}$ are preferably hydrogen, and $R^3$ to $R^6$, $R^{17}$ and $R^{18}$ are furthermore preferably sulfo.

The radicals $R^7$ to $R^{10}$ are preferably hydrogen or methyl, $R^7$ and $R^8$ are preferably also phenyl, and $R^9$ and $R^{10}$ are preferably 2-sulfoethyl or 2-, 3- or 4-sulfophenyl, or $R^9$ and $R^{10}$ form a cyclic ring system corresponding preferably to the formula $-(CH_2)_2-O-(CH_2)_2-$.

Examples of groups $D^1$ to $D^8$ of the formula (1) and (2) are 2-(β-sulfatoethylsulfonyl)phenyl, 3-(β-sulfatoethylsulfonyl)phenyl, 4-(β-sulfatoethylsulfonyl)phenyl, 2-carboxy-5-(β-sulfatoethylsulfonyl)phenyl, 2-chloro-4-(β-sulfatoethylsulfonyl)phenyl, 2-chloro-5-(β-sulfatoethylsulfonyl)phenyl, 2-bromo-4-(β-sulfatoethylsulfonyl)phenyl, 2-sulfo-4-(β-sulfatoethylsulfonyl)phenyl, 2-sulfo-5-(β-sulfatoethylsulfonyl)phenyl, 2-methoxy-5-(β-sulfatoethylsulfonyl)phenyl, 2-ethoxy-5-(β-sulfatoethylsulfonyl)phenyl, 2,5-dimethoxy-4-(β-sulfatoethylsulfonyl)phenyl, 2-methoxy-5-methyl-4-(β-sulfatoethylsulfonyl)phenyl, 2-methyl-4-(β-sulfatoethylsulfonyl)phenyl, 2- or 3- or 4-(β-thiosulfatoethylsulfonyl)phenyl, 2-methoxy-5-(β-thiosulfatoethylsulfonyl)phenyl, 2-sulfo-4-(β-phosphatoethylsulfonyl)phenyl, 2- or 3- or 4-vinylsulfonylphenyl, 2-sulfo-4-vinylsulfonylphenyl, 2-chloro-4-(β-chloroethylsulfonyl)phenyl, 2-chloro-5-(β-chloroethylsulfonyl)phenyl, 3- or 4-(β-acetoxyethylsulfonyl)phenyl, 6- or 8-(β-sulfatoethylsulfonyl)naphth-2-yl, 6-(β-sulfatoethylsulfonyl)-1-sulfonaphth-2-yl and 8-(β-sulfatoethylsulfonyl)-6-sulfonaphth-2-yl, among which preference is given to 3-(β-sulfatoethylsulfonyl)phenyl, 4-(β-sulfatoethylsulfonyl)phenyl, 2-sulfo-4-(β-sulfatoethylsulfonyl)phenyl, 2-methoxy-5-(β-sulfatoethylsulfonyl)phenyl, 2,5-dimethoxy-4-(β-sulfatoethylsulfonyl)phenyl, 2-methoxy-5-methyl-4-(β-sulfatoethylsulfonyl)phenyl and 3- or 4-vinylsulfonylphenyl, or $D^1$ to $D^8$ correspond to a group of the formulae (3) or (9), where $R^5$ to $R^7$ and $R^{12}$ to $R^{14}$ possess the preferred definitions described above.

Where $D^1$ to $D^8$ are a group of the formula (I) and $X^1$ is —$SO_2Z$, the $SO_2Z$ group is preferably positioned meta or para to the diazo group, and where $D^1$ to $D^8$ are each a group of the formula (2), the bond leading to the diazo group is preferably attached in β-position on the naphthalene nucleus.

Where A is phenylene and $X^3$ is —$SO_2Z$, the $SO_2Z$ group is preferably positioned meta or para to the nitrogen atom. In the group of the formula (9) the carboxamide group is preferably positioned para or meta to the diazo group. Where A is naphthylene the bond leading to the nitrogen atom is preferably attached in β position on the naphthalene nucleus.

Examples of substituents A are, in particular, 1,2-phenylene, 1,3-phenylene, 1,4-phenylene, 2-chloro-1,4-phenylene, 2-chloro-1,5-phenylene, 2-bromo-1,4-phenylene, 2-sulfo-1,4-phenylene, 2-sulfo-1,5-phenylene, 2-methoxy-1,5-phenylene, 2-ethoxy-1,5-phenylene, 2,5-dimethoxy-1,4-phenylene, 2-methoxy-5-methyl-1,4-phenylene, 2-methyl-1,4-phenylene, 2,6-naphthylene, 2,8-naphthylene, 1-sulfo-2,6-naphthylene, 6-sulfo-2,8-naphthylene or 1,2-ethylene and 1,3-propylene.

More preferably A is 1,3-phenylene, 1,4-phenylene, 2-sulfo-1,4-phenylene, 2-methoxy-1,5-phenylene, 2,5-dimethoxy-1,4-phenylene, 2-methoxy-5-methyl-1,4-phenylene or 1,2-ethylene and 1,3-propylene, and in the case of the two last-mentioned alkylene groups the radical $R^{12}$ is preferably phenyl and 2-sulfophenyl.

k is preferably 2 or 3.

W is preferably 1,3-phenylene, 1,4-phenylene, 2-sulfo-1,4-phenylene, 2-methoxy-1,5-phenylene, 2,5-dimethoxy-1,4-phenylene, 2-methoxy-5-methyl-1,4-phenylene, 1,2-ethylene or 1,3-propylene.

Examples of the groups $Q^1$ and $Q^2$ in the formula (5) are, independently of one another, fluorine, chlorine, hydroxyl, methoxy, ethoxy, phenoxy, 3-sulfophenoxy, 4-sulfophenoxy, methylmercapto, cyanamido, amino, methylamino, ethylamino, morpholino, piperidino, phenylamino, methylphenylamino, 2-sulfophenylamino, 3-sulfophenylamino, 4-sulfophenylamino, 2,4-disulfophenylamino, 2,5-disulfophenylamino, 2-sulfoethylamino, N-methyl-2-sulfoethylamino, pyridino, 3-carboxypyridino, 4-carboxypyridino, 3-carbamoylpyridino, 4-carbamoylpyridino, 2-(2-sulfatoethylsulfonyl)phenylamino, 3-(2-sulfatoethylsulfonyl)phenylamino, 4-(2-sulfatoethylsulfonyl)phenylamino, N-ethyl-3-(2-sulfatoethylsulfonyl)phenylamino, N-ethyl-4-(2-sulfatoethylsulfonyl)phenylamino, 2-carboxy-5-(2-sulfatoethylsulfonyl)phenylamino), 2-chloro-4-(2-sulfatoethylsulfonyl)phenylamino, 2-chloro-5-(2-sulfatoethylsulfonyl)phenylamino, 2-bromo-4-(2-sulfatoethylsulfonyl)phenylamino, 2-sulfo-4-(2-sulfatoethylsulfonyl)phenylamino, 2-sulfo-5-(2-sulfatoethylsulfonyl)phenylamino, 2-methoxy-5-(2-sulfatoethylsulfonyl)phenylamino, 2,5-dimethoxy-4-(2-sulfatoethylsulfonyl)phenylamino, 2-methoxy-5-methyl-4-(2-sulfatoethylsulfonyl)phenylamino, 2-methyl-4-(2-sulfatoethylsulfonyl)phenylamino, 2-(vinylsulfonyl)phenylamino, 3-(vinylsulfonyl)phenylamino, 4-(vinylsulfonyl)phenylamino, N-ethyl-3-(vinylsulfonyl)phenylamino, N-ethyl-4-(vinylsulfonyl)phenylamino, 6-(2-sulfatoethylsulfonyl)naphth-2-ylamino, 8-(2-sulfatoethylsulfonyl)naphth-2-ylamino, 8-(2-sulfatoethylsulfonyl)-6-sulfonaphth-2-ylamino, 3-(2-(2-sulfatoethylsulfonyl)ethylcarbamoyl)phenylamino, 4-(2-(2-sulfatoethylsulfonyl)ethylcarbamoyl)phenylamino, 3-(2-(vinylsulfonyl)ethylcarbamoyl)phenylamino, 4-(2-(2-vinylsulfonyl)ethylcarbamoyl)phenylamino, 4-(N-methyl-2-(2-sulfatoethylsulfonyl)ethylcarbamoyl)phenylamino, 4-(N-phenyl-2-(2-sulfatoethylsulfonyl)ethylcarbamoyl)phenylamino, 4-(3-(2-sulfatoethylsulfonyl)phenylcarbamoyl)phenylamino, 4-(4-(2-sulfatoethylsulfonyl)phenylcarbamoyl)phenylamino, 3-(3-(2-sulfatoethylsulfonyl)phenylcarbamoyl)phenylamino, 3-(4-(2-sulfatoethylsulfonyl)phenylcarbamoyl)phenylamino, 3-(2-sulfatoethylsulfonyl)propylamino, N-methyl-N-(2-(2-sulfatoethylsulfonyl)ethyl)amino, N-phenyl-N-(2-(2-sulfatoethylsulfonyl)ethyl)amino or N-phenyl-N-(2-(2-sulfatoethylsulfonyl)propyl)amino.

Preferably the groups $Q^1$ and $Q^2$ in the formula (5) are independently of one another fluorine, chlorine, cyanamido, morpholino, 2-sulfophenylamino, 3-sulfophenylamino, 4-sulfophenylamino, N-methyl-2-sulfoethylamino, 3-carboxypyridino, 4-carboxypyridino, 3-carbamoylpyridino, 4-carbamoylpyridino, 3-(2-sulfatoethylsulfonyl)phenylamino, 4-(2-sulfatoethylsulfonyl)phenylamino, 3-(vinylsulfonyl)phenylamino, 4-(vinylsulfonyl)phenylamino), 4-(3-(2-sulfatoethylsulfonyl)phenylcarbamoyl)phenylamino, 4-(4-(2-sulfatoethylsulfonyl)phenylcarbamoyl)phenylamino, 3-(3-(2-sulfatoethylsulfonyl)phenylcarbamoyl)phenylamino, 3-(4-(2-sulfatoethylsulfonyl)phenylcarbamoyl)phenylamino, N-methyl-N-(2-(2-sulfatoethylsulfonyl)ethyl)amino or N-phenyl-N-(2-(2-sulfatoethylsulfonyl)ethyl)amino.

More preferably the groups $Q^1$ and $Q^2$ in the formula (5) independently of one another are fluorine, chlorine, cyanamido, morpholino, 2-sulfophenylamino, 3-sulfophenylamino, 4-sulfophenylamino, 3-(2-sulfatoethylsulfonyl)phenylamino, 4-(2-sulfatoethylsulfonyl)phenylamino, 3-(vinylsulfonyl)phenylamino, 4-(vinylsulfonyl)phenylamino), N-methyl-N-(2-(2-sulfatoethylsulfonyl)ethyl)amino or N-phenyl-N-(2-(2-sulfatoethylsulfonyl)ethyl)amino.

Examples of the group $Z^2$ are 2,4-difluoropyrimidin-6-yl, 4,6-difluoropyrimidin-2-yl, 5-chloro-2,4-difluoropyrimidin-6-yl, 5-chloro-4,6-difluoropyrimidin-2-yl, 4,5-difluoropyrimidin-6-yl, 5-chloro-4-fluoropyrimidin-6-yl, 2,4,5-trichloropyrimidin-6-yl, 4,5-dichloropyrimidin-6-yl, 2,4-dichloropyrimidin-6-yl, 4-fluoropyrimidin-6-yl, 4-chloropyrimidin-6-yl, or a group of the formula (5) having the above-indicated examples of $Q^1$ and $Q^2$, or a group of the formula (6).

Preferably $Z^2$ is 2,4-difluoropyrimidin-6-yl, 4,6-difluoropyrimidin-2-yl, 5-chloro-2,4-difluoropyrimidin-6-yl, 5-chloro-4,6-difluoropyrimidin-2-yl or a group of the formula (5) having the above-indicated preferred groups $Q^1$ and $Q^2$.

More preferably $Z^2$ is 2,4-difluoropyrimidin-6-yl, 5-chloro-2,4-difluoropyrimidin-6-yl or a group of the formula (5) having the above-indicated particularly preferred groups $Q^1$ and $Q^2$.

In formula (IV) T is preferably hydroxyl or amino, attached in α-position on the naphthalene nucleus, with particular preference being given to hydroxyl.

b and v are preferably 1 and f is 0.

$R^0$ is more preferably acetyl, 2,4-dichloro-1,3,5-triazin-6-yl or 2,4-difluoropyrimidin-6-yl.

Preferred dye mixtures comprise at least one dye of the formula (I)

(I)

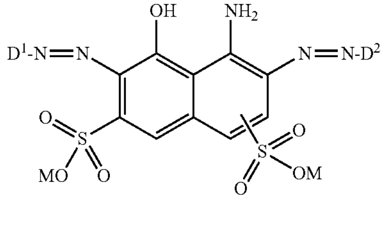

and at least one dye of the formula (II)

(II)

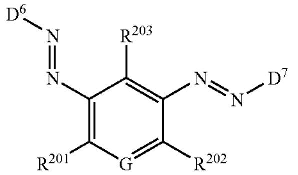

in which $D^1$, $D^2$, $D^6$, $D^7$, G, $R^{201}$, $R^{202}$, $R^{203}$ and M are as defined above, but no dyes of the formula (III) and (IV).

Further preferred dye mixtures comprise at least one dye of the formula (I)

(I)

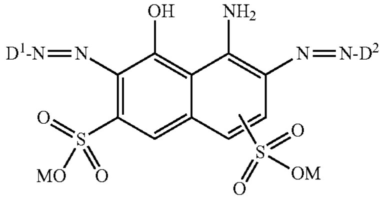

at least one dye of the formula (II)

(II)

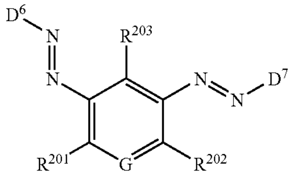

and at least one dye of the formula (III-a)

(III-a)

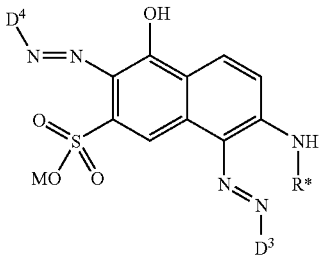

in which $D^1$, $D^2$, $D^3$, $D^4$, $D^6$, $D^7$, G, $R^{201}$, $R^{202}$, $R^{203}$, R* and M are as defined above.

Preferred mixtures are additionally those which comprise one or more dyes of the formula (I)

(I)

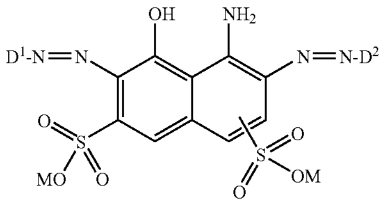

one or more dyes of the formula (II)

(II)

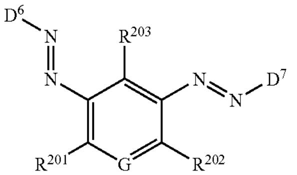

and one or more dyes of the formula (IV-a)

(IV-a)

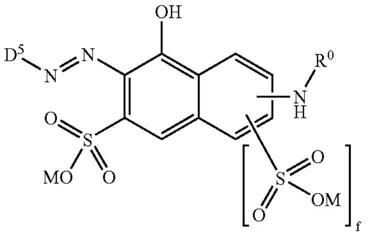

in which $D^1$, $D^2$, $D^5$, $D^6$, $D^7$, G, $R^{201}$, $R^{202}$, $R^{203}$, $R^o$, f and M are as defined above.

Further preferred dye mixtures comprise one or more dyes of the formula (I)

(I)

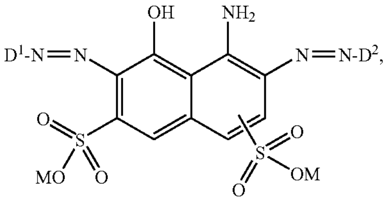

one or more, such as two or three, preferably 1 or 2, dyes of the formula (II)

(II)

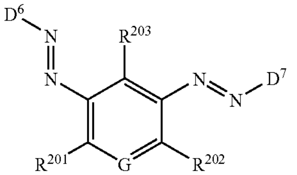

and one or more, such as two or three, preferably 1 or 2, dyes of the formula (III-b)

(III-b)

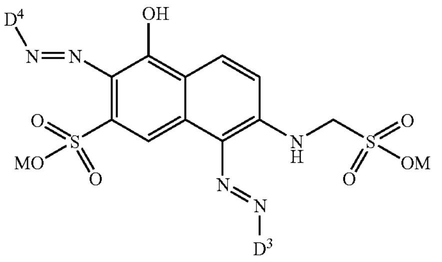

in which $D^1$, $D^2$, $D^3$, $D^4$, $D^6$, $D^7$, G, $R^{201}$, $R^{202}$, $R^{203}$ and M are as defined above.

With particular preference $D^1$, $D^2$, $D^3$, $D^4$, $D^6$ and $D^7$ independently of one another are 3-(β-sulfatoethylsulfonyl)phenyl, 4-(β-sulfatoethylsulfonyl)phenyl, 2-sulfo-4-(β-sulfatoethylsulfonyl)phenyl, 2-methoxy-5-(β-sulfatoethylsulfonyl)phenyl, 2,5-dimethoxy-4-(β-sulfatoethylsulfonyl)phenyl, 2-methoxy-5-methyl-4-(β-sulfatoethylsulfonyl)phenyl, 3- or 4-vinylsulfonylphenyl, 2-sulfo-4-(vinylsulfonyl)phenyl, 2-methoxy-5-(vinylsulfonyl)phenyl, 2,5-dimethoxy-4-(vinylsulfonyl)phenyl or 2-methoxy-5-methyl-4-(vinylsulfonyl)phenyl.

Particularly preferred reactive-dye mixtures of the invention comprise at least one dye of the formula (I-a)

(I-a)

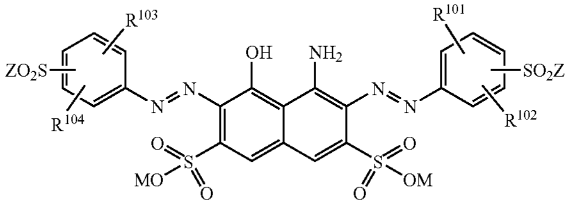

and at least one dye of the formula (II-a)

(II-a)

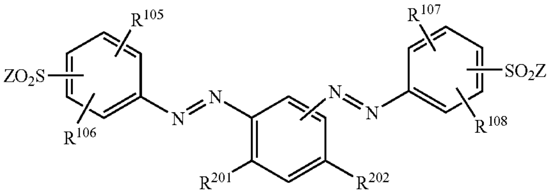

and optionally a dye of the formula (III-c)

(III-c)

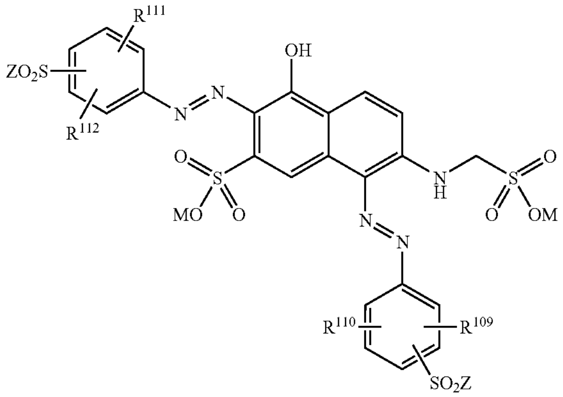

in which $R^{101}$ to $R^{112}$ independently of one another are hydrogen, $C_1$-$C_4$-alkyl, $C_1$-$C_4$-alkoxy, sulfo, carboxyl or halogen;

$R^{201}$ and $R^{202}$ independently of one another are amino or hydroxyl;

Z is vinyl, β-sulfatoethyl or hydroxyl; and

M is hydrogen, an alkali metal or one equivalent of an alkaline earth metal.

Additionally, further particularly preferred dye mixtures are those which comprise at least one dye of the formula (I-a), (I-a)

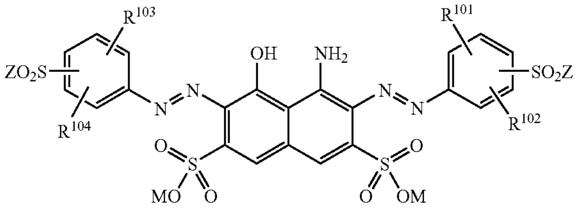

and at least one dye of the formula (II-b)

(II-b)

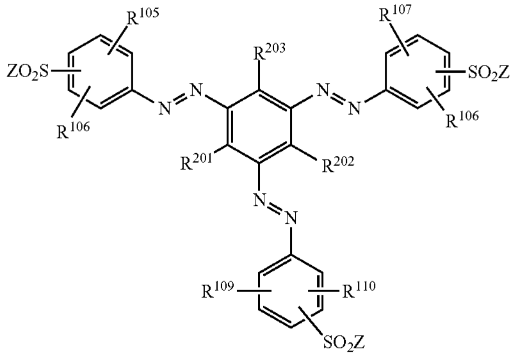

and optionally a dye of the formula (III-c), where $R^{101}$ to $R^{110}$ independently of one another are hydrogen, $C_1$-$C_4$-alkyl, $C_1$-$C_4$-alkoxy, sulfo, carboxyl or halogen;

$R^{201}$ and $R^{202}$ independently of one another are amino or hydroxyl;

$R^{203}$ is hydrogen, amino or hydroxyl;

Z is vinyl, β-sulfatoethyl or hydroxyl; and

M is hydrogen, an alkali metal or one equivalent of an alkaline earth metal.

Particularly preferred dye mixtures are additionally those which comprise at least one dye of the formula (I-a), (I-a)

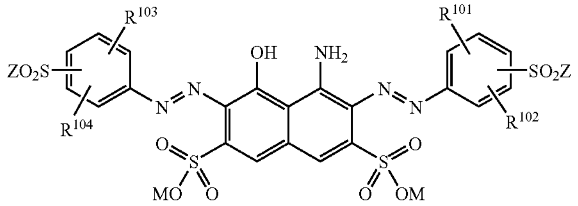

and at least one dye of the formula (II-c)

(II-c)

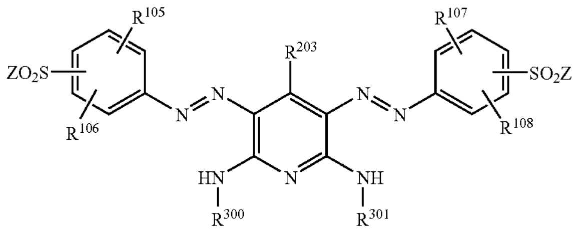

in which $R^{101}$ to $R^{108}$ independently of one another are hydrogen, $C_1$-$C_4$-alkyl, $C_1$-$C_4$-alkoxy, sulfo, carboxyl or halogen;

$R^{203}$, $R^{300}$ and $R^{301}$ independently of one another are hydrogen, $(C_1$-$C_4)$-alkyl, hydroxyl-, alkoxy-, amino-, alkylamino-, sulfo-, sulfato- or carboxyl-substituted $(C_1$-$C_4)$-alkyl or aryl;

z is vinyl, β-sulfatoethyl or hydroxyl; and

M is hydrogen, an alkali metal or one equivalent of an alkaline earth metal.

The dye mixtures of the invention contain preferably at least one dye of the formula (I) in an amount of 30% to 95% by weight, more preferably 50% to 90% by weight, at least one dye of the formula (II) in an amount of 70% to 5% by weight, more preferably 50% to 10% by weight, and dyes of the formula (III) and (IV) independently of one another preferably in each case in an amount of 0 to 65% by weight, more preferably 5% to 40% by weight.

As well as the dyes of the formulae (I) to (IV), the dye mixtures of the invention may comprise one or more monoazo dyes of the formulae (15) to (18) in an amount of up to 10% by weight, preferably up to 5% by weight, (15)

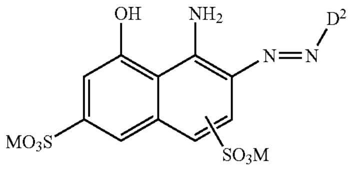

(16)

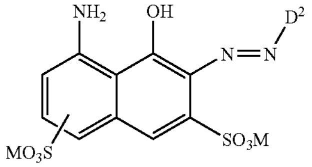

-continued (17)

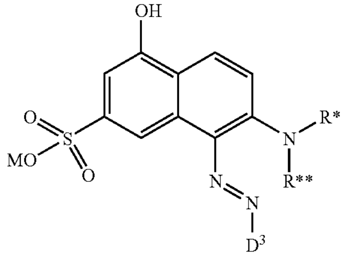

(18)

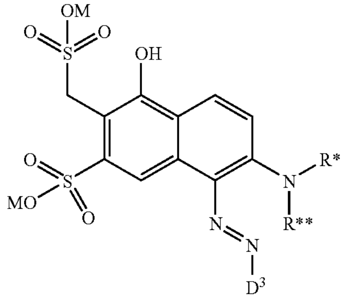

where $D^2$, $D^3$, M, R* and R** are as defined above.

Preferably $D^2$ and $D^3$ independently of one another are 3-(β-sulfatoethylsulfonyl)phenyl, 4-(β-sulfatoethylsulfonyl)phenyl, 2-sulfo-4-(β-sulfatoethylsulfonyl)phenyl, 2-methoxy-5-(β-sulfatoethylsulfonyl)phenyl, 2,5-dimethoxy-4-(β-sulfatoethylsulfonyl)phenyl, 2-methoxy-5-methyl-4-(β-sulfatoethylsulfonyl)phenyl, 3- or 4-vinylsulfonylphenyl, 2-sulfo-4-(vinylsulfonyl)phenyl, 2-methoxy-5-(vinylsulfonyl)phenyl, 2,5-dimethoxy-4-(vinylsulfonyl)phenyl or 2-methoxy-5-methyl-4-(vinylsulfonyl)phenyl.

Furthermore, the dye mixtures of the invention may also include one or more additional dyes as further co-components and/or as shading components. Examples include the dyes of the formulae (Ga)-(Gf)

(Ga)

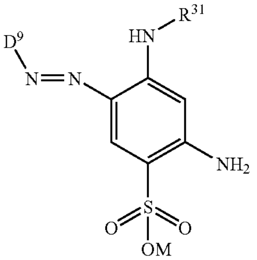

(Gb)

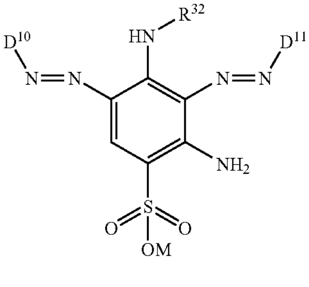

-continued (Gc)

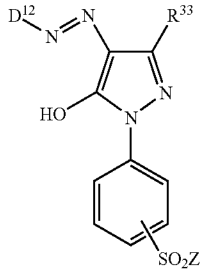

(Gd)

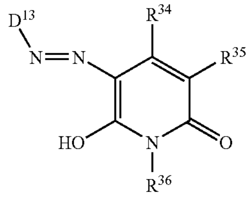

(Ge)

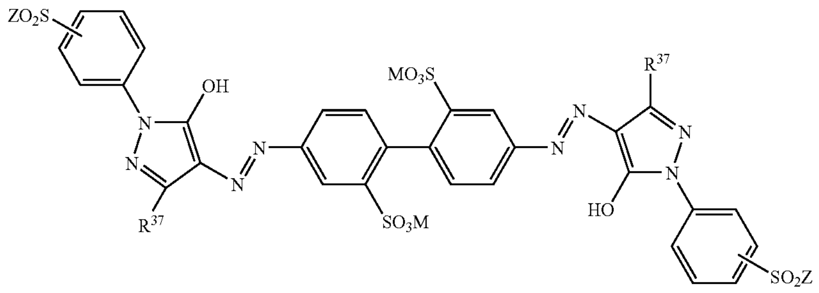

(Gf)

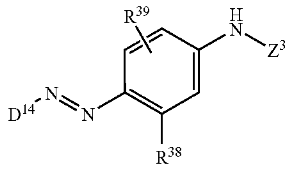

in which $D^9$, $D^{10}$, $D^{11}$, $D^{12}$, $D^{13}$ and $D^{14}$ possess one of the definitions of $D^1$, and $D^9$, if $R^{31}$ is not a group of the formula (4) or (5), and also $D^{10}$ or $D^{11}$ and $D^{13}$ contain at least one fiber-reactive group of the formula —$SO_2Z$ or $Z^2$;

$R^{31}$ is hydrogen, acetyl, carbamoyl or sulfomethyl or is a group of the formula (4-1) or (5-1), (4-1)

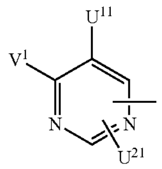

(5-1)

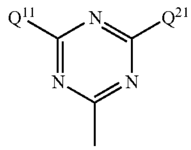

in which $V^1$ is fluorine or chlorine;

$U^{11}$ and $U^{21}$ independently of one another are fluorine, chlorine or hydrogen;

$Q^{11}$ and $Q^{21}$ independently of one another are chlorine, fluorine, cyanamide, hydroxyl, ($C_1$-$C_6$)-alkoxy, phenoxy, sulfophenoxy, mercapto, ($C_1$-$C_6$)-alkylmercapto, pyridino, carboxypyridino, carbamoylpyridino or a group of the formula (7-1) or (8-1)

(7-1)

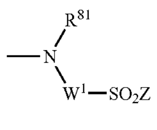

(8-1)

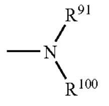

in which $R^{81}$ is hydrogen, ($C_1$-$C_6$)-alkyl, sulfo-($C_1$-$C_6$)-alkyl or phenyl which is unsubstituted or substituted by ($C_1$-$C_4$)-alkyl, ($C_1$-$C_4$)-alkoxy, sulfo, halogen, carboxyl, acetamido or ureido;

$R^{91}$ and $R^{100}$ independently of one another have one of the definitions of $R^{81}$ or form a cyclic ring system of the formula $-(CH_2)_j-$, in which j is 4 or 5, or $-(CH_2)_2$-E-$(CH_2)_2-$, in which E is oxygen, sulfur, sulfonyl or $-NR^{11}$ and $R^{11}$ is $(C_1-C_6)$-alkyl;

$W^1$ is phenylene; phenylene substituted by 1 or 2 substituents, such as $(C_1-C_4)$-alkyl, $(C_1-C_4)$-alkoxy, carboxyl, sulfo, chlorine or bromine, $(C_1-C_4)$-alkylene-arylene; $(C_2-C_6)$-alkylene; $(C_2-C_6)$-alkylene which is interrupted by oxygen, sulfur, sulfonyl, amino, carbonyl or carboxamido; phenylene-CONH-phenylene; phenylene-CONH-phenylene substituted by $(C_1-C_4)$-alkyl, $(C_1-C_4)$-alkoxy, hydroxyl, sulfo, carboxyl, amido, ureido or halogen; naphthylene; or naphthylene substituted by one or two sulfo groups;

Z is as defined above, and $R^{32}$ is hydrogen or sulfomethyl;

$R^{33}$ is methyl, carboxyl or carboxy-$(C_1-C_4)$-alkyl;

$R^{34}$ is hydrogen or methyl;

$R^{35}$ is hydrogen, cyano, carbamoyl, carboxyl or sulfomethyl;

$R^{36}$ is methyl, ethyl or β-sulfoethyl;

$R^{37}$ is methyl, carboxyl or carboxy-$(C_1-C_4)$-alkyl;

$R^{38}$ is acetamido, ureido or methyl;

$R^{39}$ is hydrogen, methyl or methoxy;

$Z^3$ has one of the definitions of $Z^2$; and

M and Z have one of the abovementioned definitions.

The dye mixtures of the invention can be prepared by methods which are conventional per se and are known to the skilled worker.

One preferred preparation method comprises mechanically mixing the individual dyes of the formulae (I) and (II), and also, if desired, of the formulae (III), (IV), (15) to (18), and (Ga) to (Gf) in the desired mixing ratio.

These dyes can be used in the form of dye powders or dye granules, of synthesis solutions or of aqueous solutions in general, which may additionally include typical auxiliaries.

In another preferred preparation method for dye mixtures of the invention, suitable mixtures of diazo components and coupling components are reacted in the desired proportions in diazotization and coupling reactions familiar to the skilled worker.

Dyes of the formula (I) are described in great number in the literature and are known for example from U.S. Pat. No. 2,657,205, JP Sho-58-160 362, and also from U.S. Pat. No. 4,257,770 and the references given therein.

Dyes of the formula (III) are described for example in JP 8060017 and DE 196 00 765 A1.

Dyes of the formula (IV) are likewise described in large number and are available via standard synthesis methods.

Dyes of the formulae (15) to (18) are in some cases formed during the synthesis of dyes of the formula (I) and (III), and are likewise available via standard synthesis methods.

Dyes of the formula (Ga)-(Gf) are known from the literature and are available by standard processes.

Dyes similar to the dyes of the formula (II) are known from EP 1 035 171 A1, WO 2004/069937 and EP 1 669 415 A1. The dyes of the formula (II) themselves, however, are new and are likewise provided by the present specification.

The present specification accordingly provides dyes of the formula (II)

(II)

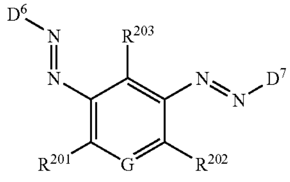

in which $D^6$ and $D^7$ independently of one another are a group of the formula (I)

(1)

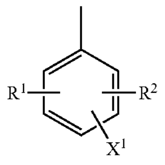

in which $R^1$ and $R^2$ independently of one another are hydrogen, $(C_1-C_4)$-alkyl, $(C_1-C_4)$-alkoxy, hydroxyl, sulfo, carboxyl, cyano, nitro, amido, ureido or halogen;

$X^1$ is hydrogen or a group of the formula $-SO_2-Z$, where Z is $-CH{=}CH_2$, $-CH_2CH_2Z^1$ or hydroxyl, in which $Z^1$ is hydroxyl or a group which can be eliminated under the action of alkali; or $D^6$ and $D^7$ independently of one another are a naphthyl group of the formula (2)

(2)

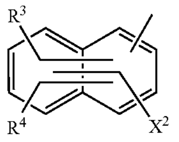

in which $R^3$ and $R^4$ independently of one another are hydrogen, $(C_1-C_4)$-alkyl, $(C_1-C_4)$-alkoxy, hydroxyl, sulfo, carboxyl, cyano, nitro, amido, ureido or halogen; and $X^2$ has one of the definitions of $X^1$; or $D^6$ and $D^7$ independently of one another are a group of the formula (3)

(3)

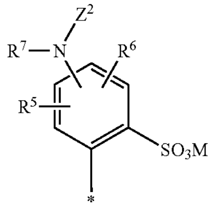

in which $R^5$ and $R^6$ independently of one another have one of the definitions of $R^1$ and $R^2$;

$R^7$ is hydrogen, $(C_1-C_4)$-alkyl, or phenyl which is unsubstituted or substituted by $(C_1-C_4)$-alkyl, $(C_1-C_4)$-alkoxy, sulfo, halogen or carboxyl; and $Z^2$ is a group of the formula (4) or (5) or (6)

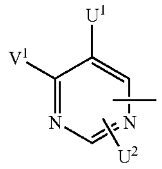

(4)

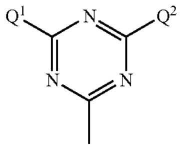

(5)

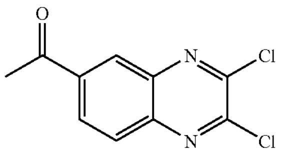

(6)

in which

V is fluorine or chlorine;

$U^1$ and $U^2$ independently of one another are fluorine, chlorine or hydrogen;

$Q^1$ and $Q^2$ independently of one another are chlorine, fluorine, cyanamide, hydroxyl, $(C_1\text{-}C_6)$-alkoxy, phenoxy, sulfophenoxy, mercapto, $(C_1\text{-}C_6)$-alkylmercapto, pyridino, carboxypyridino, carbamoylpyridino or a group of the formula (7) or

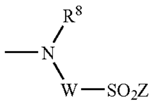

(7)

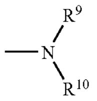

(8)

in which $R^8$ is hydrogen or $(C_1\text{-}C_6)$-alkyl, sulfo-$(C_1\text{-}C_6)$-alkyl or phenyl which is unsubstituted or substituted by $(C_1\text{-}C_4)$-alkyl, $(C_1\text{-}C_4)$-alkoxy, sulfo, halogen, carboxyl, acetamido or ureido;

$R^9$ and $R^{10}$ have independently of one another one of the definitions of $R^8$, or form a cyclic ring system of the formula $-(CH_2)_j-$ where j is 4 or 5, or alternatively $-(CH_2)_2\text{-E-}(CH_2)_2-$, where E is oxygen, sulfur, sulfonyl or $-NR^{11}$ with $R^{11}=(C_1\text{-}C_6)$-alkyl;

W is phenylene which is unsubstituted or substituted by 1 or 2 substituents, such as $(C_1\text{-}C_4)$-alkyl, $(C_1\text{-}C_4)$-alkoxy, carboxyl, sulfo, chlorine or bromine, or is $(C_1\text{-}C_4)$-alkylene-arylene or $(C_2\text{-}C_6)$-alkylene which is interrupted by oxygen, sulfur, sulfonyl, amino, carbonyl or carboxamido, or is phenylene-CONH-phenylene which is unsubstituted or substituted by $(C_1\text{-}C_4)$-alkyl, $(C_1\text{-}C_4)$-alkoxy, hydroxyl, sulfo, carboxyl, amido, ureido or halogen, or is naphthylene which is unsubstituted or substituted by one or two sulfo groups; and Z is as defined above; or $D^6$ and $D^7$ independently of one another are a group of the formula (9)

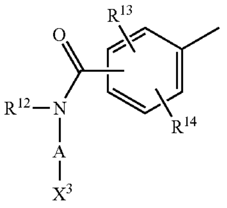

(9)

in which $R^{12}$ is hydrogen, $(C_1\text{-}C_4)$-alkyl, aryl or a substituted aryl radical;

$R^{13}$ and $R^{14}$ independently of one another are hydrogen, $(C_1\text{-}C_4)$-alkyl, $(C_1\text{-}C_4)$-alkoxy, hydroxyl, sulfo, carboxyl, cyano, nitro, amido, ureido or halogen; and A is a phenylene group of the formula (10)

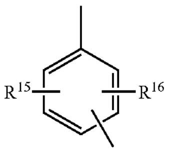

(10)

in which $R^{15}$ and $R^{16}$ independently of one another are hydrogen, $(C_1\text{-}C_4)$-alkyl, $(C_1\text{-}C_4)$-alkoxy, hydroxyl, sulfo, carboxyl, cyano, nitro, amido, ureido or halogen; or A is a naphthylene group of the formula (11)

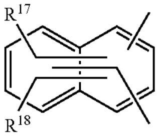

(11)

in which $R^{17}$ and $R^{18}$ independently of one another are hydrogen, $(C_1\text{-}C_4)$-alkyl, $(C_1\text{-}C_4)$-alkoxy, hydroxyl, sulfo, carboxyl, cyano, nitro, amido, ureido or halogen; or A is a polymethylene group of the formula (12)

$$-(CR^{19}R^{20})_k- \quad (12)$$

in which k is an integer greater than 1; and $R^{19}$ and $R^{20}$ independently of one another are hydrogen, $(C_1\text{-}C_4)$-alkyl, $(C_1\text{-}C_4)$-alkoxy, hydroxyl, cyano, amido, halogen or aryl; and $X^3$ has one of the definitions of $X^1$;

G is $C-R^{200}$ or N, in which $R^{200}$ is hydrogen, $C_1\text{-}C_6$-alkyl, which is unsubstituted or substituted by amino, $(C_1\text{-}C_4)$-alkylamino, hydroxyl, $(C_1\text{-}C_4)$-alkoxy, sulfo, halogen, carboxyl, acetamido or ureido, or is phenyl which is unsubstituted or substituted by $(C_1\text{-}C_4)$-alkyl, $(C_1\text{-}C_4)$-alkoxy, sulfo, halogen, carboxyl, acetamido or ureido, or is sulfo, carboxyl, cyano or halogen, or is a group of the formula (100);

$$-N-N\text{-}D^8 \quad (100)$$

in which $D^8$ possesses one of the definitions of $D^1$ or is a group of the formula (101)

(101)

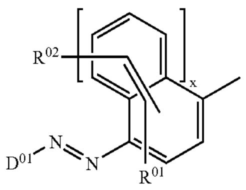

in which $D^{01}$ possesses one of the definitions of $D^1$;

$R^{01}$ and $R^{02}$ independently of one another are hydrogen, $C_1$-$C_6$-alkyl, amino, ($C_1$-$C_4$)-alkylamino, hydroxyl, ($C_1$-$C_4$)-alkoxy, acetamido, ureido, sulfo or carboxyl;

x is 0 or 1;

$R^{201}$ and $R^{202}$ independently of one another are amino, hydroxyl, ($C_1$-$C_4$)-alkylamino, ($C_1$-$C_4$)-alkoxy or mercapto; or one of the radicals $R^{201}$ and $R^{202}$ is hydrogen and the other has one of the aforementioned definitions;

$R^{203}$ is hydrogen, $C_1$-$C_{10}$-alkyl, which is unsubstituted or substituted by amino, ($C_1$-$C_4$)-alkylamino, hydroxyl, ($C_1$-$C_4$)-alkoxy, sulfo, halogen, carboxyl, acetamido or ureido, or is phenyl which is unsubstituted or substituted by ($C_1$-$C_4$)-alkyl, ($C_1$-$C_4$)-alkoxy, sulfo, halogen, carboxyl, acetamido or ureido, or is amino, ($C_1$-$C_4$)-alkylamino, hydroxyl, ($C_1$-$C_4$)-alkoxy, sulfo, carboxyl, cyano, halogen, nitro, amido or ureido;

where the dye of the formula (II) contains at least one fiber-reactive group of the formula —$SO_2$—Z or —$Z^2$; and where the dyes where $R^{201}$ and $R^{202}$ are both amino, $R^{203}$ is carboxyl, G is C—$R^{200}$ and $R^{200}$ is a radical formula (100), where $D^8$ is a radical of the formula (1-2) and one of the radicals $D^6$ and $D^7$ is a radical of the formula (1-3) and the other is a radical of the formula (1-2) or both of the radicals $D^6$ and $D^7$ are a radical of the formula (1-2); and the dye where $R^{201}$ and $R^{202}$ are both amino, $R^{203}$ is carboxyl, G is C—$R^{200}$ and $R^{200}$ is a radical formula (100), where $D^8$ is a radical of the formula (1-5), and one of the radicals $D^6$ and $D^7$ is a radical of the formula (14) and the other is a radical of the formula (1-5); and the dyes where $R^{201}$ and $R^{202}$ are both hydroxy, $R^{203}$ is hydrogen, G is C—$R^{200}$ and $R^{200}$ is hydrogen and one of the radicals $D^6$ and $D^7$ is a radical of the formula (1-2) and the other is a radical of the formula (1-9), (1-10) or (1-11); and the dyes where $R^{201}$ and $R^{202}$ are both amino, $R^{203}$ is carboxyl, G is C—$R^{200}$ and $R^{200}$ is hydrogen and $D^9$ and $D^7$ are both a radical of the formula (1-2) or one of the radicals $D^6$ and $D^7$ is a radical of the formula (1-1) and the other is a radical of the formula (1-2); and the dye where $R^{201}$ and $R^{202}$ are both amino, $R^{203}$ is carboxyl, G is C—$R^{200}$ and $D^{200}$ is hydrogen and the radicals $D^6$ and $D^7$ are both a radical of the formula (1-6); and the dye where $R^{201}$ and $R^{202}$ are both amino, $R^{203}$ is carboxyl, G is C—$R^{200}$ and $R^{200}$ is hydrogen and one of the radicals $D^6$ and $D^7$ is a radical of the formula (1-1) and the other is a radical of the formula (1-6); and the dye where $R^{201}$ and $R^{202}$ are both amino, $R^{203}$ is carboxyl, G is C—$R^{200}$ and $R^{200}$ is hydrogen and one of the radicals $D^6$ and $D^7$ is a radical of the formula (1-7) and the other is a radical of the formula (1-8); and the dye where $R^{201}$ and $R^{202}$ are both amino, $D^{203}$ is hydrogen, G is C—$R^{200}$ and $R^{200}$ is hydrogen and $D^6$ and $D^7$ are both a radical of the formula (1-1)

(1-1)

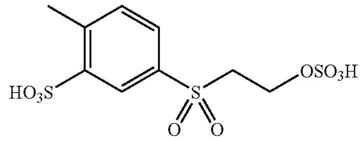

(1-2)

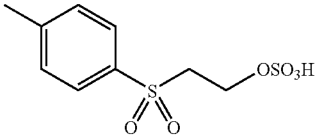

(1-3)

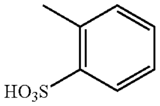

(1-4)

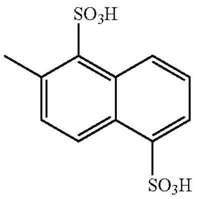

(1-5)

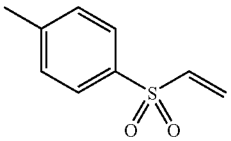

(1-6)

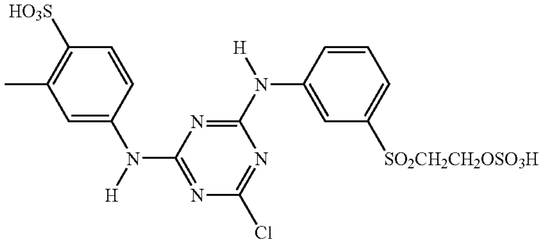

(1-7)

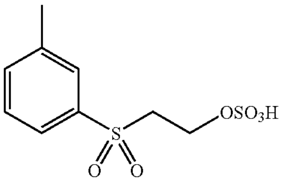

(1-8)

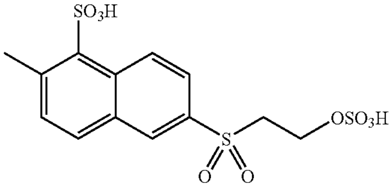

(1-9)

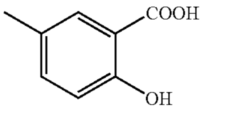

-continued (1-10)

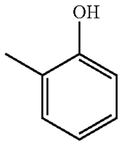

(1-11)

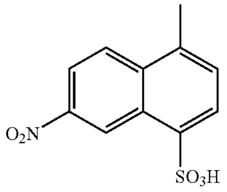

are excluded

Preferred dyes of the formula (II) have the definitions of $D^6$, $D^7$, $R^{201}$ to $R^{203}$ and G and/or C—$R^{200}$ that were identified above as being preferred or particularly preferred.

The dyes of the formula (II) of the invention can be prepared for example by diazotizing an amine of the formula (19)

$$D^7\text{-}NH_2 \quad (19),$$

in which $D^7$ is defined as indicated above, and subsequently coupling the resultant diazonium compound onto a compound of the formula (24)

(24)

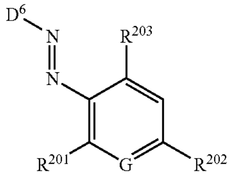

in which $D^6$, $R^{201}$ to $R^{203}$ and C are defined as indicated above.

Diazotization and coupling reactions are known to the skilled worker and described at length in the literature.

The compound of the formula (24) is obtainable by diazotizing an amine of the formula (25), $$D^6\text{-}NH_2 \quad (25)$$

in which $D^6$ is defined as indicated above, and subsequently coupling the product onto a compound of the formula (26)

(26)

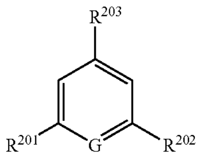

in which $R^{201}$, $R^{202}$, $R^{203}$ and G are as defined above.

Compounds of the formula (26) are preparable by common methods of preparative chemistry.

The formula (II) dyes and dye mixtures of the invention may be present as a preparation in solid or in liquid (dissolved) form. In solid form they include, where necessary, the electrolyte salts which are customary in the case of water-soluble and, in particular, fiber-reactive dyes, such as sodium chloride, potassium chloride and sodium sulfate, and may further include the auxiliaries that are customary in commercial dyes, such as buffer substances capable of setting a pH in aqueous solution of between 3 and 7, such as sodium acetate, sodium citrate, sodium borate, sodium hydrogen carbonate, sodium dihydrogen phosphate and disodium hydrogen phosphate, and also dyeing assistants, dedusting agents and small amounts of siccatives; if they are present in liquid aqueous solution (including the presence of thickeners of the type customary in printing pastes) they may also include substances which ensure the keeping properties of these preparations, such as mold preventatives, for example.

In solid form the formula (II) dyes and dye mixtures of the invention are generally in the form of powders or granules (referred to in general below as preparations) containing electrolyte salt and where appropriate with one or more of the above-mentioned auxiliaries. The preparations contain the dye mixture at 20% to 90% by weight, based on the preparation comprising it. The buffer substances are generally present in a total amount of up to 5% by weight, based on the preparation.

Where the formula (II) dyes and dye mixtures of the invention are in aqueous solution, the total dye content of these aqueous solutions is up to about 50% by weight, such as between 5% and 50% by weight, for example, with the electrolyte salt content of these aqueous solutions being preferably below 10% by weight, based on the aqueous solution; the aqueous solutions (liquid preparations) may contain the aforementioned buffer substances generally in an amount of up to 5% by weight, preferably up to 2% by weight.

The formula (II) dyes and dye mixtures of the invention possess valuable performance properties. They are used for dyeing or printing hydroxyl- and/or carboxamido-containing materials, in the form for example of sheetlike structures, such as paper and leather, or of films, such as of polyamide, for example, or in the mass, such as of polyamide and polyurethane, for example, but in particular for dyeing or printing these materials in fiber form. The solutions of the dyes and dye mixtures of the invention that are obtained in the course of the synthesis can also be used directly as a liquid preparation for dyeing, where appropriate following addition of a buffer substance and, where appropriate, after concentration or dilution.

The present invention hence also provides for the use of the dyes and dye mixtures of the invention for dyeing or printing these materials, and provides methods of dyeing or printing such materials in conventional ways, wherein a dye mixture of the invention or its individual components (dyes) individually is or are used together as colorants. The materials are preferably employed in the form of fiber materials, particularly in the form of textile fibers, such as woven fabrics or yarns, as in the form of hanks or wound packages.

Hydroxyl-containing materials are those of natural or synthetic origin, such as cellulose fiber materials or their regenerated products and polyvinyl alcohols, for example. Cellulose fiber materials are preferably cotton, but also other plant fibers, such as linen, hemp, jute and ramie fibers; regenerated cellulose fibers are, for example, staple viscose and filament viscose, and also chemically modified cellulose fibers, such as aminated cellulose fibers or fibers as described, for example, in WO 96/37641 and WO 96/37642 and also in EP-A-0 538 785 and EP-A-0 692 559.

Carboxamido-containing materials are, for example, synthetic and natural polyamides and polyurethanes, particularly in the form of fibers, examples being wool and other animal hairs, silk, leather, nylon-6,6, nylon-6, nylon-11 and nylon-4.

The dyes and dye mixtures of the invention can be applied to and fixed on the stated substrates, in particular the stated fiber materials, by the application techniques that are known for water-soluble dyes and especially for fiber-reactive dyes. For instance, on cellulose fibers by the exhaust methods from a long liquor and also from a short liquor, in a liquor-to-goods ratio of 5:1 to 100:1, for example, preferably 6:1 to 30:1, using any of a wide variety of acid-binding agents and, where appropriate, neutral salts as far as is necessary, such as sodium chloride or sodium sulfate, they produce dyeings having very good color yields. Dyeing takes place preferably in an aqueous bath at temperatures between 40 and 105° C., where appropriate at a temperature up to 130° C. under superatmospheric pressure, but preferably at 30 to 95° C., especially 45 to 65° C., and in the presence where appropriate of customary dyeing assistants. One possible procedure here is to introduce the material into the warm bath and gradually to heat the bath to the desired dyeing temperature, and to complete the dyeing operation at that temperature. The neutral salts which accelerate the exhaustion of the dyes may also, if desired, be added to the bath only after the actual dyeing temperature has been reached.

Padding processes likewise provide excellent color yields and very good color buildup on cellulose fibers, the dyes being fixable in conventional manner by batching at room temperature or elevated temperature, at up to about 60° C. for example, or in a continuous dyeing procedure, by means for example of a pad-dry-pad steam process, by steaming or using dry heat.

Similarly, the customary printing processes for cellulose fibers, which can be carried out in one step, by means of printing, for example, with a print paste containing sodium bicarbonate or another acid-binding agent, and by subsequent steaming at 100 to 103° C., or in two steps, by printing, for example, with a neutral to weakly acidic printing ink and then fixing either by passing the printed material through a hot alkaline bath containing electrolyte, or by overpadding it with an alkaline, electrolyte-containing padding liquor and subsequently batching or steaming or dry-heat-treating the alkali-overpadded material, produce strongly colored prints with well-defined contours and a clear white ground. The extent to which the outcome of the prints is dependent on fluctuations in fixing conditions is low.

When fixing by means of dry heat in accordance with the customary thermofix processes, hot air at 120 to 200° C. is used. In addition to the customary steam at 101 to 103° C. it is also possible to use superheated steam and pressurized steam with temperatures of up to 160° C.

The acid-binding agents which effect the fixation of the dyes in the dye mixtures of the invention on the cellulose fibers are, for example, water-soluble basic salts of alkali metals and likewise alkaline earth metals of organic or inorganic acids or compounds which liberate alkali when heated, and also alkali metal silicates. Mention may be made in particular of the alkali metal hydroxides and alkali metal salts of weak to moderately strong organic or inorganic acids, the alkali metal compounds referred to being preferably the sodium and potassium compounds. Examples of such acid-binding agents are sodium hydroxide, potassium hydroxide, sodium carbonate, sodium bicarbonate, potassium carbonate, sodium formate, sodium dihydrogen phosphate, disodium hydrogen phosphate, sodium trichloroacetate, trisodium phosphate or waterglass or mixtures thereof, such as mixtures of sodium hydroxide solution and waterglass, for example.

The present invention further provides for the use of the dyes and dye mixtures of the invention in printing inks for digital textile printing by the inkjet process.

The printing inks of the present invention comprise one or more of the reactive dyes or reactive dye mixtures stated, for example in amounts from 0.1% by weight to 50% by weight, preferably in amounts from 1% by weight to 30% by weight and more preferably in amounts from 1% by weight to 15% by weight based on the total weight of the ink. They may also include combinations of the aforementioned reactive dyes with other reactive dyes used in textile printing. For the inks to be used in the continuous flow process, a conductivity of 0.5 to 25 mS/m can be set by adding an electrolyte.

Useful electrolytes include for example lithium nitrate and potassium nitrate.

The dye inks of the present invention may include organic solvents at a total level of 1-50% and preferably 5-30% by weight.

Suitable organic solvents are for example alcohols, for example methanol, ethanol, 1-propanol, isopropanol, 1-butanol, tert-butanol, pentyl alcohol, polyhydric alcohols for example: 1,2-ethanediol, 1,2,3-propanetriol, butanediol, 1,3-butanediol, 1,4-butanediol, 1,2-propanediol, 1,3-propanediol, pentanediol, 1,4-pentanediol, 1,5-pentanediol, hexanediol, D,L-1,2-hexanediol, 1,6-hexanediol, 1,2,6-hexanetriol, 1,2-octanediol, polyalkylene glycols, for example: polyethylene glycol, polypropylene glycol, alkylene glycols having 2 to 8 alkylene groups, for example monoethylene glycol, diethylene glycol, triethylene glycol, tetraethylene glycol, thioglycol, thiodiglycol, butyltriglycol, hexylene glycol, propylene glycol, dipropylene glycol, tripropylene glycol, low alkyl ethers of polyhydric alcohols, for example: ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, diethylene glycol monohexyl ether, triethylene glycol monomethyl ether, triethylene glycol monobutyl ether, tripropylene glycol monomethyl ether, tetraethylene glycol monomethyl ether, tetraethylene glycol monobutyl ether, tetraethylene glycol dimethyl ether, propylene glycol monomethyl ether, propylene glycol monoethyl ether, propylene glycol monobutyl ether, tripropylene glycol isopropyl ether, polyalkylene glycol ethers, such as for example: polyethylene glycol monomethyl ether, polypropylene glycol glycerol ether, polyethylene glycol tridecyl ether, polyethylene glycol nonylphenyl ether, amines, such as, for example: methylamine, ethylamine, diethylamine, triethylamine, dimethylamine, trimethylamine, dibutylamine, diethanolamine, triethanolamine, N-acetylethanolamine, N-formylethanolamine, ethylenediamine, urea derivatives, such as for example: urea, thiourea, N-methylurea, N,N'-dimethylurea, ethyleneurea, 1,1,3,3-tetramethylurea, amides, such as for example: dimethylformamide, dimethylacetamide, acetamide, ketones or keto alcohols, such as for example: acetone, diacetone alcohol, cyclic ethers, such as for example; tetrahydrofuran, dioxane, trimethylolethane, trimethylolpropane, 2-butoxyethanol, benzyl alcohol, gamma-butyrolactone, epsilon-caprolactam, further sulfolane, dimethylsulfolane, methylsulfolane, dimethyl sulfone, butadiene sulfone, dimethyl sulfoxide, dibutyl sulfoxide, N-cyclohexylpyrrolidone, N-methyl-2-pyrrolidone, N-ethylpyrrolidone, 2-pyrrolidone, 1-(2-hydroxyethyl)-2-pyrrolidone, 1-(3-hydroxypropyl)-2-pyrrolidone, 1,3-dimethyl-2-imidazolidinone, 1,3-dimethyl-2-imidazolinone, 1,3-bismethoxymethylimidazolidine, 2-(2-methoxyethoxy)ethanol, 2-(2-ethoxyethoxy)ethanol, 2-(2-butoxyethoxy)ethanol, 2-(2-propoxyethoxy)ethanol, pyridine, piperidine, trimethoxypropane, 1,2-dimethoxypropane, ethyl acetate, ethylenediaminetetraacetate, ethyl pentyl ether.

The printing inks of the invention may further include customary additives, for example viscosity moderators to set viscosities in the range from 1.5 to 40.0 mPas in a temperature range from 20 to 50° C. Preferred inks have a viscosity of 1.5 to 20 mPas and particularly preferred inks have a viscosity of 1.5 to 15 mPas.

Useful viscosity moderators include rheological additives, for example: polyvinylcaprolactam, polyvinylpyrrolidone and their copolymers polyetherpolyol, associative thickeners, polyurea, polyurethane, sodium alginates, modified galactomannans, polyetherurea, polyurethane, nonionic cellulose ethers.

As further additives the inks of the invention may include surface-active substances to set surface tensions of 20 to 65 mN/m, which are adapted if necessary as a function of the process used (thermal or piezo technology).

Useful surface-active substances include for example: all surfactants, preferably nonionic surfactants, butyldiglycol, 1,2-hexanediol.

The inks may further include customary additives, for example substances to inhibit fungal and bacterial growth in amounts from 0.01% to 1% by weight based on the total weight of the ink.

The inks may be prepared in a conventional manner by mixing the components in water.

The dye inks of the invention are useful in inkjet printing processes for printing a wide variety of pretreated materials, such as silk, leather, wool, polyamide fibers and polyurethanes, and especially cellulosic fiber materials of any kind. Such fiber materials are for example the natural cellulose fibers, such as cotton, linen and hemp, and also pulp and regenerated cellulose. The printing inks of the invention are also useful for printing pretreated hydroxyl- or amino-containing fibers present in blend fabrics, for example blends of cotton, silk, wool with polyester fibers or polyamide fibers.

In contrast to conventional textile printing, where the printing ink already contains all the fixing chemicals and thickeners for a reactive dye, in inkjet printing the auxiliaries have to be applied to the textile substrate in a separate pretreatment step.

The pretreatment of the textile substrate, for example cellulose and regenerated cellulose fibers and also silk and wool, is effected with an aqueous alkaline liquor prior to printing. To fix reactive dyes there is a need for alkali, for example sodium carbonate, sodium bicarbonate, sodium acetate, trisodium phosphate, sodium silicate, sodium hydroxide, alkali donors such as, for example, sodium chloroacetate, sodium formate, hydrotropic substances such as, for example, urea, reduction inhibitors, for example sodium nitrobenzenesulfonates, and also thickeners to prevent flowing of the motifs when the printing ink is applied, for example sodium alginates, modified polyacrylates or highly etherified galactomannans.

These pretreatment reagents are uniformly applied to the textile substrate in a defined amount using suitable applicators, for example using a 2- or 3-roll pad, using contactless spraying technologies, by means of foam application or using appropriately adapted inkjet technologies, and subsequently dried.

After printing, the textile fiber material is dried at 120 to 150° C. and subsequently fixed.

The fixing of the inkjet prints prepared with reactive dyes may be effected at room temperature or with saturated steam, with superheated steam, with hot air, with microwaves, with infrared radiation, with laser or electron beams or with other suitable energy transfer techniques.

A distinction is made between one- and two-phase fixing processes:

In one-phase fixing, the necessary fixing chemicals are already on the textile substrate.

In two-phase fixing, this pretreatment is unnecessary. Fixing only requires alkali, which, following inkjet printing, is applied prior to the fixing process, without intermediate drying. There is no need for further additives such as urea or thickener. Fixing is followed by the print aftertreatment, which is the prerequisite for good fastness properties, high brilliance and an impeccable white ground.

The dyes and dye mixtures according to the invention are notable for outstanding color strength when applied to the cellulose fiber materials by dyeing or printing, said strength being in some cases attainable even in the presence of no or very small amounts of alkali or alkaline earth metal compounds. In these special cases, for instance, no electrolyte salt is required for a shallow depth of shade, not more than 5 g/l of electrolyte salt is required for a medium depth of shade and not more than 10 g/l of electrolyte salt is required for deep shades.

In this context a shallow depth of shade refers to the use of 2% by weight of dye based on the substrate to be dyed, a medium depth of shade refers to the use of 2% to 4% by weight of dye based on the substrate to be dyed, and a deep shade refers to the use of 4% to 10% by weight of dye based on the substrate to be dyed.

The dyeings and prints obtainable with the dyes and dye mixtures according to the invention possess bright shades; more particularly, the dyeings and prints on cellulose fiber materials possess good lightfastness and especially good wetfastness properties, such as fastness to washing, milling, water, seawater, crossdyeing and acidic and alkaline perspiration, and also good fastness to pleating, hot pressing, and rubbing. Furthermore, the cellulose dyeings obtained following the customary aftertreatment of rinsing to remove unfixed dye portions exhibit excellent wetfastness properties, in particular since unfixed dye portions are easily washed off because of their good solubility in cold water.

The dyes or dye mixtures of the invention can also be used, furthermore, for the fiber-reactive dyeing of wool. This includes wool which has been given a nonfelting or lowfelting finish (cf., for example, H. Rath, Lehrbuch der Textilchemie, Springer-Verlag, 3rd edition (1972), pp. 295-9, particularly wool finished by the Hercosett process (p. 298); J. Soc. Dyers and Colourists 1972, 93-9, and 1975, 33-44) with very good fastness properties. Dyeing on wool takes place in conventional manner from an acidic medium. For instance, acetic acid and/or ammonium sulfate or acetic acid and ammonium acetate or sodium acetate can be added to the dyebath in order to obtain the desired pH. To achieve a practicable levelness in the dyeing it is advisable to add customary leveling assistants, such as those based, for example, on a reaction product of cyanuric chloride with three times the molar amount of an aminobenzenesulfonic acid and/or an aminonaphthalenesulfonic acid or based on a reaction product of, for example, stearylamine with ethylene oxide. Thus, for example, the dye mixture of the invention is preferably subjected first to the exhaust operation from an acidic dye bath having a pH of about 3.5 to 5.5, under pH control, and then, toward the end of the dyeing time, the pH is shifted into the neutral and, where appropriate, weakly alkaline range up to a pH of 8.5, in order to bring about, especially for very deep dyeings, the full reactive bond between the dyes of the dye mixtures of the invention and the fiber. At the same time the fraction of dye not reactively bound is detached.

The procedure described here also applies to the production of dyeings on fiber materials composed of other natural polyamides or of synthetic polyamides and polyurethanes. In general the material to be dyed is introduced into the bath at a temperature of about 40° C., agitated therein for a certain time, and then the dyebath is adjusted to the desired weakly acidic, preferably weakly acetic acid, pH and the actual dyeing is carried out at a temperature between 60 and 98° C. Alternatively the dyeings can be performed at boiling temperature or, in closed dyeing apparatus, at temperatures of up to 106° C. Since the water solubility of the dye mixtures of the invention is very good they can also be used with advantage in customary continuous dyeing processes. The color strength of the dye mixtures of the invention is very high.

On the stated materials, preferably fiber materials, the dye mixtures of the invention produce navy to deep-black dyeings having very good fastness properties.

On the stated materials, the dyes of the formula (II) of the invention produce orange-yellow to brown dyeings having likewise good fastness properties.

The examples which follow serve to illustrate the invention. Parts and percentages are by weight unless noted otherwise. The relationship of parts by weight to parts by volume is that of the kilogram to the liter. The compounds described by formula in the examples are written in the form of the sodium salts, since they are generally prepared and isolated in the form of their salts, preferably sodium or potassium salts, and are used in the form of their salts for coloring. The starting compounds specified in the examples below, especially tabular examples, can be used in the synthesis in the form of the free acid or likewise in the form of their salts, preferably alkali metal salts, such as sodium or potassium salts.

A. Examples of compounds of the formula (II)

EXAMPLE 1

12.7 parts of 2-aminobenzene-1,4-disulfonic acid are diazotized with 8.8 parts of a 40% strength sodium nitrite solution in a medium containing sulfuric acid and the product is then coupled onto 5.4 parts of 1,3-diaminobenzene in an aqueous medium at 5-10° C. and a pH of 1.5-2.5.

This gives an aqueous solution of 20.8 parts of the yellow monoazo dye of the formula (24-1)

(24-1)

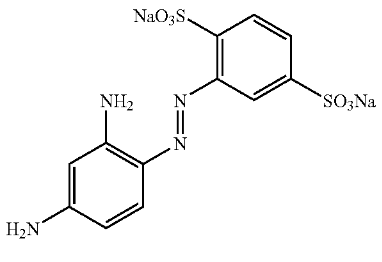

In a separate reaction vessel 28.5 parts of 4-(β-sulfatoethylsulfonyl)aniline are suspended in 70 parts of ice-water and 18.5 parts of 30% strength hydrochloric acid and diazotized by dropwise addition of 17.9 parts of 40% strength sodium nitrite solution. Following removal of the excess nitrite with amidosulfonic acid, this diazo suspension is added to the first coupling stage (24-1) from a) and, using sodium carbonate, a pH of 5-5 is set, which is kept constant by further addition of sodium carbonate up until the end of the second and third coupling at 15-20° C. for 1-2 hours. The resultant trisazo dye of the formula (II-1) is isolated by evaporation in vacuo or spray drying. This gives 88 parts of a salt-containing, dark brown solid which contains the dye of the formula (II-1)

(II-1)

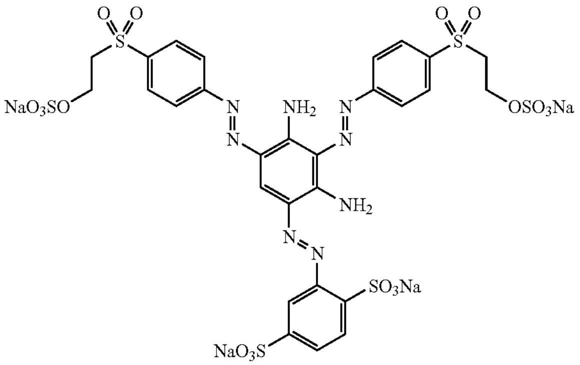

in a fraction of about 60% (abs. max. 416 nm).

Alternatively the dye solution obtained when coupling is at an end can also be buffered by addition of a phosphate buffer at a pH of 5.5-6 and can be adjusted by further dilution or concentration to provide a liquid brand of defined strength.

The dye of the formula (II-1) of the invention dyes cotton in brown shades by the dyeing methods typical for reactive dyes.

EXAMPLE 2

56 parts of 2-amino-5-(β-sulfatoethylsulfonyl)benzenesulfonic acid are suspended in 120 parts of ice-water and 30 parts of 30% strength hydrochloric acid and diazotized by dropwise addition of 28.5 parts of 40% strength sodium nitrite solution. Following removal of the excess nitrite with amidosulfonic acid, the resulting diazo solution is added dropwise at 5-10° C. to a solution of 5.4 parts of 1,3-diaminobenzene in water, the pH being maintained at 1.7-2.5 during the addition, using solid sodium carbonate. Following complete addition of the diazo solution, a pH of 5.5-6.5 is slowly set at below 25° C. using sodium carbonate, and the system is stirred at this pH and at 15-20° C. for 1-2 hours, after which the trisazo dye of the formula (II-2) that is formed when the coupling reaction has ended is isolated by evaporation in vacuo. This gives 98 parts of a salt-containing, dark brown solid which contains the dye (II-2)

(II-2)

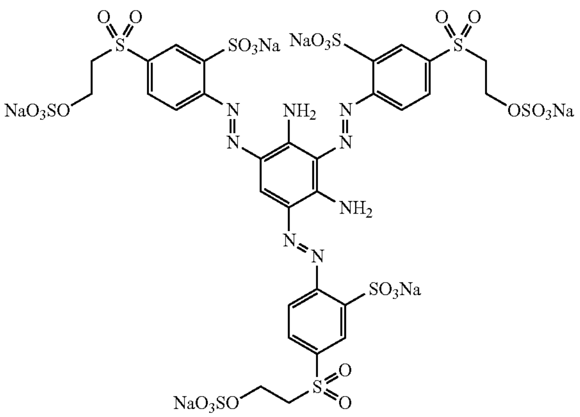

in a fraction of about 70% (abs. max.=433 nm).

The dye of the formula (II-2) of the invention dyes cotton in brown shades by the dyeing methods typical for reactive dyes.

EXAMPLE 3

14.5 parts of 4-(β-sulfatoethylsulfonyl)aniline are suspended in 40 parts of ice-water and 9.5 parts of 30% strength hydrochloric acid and diazotized by dropwise addition of 9 parts of 40% strength sodium nitrite solution. Following removal of the excess nitrite with amidosulfonic acid, the diazo suspension is added dropwise to a solution of 5.4 parts of 1,3-diaminobenzene in water, the pH being kept at 1.5-2.5 using solid sodium carbonate. After the end of the first coupling an aqueous suspension is obtained of 21.1 parts of the yellow monoazo dye of the formula (24-2)

(24-2)

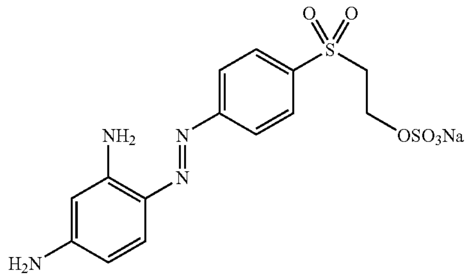

In a separate reaction vessel 28 parts of 2-amino-5-(β-sulfatoethylsulfonyl)benzenesulfonic acid are suspended in 90 parts of ice-water and 21 parts of 30% strength hydrochloric acid and diazotized by dropwise addition of 19 parts of 40% strength sodium nitrite solution. After removal of the excess nitrite with amidosulfonic acid, the resulting diazo solution is added dropwise at 10-15° C. to the aqueous first coupling stage (24-2), the pH being adjusted to and maintained at 2-3 during the addition, using solid sodium carbonate. Following complete addition of the diazo solution, a pH of 5.5-6.5 is slowly set at below 25° C. using sodium carbonate, and is held constant by further addition of sodium carbonate up until the end of the second and third coupling for 1-2 hours at 15-20° C. The resultant trisazo dye of the formula (II-3) is isolated by evaporation in vacuo or spray drying. This gives 94 parts of a salt-containing dark brown solid which contains the dye of the formula (II-3)

(II-3)

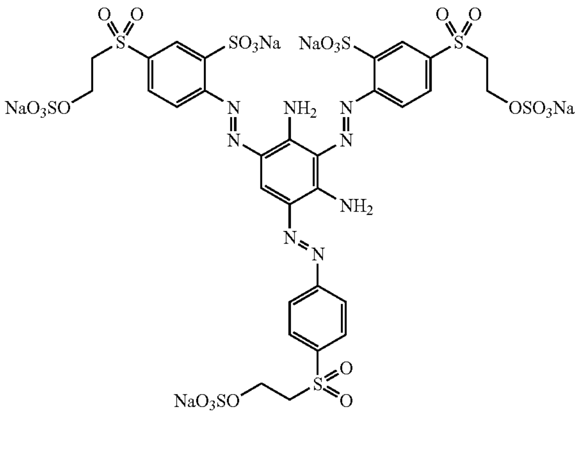

in a fraction of about 66% (abs. max.=434 nm).

The dye of the formula (II-3) of the invention dyes cotton in brown shades by the dyeing methods typical for reactive dyes.

EXAMPLE 4

10.2 parts of 2-amino-5-methoxybenzenesulfonic acid are diazotized with 8-7 parts of a 40% strength sodium nitrite solution in a medium containing sulfuric acid and the product is then coupled onto 5.4 parts of 1,3-diaminobenzene in an aqueous medium at 5-10° C. and a pH of 1.5-2.5. This gives an aqueous suspension of 17.2 parts of the yellow monoazo dye of the formula (24-3).

(24-3)

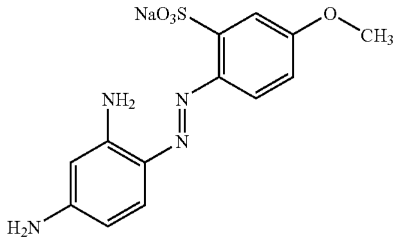

In a separate reaction vessel 38 parts of 2-amino-3-5-(β-sulfatoethylsulfonyl)benzenesulfonic acid are suspended in 90 parts of ice-water and 21 parts of 30% strength hydrochloric acid and diazotized by dropwise addition of 19 parts of 40% strength sodium nitrite solution. After removal of the excess nitrite with amidosulfonic acid, the resulting diazo solution is added dropwise at 10-15° C. to the aqueous first coupling stage (24-3), the pH being adjusted to and held at 2-3 during the addition, using solid sodium carbonate. Following complete addition of the diazo solution, a pH of 5.5-6.5 is slowly set at below 25° C. using sodium carbonate, and is kept constant by further addition of sodium carbonate until the end of the second and third coupling for 1-2 hours at 15-20° C. The resultant trisazo dye of the formula (II-6) is isolated by evaporation in vacuo or spray drying. This gives 89 parts of a salt-containing dark brown solid which contains the dye of the formula (II-6)

(II-6)

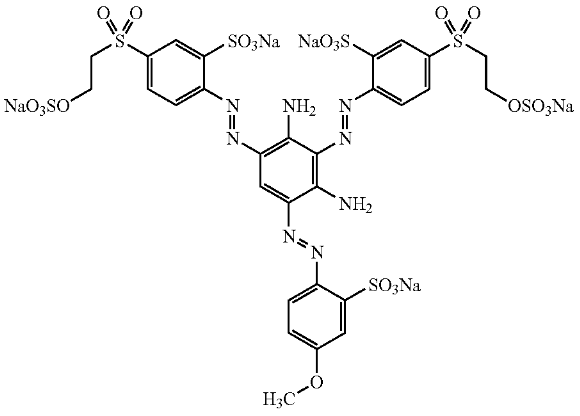

(II-6)

in a fraction of about 660%. (abs. max.=437 nm)

The dye of the formula (II-6) of the invention dyes cotton in brown shades by the dyeing methods typical for reactive dyes.

EXAMPLE 5 a) 37 parts of 2-amino-5-(β-sulfatoethylsulfonyl)benzenesulfonic acid are suspended in 90 parts of ice-water and 21 parts of 30% strength hydrochloric acid and diazotized by dropwise addition of 18 parts of 40% strength sodium nitrite solution. After removal of the excess nitrite with amidosulfonic acid, the resulting diazo solution is added dropwise at 5-10° C. to a solution of 5.4 parts of 1,3-diaminobenzene in water, the pH being held at 1.7-2.5 during the addition, using sodium hydrogen carbonate.

Following complete addition of the diazo solution, a pH of 34 is set using sodium carbonate and is held constant by a further addition of sodium carbonate until the end of the second coupling for 1-2 hours at 10-15° C.

This gives an aqueous solution whose major component is about 47 parts of the brown disazo dye of the formula (II-54)

(II-54)

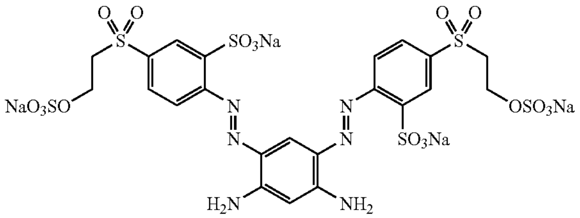

(abs. max.=456 nm).

b) In a separate reaction vessel 14.5 parts of 4-(β-sulfatoethylsulfonyl)aniline are suspended in 40 parts of ice-water and 10 parts of 30% strength hydrochloric acid and diazotized by dropwise addition of 9 parts of 40% strength sodium nitrite solution. After removal of the excess nitrite with amidosulfonic acid, this diazo suspension is added to the solution of the second coupling stage of the formula (II-54) from a) and, using sodium carbonate, a pH of 5-6 is set which is kept constant by further addition of sodium carbonate until the end of the third coupling for 1-2 hours at 15-20° C. Evaporation in vacuo or spray drying gives 96 parts of a salt-containing dark brown solid which contains as its main product the dye of the formula (II-20)

(II-20)

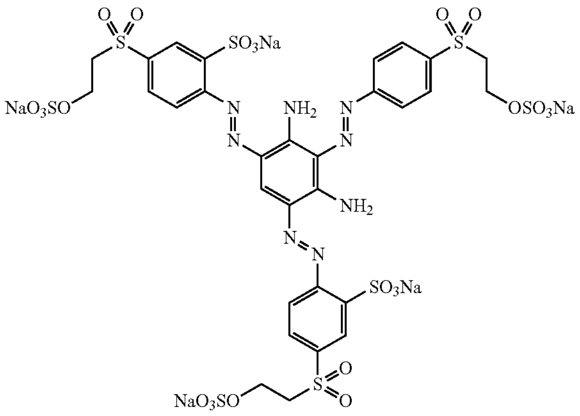

in a fraction of about 65% (abs. max.=429 nm).

The dye of the formula (II-20) of the invention dyes cotton in brown shades by the dyeing methods typical for reactive dyes.

EXAMPLE 6 a) 15.2 parts of 3-aminonaphthalene-1,5-disulfonic acid are diazotized with 8.7 parts of 40% strength sodium nitrite solution in a medium containing sulfuric acid and this product is then coupled onto 6.3 parts of phloroglucinol in an aqueous medium at 5-10° C. and a pH of 1-2.

b) In a separate reaction vessel 14.1 parts of 4-(β-sulfatoethylsulfonyl)aniline are suspended in 40 parts of ice-water and 9.5 parts of 30% strength hydrochloric acid and diazotized by dropwise addition of 9 parts of 40% strength sodium nitrite solution. After removal of the excess nitrite with amidosulfonic acid, this diazo suspension is added to the first coupling stage from a) and, using sodium carbonate, a pH of 2.5-3.5 is set which is held constant by further addition of sodium carbonate up until the end of the second coupling for 1-2 hours at 10-15° C.

c) Subsequently 18.3 parts of 2-amino-5-(R-sulfatoethylsulfonyl)benzenesulfonic acid are suspended in 40 parts of ice-water and 10 parts of 30% strength hydrochloric acid and diazotized by dropwise addition of 9 parts of 40% strength sodium nitrite solution. After removal of the excess nitrite with amidosulfonic acid, the diazo solution is added dropwise to the second coupling state from b) and, using sodium carbonate, a pH of 5-6 is set which is held constant until the end of the third coupling for 1-2 hours at 10-15° C. Evaporation in vacuo or spray drying gives 102 parts of a salt-containing, orange-brown solid containing as its principal product the dye of the formula (II-48)

(II-48)

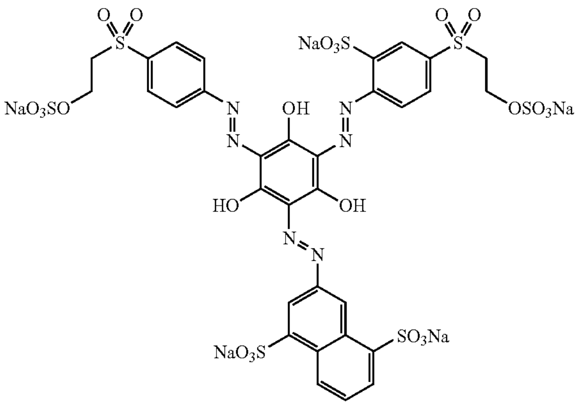

in a fraction of about 60%. (abs. max. 480 nm)

Alternatively the dye solution obtained after the end of coupling can also be buffered at a pH of 5.5-6 by addition of a phosphate buffer and can be adjusted by further dilution or concentration to provide a liquid brand of defined strength.

The dye of the formula (II-48) of the invention dyes cotton in orange shades by the dyeing method typical for reactive dyes.

EXAMPLE 7

14.1 parts of 4-(β-sulfatoethylsulfonyl)aniline and 18.2 parts of 2-amino-5-(β-sulfatoethylsulfonyl)benzenesulfonic acid are suspended in 90 parts of ice-water and 21 parts of 30% strength hydrochloric acid and diazotized by dropwise addition of 18.5 parts of 40% strength sodium nitrite solution. After removal of the excess nitrite with amidosulfonic acid, the resulting diazo mixture is added dropwise at 10-15° C.

and a pH of between 2 and 3, which is maintained using solid sodium carbonate, to an aqueous solution of 20.8 parts of the yellow monoazo dye of the formula (24-1), which was prepared by diazotizing 12.7 parts of 2-aminobenzene-1,4-disulfonic acid with 9 parts of 40% strength sodium nitrite solution in an acidic medium and then coupling the product onto 5.4 parts of 1,3-diaminobenzene in an aqueous medium at a pH of 1.5-2.5. After the end of the addition of diazo mixture, the pH is adjusted using sodium carbonate to 5.5-6.5 and maintained until the end of the coupling reaction.

The resulting 22.8:25:25:27/2 mixture of the four dyes (II-1), (II-8), (II-116) and (II-10)

(II-1)

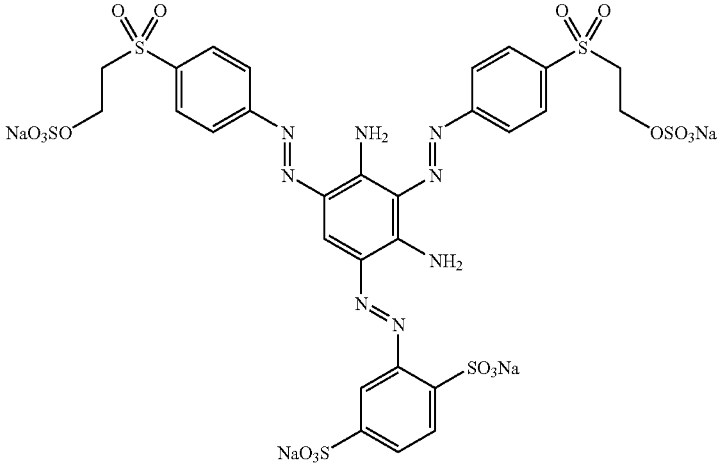

(II-8)

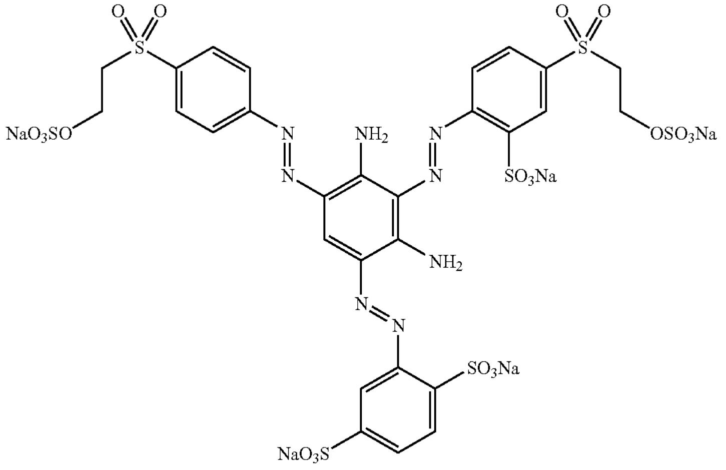

(II-116)

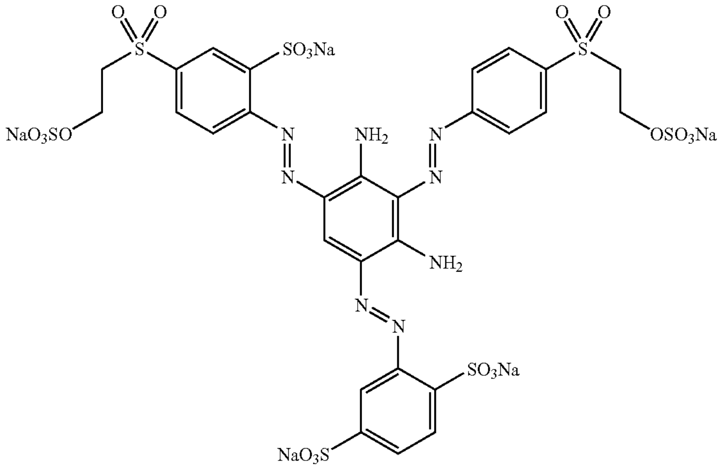

-continued (II-10)

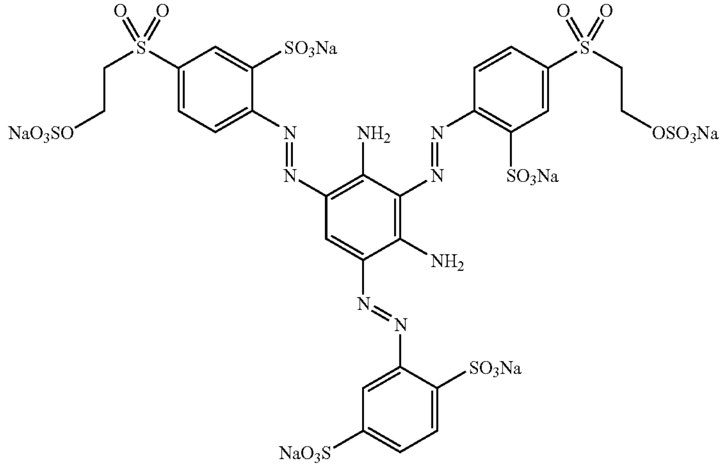

can be isolated by evaporation in vacuo or by spray drying and dyes cotton in brown shades by the dyeing methods typical for reactive dyes. (abs. max.=427 nm)

EXAMPLE 8

18.2 parts of 2-amino-5-(β-sulfatoethylsulfonyl)benzenesulfonic acid are suspended in 40 parts of ice-water and 10 parts of 30% strength hydrochloric acid and diazotized by dropwise addition of 9 parts of 40% strength sodium nitrite solution. After removal of the excess nitrite with amidosulfonic acid, the diazo solution is added dropwise to a solution of 5.4 parts of 1,3-diaminobenzene in water at 5-10° C., the pH being held at 1.5-2.5 using sodium hydrogen carbonate. After the end of the first coupling an aqueous suspension is obtained of 26.2 parts of the yellow monoazo dye of the formula (24-6).

(24-6)

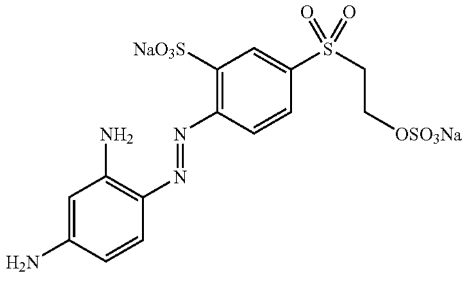

In a separate reaction vessel 16 parts of 2-methoxy-5-(β-sulfatoethylsulfonyl)aniline are suspended in 45 parts of ice-water and 10 parts of 30% strength hydrochloric acid and diazotized by dropwise addition of 9 parts of 40% strength sodium nitrite solution. After removal of the excess nitrite with amidosulfonic acid, the resulting diazo suspension is added dropwise at 10-15° C. to the aqueous first coupling stage (24-6), a pH of 34 being set by simultaneous addition of solid sodium carbonate and being maintained until the end of the second coupling for 2-3 hours at 15-20° C. Subsequently sodium carbonate is used to set the pH to 5.5-6.5. The resulting disazo dye of the formula (II-56) is isolated by evaporation in vacuo or spray drying. This gives 62 parts of a salt-containing dark brown solid which contains the dye of the formula (II-56)

(II-56)

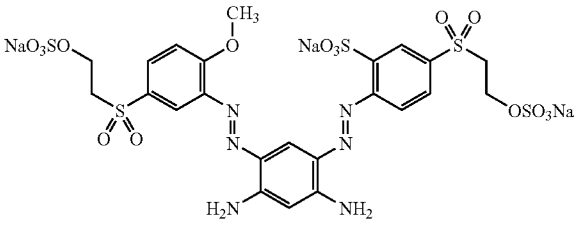

in a fraction of about 70%. (abs. max.=448 nm)

The dye of the formula (II-56) of the invention dyes cotton in orange-brown shades by the dyeing methods typical for reactive dyes.

EXAMPLE 9

36.5 parts of 2-amino-5-(1-sulfatoethylsulfonyl)benzenesulfonic acid are suspended in 80 parts of ice-water and 20 parts of 30% strength hydrochloric acid and diazotized by dropwise addition of 18.5 parts of 40% strength sodium nitrite solution. After removal of the excess nitrite with amidosulfonic acid, an aqueous solution of 7.6 parts of 3,5-diaminobenzoic acid is added, after which a pH of 1-1.5 is set at below 20° C. by adding solid sodium hydrogen carbonate, this pH range being kept constant until the end of coupling for 2-3 hours at 10-15° C. Subsequently sodium carbonate is used to set the pH to 5.5-6.5. The resulting disazo dye of the formula (II-77) can be isolated by evaporation in vacuo or spray drying. This gives 72 parts of a salt-containing orange-brown solid which contains the dye of the formula (II-77)

(II-77)

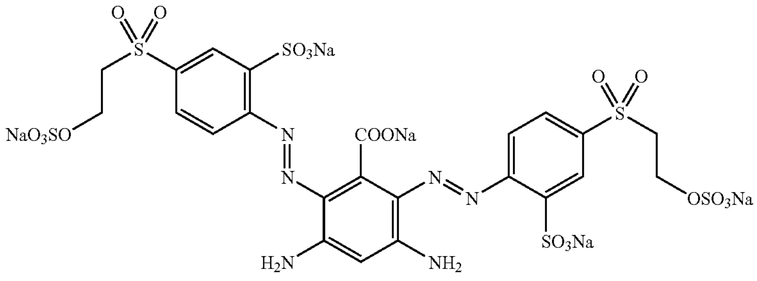

in a fraction of about 70%. (abs. max.=478 nm)

The dye of the formula (II-77) of the invention dyes cotton in orange shades by the dyeing methods typical for reactive dyes.

EXAMPLE 10

18.3 parts of 2-amino-5-(β-sulfatoethylsulfonyl)benzenesulfonic acid are suspended in 40 parts of ice-water and 10 parts of 30% strength hydrochloric acid and diazotized by dropwise addition of 9 parts of 40% strength sodium nitrite solution. After removal of the excess nitrite with amidosulfonic acid, the diazo solution is added dropwise to a solution of 5.5 parts of 3-aminophenol in water at 5-10° C., the pH being kept at 1.5-2.5 using solid sodium carbonate. After the end of the first coupling an aqueous suspension is obtained of 26.3 parts of the yellow monoazo dye of the formula (24-7)

(24-7)

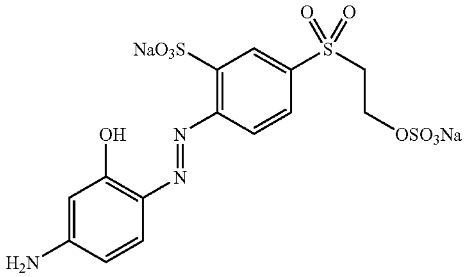

In a separate reaction vessel 14.1 parts of 4-(β-sulfatoethylsulfonyl)aniline are suspended in 35 parts of ice-water and 10 parts of 30% strength hydrochloric acid and diazotized by dropwise addition of 9 parts of 40% strength sodium nitrite solution. After removal of the excess nitrite with amidosulfonic acid, the resulting diazo suspension is added dropwise at 10-15° C. to the aqueous first coupling stage (24-7) and the pH is adjusted to 5.5-6.5 using solid sodium carbonate and is held constant by further addition of sodium carbonate until the end of the second coupling for 1-2 hours at 15-20° C. The resulting disazo dye of the formula (II-81) can be isolated by evaporation in vacuo or spray drying. This gives 65 parts of a salt-containing brown solid which contains the dye of the formula (II-81)

(II-81)

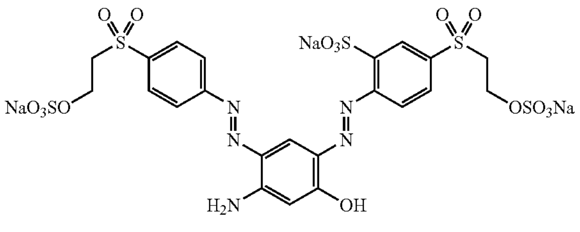

in a fraction of about 65% (abs. max.=430 nm).

The dye of the formula (II-81) of the invention dyes cotton in orange shades by the dyeing methods typical for reactive dyes.

EXAMPLE 11

36.5 parts of 2-amino-5-(β-sulfatoethylsulfonyl)benzenesulfonic acid are suspended in 80 parts of ice-water and 20 parts of 30% strength hydrochloric acid and diazotized by dropwise addition of 18.5 parts of 40% strength sodium nitrite solution. After removal of the excess nitrite with amidosulfonic acid, 5.5 parts of resorcinol are added, a pH of 5.5-6.5 is then set at below 20° C. by slow addition of solid sodium carbonate, and this pH range is maintained constant until the end of coupling, by further addition of sodium carbonate. The resulting disazo dye of the formula (II-92) can be isolated by evaporation in vacuo or spray drying. This gives 78 parts of a salt-containing orange-brown solid which contains the dye of the formula (II-92)

(II-92)

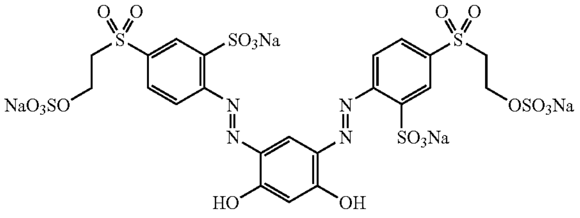

in a fraction of about 60%. (abs. max.=423 nm)

The dye of the formula (II-92) of the invention dyes cotton in orange-yellow shades by the dyeing methods typical for reactive dyes.

EXAMPLE 12

Following the procedure of Example 10 but using 5.5 parts of 2,6-diaminopyridine instead of 3-aminophenol as coupling component gives 65 parts of a salt-containing brown solid which contains the dye of the formula (II-106)

(II-106)

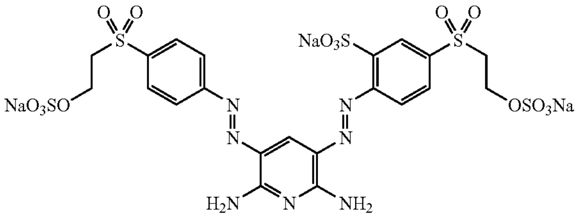

in a fraction of about 65%. (abs. max.=497 nm)

The dye of the formula (II-106) of the invention dyes cotton in red-brown shades by the dyeing methods typical for reactive dyes.

EXAMPLES 13 TO 119

The examples below describe further dyes of the formula (II) of the invention, each given in the form of the sodium salts. The dyes give orange-yellow to brown-red dyeings on cotton, for example, by the dyeing methods typical for reactive dyes.

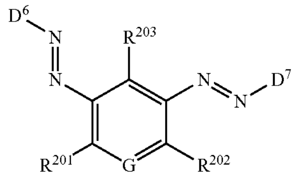
(II)
| Example (compound No.) | G | $R^{201}$ | $R^{202}$ | $R^{203}$ | $D^6$ | $D^7$ |
|---|---|---|---|---|---|---|
| 13 (II-9) | 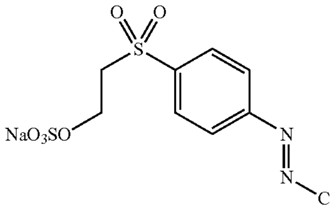 | $NH_2$ | $NH_2$ | H | 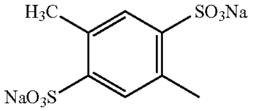 | 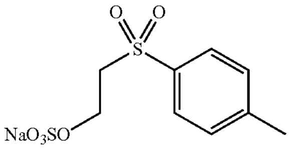 |
| 14 (II-12) | 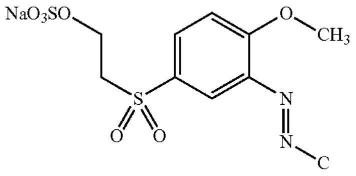 | $NH_2$ | $NH_2$ | H | 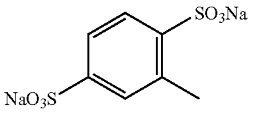 | 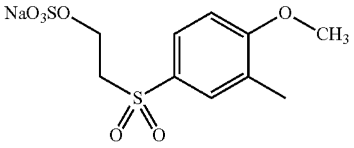 |
| 15 (II-14) | 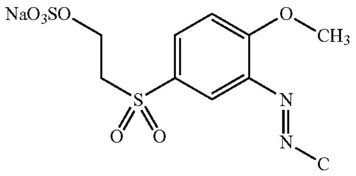 | $NH_2$ | $NH_2$ | H | 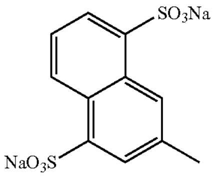 | 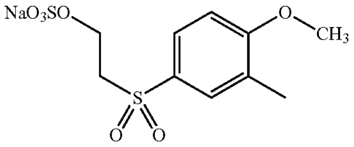 |

-continued
(II)
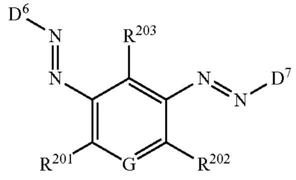
| Example (com-pound No.) | G | $R^{201}$ | $R^{202}$ | $R^{203}$ | $D^6$ | $D^7$ |
|---|---|---|---|---|---|---|
| 16 (II-15) | 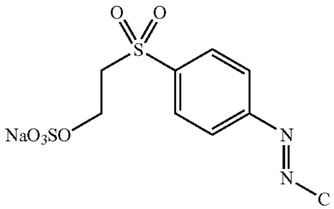 | $NH_2$ | $NH_2$ | H | 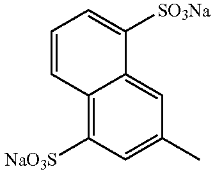 | 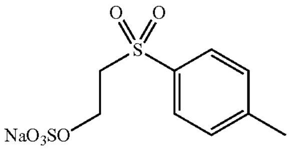 |
| 17 (II-17) | 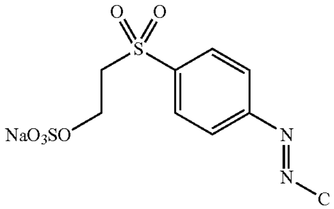 | $NH_2$ | $NH_2$ | H | 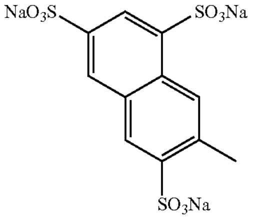 | 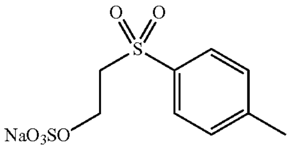 |
| 18 (II-26) | 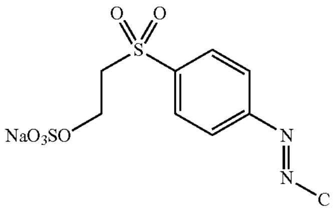 | $NH-CH_3$ | $NH_2$ | H | 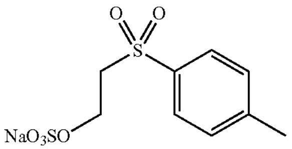 | 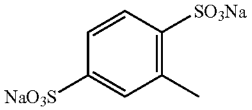 |

-continued
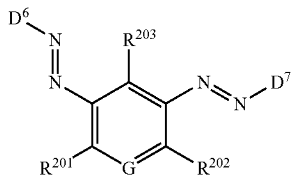
(II)
| Example (compound No.) | G | $R^{201}$ | $R^{202}$ | $R^{203}$ | $D^6$ | $D^7$ |
|---|---|---|---|---|---|---|
| 19 (II-35) | 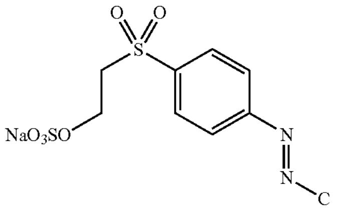 | OH | OH | OH | 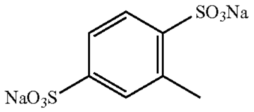 | 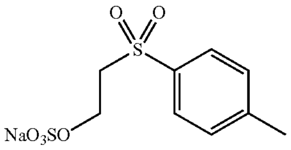 |
| 20 (II-44) | 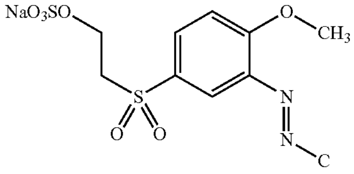 | OH | OH | OH | 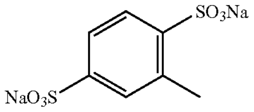 | 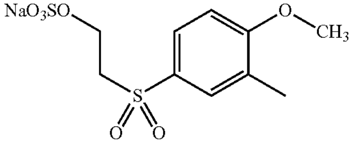 |
| 21 (II-46) | 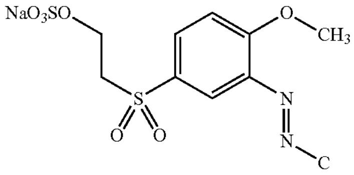 | OH | OH | OH | 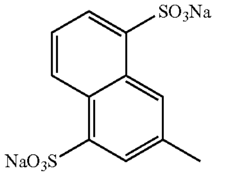 | 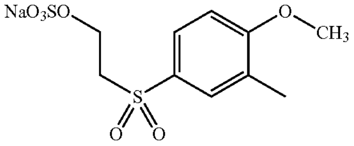 |

-continued
(II)
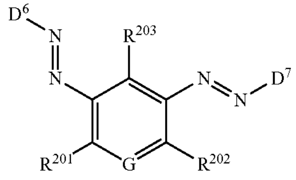
| Example (compound No.) | G | $R^{201}$ | $R^{202}$ | $R^{203}$ | $D^6$ | $D^7$ |
|---|---|---|---|---|---|---|
| 22 (II-47) | 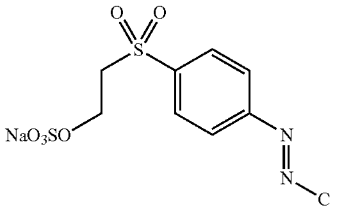 | OH | OH | OH | 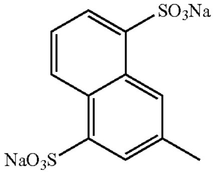 | 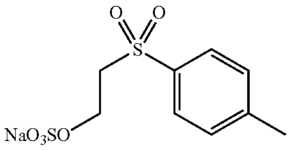 |
| 23 (II-49) | 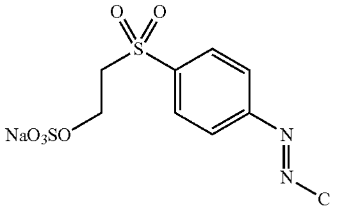 | OH | OH | OH | 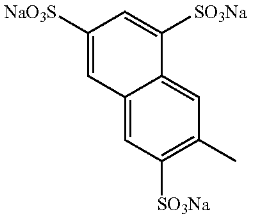 | 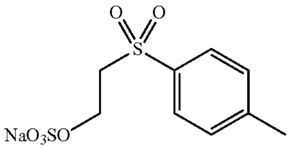 |
| 24 (II-25) | 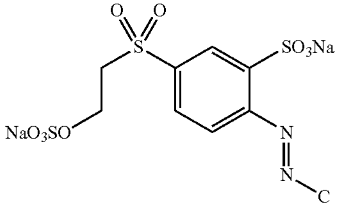 | NH—$CH_3$ | $NH_2$ | H | 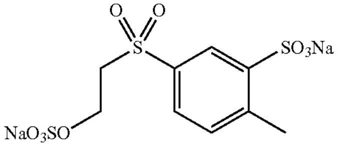 | 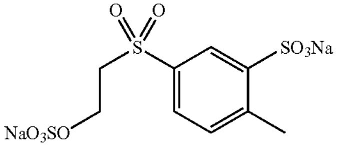 |

-continued
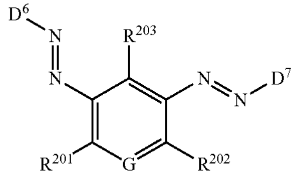
(II)
| Example (compound No.) | G | $R^{201}$ | $R^{202}$ | $R^{203}$ | $D^6$ | $D^7$ |
|---|---|---|---|---|---|---|
| 25 (II-36) | 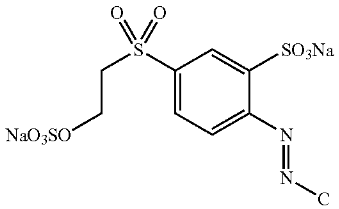 | OH | OH | OH | 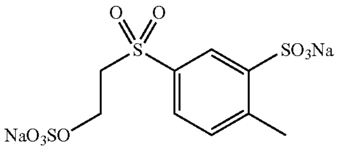 | 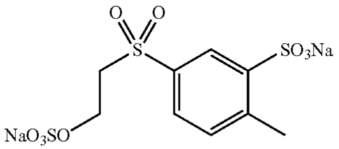 |
| 26 (II-4) | 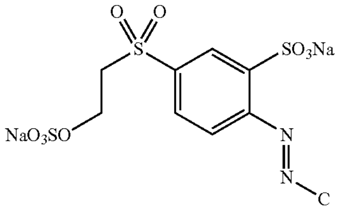 | $NH_2$ | $NH_2$ | H | 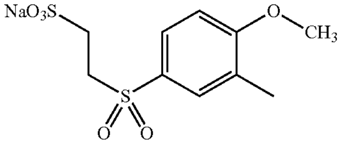 | 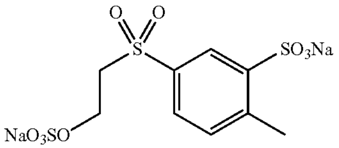 |
| 27 (II-23) | 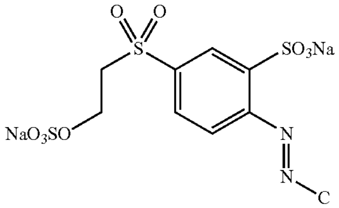 | $NH_2$ | $NH_2$ | H | 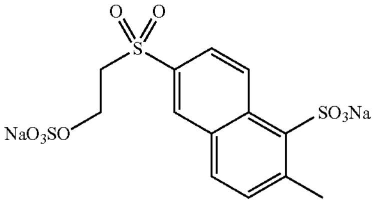 | 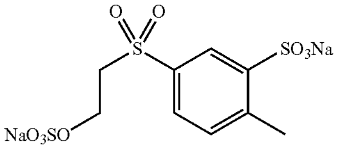 |

-continued
(II)
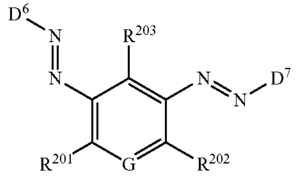
| Example (compound No.) | G | $R^{201}$ | $R^{202}$ | $R^{203}$ | $D^6$ | $D^7$ |
|---|---|---|---|---|---|---|
| 28 (II-24) | 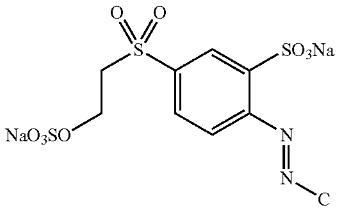 | $NH_2$ | $NH_2$ | H | 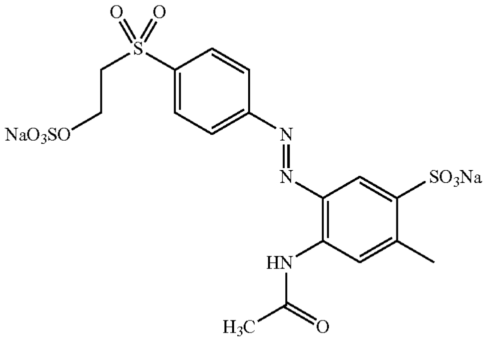 | 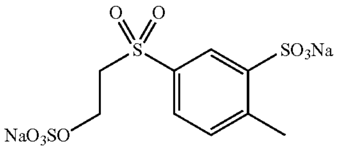 |
| 29 (II-28) | 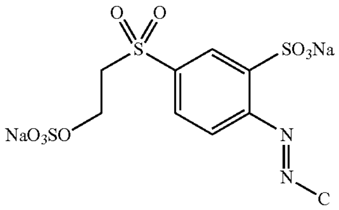 | 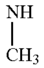 | $NH_2$ | H | 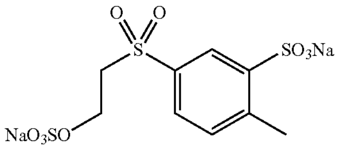 | 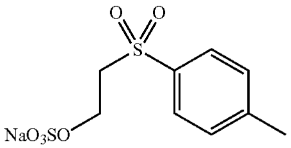 |

-continued
(II)
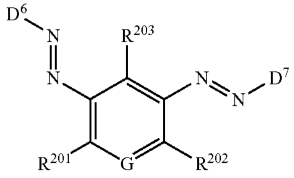
| Example (compound No.) | G | $R^{201}$ | $R^{202}$ | $R^{203}$ | $D^6$ | $D^7$ |
|---|---|---|---|---|---|---|
| 30 (II-34) | 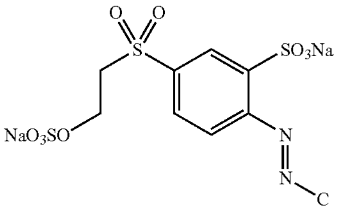 | 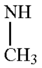 | $NH_2$ | H | 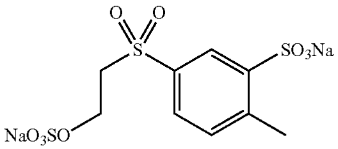 | 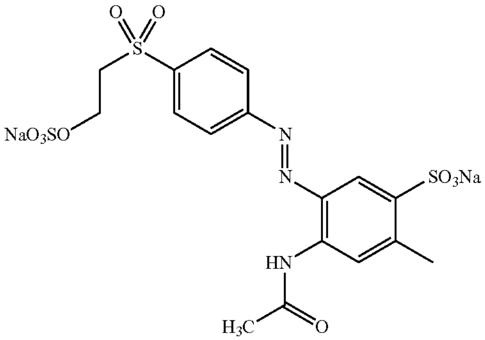 |
| 31 (II-37) | 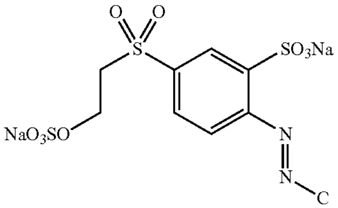 | OH | OH | OH | 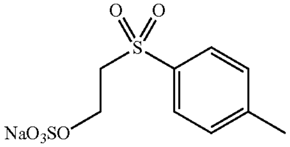 | 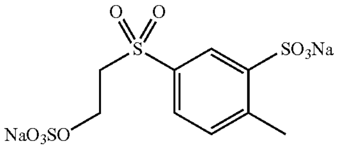 |
| 32 (II-38) | 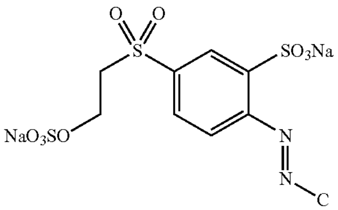 | OH | OH | OH | 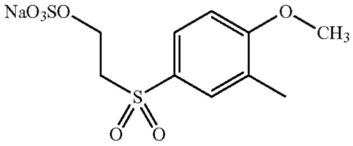 | 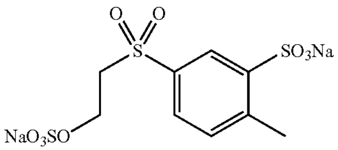 |

-continued
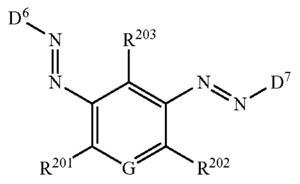
(II)
| Example (compound No.) | G | $R^{201}$ | $R^{202}$ | $R^{203}$ | $D^6$ | $D^7$ |
|---|---|---|---|---|---|---|
| 33 (II-52) | 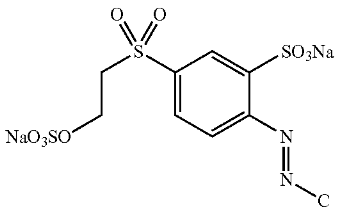 | OH | OH | OH | 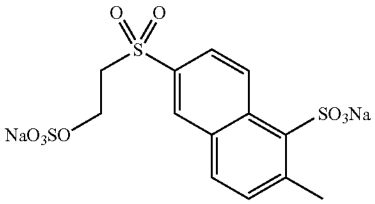 | 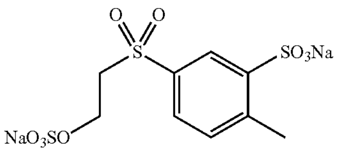 |
| 34 (II-53) | 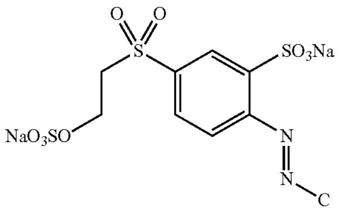 | OH | OH | OH | 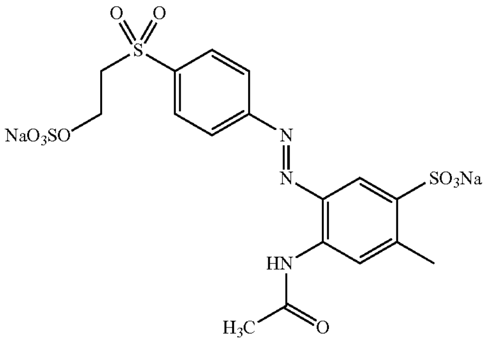 | 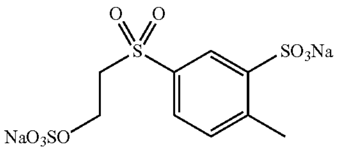 |

-continued
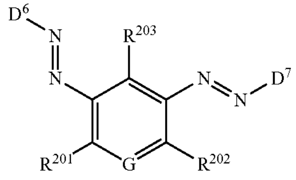
(II)
| Example (compound No.) | G | $R^{201}$ | $R^{202}$ | $R^{203}$ | $D^6$ | $D^7$ |
|---|---|---|---|---|---|---|
| 35 (II-5) | 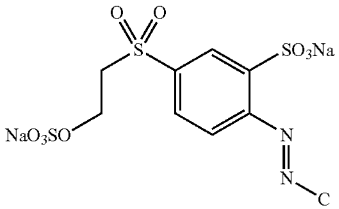 | $NH_2$ | $NH_2$ | H | 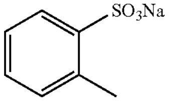 | 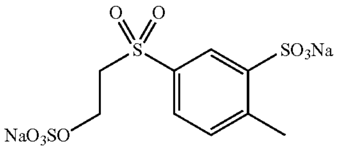 |
| 36 (II-7) | 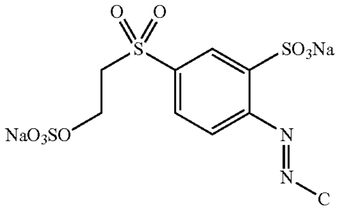 | $NH_2$ | $NH_2$ | H | 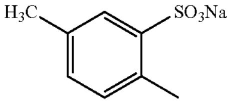 | 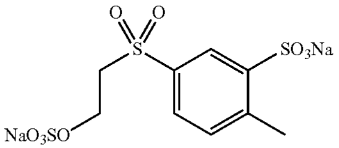 |
| 37 (II-10) | 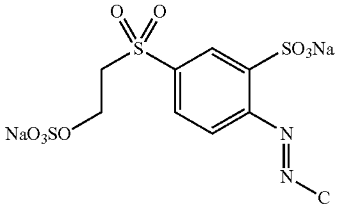 | $NH_2$ | $NH_2$ | H | 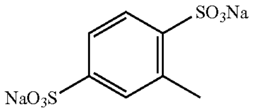 | 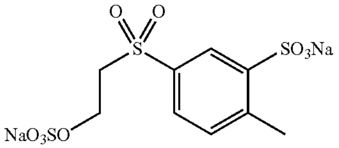 |

-continued
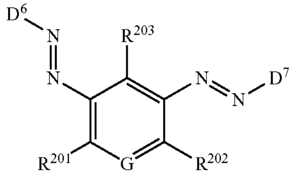
(II)
| Example (compound No.) | G | $R^{201}$ | $R^{202}$ | $R^{203}$ | $D^6$ | $D^7$ |
|---|---|---|---|---|---|---|
| 38 (II-11) | 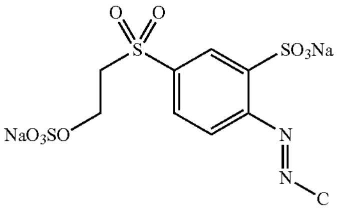 | $NH_2$ | $NH_2$ | H | 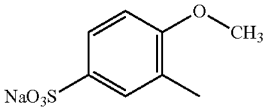 | 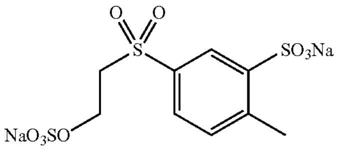 |
| 39 (II-13) | 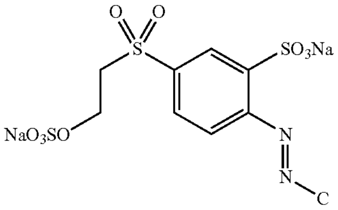 | $NH_2$ | $NH_2$ | H | 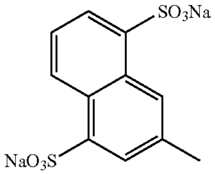 | 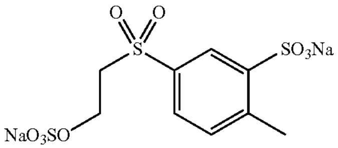 |
| 40 (II-18) | 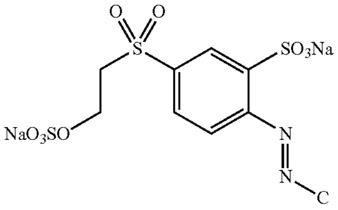 | $NH_2$ | $NH_2$ | H | 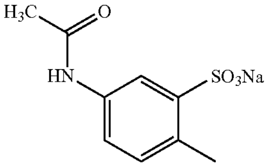 | 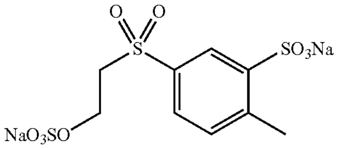 |

-continued
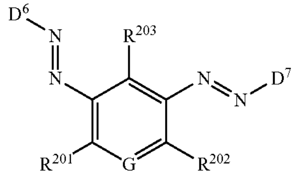
(II)
| Example (compound No.) | G | $R^{201}$ | $R^{202}$ | $R^{203}$ | $D^6$ | $D^7$ |
|---|---|---|---|---|---|---|
| 41 (II-31) | 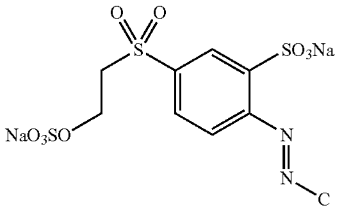 | 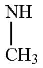 | $NH_2$ | H | 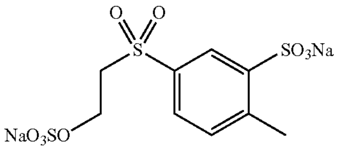 | 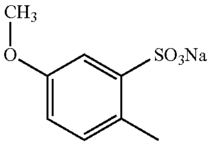 |
| 42 (II-39) | 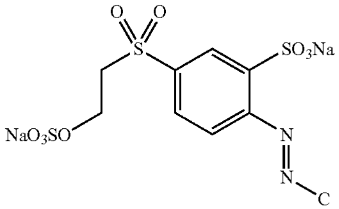 | OH | OH | OH | 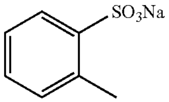 | 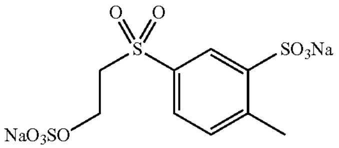 |
| 43 (II-40) | 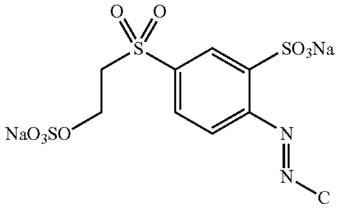 | OH | OH | OH | 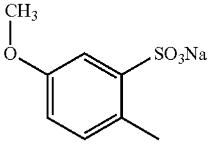 | 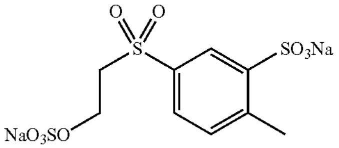 |

-continued
(II)
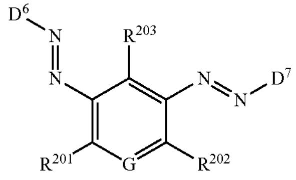
| Example (compound No.) | G | $R^{201}$ | $R^{202}$ | $R^{203}$ | $D^6$ | $D^7$ |
|---|---|---|---|---|---|---|
| 44 (II-41) | 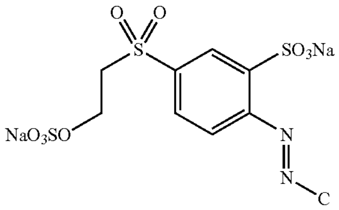 | OH | OH | OH | 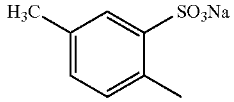 | 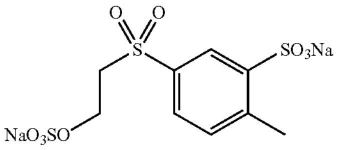 |
| 45 (II-43) | 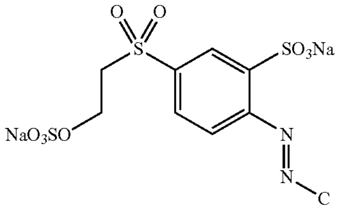 | OH | OH | OH | 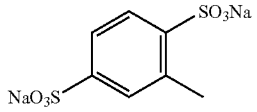 | 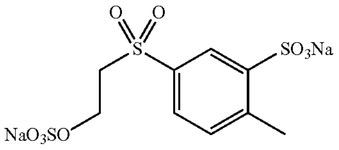 |
| 46 (II-45) | 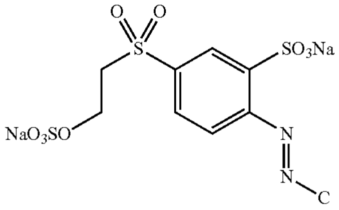 | OH | OH | OH | 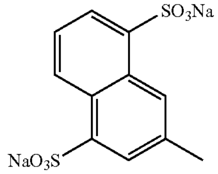 | 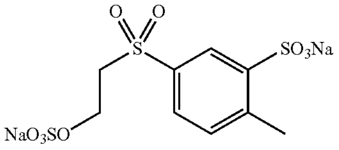 |

-continued
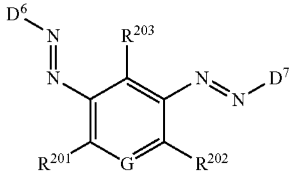
(II)
| Example (compound No.) | G | $R^{201}$ | $R^{202}$ | $R^{203}$ | $D^6$ | $D^7$ |
|---|---|---|---|---|---|---|
| 47 (II-50) | 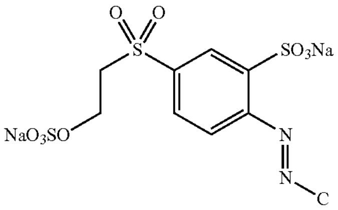 | OH | OH | OH | 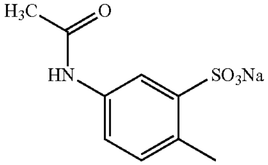 | 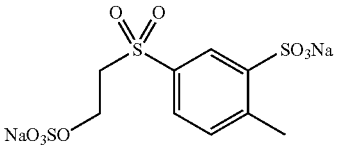 |
| 48 (II-21) | 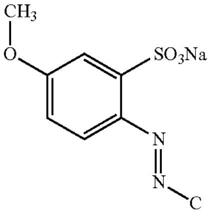 | $NH_2$ | $NH_2$ | H | 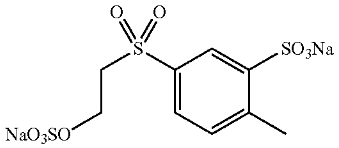 | 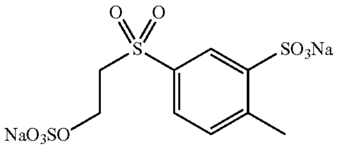 |
| 49 (II-22) | 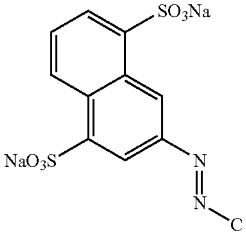 | $NH_2$ | $NH_2$ | H | 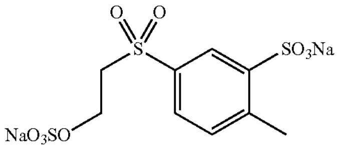 | 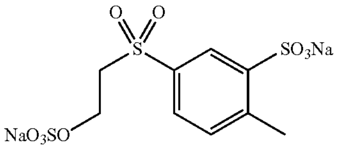 |

-continued
(II)
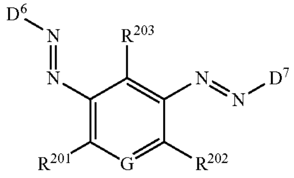
| Example (compound No.) | G | $R^{201}$ | $R^{202}$ | $R^{203}$ | $D^6$ | $D^7$ |
|---|---|---|---|---|---|---|
| 50 (II-30) | 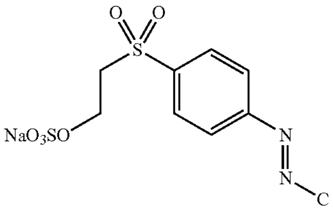 | NH—$CH_3$ | $NH_2$ | H | 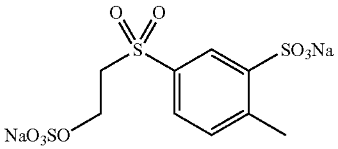 | 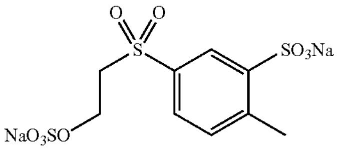 |
| 51 (II-33) | 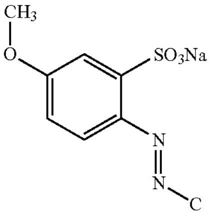 | NH—$CH_3$ | $NH_2$ | H | 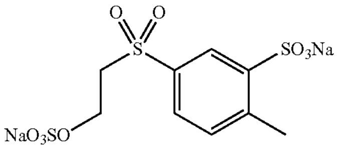 | 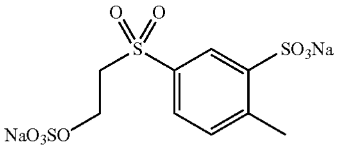 |
| 52 (II-8) | 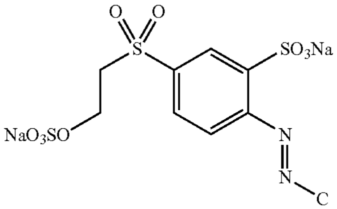 | $NH_2$ | $NH_2$ | H | 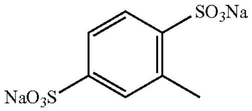 | 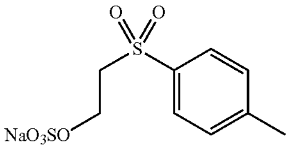 |

-continued
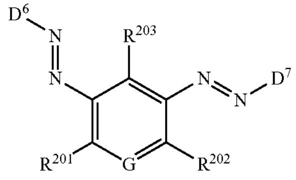
(II)
| Example (compound No.) | G | $R^{201}$ | $R^{202}$ | $R^{203}$ | $D^6$ | $D^7$ |
|---|---|---|---|---|---|---|
| 53 (II-16) | 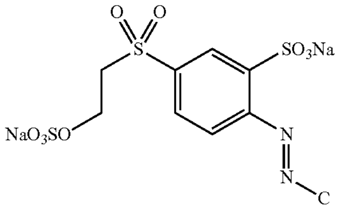 | $NH_2$ | $NH_2$ | H | 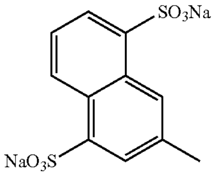 | 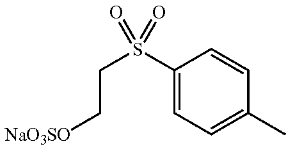 |
| 54 (II-19) | 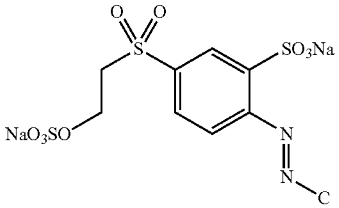 | $NH_2$ | $NH_2$ | H | 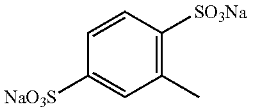 | 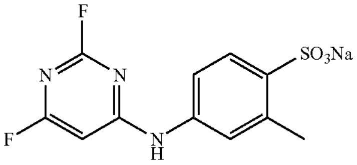 |
| 55 (II-42) | 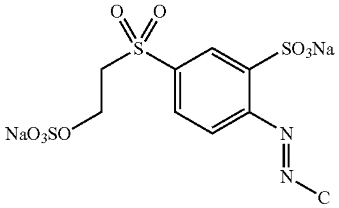 | OH | OH | OH | 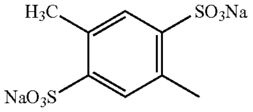 | 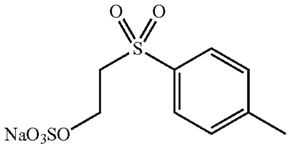 |

-continued
(II)
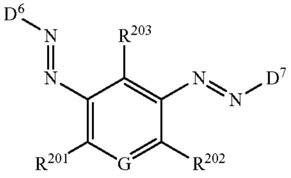
| Example (compound No.) | G | $R^{201}$ | $R^{202}$ | $R^{203}$ | $D^6$ | $D^7$ |
|---|---|---|---|---|---|---|
| 56 (II-51) | 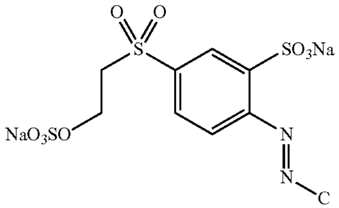 | OH | OH | OH | 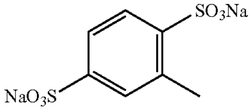 | 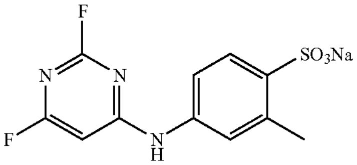 |
| 57 (II-116) | 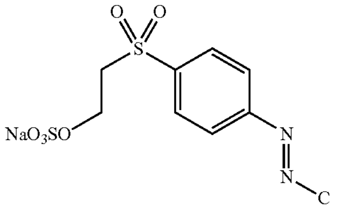 | $NH_2$ | $NH_2$ | H | 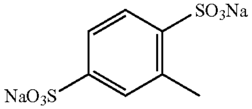 | 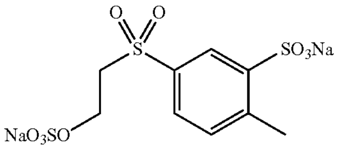 |
| 58 (II-55) | CH | $NH_2$ | $NH_2$ | H | 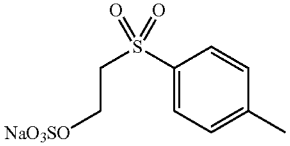 | 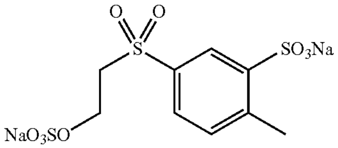 |

-continued
(II)
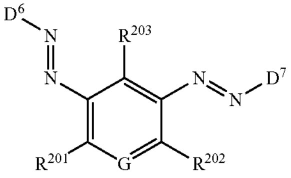
| Example (compound No.) | G | $R^{201}$ | $R^{202}$ | $R^{203}$ | $D^6$ | $D^7$ |
|---|---|---|---|---|---|---|
| 59 (II-57) | CH | $NH_2$ | $NH_2$ | H | 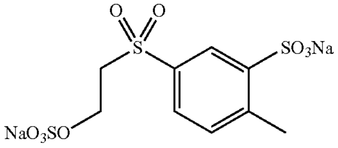 | 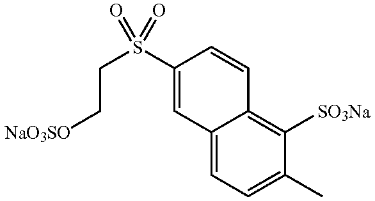 |
| 60 (II-58) | CH | $NH_2$ | $NH_2$ | H | 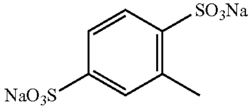 | 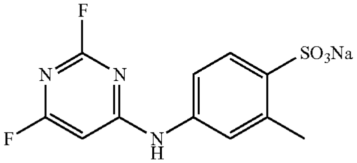 |
| 61 (II-59) | CH | $NH_2$ | $NH_2$ | H | 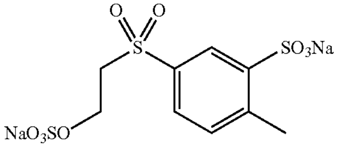 | 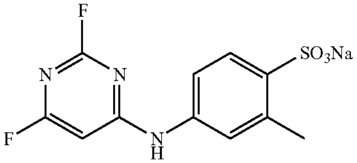 |
| 62 (II-60) | CH | $NH_2$ | $NH_2$ | H | 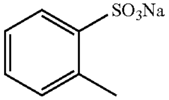 | 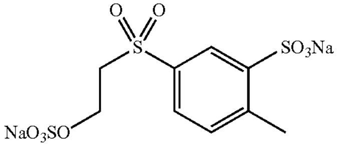 |

-continued
(II)
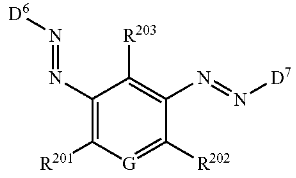
| Example (compound No.) | G | $R^{201}$ | $R^{202}$ | $R^{203}$ | $D^6$ | $D^7$ |
|---|---|---|---|---|---|---|
| 63 (II-61) | CH | $NH_2$ | $NH_2$ | H | 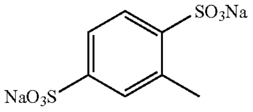 | 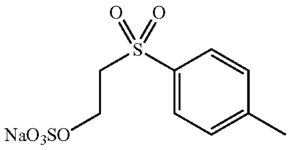 |
| 64 (II-62) | CH | $NH_2$ | $NH_2$ | H | 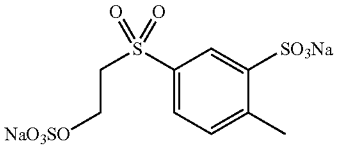 | 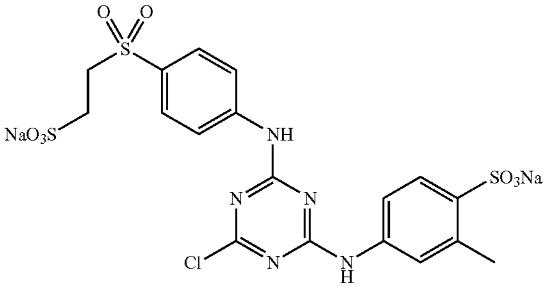 |
| 65 (II-63) | CH | $NH_2$ | $NH_2$ | H | 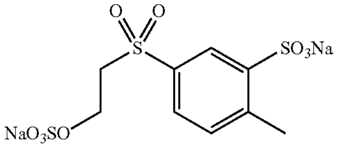 | 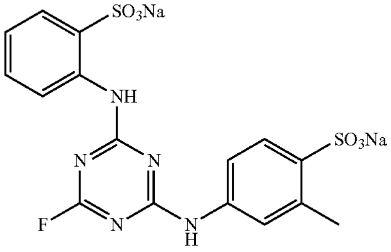 |

-continued
(II)
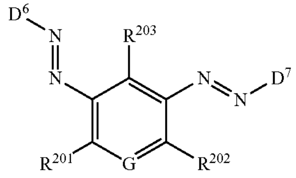
| Example (compound No.) | G | $R^{201}$ | $R^{202}$ | $R^{203}$ | $D^6$ | $D^7$ |
|---|---|---|---|---|---|---|
| 66 (II-64) | CH | $NH_2$ | $NH_2$ | H | 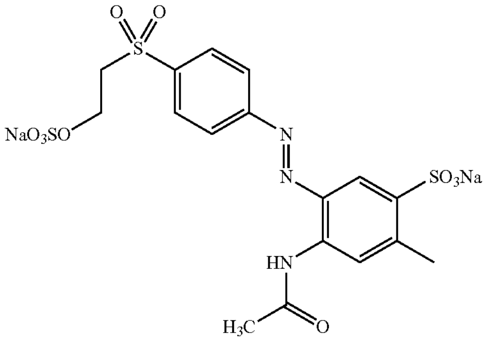 | 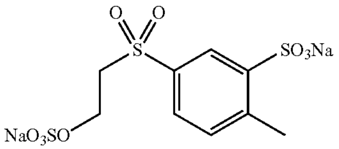 |
| 67 (II-66) | CH | NH—$CH_3$ | $NH_2$ | H | 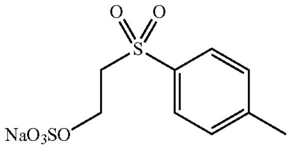 | 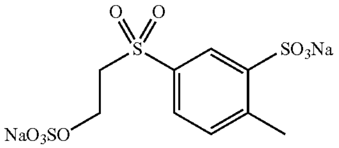 |
| 68 (II-67) | CH | NH—$CH_3$ | $NH_2$ | H | 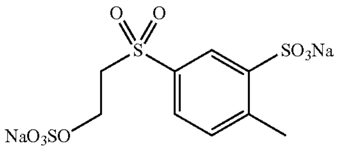 | 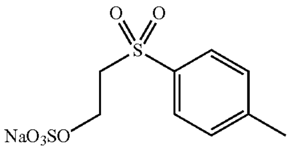 |

-continued
(II)
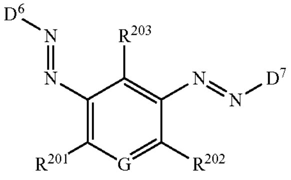
| Example (compound No.) | G | $R^{201}$ | $R^{202}$ | $R^{203}$ | $D^6$ | $D^7$ |
|---|---|---|---|---|---|---|
| 69 (II-68) | CH | $NH-CH_3$ | $NH_2$ | H | 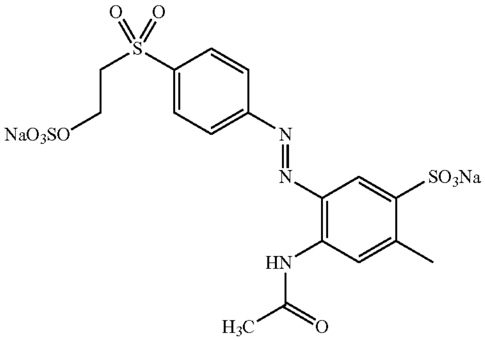 | 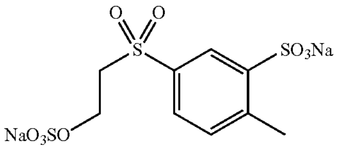 |
| 70 (II-78) | CH | $NH_2$ | $NH_2$ | CO ONa | 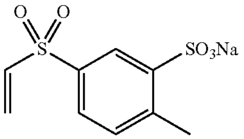 | 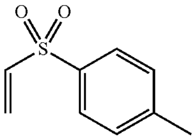 |
| 71 (II-119) | C—$CH_3$ | $NH_2$ | $NH_2$ | $NH_2$ | 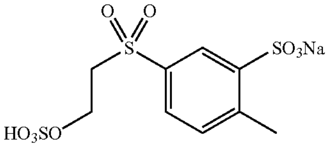 | 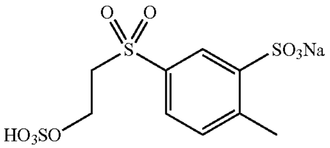 |

-continued
(II)
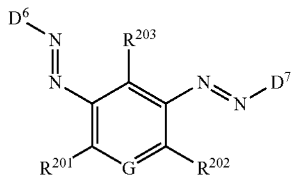
| Example (compound No.) | G | $R^{201}$ | $R^{202}$ | $R^{203}$ | $D^6$ | $D^7$ |
|---|---|---|---|---|---|---|
| 72 (II-65) | CH | NH—$CH_3$ | $NH_2$ | H | 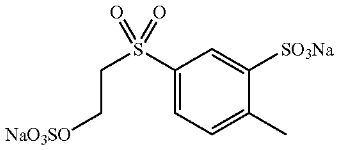 | 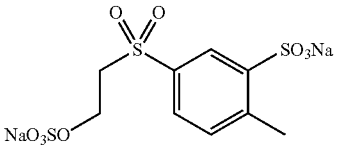 |
| 73 (II-79) | CH | $NH_2$ | $NH_2$ | COONa | 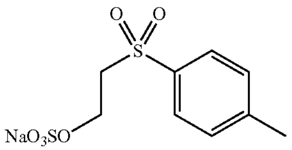 | 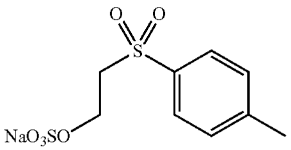 |
| 74 (II-70) | C—$CH_3$ | $NH_2$ | $NH_2$ | H | 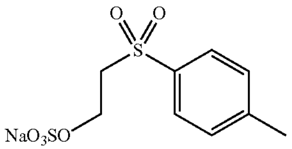 | 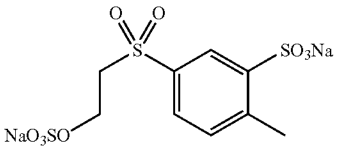 |
| 75 (II-72) | C—$CH_3$ | $NH_2$ | $NH_2$ | OH | 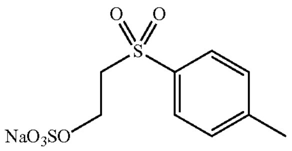 | 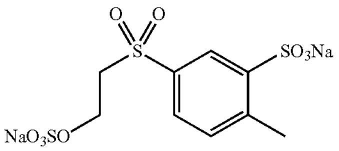 |

-continued
(II)
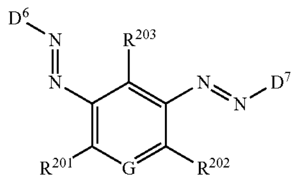
| Example (compound No.) | G | $R^{201}$ | $R^{202}$ | $R^{203}$ | $D^6$ | $D^7$ |
|---|---|---|---|---|---|---|
| 76 (II-74) | C—$CH_3$ | $SO_3$Na | $NH_2$ | $NH_2$ | 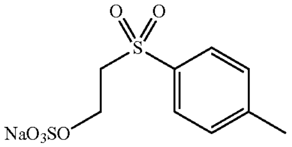 | 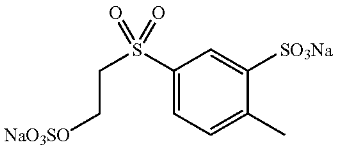 |
| 77 (II-75) | C—$CH_3$ | $SO_3$Na | $NH_2$ | $NH_2$ | 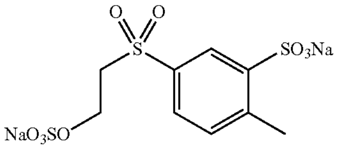 | 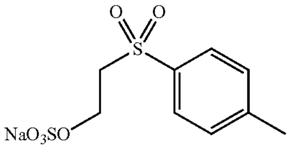 |
| 78 (II-82) | CH | OH | $NH_2$ | H | 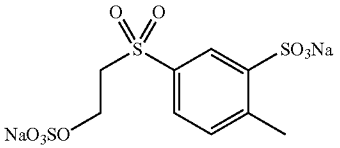 | 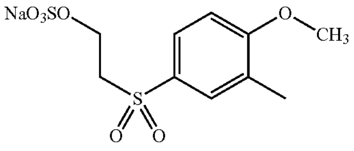 |
| 79 (II-83) | CH | OH | $NH_2$ | H | 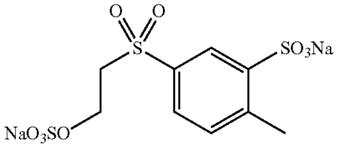 | 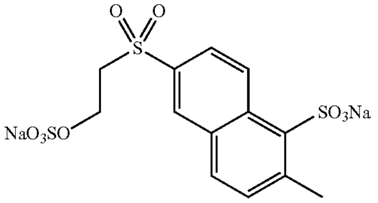 |

-continued
(II)
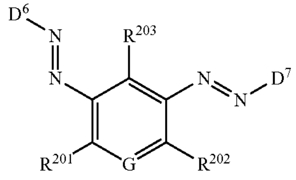
| Example (compound No.) | G | $R^{201}$ | $R^{202}$ | $R^{203}$ | $D^6$ | $D^7$ |
|---|---|---|---|---|---|---|
| 80 (II-84) | CH | OH | $NH_2$ | H | 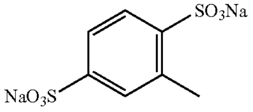 | 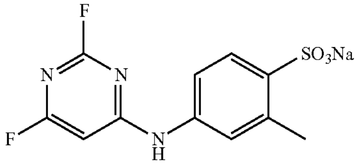 |
| 81 (II-85) | CH | OH | $NH_2$ | H | 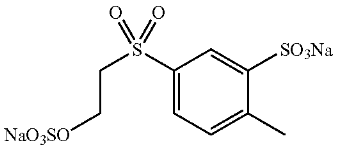 | 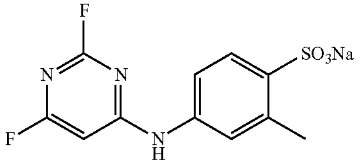 |
| 82 (II-86) | CH | OH | $NH_2$ | H | 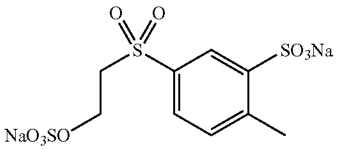 | 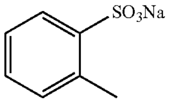 |
| 83 (II-87) | CH | OH | $NH_2$ | H | 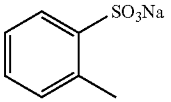 | 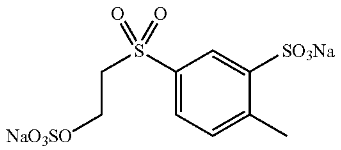 |

-continued
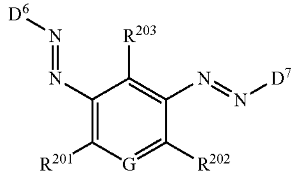
(II)
| Example (compound No.) | G | $R^{201}$ | $R^{202}$ | $R^{203}$ | $D^6$ | $D^7$ |
|---|---|---|---|---|---|---|
| 84 (II-88) | CH | OH | $NH_2$ | H | 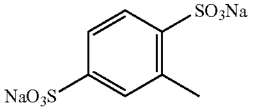 | 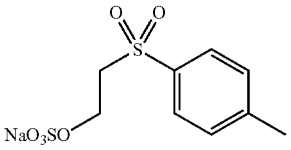 |
| 85 (II-89) | CH | OH | $NH_2$ | H | 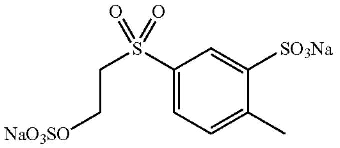 | 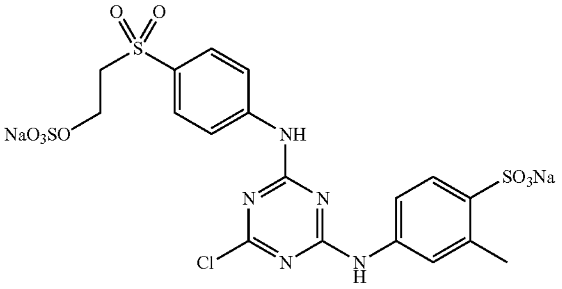 |
| 86 (II-90) | CH | OH | $NH_2$ | H | 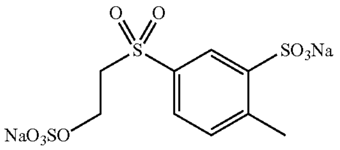 | 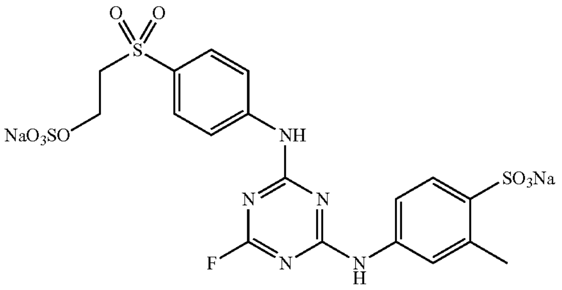 |

-continued
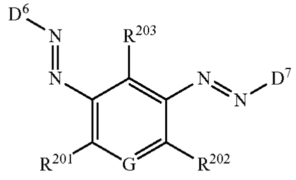
(II)
| Example (compound No.) | G | $R^{201}$ | $R^{202}$ | $R^{203}$ | $D^6$ | $D^7$ |
|---|---|---|---|---|---|---|
| 87 (II-91) | CH | OH | $NH_2$ | H | 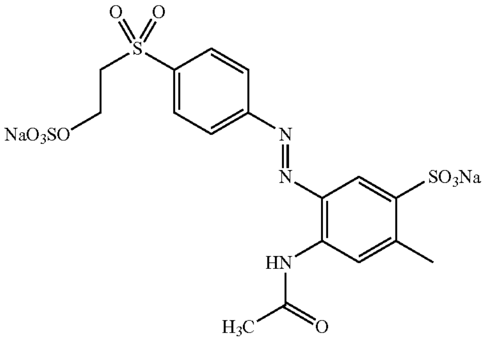 | 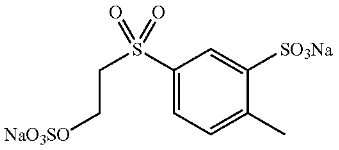 |
| 88 (II-93) | CH | OH | OH | H | 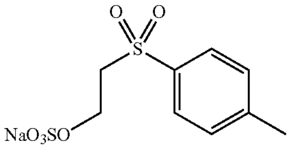 | 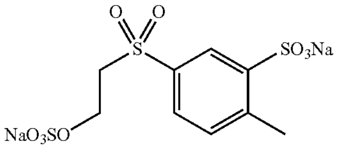 |
| 89 (II-94) | CH | OH | OH | H | 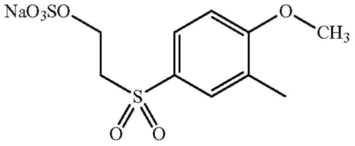 | 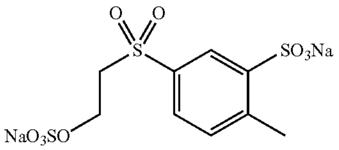 |

-continued
(II)
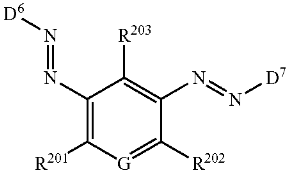
| Example (compound No.) | G | $R^{201}$ | $R^{202}$ | $R^{203}$ | $D^6$ | $D^7$ |
|---|---|---|---|---|---|---|
| 90 (II-95) | CH | OH | OH | H | 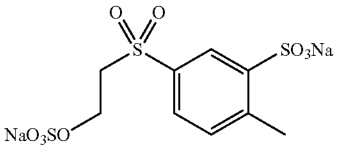 | 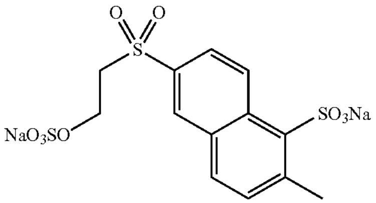 |
| 91 (II-96) | CH | OH | OH | H | 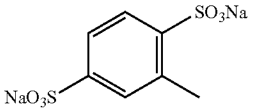 | 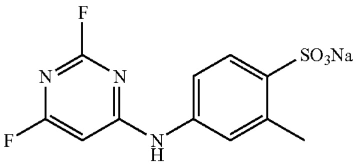 |
| 92 (II-97) | CH | OH | OH | H | 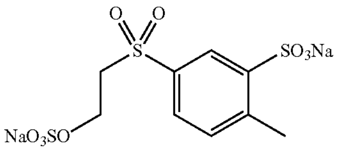 | 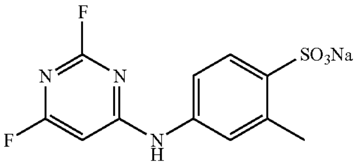 |
| 93 (II-98) | CH | OH | OH | H | 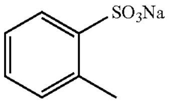 | 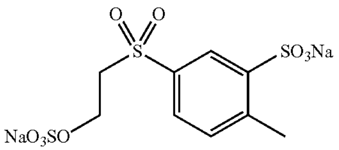 |

-continued
(II)
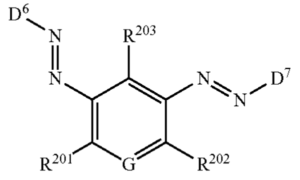
| Example (compound No.) | G | $R^{201}$ | $R^{202}$ | $R^{203}$ | $D^6$ | $D^7$ |
|---|---|---|---|---|---|---|
| 94 (II-99) | CH | OH | OH | H | 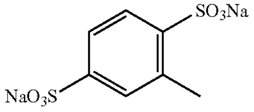 | 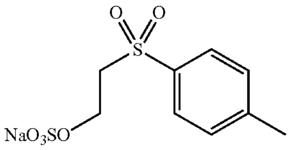 |
| 95 (II-100) | CH | OH | OH | H | 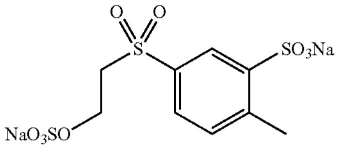 | 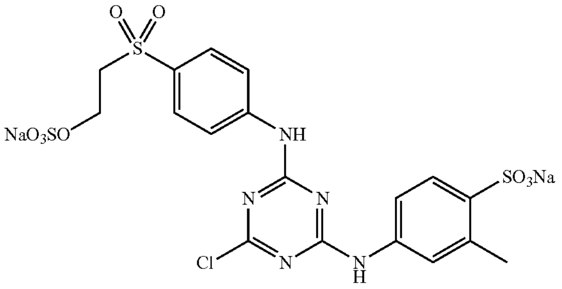 |
| 96 (II-101) | CH | OH | OH | H | 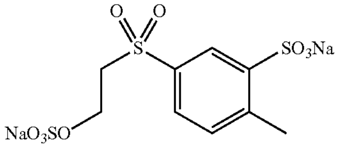 | 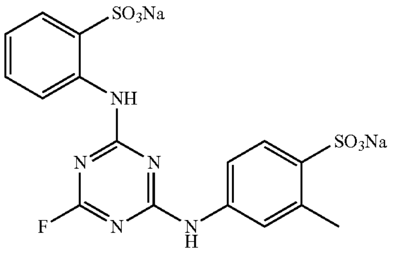 |

-continued
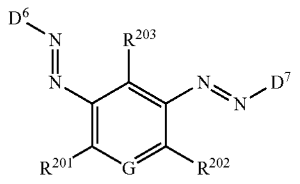
(II)
| Example (compound No.) | G | $R^{201}$ | $R^{202}$ | $R^{203}$ | $D^6$ | $D^7$ |
|---|---|---|---|---|---|---|
| 97 (II-102) | CH | OH | OH | H | 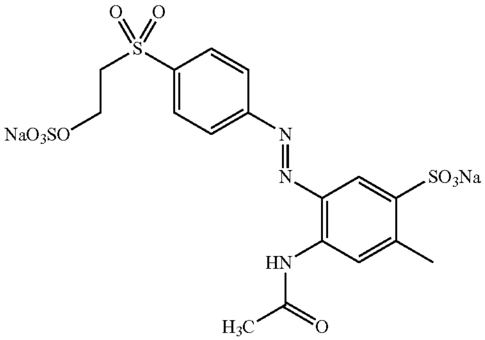 | 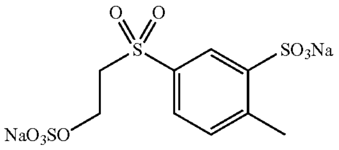 |
| 98 (II-104) | C—COONa | OH | OH | H | 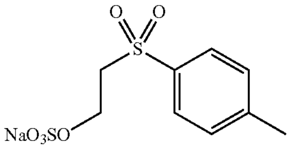 | 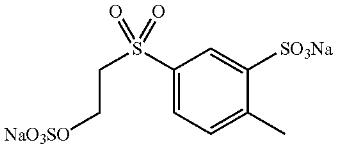 |
| 99 (II-69) | C—$CH_3$ | $NH_2$ | $NH_2$ | H | 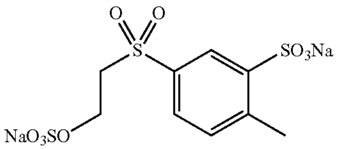 | 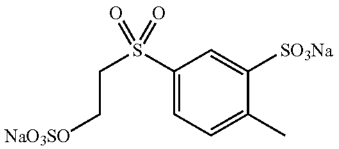 |

-continued
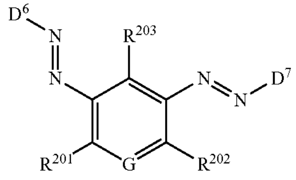
(II)
| Example (compound No.) | G | $R^{201}$ | $R^{202}$ | $R^{203}$ | $D^6$ | $D^7$ |
|---|---|---|---|---|---|---|
| 100 (II-71) | C—$CH_3$ | $NH_2$ | $NH_2$ | OH | 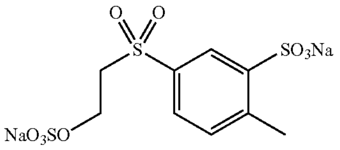 | 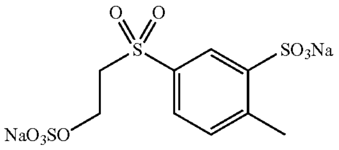 |
| 101 (II-73) | C—$CH_3$ | $SO_3Na$ | $NH_2$ | $NH_2$ | 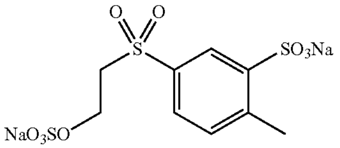 | 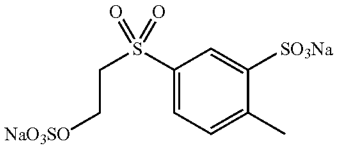 |
| 102 (II-76) | C—$CH_3$ | $SO_3Na$ | $NH_2$ | $NH_2$ | 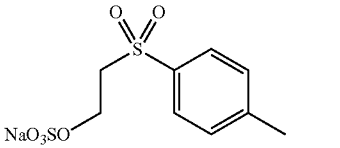 | 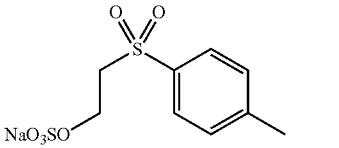 |
| 103 (II-80) | CH | OH | $NH_2$ | H | 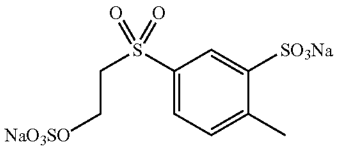 | 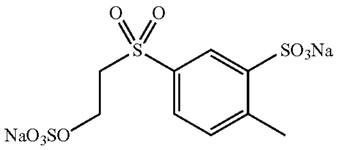 |

-continued
(II)
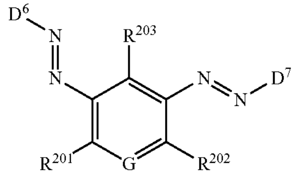
| Example (compound No.) | G | $R^{201}$ | $R^{202}$ | $R^{203}$ | $D^6$ | $D^7$ |
|---|---|---|---|---|---|---|
| 104 (II-103) | C—COONa | OH | OH | H | 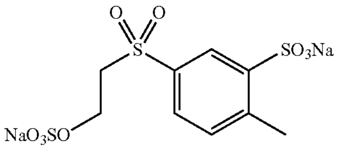 | 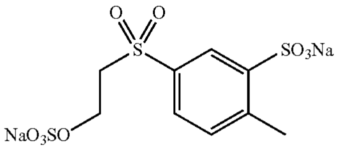 |
| 105 (II-105) | N | $NH_2$ | $NH_2$ | H | 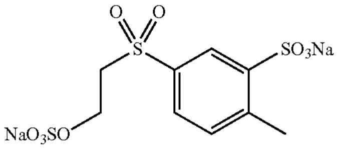 | 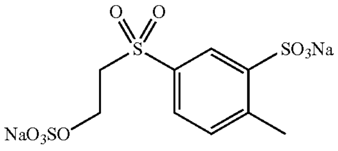 |
| 106 (II-117) | C—$CH_3$ | $NH_2$ | CO ONa | $NH_2$ | 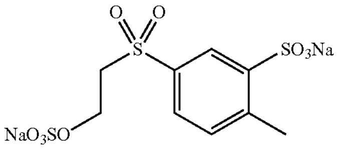 | 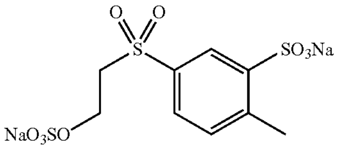 |
| 107 (II-118) | C—$CH_3$ | $NH_2$ | $NH_2$ | CO ONa | 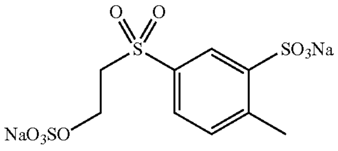 | 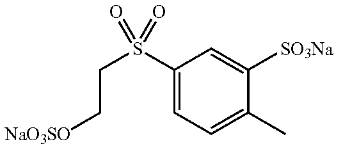 |

-continued
(II)
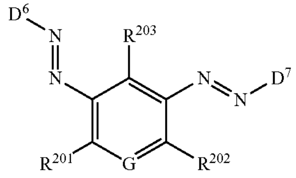
| Example (compound No.) | G | $R^{201}$ | $R^{202}$ | $R^{203}$ | $D^6$ | $D^7$ |
|---|---|---|---|---|---|---|
| 108 (II-107) | N | $NH_2$ | $NH_2$ | H | 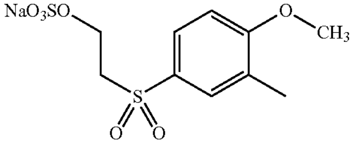 | 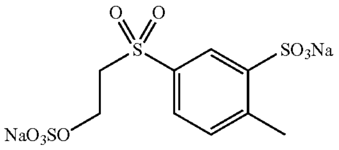 |
| 109 (II-108) | N | $NH_2$ | $NH_2$ | H | 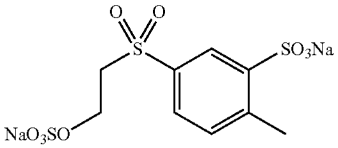 | 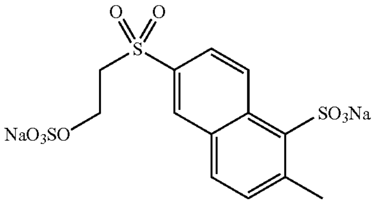 |
| 110 (II-109) | N | $NH_2$ | $NH_2$ | H | 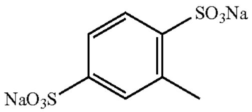 | 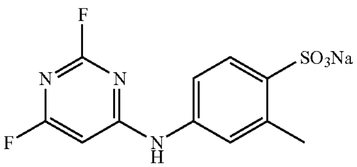 |
| 111 (II-110) | N | $NH_2$ | $NH_2$ | H | 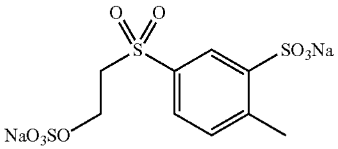 | 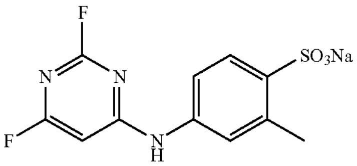 |

-continued
(II)
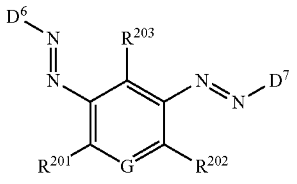
| Example (compound No.) | G | $R^{201}$ | $R^{202}$ | $R^{203}$ | $D^6$ | $D^7$ |
|---|---|---|---|---|---|---|
| 112 (II-111) | N | $NH_2$ | $NH_2$ | H | 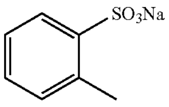 | 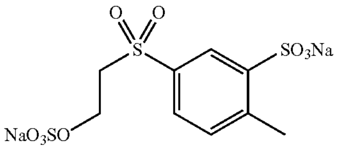 |
| 113 (II-112) | N | $NH_2$ | $NH_2$ | H | 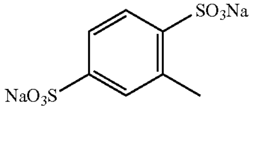 | 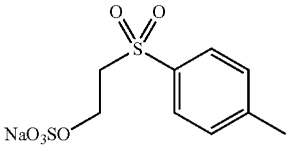 |
| 114 (II-113) | N | $NH_2$ | $NH_2$ | H | 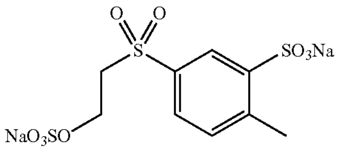 | 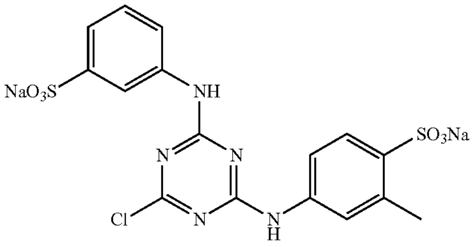 |

-continued
(II)
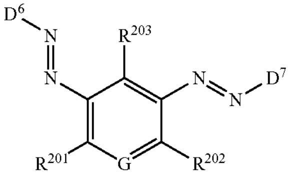
| Example (compound No.) | G | $R^{201}$ | $R^{202}$ | $R^{203}$ | $D^6$ | $D^7$ |
|---|---|---|---|---|---|---|
| 115 (II-114) | N | $NH_2$ | $NH_2$ | H | 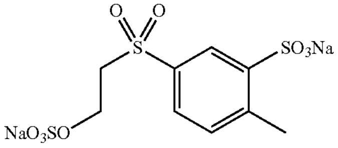 | 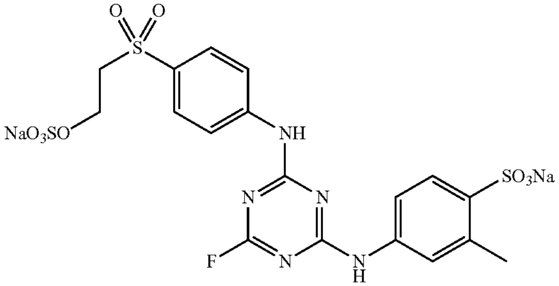 |
| 116 (II-115) | N | $NH_2$ | $NH_2$ | H | 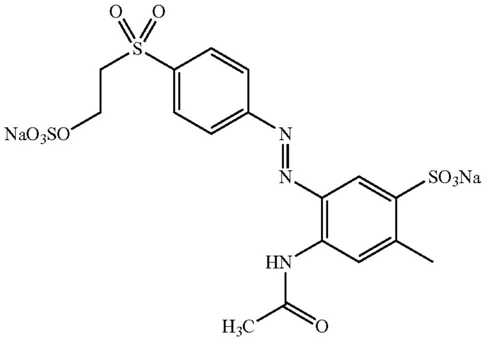 | 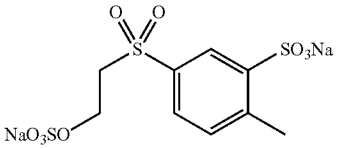 |

B. Examples of Mixtures of the Invention

EXAMPLE 120

70 parts of an electrolyte-containing dye powder containing the navy disazo dye of the formula (I-1)

(I-1)

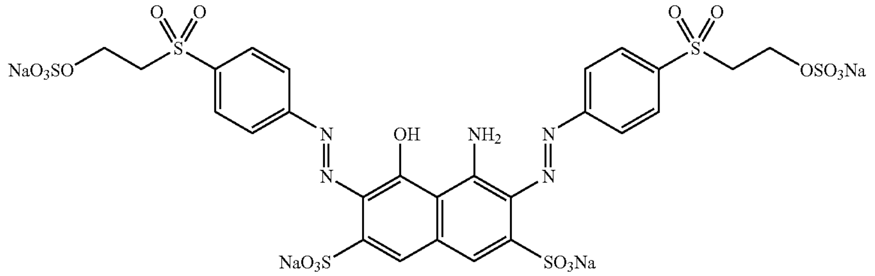

in a fraction of 75% and 30 parts of an electrolyte-containing dye powder containing the brown trisazo dye of the formula (II-1)

(II-1)

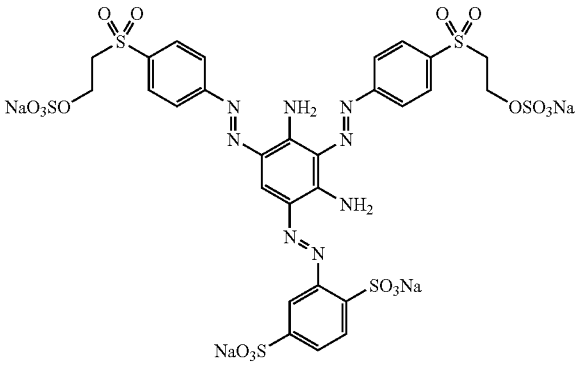

in a fraction of 75% are mixed mechanically with one another.

The resulting dye mixture of the invention gives black dyeings and prints, on cotton for example, under the dyeing conditions typical for reactive dyes.

EXAMPLE 121

67 parts of an electrolyte-containing dye powder containing the navy disazo dye of the formula (I-1) in a fraction of 75% and 33 parts of an electrolyte-containing dye powder containing the brown trisazo dye of the formula (II-2)

(II-2)

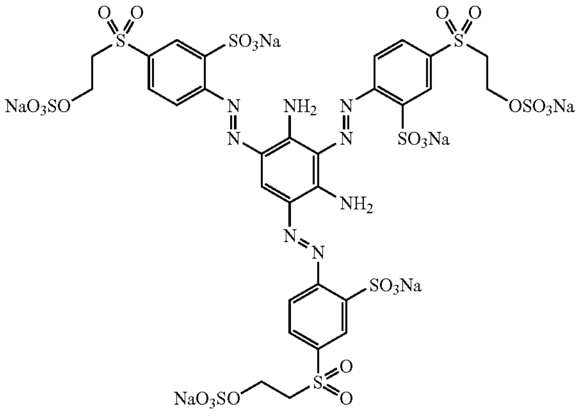

in a fraction of 75% are dissolved in 500 parts of water and the dye solution obtained is adjusted to pH 5-6. Evaporating this dye solution gives a dye mixture which gives black dyeings and prints on cotton under the dyeing conditions typical for reactive dyes.

EXAMPLE 122

70 parts of an electrolyte-containing dye powder containing the navy disazo dye of the formula (I-1), 18 parts of an electrolyte-containing dye powder containing the brown trisazo dye of the formula (II-3)

(II-3)

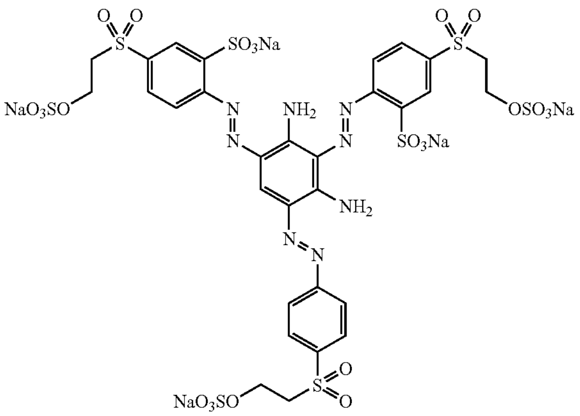

in a fraction of 70% and 12 parts of an electrolyte-containing dye powder containing the scarlet disazo dye of the formula (III-1)

(III-1)

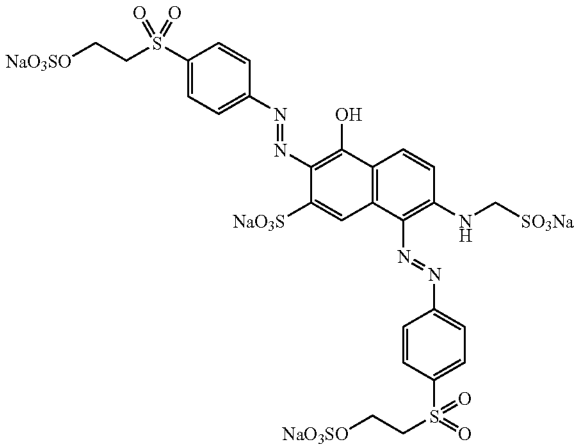

in a fraction of 70% are mixed mechanically with one another.

The resulting dye mixture of the invention gives jet black dyeings and prints, on cotton for example, under the dyeing conditions typical for reactive dyes.

EXAMPLE 123

67 parts of an electrolyte-containing dye powder containing the navy disazo dye of the formula (I-1) in a fraction of 75%, 15 parts of an electrolyte-containing dye powder containing the brown trisazo dye of the formula (II-5)

(II-5)

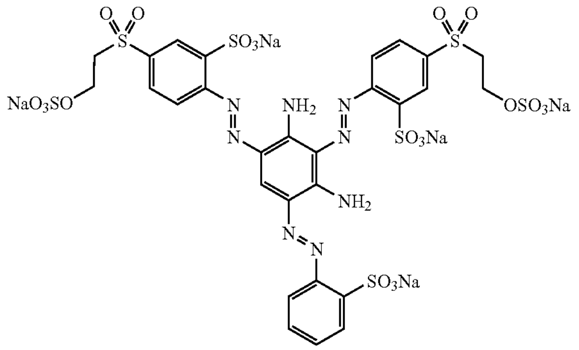

in a fraction of 70% and 15 parts of an electrolyte-containing dye powder containing the orange azo dye of the formula (IV-1)

(IV-1)

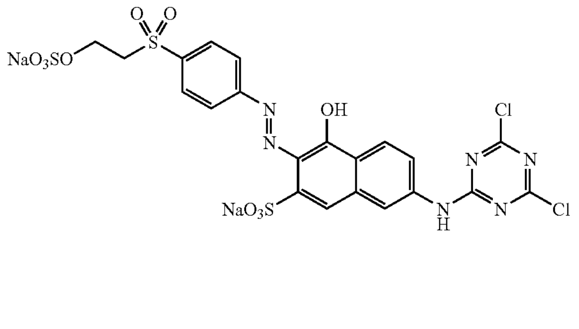

in a fraction of 75% are dissolved in 500 parts of water and the dye solution obtained is adjusted to pH 5-6. Evaporating this dye solution gives a dye mixture which gives jet black dyeings and prints on cotton under the dyeing conditions typical for reactive dyes.

EXAMPLE 124

67 parts of an electrolyte-containing dye powder containing the navy disazo dye of the formula (I-1), 23 parts of an electrolyte-containing dye powder containing the brown trisazo dye of the formula (II-6)

(II-6)

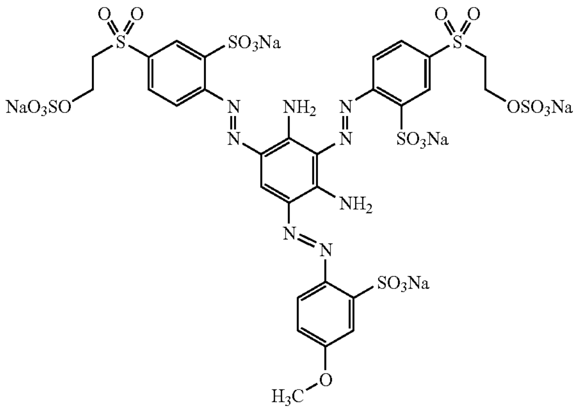

in a fraction of 70% and 10 parts of an electrolyte-containing dye powder containing the scarlet disazo dye of the formula (III-2)

(III-2)

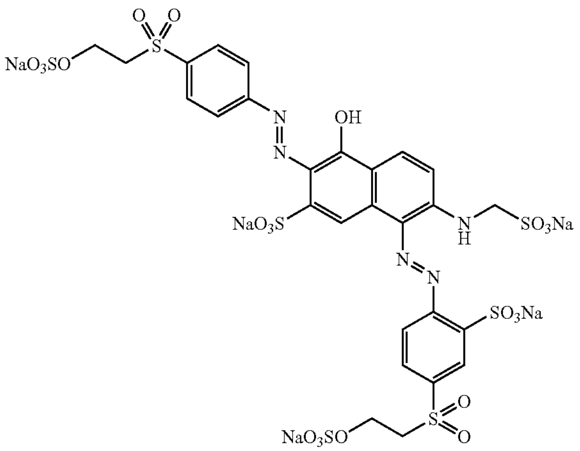

in a fraction of 70% are mixed mechanically with one another.

The resulting dye mixture of the invention gives jet black dyeings and prints, on cotton for example, under the dyeing conditions typical for reactive dyes.

EXAMPLE 125

59 parts of 4-(β-sulfatoethylsulfonyl)aniline are suspended in 145 parts of ice-water and 38 parts of 30% strength hydrochloric acid and diazotized by dropwise addition of 37 parts of 40% strength sodium nitrite solution. After removal of the excess nitrite with amidosulfonic acid, 22.6 parts of 1-amino-8-hydroxynaphthalene-3,6-disulfonic acid are added and coupling takes place initially, in a first stage, at a pH of 1 to 1.5 at below 20° C. to give a monoazo dye of the formula (15-1)

(15-1)

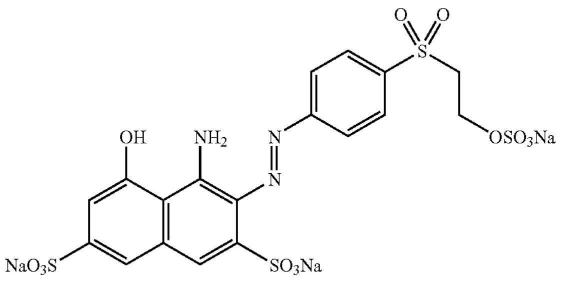

The pH range indicated is set, and maintained during the coupling reaction, by addition of solid sodium hydrogen carbonate.

After the end of the first coupling an aqueous solution of 12.1 parts of the yellow monoazo dye of the formula (24-1)

(24-1)

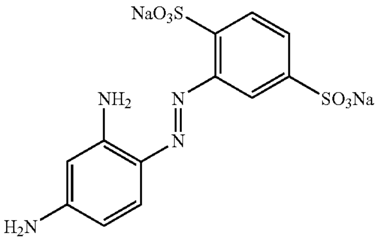

which has been prepared by diazotizing 7.4 parts of 2-aminobenzene-1,4-disulfonic acid with 5.1 parts of 40% strength sodium nitrite solution in an acidic medium and subsequent coupling onto 3.1 parts of 1,3-diaminobenzene in an aqueous medium at a pH of 1.5-2.5, is added and the pH is adjusted to 5.5-6.5 at below 26° C. using sodium carbonate. The 70:30 mixture of the two azo dyes (I-1) and (II-1) that results after the end of the second coupling reaction is isolated by evaporation in vacuo or spray drying.

Alternatively the dye solution obtained, can also be buffered at a pH of 5.5-6 by addition of a phosphate buffer and can be adjusted by further dilution or concentration to give a liquid brand of defined strength.

The resulting dye mixture of the invention dyes cotton in black shades.

EXAMPLE 126 a) 24 parts of 2,5-dimethoxy-4-(β-sulfatoethylsulfonyl) aniline are suspended in 60 parts of ice-water and 13 parts of 30% strength hydrochloric acid and diazotized by dropwise addition of 12.5 parts of 40% strength sodium nitrite solution. After removal of the excess nitrite with amidosulfonic acid, 21.5 parts of 1-amino-8-hydroxynaphthalene-3,6-disulfonic acid are added and coupling is carried out in a first stage at a pH of 1-1.5 below 20° C. to give a red monoazo dye of the formula (15-2)

(15-2)

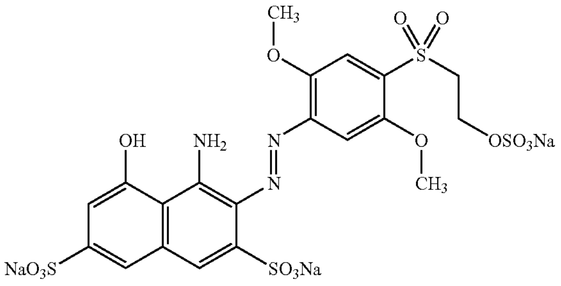

The pH range indicated is set, and maintained during the coupling reaction, by addition of solid sodium hydrogen carbonate. After the end of the first coupling an aqueous solution is added of 12.1 parts of the yellow monoazo dye of the formula (24-1), (24-1)

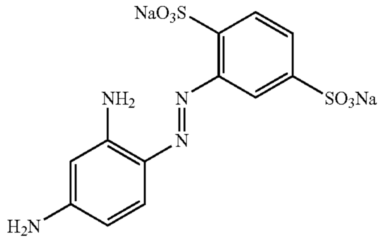

which was prepared by diazotizing 7.4 parts of 2-aminobenzene-1,4-disulfonic acid with 5.1 parts of 40% strength sodium nitrite solution in an acidic medium and subsequent coupling onto 3.1 parts of 1,3-diaminobenzene in an aqueous medium at a pH of 1.5-2.5.

b) In a separate reaction vessel 37 parts of 4-(β-sulfatoethylsulfonyl)aniline are suspended in 91 parts of ice-water and 24 parts of 30% strength hydrochloric acid and diazotized by dropwise addition of 23.5 parts of 40% strength sodium nitrite solution. After removal of the excess nitrite with amidosulfonic acid the resulting diazo suspension is added dropwise to the aqueous mixture of the two monoazo dyes from a) and the pH is adjusted to 5.5-6.5 at below 25° C. using sodium carbonate. The 70:30 mixture of the two dyes (I-9)

(I-9)

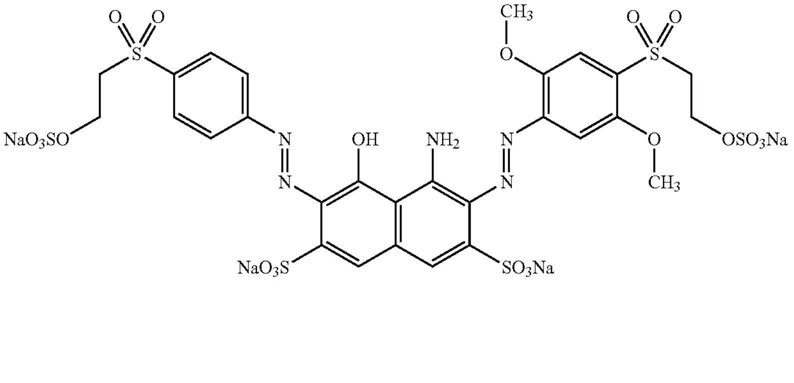

and (II-1), obtained after the end of the coupling reaction, is subsequently isolated by evaporation in vacuo or by spray drying. The resulting dye mixture of the invention dyes cotton in black shades.

EXAMPLE 127 a) 18.5 parts of 4-(β-sulfatoethylsulfonyl)aniline are suspended in 50 parts of ice-water and 12 parts of 30% strength hydrochloric acid and diazotized by dropwise addition of 12 parts of 40% strength sodium nitrite solution. After removal of the excess nitrite with amidosulfonic acid, 20.5 parts 1-amino-8-hydroxy-naphthalene-3,6-disulfonic acid are added and coupling is carried out initially, in a first stage, at a pH of 1-1.5 at below 20° C. to give a monoazo dye of the formula (15-1). The pH range indicated is set, and maintained during the coupling reaction, by addition of solid sodium hydrogen carbonate. After the end of the first coupling an aqueous solution of 2.4 parts of 1,3-diaminobenzene is added and the pH is adjusted to 2 using sodium carbonate solution.
b) In a separate reaction vessel 47 parts of 2-amino-5-(β-sulfatoethylsulfonyl)benzenesulfonic acid are suspended in 100 parts of ice-water and 25 parts of 30% strength hydrochloric acid and diazotized by dropwise addition of 24 parts of 40% strength sodium nitrite solution. After removal of the excess nitrite with amidosulfonic acid, the resulting diazo solution is added dropwise at 10-15° C. to the aqueous coupler mixture from a), the pH being maintained during the addition at 1.7-2.5 using solid sodium carbonate. Following complete addition of the diazo solution, the pH is slowly adjusted to 5.5-6.5 at below 25° C., using sodium carbonate, and the 70:30 mixture of the two dyes (I-7)

(24-2)

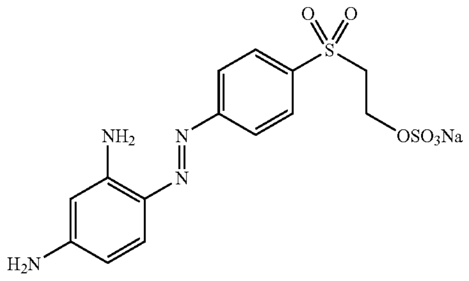

The pH range indicated is set, and maintained during the coupling reaction, by addition of solid sodium hydrogen carbonate.
b) In a separate reaction vessel 41 parts of 2-amino-5-(β-sulfatoethylsulfonyl)benzenesulfonic acid are suspended in 90 parts of ice-water and 22 parts of 30% strength hydrochloric acid and diazotized by dropwise addition of 21 parts of 40% strength sodium nitrite solution. After removal of the excess nitrite with amidosulfonic acid, the resulting diazo solution is added dropwise at 10-15° C. to the aqueous coupler mixture from a), the pH being maintained during the addition at 2-3 using solid sodium carbonate. Following complete addition of the diazo solution, the pH is slowly adjusted to 5.5-6.5 at below 25° C., using sodium carbonate, and the 70:30 mixture of the two dyes (I-7) and (II-3) obtained after the end of the coupling reaction, is subsequently isolated by evaporation in vacuo or by spray drying. The resulting dye mixture of the invention dyes cotton in black shades.

(I-7)

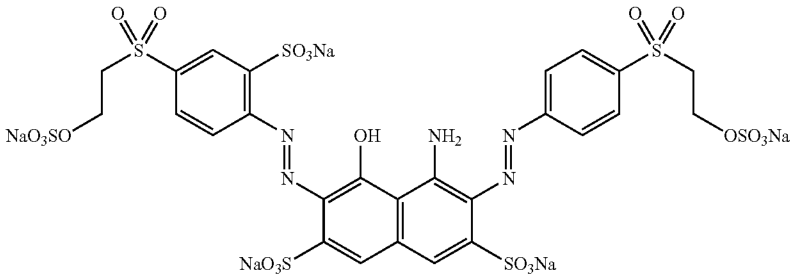

and (II-2), obtained after the end of the coupling reaction, is subsequently isolated by evaporation in vacuo or by spray drying. The resulting dye mixture of the invention dyes cotton in black shades.

EXAMPLE 128 a) 26 parts of 4-(β-sulfatoethylsulfonyl)aniline are suspended in 65 parts of ice-water and 17 parts of 30% strength hydrochloric acid and diazotized by dropwise addition of 16.5 parts of 40% strength sodium nitrite solution. After removal of the excess nitrite with amidosulfonic acid, 20.4 parts 1-amino-8-hydroxynaphthalene-3,6-disulfonic acid, and 2.6 parts of 1,3-diaminobenzene in the form of an aqueous solution are added and coupling is carried out initially, in a first stage, at a pH of 1-1.7 at below 20° C. to give a mixture of the two monoazo dyes of the formula (15-1) and (24-2)

EXAMPLE 129 a) 18.5 parts of 4-(β-sulfatoethylsulfonyl)aniline are suspended in 45 parts of ice-water and 12 parts of 30% strength hydrochloric acid and diazotized by dropwise addition of 12 parts of 40% strength sodium nitrite solution. After removal of the excess nitrite with amidosulfonic acid, 20.4 parts 1-amino-8-hydroxy-naphthalene-3,6-disulfonic acid are added and coupling is carried out initially, in a first stage, at a pH of 1-1.5 at below 20° C. to give a monoazo dye of the formula (15-1). The pH range indicated is set, and maintained during the coupling reaction, by addition of solid sodium hydrogen carbonate. After the end of the first coupling an aqueous solution of 9 parts of the yellow monoazo dye of formula (24-3), (24-3)

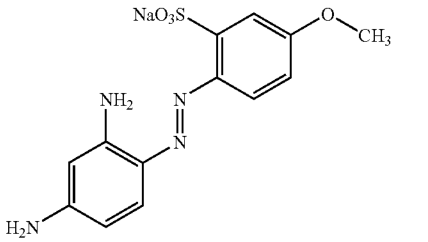

which has been prepared by diazotizing 5.3 parts of 2-amino-5-methoxy-benzenesulfonic acid with 4.5 parts of a 40% strength sodium nitrite solution in acidic medium and subsequently coupling the product onto 2.8 parts of 1,3-diaminobenzene in an aqueous medium at a pH of 1.5-2.5.

b) In a separate reaction vessel 42 parts of 2-amino-5-(R-sulfatoethylsulfonyl)benzenesulfonic acid are suspended in 95 parts of ice-water and 23 parts of 30% strength hydrochloric acid and diazotized by dropwise addition of 21.5 parts of 40% strength sodium nitrite solution. After removal of the excess nitrite with amidosulfonic acid, the resulting diazo solution is added dropwise to the aqueous mixture of the two monoazo dyes from a), and the pH is adjusted to 5.5-6.5 at below 25° C. using sodium carbonate. The 69:31 mixture of the two dyes (I-7) and (II-6) obtained after the end of coupling reaction is subsequently isolated by evaporation in vacuo or by spray drying.

The resulting dye mixture of the invention dyes cotton in black shades.

EXAMPLE 130 a) 18 parts of 4-(β-sulfatoethylsulfonyl)aniline are suspended in 45 parts of ice-water and 12 parts of 30% strength hydrochloric acid and diazotized by dropwise addition of 12 parts of 40% strength sodium nitrite solution. After removal of the excess nitrite with amidosulfonic acid, 20.4 parts 1-amino-8-hydroxynaphthalene-3,6-disulfonic acid are added and coupling is carried out initially, in a first stage, at a pH of 1-1.5 at below 20° C. to give a red monoazo dye of the formula (15-1). The pH range indicated is set, and maintained during the coupling reaction, by addition of solid sodium hydrogen carbonate. After the end of the first coupling an aqueous solution of a mixture of 4.3 parts of the yellow monoazo dye of formula (24-4) and 5.6 parts of the yellow monoazo dye of the formula (24-5), (24-4)

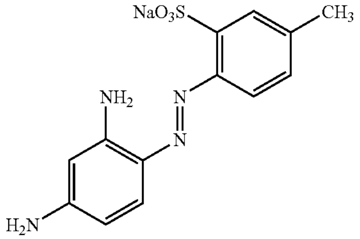

-continued (24-5)

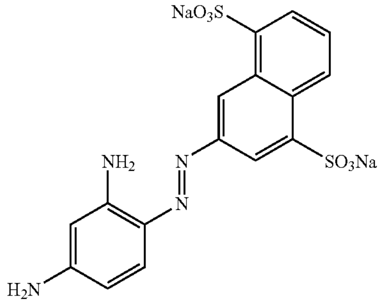

which has been prepared by diazotizing a mixture of 2.5 parts of 2-amino-5-methylbenzenesulfonic acid and 3.6 parts of 3-aminonaphthalene-1,5-disulfonic acid with 4.4 parts of a 40% strength sodium nitrite solution in acidic medium and subsequently coupling the product onto 2.7 parts of 1,3-diaminobenzene in an aqueous medium at a pH of 1.5-2.5.

b) In a separate reaction vessel 42 parts of 2-amino-5-(β-sulfatoethylsulfonyl)benzenesulfonic acid are suspended in 95 parts of ice-water and 23 parts of 30% strength hydrochloric acid and diazotized by dropwise addition of 21.5 parts of 40% strength sodium nitrite solution. After removal of the excess nitrite with amidosulfonic acid, the resulting diazo solution is added dropwise to the aqueous mixture of the three monoazo dyes from a), a pH of 2-2.5 being maintained constantly by simultaneous addition of solid sodium carbonate, and is adjusted to a final pH of 5.5-6.5 at below 25° C. using sodium carbonate. The 70:15:15 mixture of the three dyes (I-7), (II-7) and (II-13) obtained after the end of coupling reaction is subsequently isolated by evaporation in vacuo or by spray drying.

The resulting dye mixture of the invention dyes cotton in black shades.

(II-7)

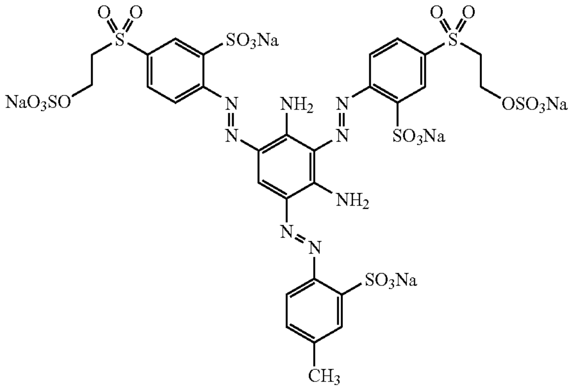

(II-13)

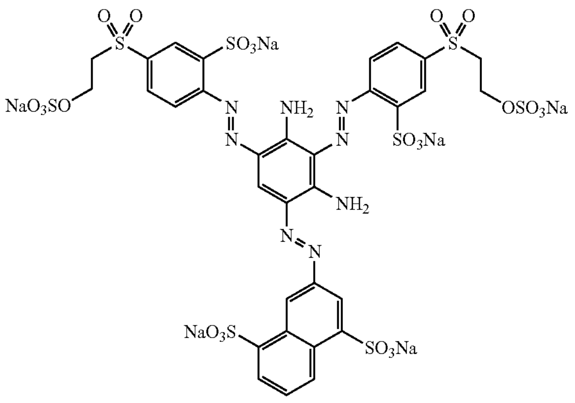

EXAMPLE 131

10 parts of 4-(β-sulfatoethylsulfonyl)aniline and 13 parts of 2-amino-5-(1-sulfatoethylsulfonyl)benzenesulfonic acid are suspended in 60 parts of ice-water and 14 parts of 30% strength hydrochloric acid and diazotized by dropwise addition of 13 parts of 40% strength sodium nitrite solution. After removal of the excess nitrite with amidosulfonic acid, the resulting diazo mixture is added dropwise at 10 to 15° C. and a pH of between 2 and 3, which is maintained with solid sodium carbonate, to an aqueous solution of 14.6 parts of the yellow monoazo dye of the formula (24-1), which has been prepared by diazotizing 8.9 parts of 2-aminobenzene-1,4-disulfonic acid with 6.1 parts of 40% strength sodium nitrite solution in acidic medium and subsequent coupling of the product onto 3.8 parts of 1,3-diaminobenzene in an aqueous medium at a pH of 1.5-2.5. After the end of the addition of the diazo mixture, the pH is adjusted with sodium carbonate to 5.5-6.5, and 60 parts of the navy disazo dye of the formula (I-1) are added. The resulting 60:9:10:10:11 mixture of the five dyes (I-1), (II-1), (II-8), (II-116) and (II-10) can be isolated by evaporation in vacuo by spray drying, and dyes cotton in black shades.

(II-1)

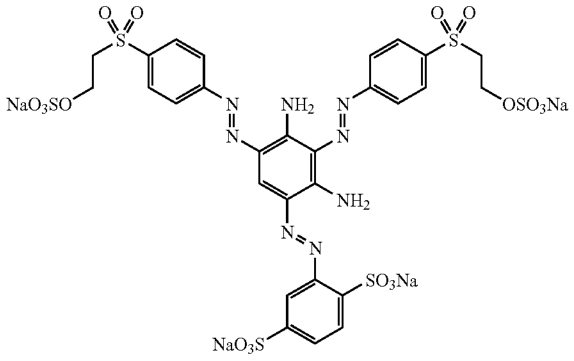

(II-8)

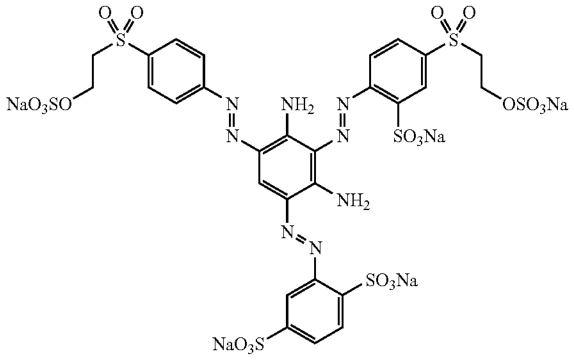

(II-116)

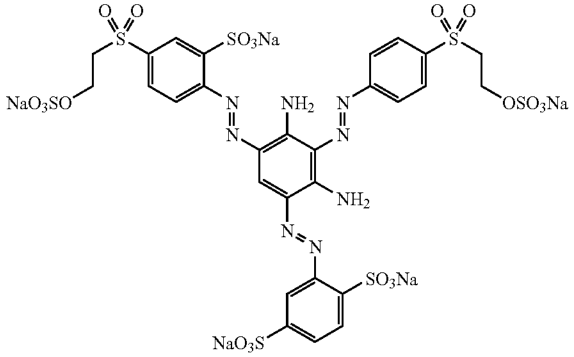

-continued (II-10)

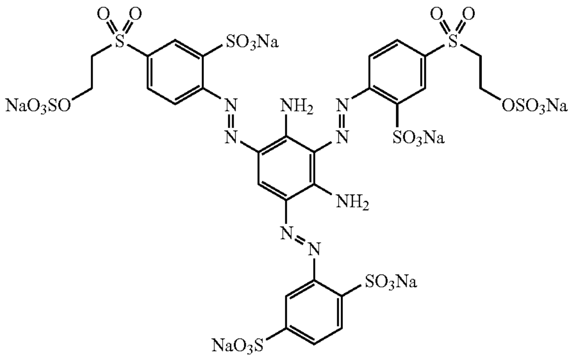

EXAMPLE 132

68 parts of an electrolyte-containing dye powder containing the navy disazo dye of the formula (I-1) in a fraction of 75% and 32 parts of an electrolyte-containing dye powder containing the orange-brown trisazo dye of the formula (II-35)

(II-35)

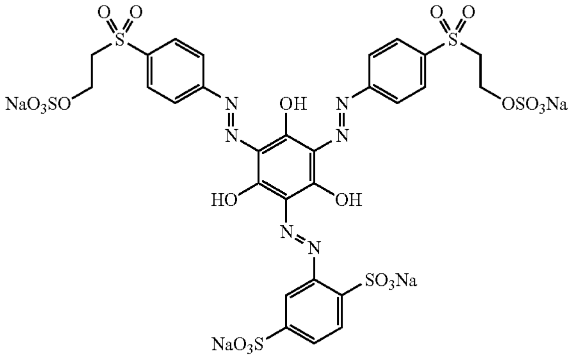

in a fraction of 75% are mixed mechanically with one another.

The resulting dye mixture of the invention gives black dyeings and prints, on cotton for example, under the dyeing conditions typical for reactive dyes.

EXAMPLE 133

67 parts of an electrolyte-containing dye powder containing the navy disazo dye of the formula (I-1) in a fraction of 75% and 33 parts of an electrolyte-containing dye powder containing the golden yellow trisazo dye of the formula (II-81)

(II-81)

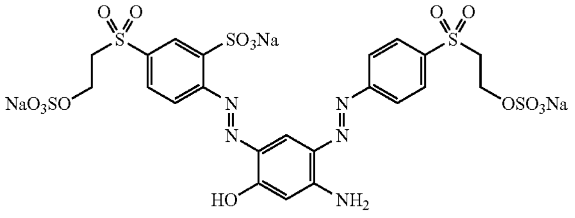

in a fraction of 75% are dissolved in 500 parts of water, and the dye solution obtained is adjusted to a pH of 5-6.

Evaporating this solution produces a dye mixture which gives greenish black dyeings and prints on cotton under the dyeing conditions typical for reactive dyes.

EXAMPLE 134

66 parts of an electrolyte-containing dye powder containing the navy disazo dye of the formula (I-1) in a fraction of 75%, 22 parts of an electrolyte-containing dye powder containing the brown-red trisazo dye of the formula (II-106)

(II-106)

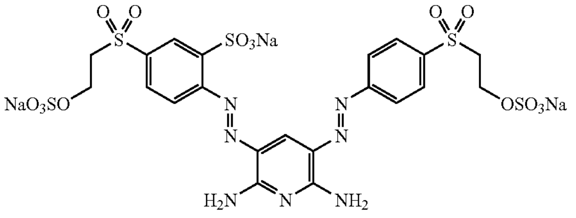

in a fraction of likewise 75%, and 12 parts of an electrolyte-containing dye powder containing the orange disazo dye of the formula (Gb-2)

(Gb-2)

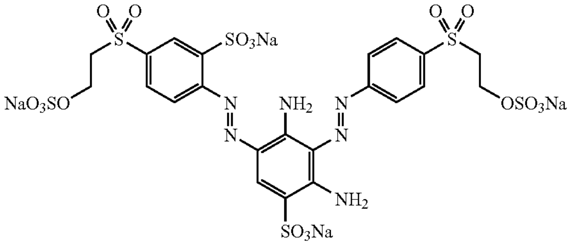

in a fraction of 70% are dissolved in 500 parts of water, and the dye solution obtained is adjusted to a pH of 5-6.

Evaporating this solution produces a dye mixture which gives reddish black dyeings and prints on cotton under the dyeing conditions typical for reactive dyes.

EXAMPLE 135

65 parts of an electrolyte-containing dye powder containing the navy disazo dye of the formula (I-1) in a fraction of 75% and 35 parts of an electrolyte-containing dye powder containing the orange-brown trisazo dye of the formula (II-117)

(II-117)

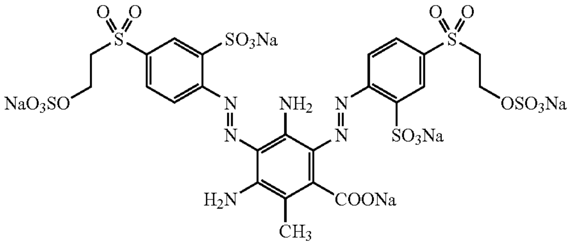

in a fraction of 70% are mixed mechanically with one another.

The resulting dye mixture of the invention gives black dyeings and prints, on cotton for example, under the dyeing conditions typical for reactive dyes.

EXAMPLE 136 a) 19.5 parts of 4-(β-sulfatoethylsulfonyl)aniline are suspended in 50 parts of ice-water and 13 parts of 30% strength hydrochloric acid and diazotized by dropwise addition of 12.5 parts of 40% strength sodium nitrite solution. After removal of the excess nitrite with amidosulfonic acid, 22 parts of 1-amino-8-hydroxy-naphthalene-3,6-disulfonic acid are added and coupling is carried out initially, in a first stage, at a pH of 1-1.5 at below 20° C. to give a monoazo dye of the formula (15-1). The pH range indicated is set, and maintained during the coupling reaction, by addition of solid sodium hydrogen carbonate.

After the end of the first coupling an aqueous solution of 18.3 parts of the yellow monoazo dye of formula (24-6), (24-6)

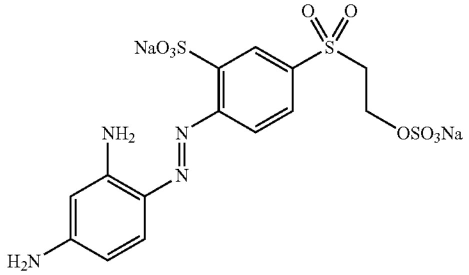

which has been prepared by diazotizing a mixture of 12.6 parts of 2-amino-5-(β-sulfatoethylsulfonyl)benzenesulfonic acid with 6.2 parts of a 40% strength sodium nitrite solution in acidic medium and subsequently coupling the product onto 3.8 parts of 1,3-diaminobenzene in an aqueous medium at a pH of 1.5-2.5 and the pH is adjusted to 3-4 using solid sodium carbonate.

b) In a separate reaction vessel 32.5 parts of 2-methoxy-5-(β-sulfatoethylsulfonyl)aniline suspended in 85 parts of ice-water and 20 parts of 30% strength hydrochloric acid and diazotized by dropwise addition of 18.5 parts of 40% strength sodium nitrite solution. After removal of the excess nitrite with amidosulfonic acid, the resulting diazo solution is added dropwise to the aqueous mixture of the two monoazo dyes from a), a pH of 3-4 being maintained constantly by simultaneous addition of solid sodium carbonate, and is adjusted to a final pH of 5.5-6.5 at below 25° C. using sodium carbonate. The 70:30 mixture of the two dyes (I-2) and (II-56) obtained after the end of coupling reaction is isolated by evaporation in vacuo or by spray drying.

(I-2)

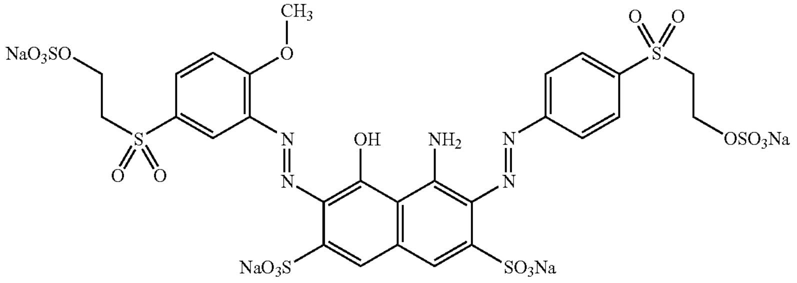

(II-56)

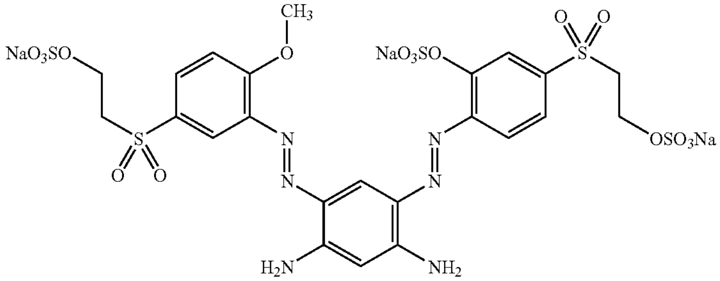

The resulting dye mixture of the invention dyes cotton in greenish black shades.

EXAMPLE 137

52 parts of 4-(β-sulfatoethylsulfonyl)aniline are suspended in 130 parts of ice-water and 34 parts of 30% strength hydrochloric acid and diazotized by dropwise addition of 33 parts of 40% strength sodium nitrite solution. After removal of the excess nitrite with aminosulfonic acid, 22.6 parts of 1-amino-8-hydroxynaphthalene-3,6-disulfonic acid are added and coupling is carried out initially, in the first stage, at a pH of 1-15 at below 20° C. to give a monoazo dyes of the formula (15-1). The stated pH range is set, and maintained during the coupling reaction, by addition of solid sodium hydrogen carbonate. After the end of the first coupling an aqueous solution of 18.9 parts of the yellow monoazo dye of the formula (24-7), (24-7)

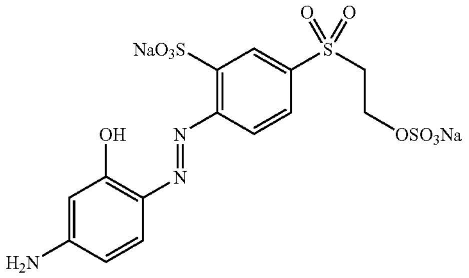

which has been prepared by diazotizing 13 parts of 2-amino-5-(β-sulfatoethylsulfonyl)benzenesulfonic acid with 6.3 parts of 40% strength sodium nitrite solution in acidic medium and subsequent coupling of the product onto 3.9 parts of 3-aminophenol in an aqueous medium at a pH 1.5-2.5 is added, and adjustment to a pH of 5.5-6.5 takes place at below 25° C. using sodium carbonate. The 70:30 mixture of the two azo dyes (I-1) and (II-81) which results in this case after the end of the second coupling reaction is isolated by evaporation in vacuo or spray drying.

(II-81)

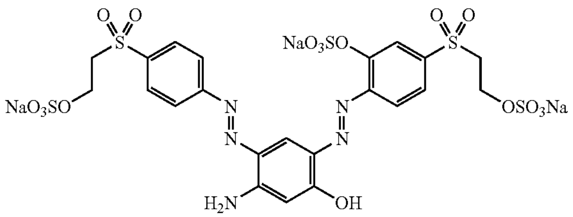

The resulting dye mixture of the invention dyes cotton in greenish black shades.

EXAMPLE 138

An aqueous mixture prepared in accordance with the procedure described in Example 137, using 2,6-diaminopyridine instead of 3-aminophenol as coupling component, and containing 67 parts of the navy disazo dye of the formula (I-1) and 22 parts of the brown-red disazo dye of the formula (II-106)

(II-106)

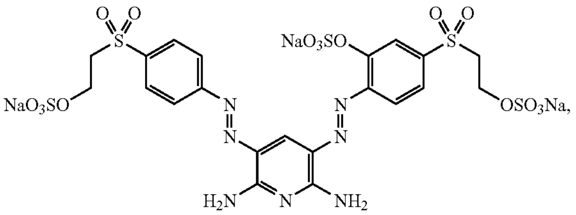

is additionally admixed with 11 parts of the yellow monoazo dye of the formula (Ga-2)

(Ga-2)

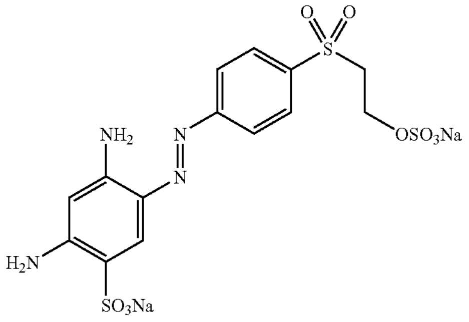

and adjusted with sodium carbonate to a pH 6-6.5. The resulting inventive mixture of the three azo dyes (I-1), (II-106) and (Ga-2) can be isolated by evaporation in vacuo or spray drying, and dyes cotton in black shades.

EXAMPLE 139 a) 29 parts of 4-(β-sulfatoethylsulfonyl)aniline are suspended in 75 parts of ice-water and 18.5 parts of 30% strength hydrochloric acid and diazotized by dropwise addition of 18 parts of 40% strength sodium nitrite solution. After removal of the excess nitrite with amidosulfonic acid, 20.4 parts of 1-amino-8-hydroxynaphthalene-3,6-disulfonic acid and 4 parts of resorcinol are added and coupling is carried out in a first stage at a pH of 1-1.7 at below 20° C. to give a mixture of the two monoazo dyes of the formula (15-1) and (24-8). The stated pH range is adjusted, and maintained during the coupling reaction, by addition of solid sodium hydrogen carbonate.

(24-8)

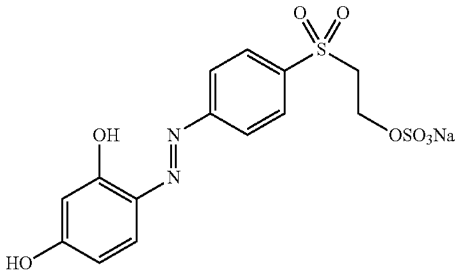

b) In a separate reaction vessel 36.5 parts of 2-amino-5-(β-sulfatoethylsulfonyl)benzenesulfonic acid are suspended in 80 parts of ice-water and 20 parts of 30% strength hydrochloric acid and diazotized by dropwise addition of 18.5 parts of 40% strength sodium nitrite solution. After removal of the excess nitrite with amidosulfonic acid, the resulting diazo solution is added dropwise at 10-15° C. to the aqueous coupler mixture from a), the pH is adjusted to 5.5-6.5 at below 25° C., using sodium carbonate, and the 70:30 mixture of the two dyes (I-7) and (II-93) which results after the end of the coupling reaction is subsequently isolated by evaporation in vacuo or by spray drying. The resulting dye mixture of the invention dyes cotton in black shades.

(II-93)

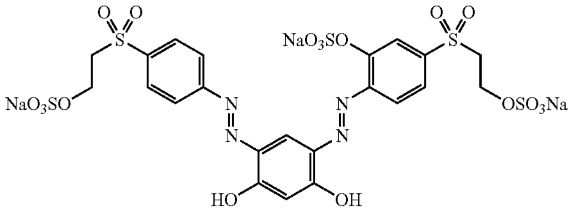

EXAMPLE 140 a) 18.5 parts of 4-(β-sulfatoethylsulfonyl)aniline are suspended in 50 parts of ice-water and 12 parts of 30% strength hydrochloric acid and diazotized by dropwise addition of 12 parts of 40% strength sodium nitrite solution. After removal of the excess nitrite with amidosulfonic acid, 20.5 parts of 1-amino-8-hydroxynaphthalene-3,6-disulfonic acid and are added and coupling is carried out in a first stage at a pH of 1-1.5 at below 20° C. to give a monoazo dye of the formula (15-1). The stated pH range is adjusted, and maintained during the coupling reaction, by addition of solid sodium hydrogen carbonate. After the end of the first coupling an aqueous solution of 4.8 parts of 3,5-diamino-4-methylbenzoic acid is added.

b) In a separate reaction vessel 46 parts of 2-amino-5-(β-sulfatoethylsulfonyl)benzenesulfonic acid are suspended in 100 parts of ice-water and 25 parts of 30% strength hydrochloric acid and diazotized by dropwise addition of 22.5 parts of 40% strength sodium nitrite solution. After removal of the excess nitrite with amidosulfonic acid, the resulting diazo solution is added dropwise at 10-15° C. to the aqueous coupler mixture from a), the pH is adjusted to 5.5-6.5 at below 25° C., using sodium carbonate, and the 70:30 mixture of the two dyes (I-7) and (II-118) which results after the end of the coupling reaction is subsequently isolated by evaporation in vacuo. The resulting dye mixture of the invention dyes cotton in black shades.

(II-118)

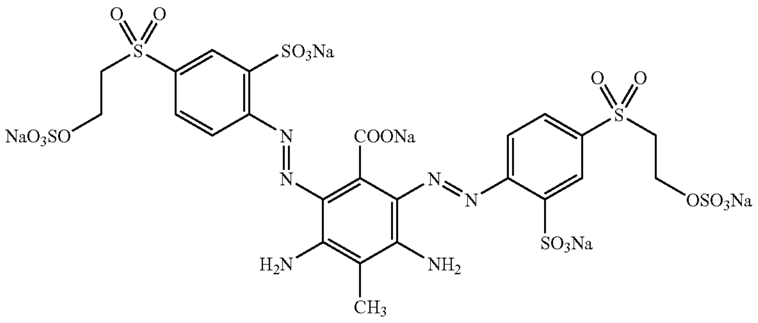

EXAMPLE 141

65 parts of an electrolyte-containing dye powder containing a navy disazo dye of the formula (I-2) in a fraction 75%, 20 parts of an electrolyte-containing dye powder containing the orange disazo dye of the formula (II-54)

(II-54)

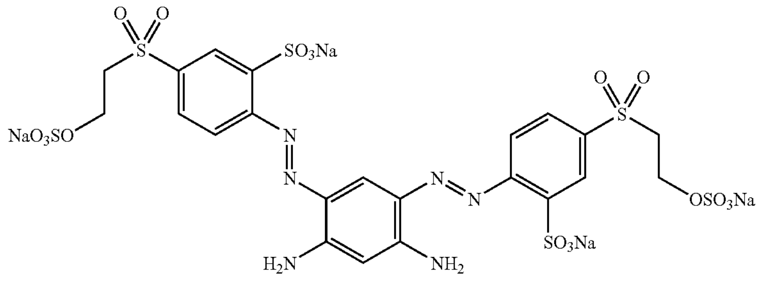

in a fraction of 70% and 15 parts of an electrolyte-containing dye powder containing the scarlet disazo dye of the formula (III-3)

(III-3)

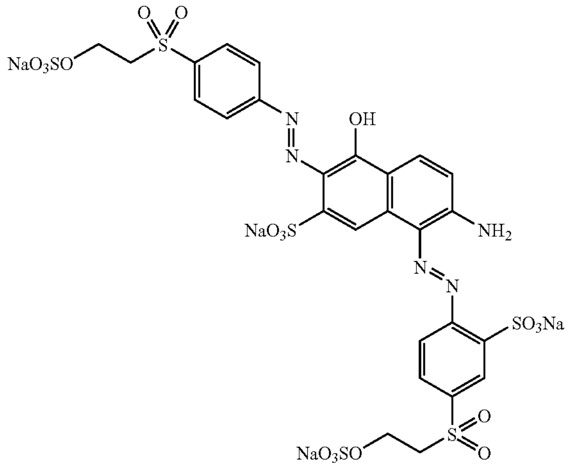

in a fraction of 65% are mixed mechanically with one another.

The resulting dye mixture of the invention gives black dyeings and prints, on cotton for example, under the dyeing conditions typical for reactive dyes.

EXAMPLE 142

67 parts of an electrolyte-containing dye powder containing a navy disazo dye of the formula (I-1) in a fraction 75%, 18 parts of an electrolyte-containing dye powder containing the orange disazo dye of the formula (II-77)

(II-77)

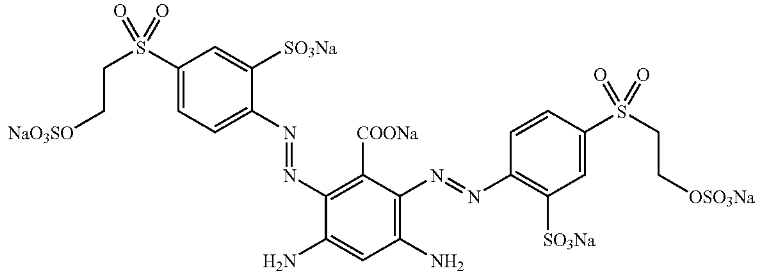

in a fraction of 65% and 15 parts of an electrolyte-containing dye powder containing the orange monoazo dye of the formula (IV-15)

(IV-15)

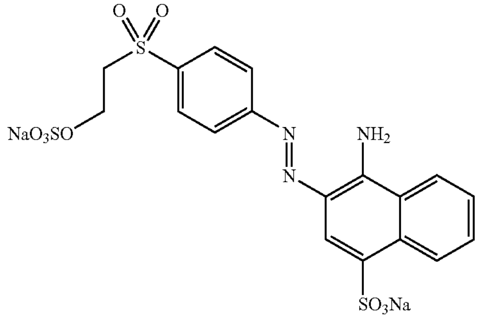

in a fraction of 70% are mixed mechanically with one another.

The resulting dye mixture of the invention gives black dyeings and prints, on cotton for example, under the dyeing conditions typical for reactive dyes.

EXAMPLE 143

45 parts of an electrolyte-containing dye powder containing the greenish navy disazo dye of the formula (I-4)

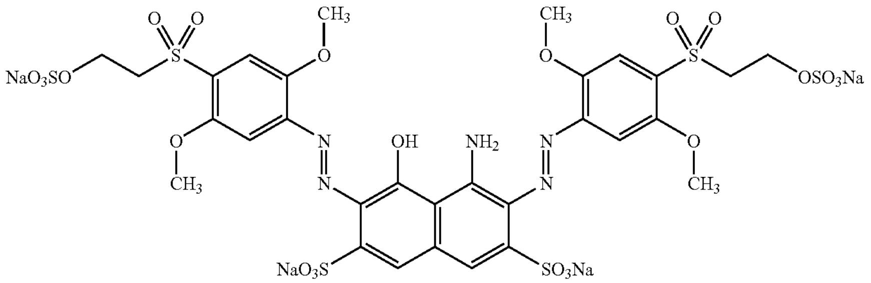

(I-4)

in a fraction of 70%, 25 parts of an electrolyte-containing dye powder containing the navy disazo dye of the formula (I-1) in a fraction of 75%, 15 parts of an electrolyte-containing dye powder containing the brown trisazo dye of the formula (II-2) in a fraction of likewise 75%, and 15 parts of an electrolyte-containing dye powder containing the scarlet disazo dye of the formula (III-2) in a fraction of 80% are dissolved in 500 parts of water and the resulting dye solution is adjusted to a pH of 5.5-6.5 and buffered with phosphate buffer. Evaporation or spray drying of this solution gives a dye mixture which on cotton gives jet black dyeings and prints under the dyeing conditions typical for reactive dyes. Alternatively, by further dilution or concentration, the dye solution obtained can be modified to provide a liquid brand of defined strength.

The examples below described further inventive mixtures of the dyes of the formulae (I)-(IV), each listed in the form of the sodium salts. The mixing ratios are expressed as weight percentages. The dye mixtures afford blue-gray to jet-black dyeings, on cotton for example, by the dyeing methods typical for reactive dyes.

Binary Mixtures of the Invention

| Example | Dye of formula (I) | Dye of formula (II) | Ratio (I):(II) |
|---|---|---|---|
| 144 | (I-1) | 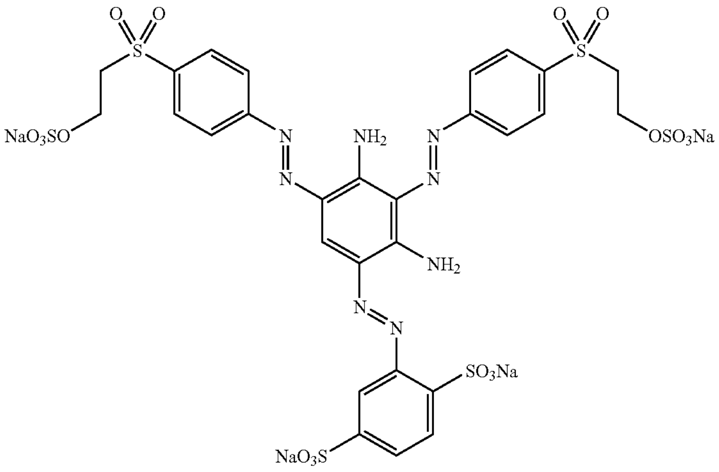 (II-1) | 60:40 |

-continued
| Example | Dye of formula (I) | Dye of formula (II) | Ratio (I):(II) |
|---|---|---|---|
| 145 | (I-1) | 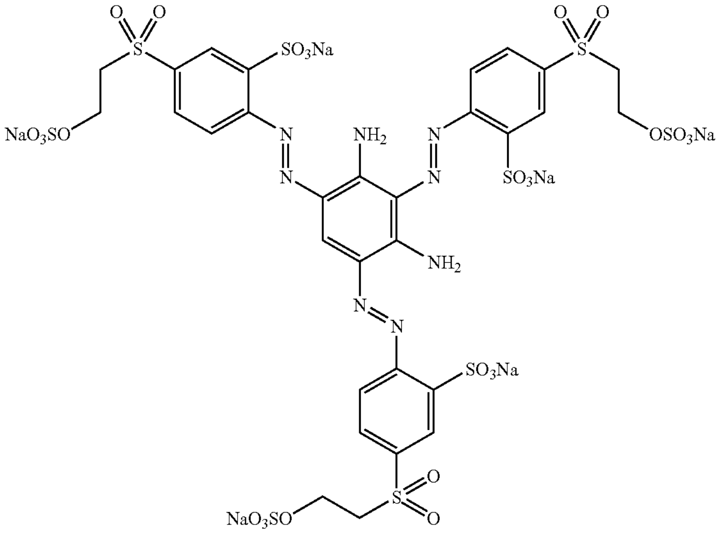 (II-2) | 72:28 |
| 146 | (I-1) | 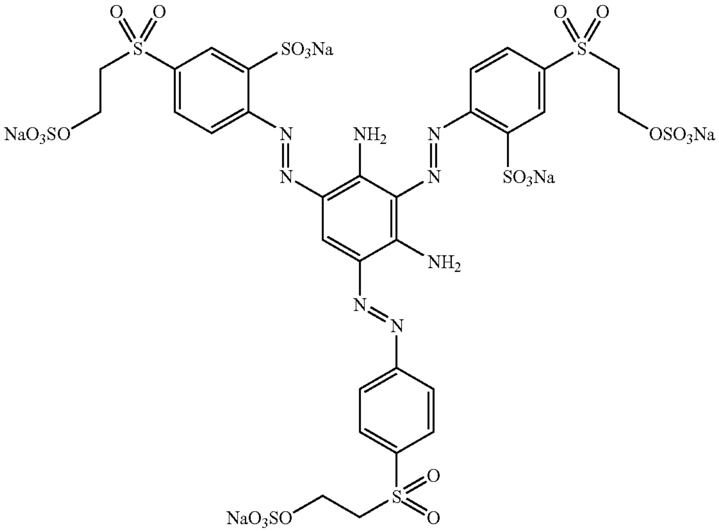 (II-3) | 72:28 |

-continued
| Example | Dye of formula (I) | Dye of formula (II) | Ratio (I):(II) |
|---|---|---|---|
| 147 | (I-1) | 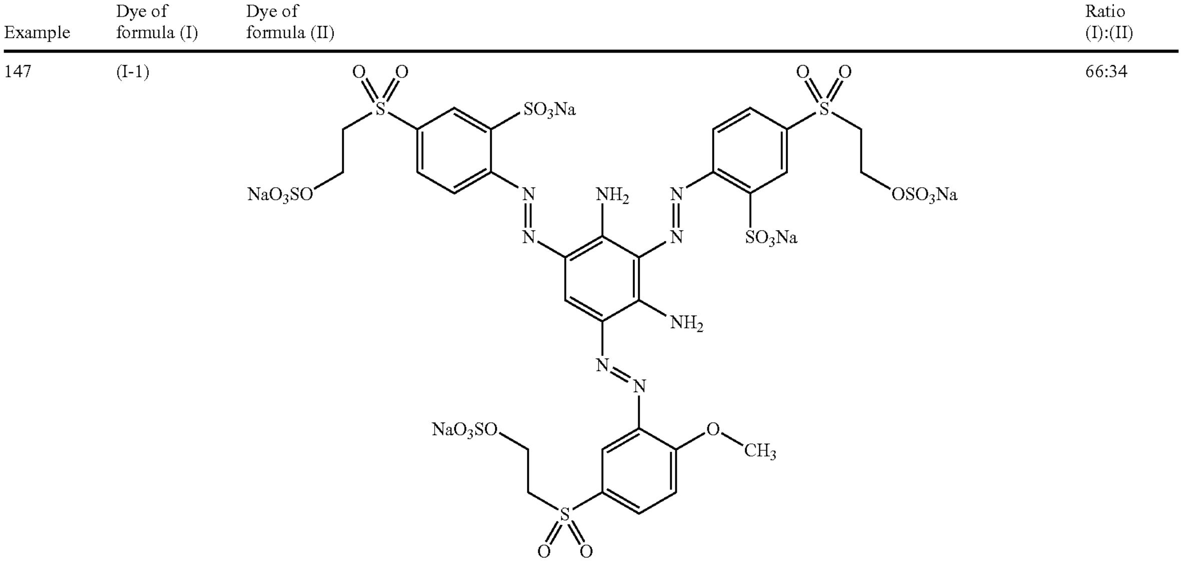 (II-4) | 66:34 |
| 148 | (I-1) | 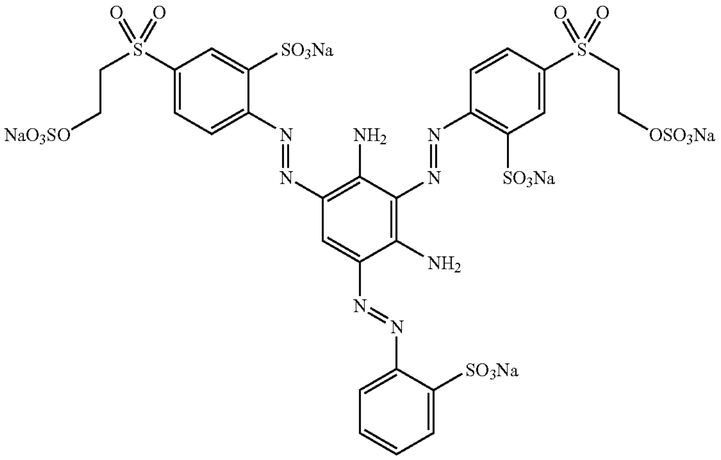 (II-5) | 68:32 |
| 149 | (I-1) | 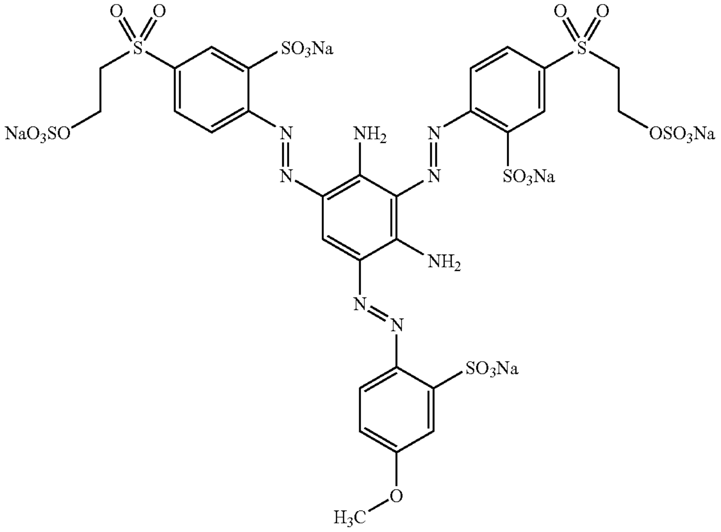 (II-6) | 72:28 |

-continued
| Example | Dye of formula (I) | Dye of formula (II) | Ratio (I):(II) |
|---|---|---|---|
| 150 | (I-1) | 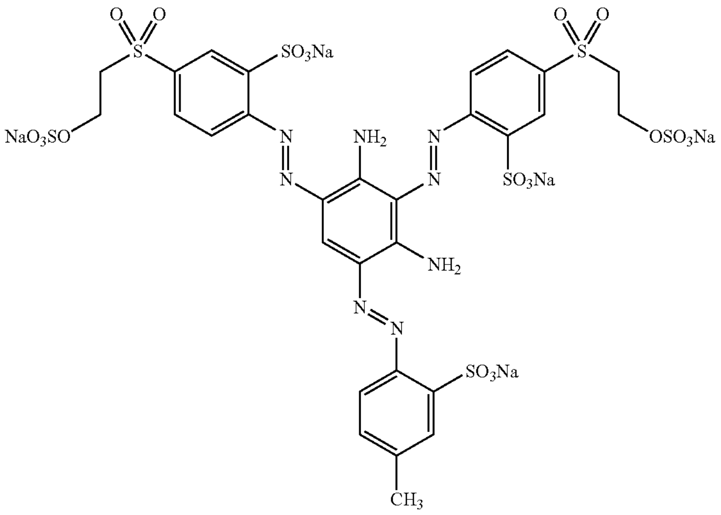 (II-7) | 65:35 |
| 151 | (I-1) | 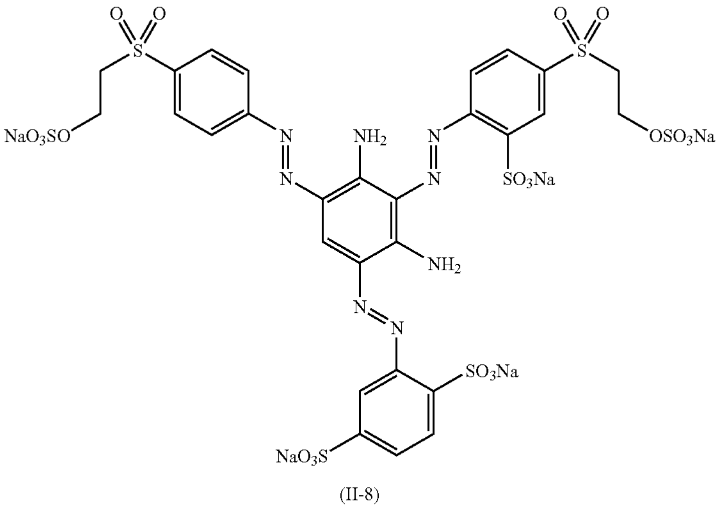 (II-8) | 70:30 |

-continued
| Example | Dye of formula (I) | Dye of formula (II) | Ratio (I):(II) |
|---|---|---|---|
| 152 | (I-1) | 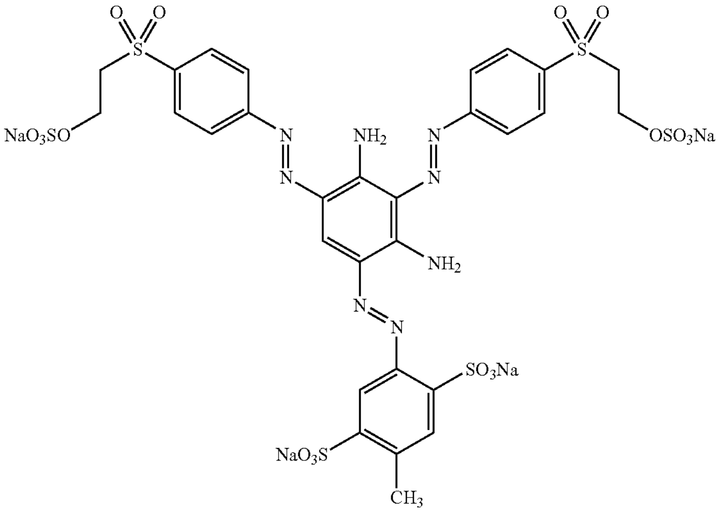 (II-9) | 67:33 |
| 153 | (I-1) | 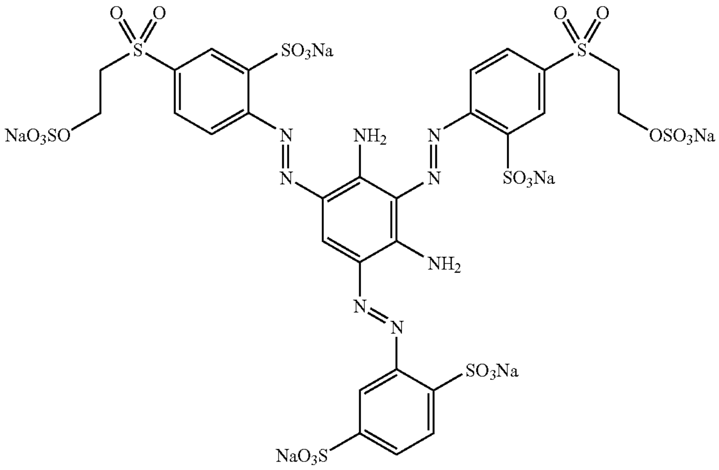 (II-10) | 62:38 |
| 154 | (I-1) | 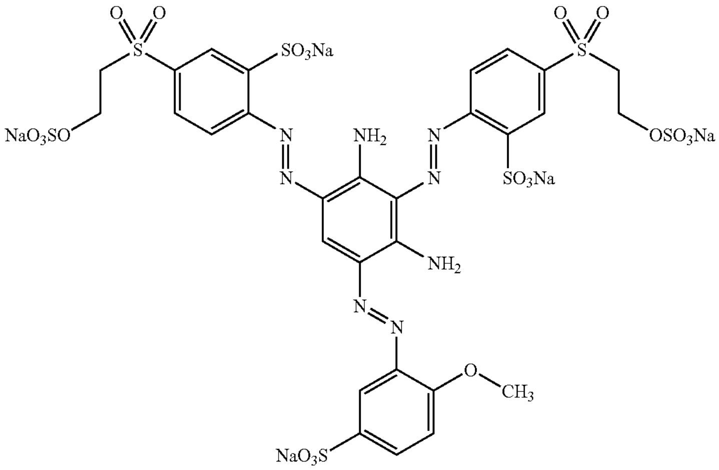 (II-11) | 68:32 |

-continued
| Example | Dye of formula (I) | Dye of formula (II) | Ratio (I):(II) |
|---|---|---|---|
| 155 | (I-1) | 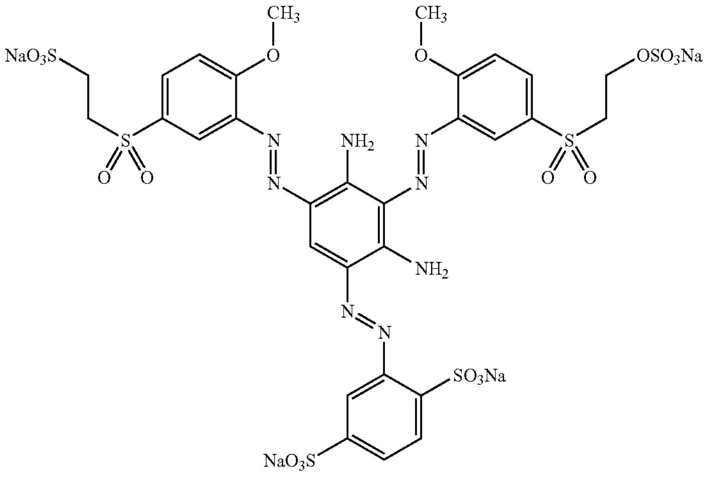 (II-12) | 65:35 |
| 156 | (I-1) | 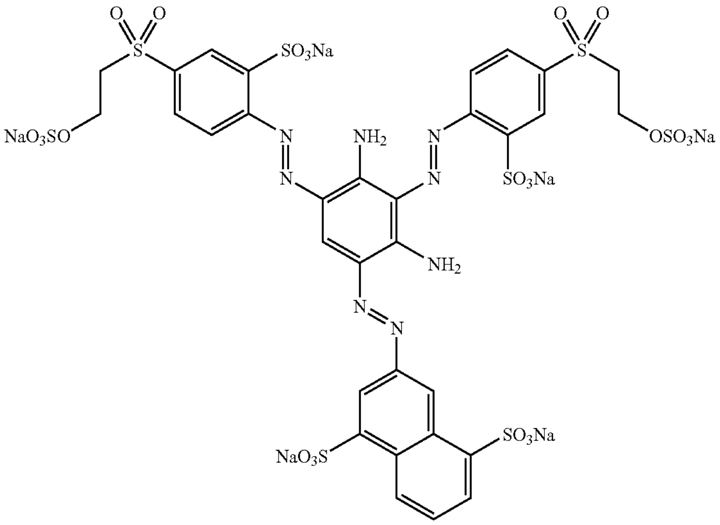 (II-13) | 70:30 |

-continued
| Example | Dye of formula (I) | Dye of formula (II) | Ratio (I):(II) |
|---|---|---|---|
| 157 | (I-1) | 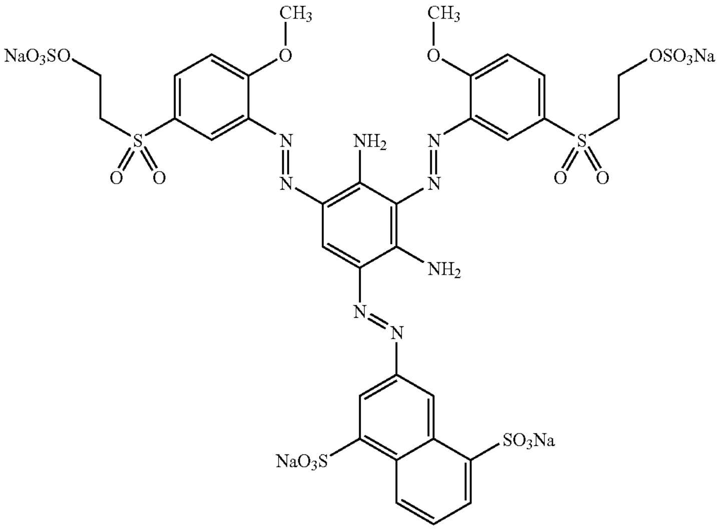 (II-14) | 68:32 |
| 158 | (I-1) | 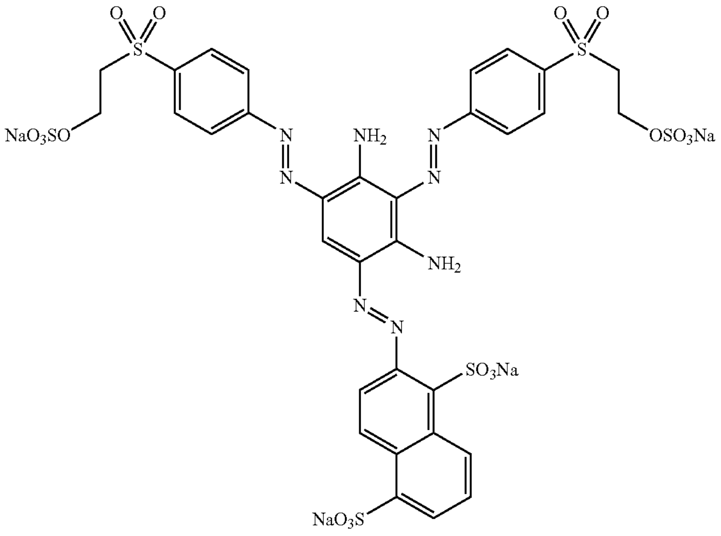 (II-15) | 70:30 |

-continued
| Example | Dye of formula (I) | Dye of formula (II) | Ratio (I):(II) |
|---|---|---|---|
| 159 | (I-1) | 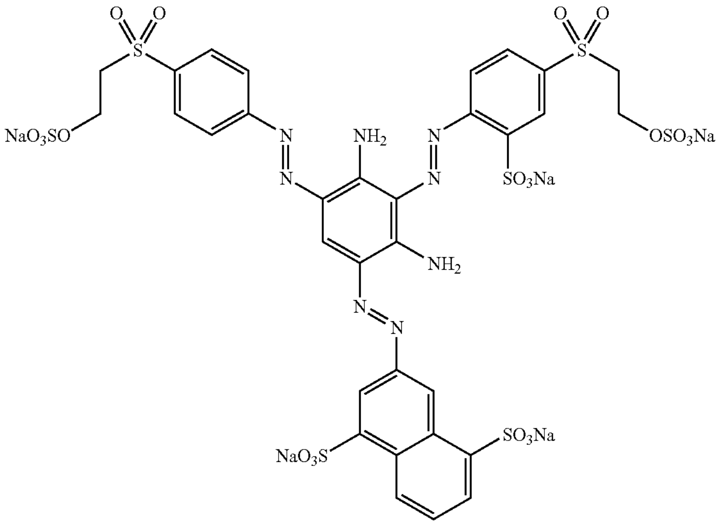 (II-16) | 66:34 |
| 160 | (I-1) | 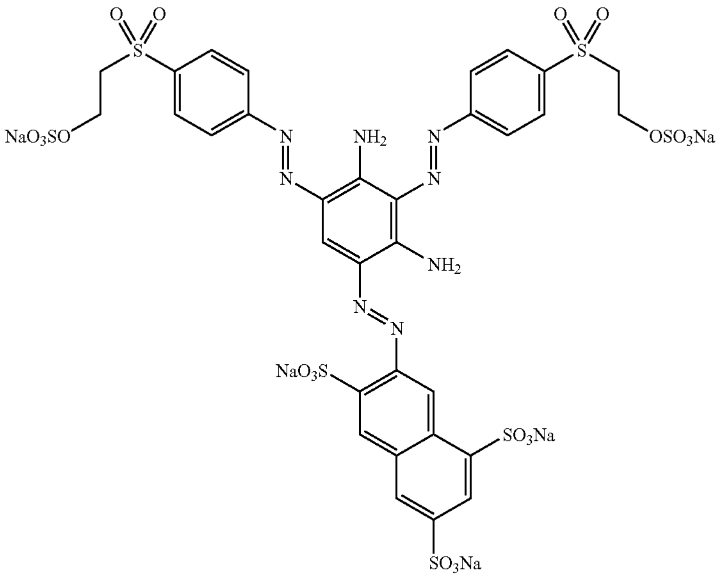 (II-17) | 65:35 |

-continued
| Example | Dye of formula (I) | Dye of formula (II) | Ratio (I):(II) |
|---|---|---|---|
| 161 | (I-1) | 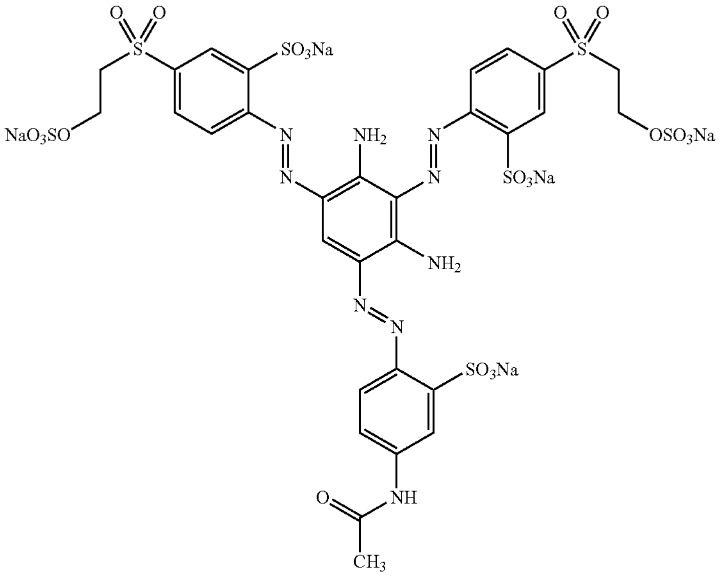 (II-18) | 60:40 |
| 162 | (I-1) | 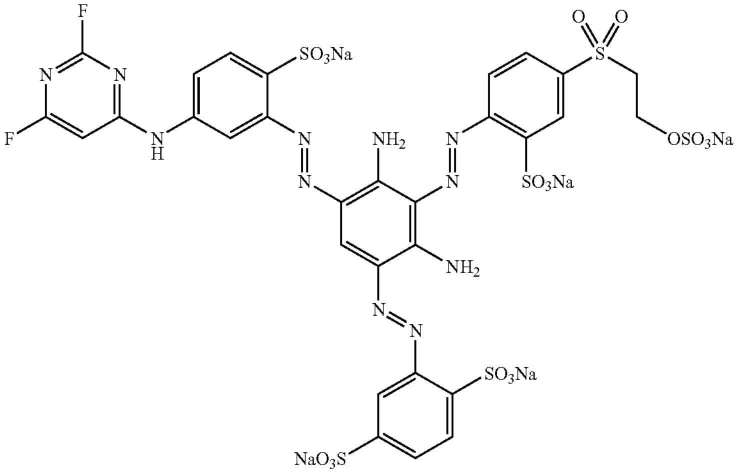 (II-19) | 69:31 |

-continued
| Example | Dye of formula (I) | Dye of formula (II) | Ratio (I):(II) |
|---|---|---|---|
| 163 | (I-1) | 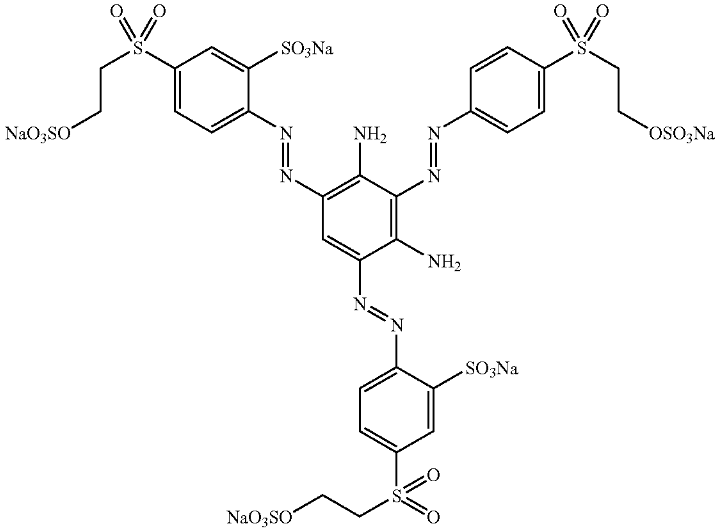 (II-20) | 70:30 |
| 164 | (I-1) | 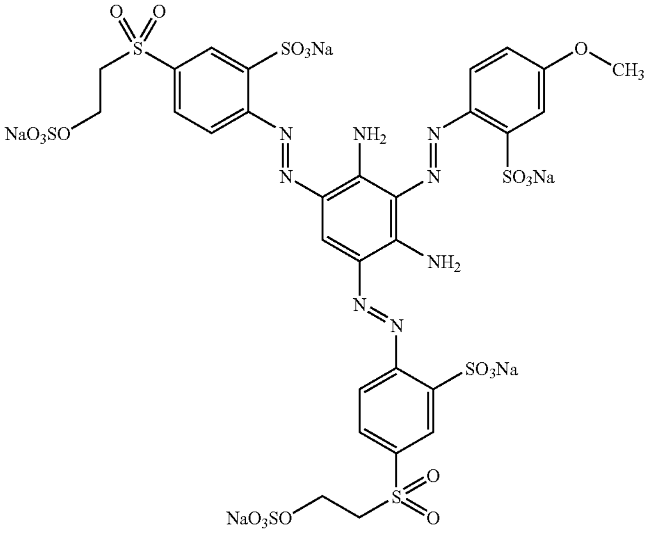 (II-21) | 67:33 |

-continued
| Example | Dye of formula (I) | Dye of formula (II) | Ratio (I):(II) |
|---|---|---|---|
| 165 | (I-1) | 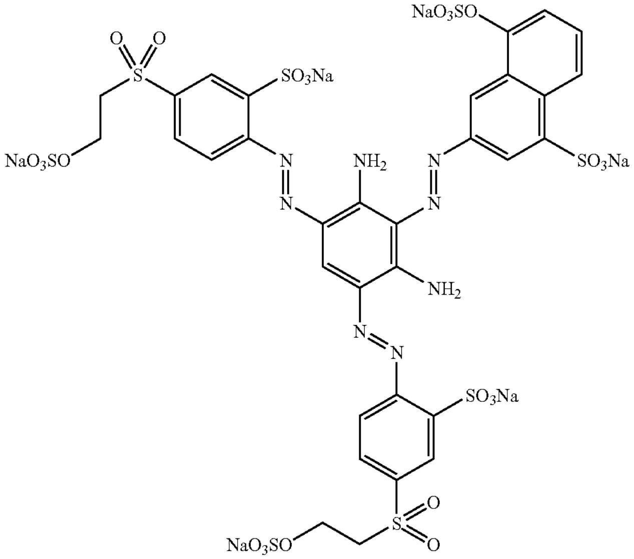 (II-22) | 68:32 |
| 166 | (I-1) | 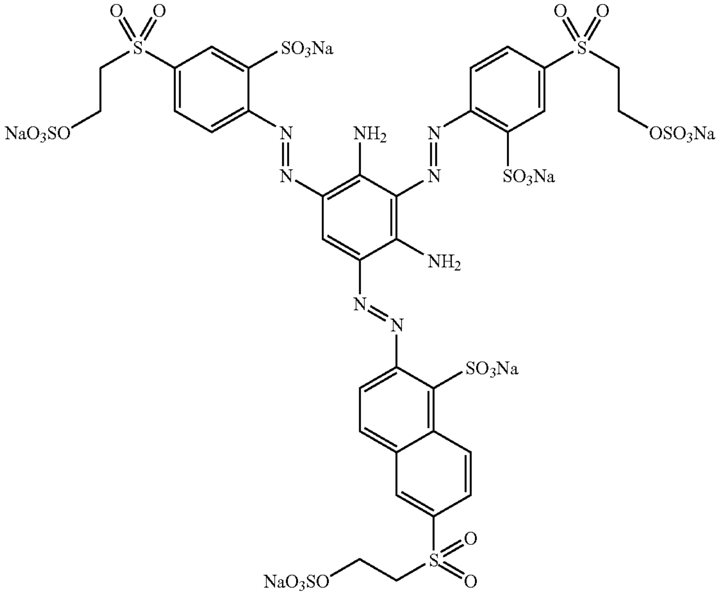 (II-23) | 73:27 |

-continued
| Example | Dye of formula (I) | Dye of formula (II) | Ratio (I):(II) |
|---|---|---|---|
| 167 | (I-1) | 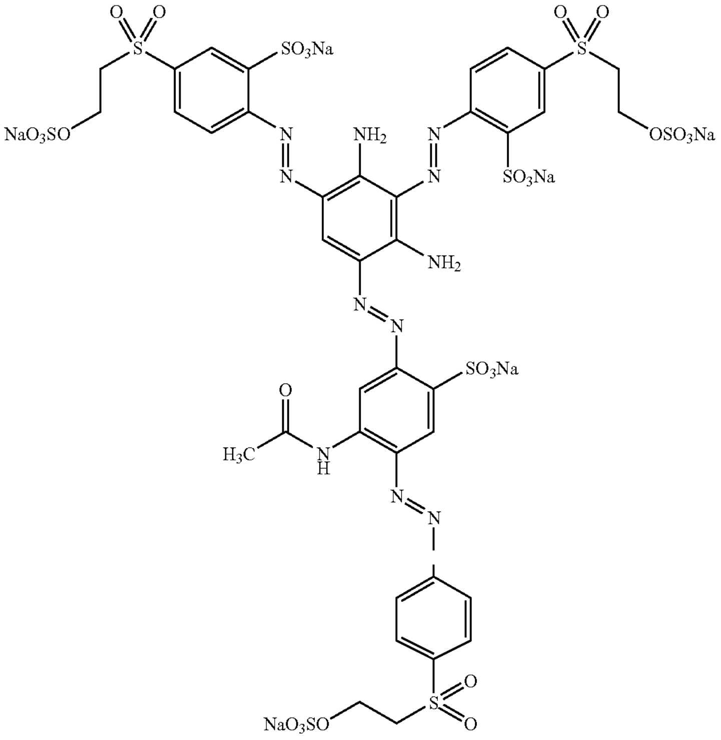 (II-24) | 70:30 |
| 168 | (I-1) | 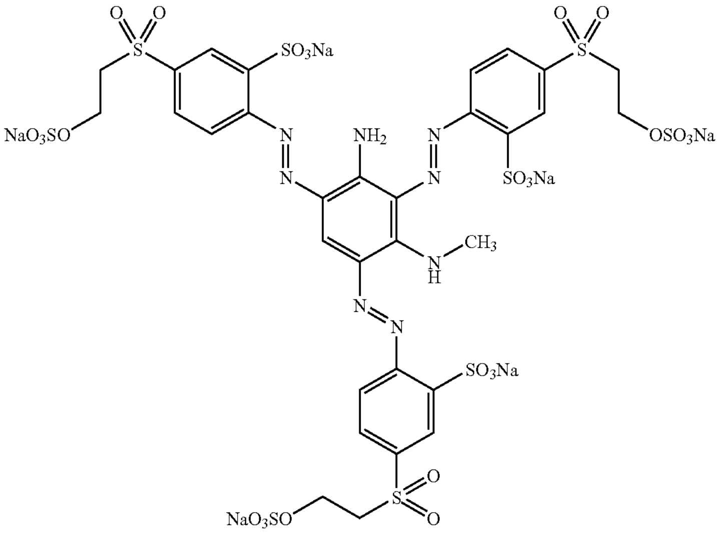 (II-25) | 70:30 |

-continued
| Example | Dye of formula (I) | Dye of formula (II) | Ratio (I):(II) |
|---|---|---|---|
| 169 | (I-1) | 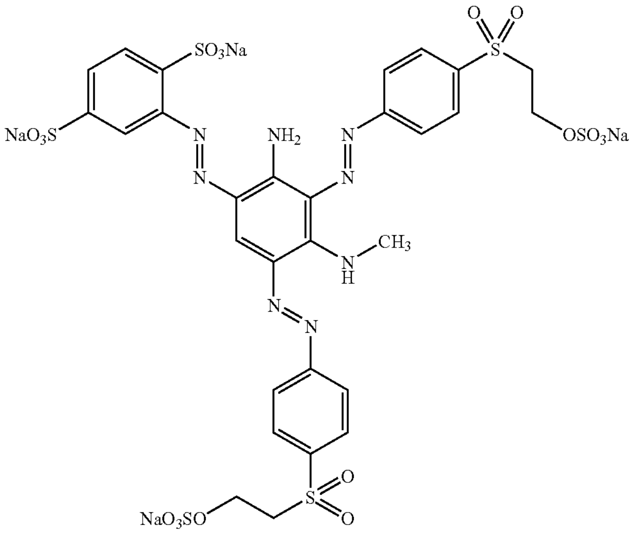 (II-26) | 67:33 |
| 170 | (I-1) | 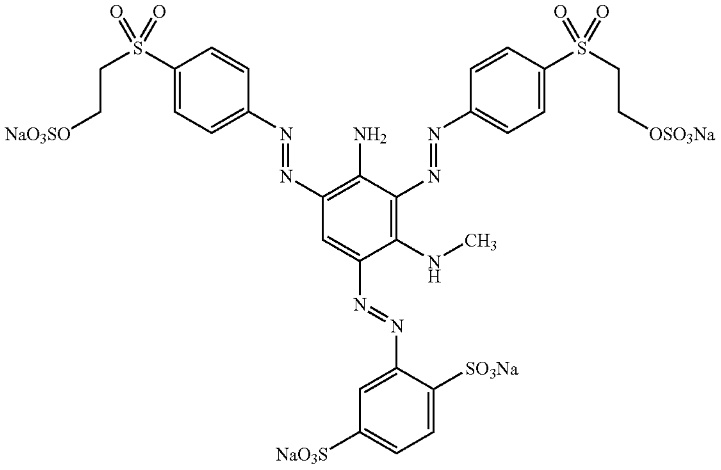 (II-27) | 67:33 |

-continued
| Example | Dye of formula (I) | Dye of formula (II) | Ratio (I):(II) |
|---|---|---|---|
| 171 | (I-1) | 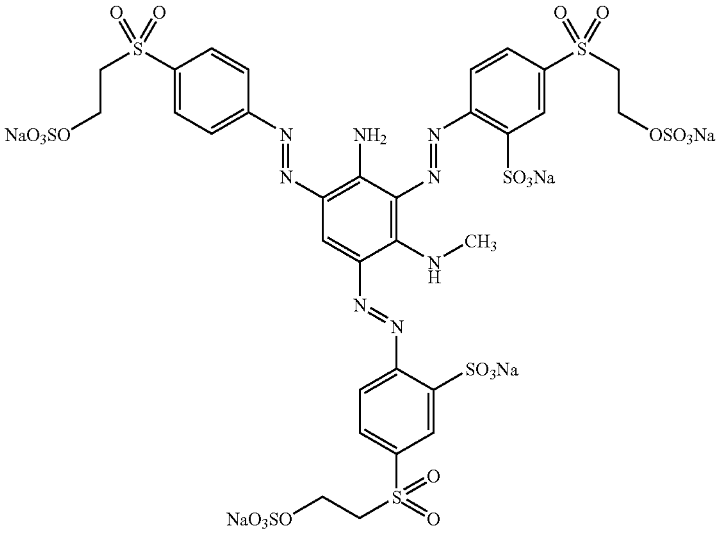 (II-28) | 68:32 |
| 172 | (I-1) | 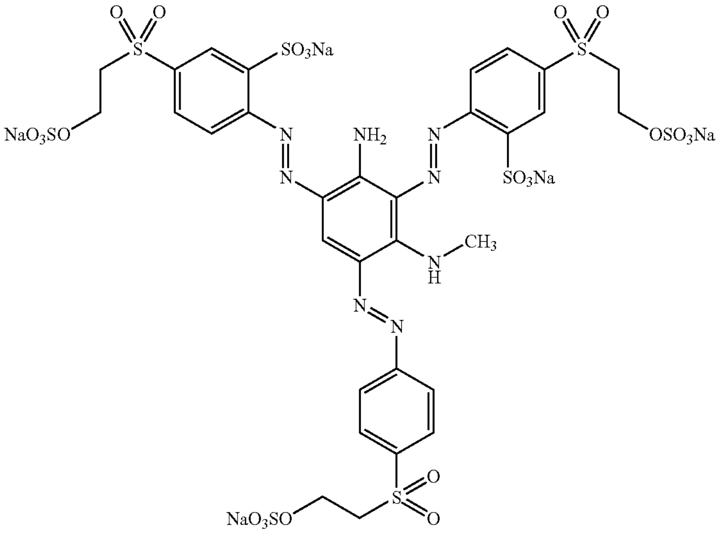 (II-29) | 68:32 |

-continued
| Example | Dye of formula (I) | Dye of formula (II) | Ratio (I):(II) |
|---|---|---|---|
| 173 | (I-1) | 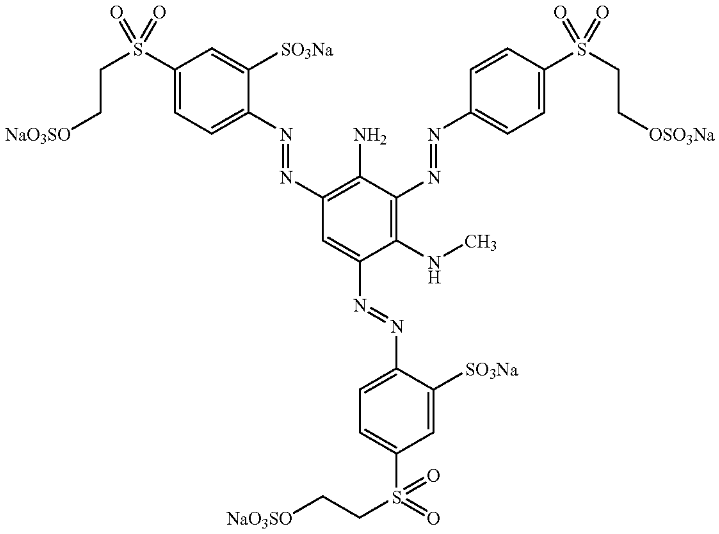 (II-30) | 68:32 |
| 174 | (I-1) | 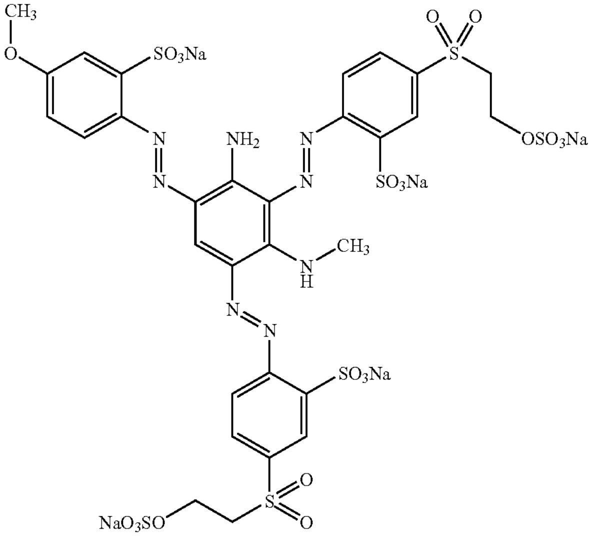 (II-31) | 65:35 |

-continued
| Example | Dye of formula (I) | Dye of formula (II) | Ratio (I):(II) |
|---|---|---|---|
| 175 | (I-1) | 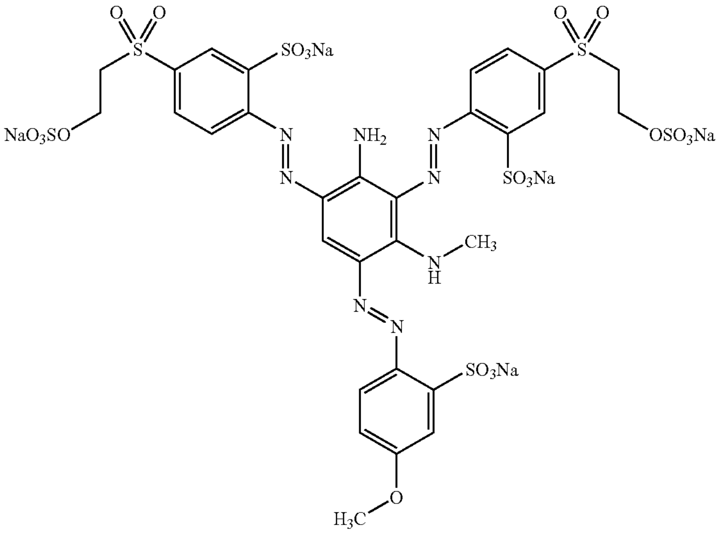 (II-32) | 65:35 |
| 176 | (I-1) | 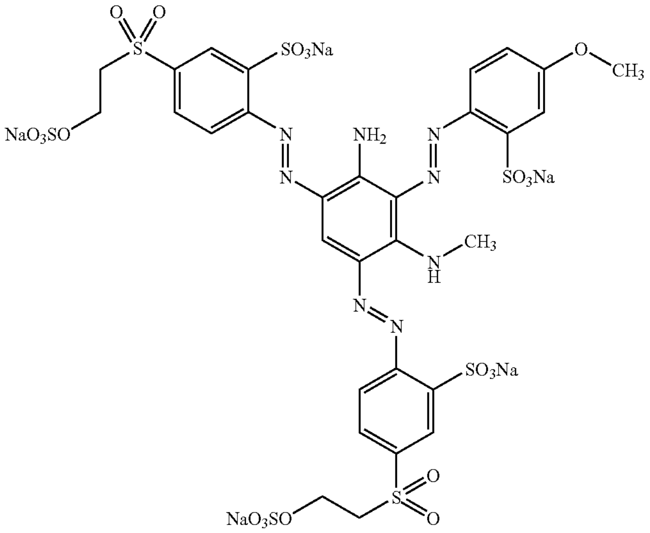 (II-33) | 65:35 |

-continued
| Example | Dye of formula (I) | Dye of formula (II) | Ratio (I):(II) |
|---|---|---|---|
| 177 | (I-1) | 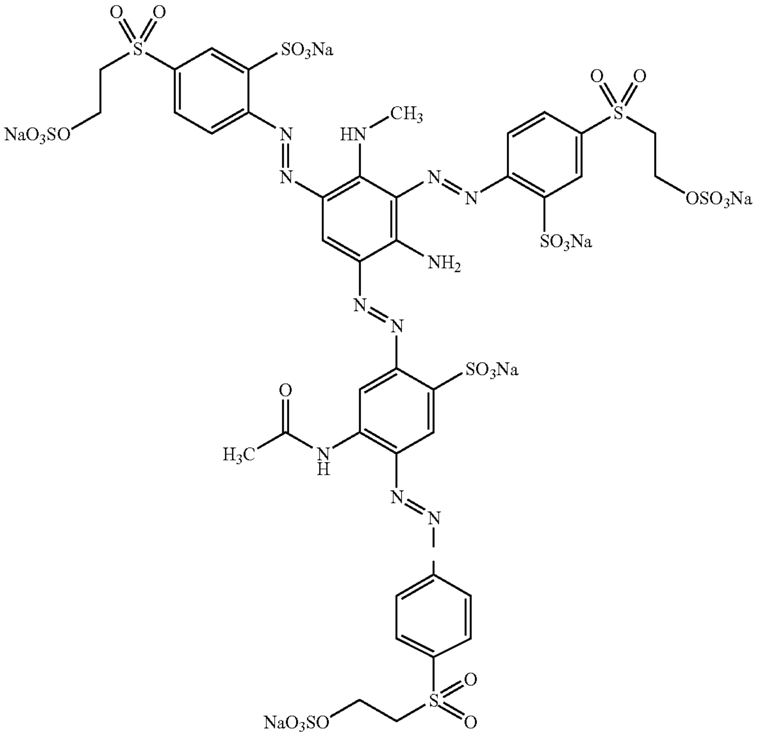 (II-34) | 69:31 |
| 178 | (I-1) | 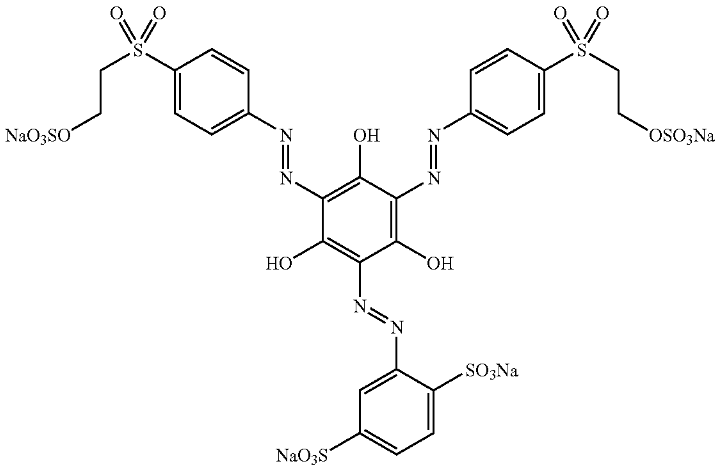 (II-35) | 75:25 |

-continued
| Example | Dye of formula (I) | Dye of formula (II) | Ratio (I):(II) |
|---|---|---|---|
| 179 | (I-1) | 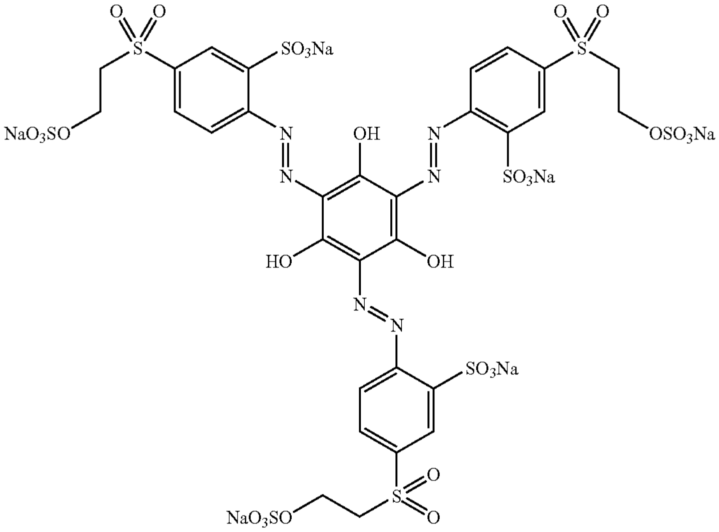 (II-36) | 67:33 |
| 180 | (I-1) | 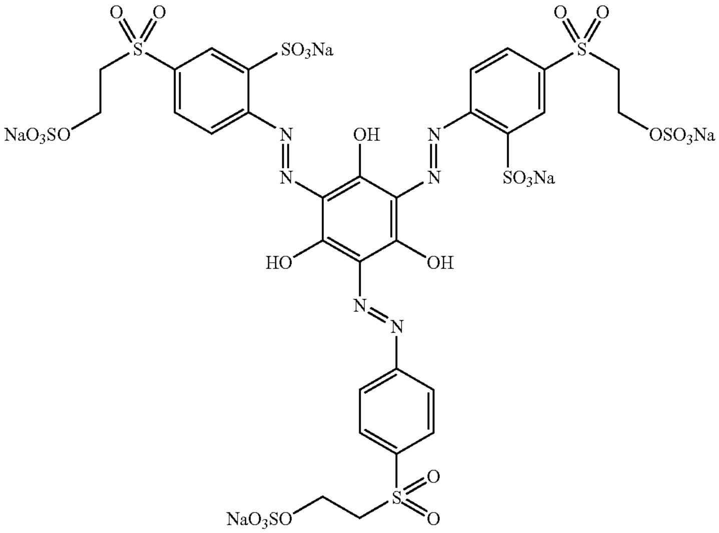 (II-37) | 72:28 |

-continued
| Example | Dye of formula (I) | Dye of formula (II) | Ratio (I):(II) |
|---|---|---|---|
| 181 | (I-1) | 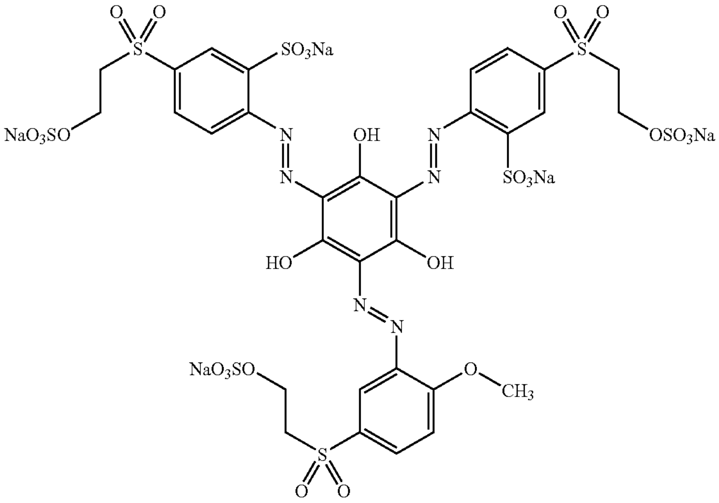 (II-38) | 67:33 |
| 182 | (I-1) | 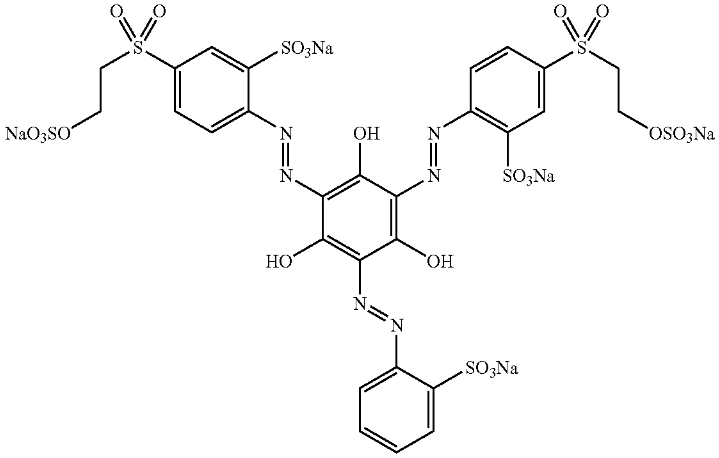 (II-39) | 68:32 |

-continued
| Example | Dye of formula (I) | Dye of formula (II) | Ratio (I):(II) |
|---|---|---|---|
| 183 | (I-1) | 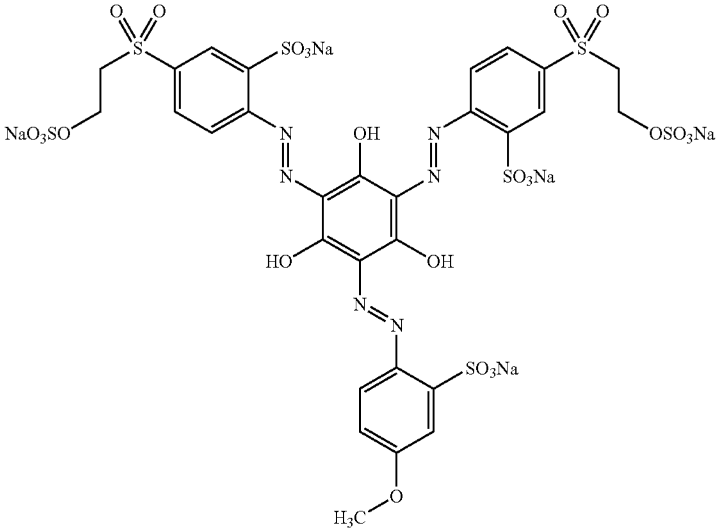 (II-40) | 72:28 |
| 184 | (I-1) | 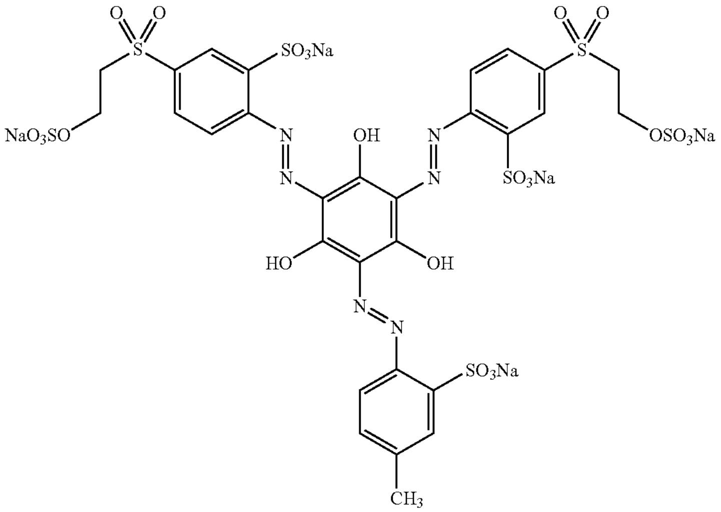 (II-41) | 65:35 |

-continued
| Example | Dye of formula (I) | Dye of formula (II) | Ratio (I):(II) |
|---|---|---|---|
| 185 | (I-1) | 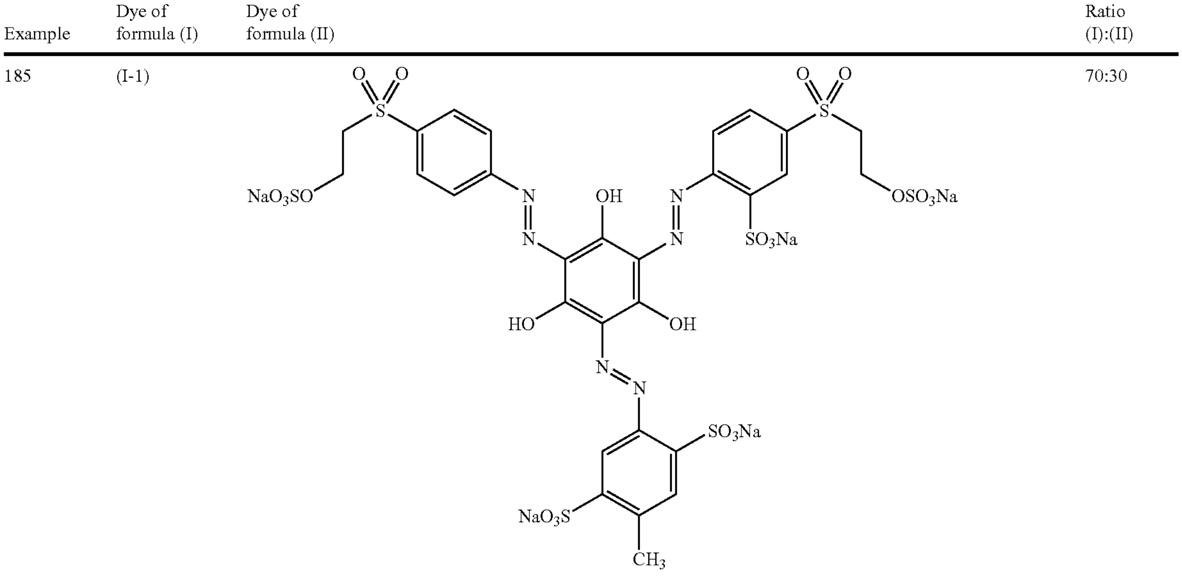 (II-42) | 70:30 |
| 186 | (I-1) | 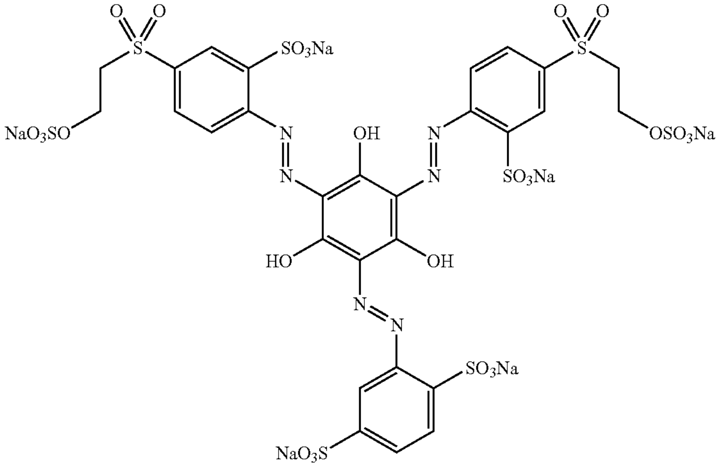 (II-43) | 62:38 |
| 187 | (I-1) | 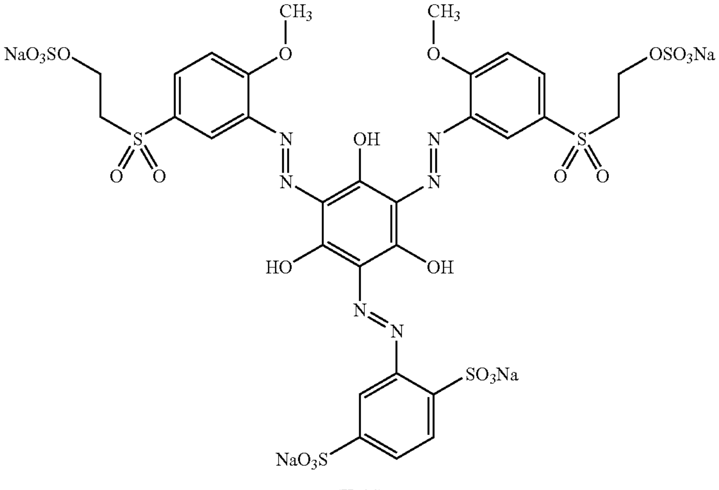 (II-44) | 65:35 |

-continued
| Example | Dye of formula (I) | Dye of formula (II) | Ratio (I):(II) |
|---|---|---|---|
| 188 | (I-1) | 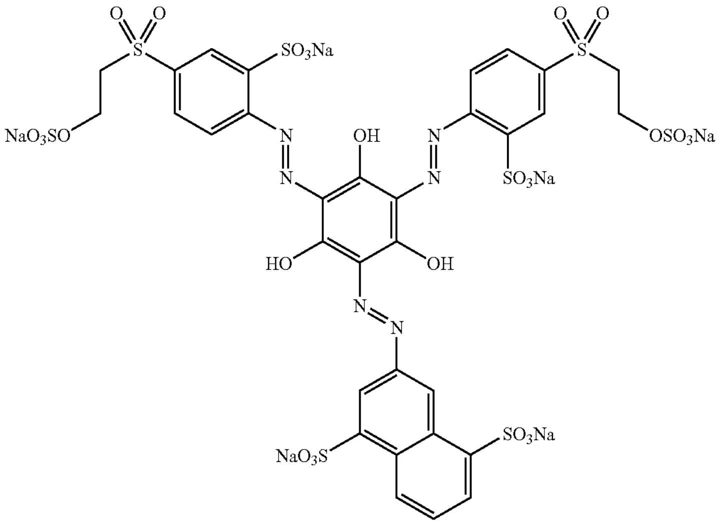 (II-45) | 70:30 |
| 189 | (I-1) | 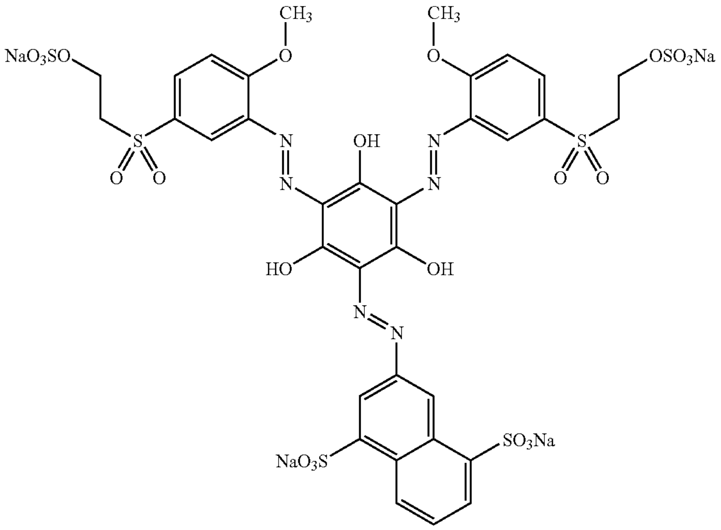 (II-46) | 68:32 |

-continued
| Example | Dye of formula (I) | Dye of formula (II) | Ratio (I):(II) |
|---|---|---|---|
| 190 | (I-1) | 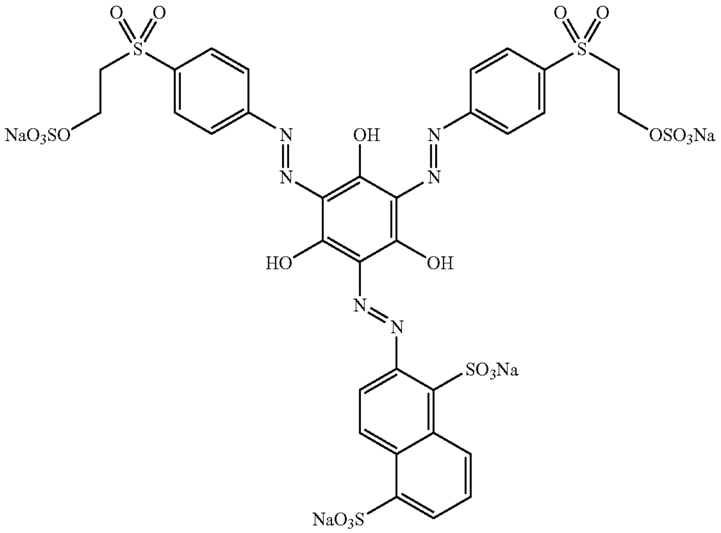 (II-47) | 72:28 |
| 191 | (I-1) | 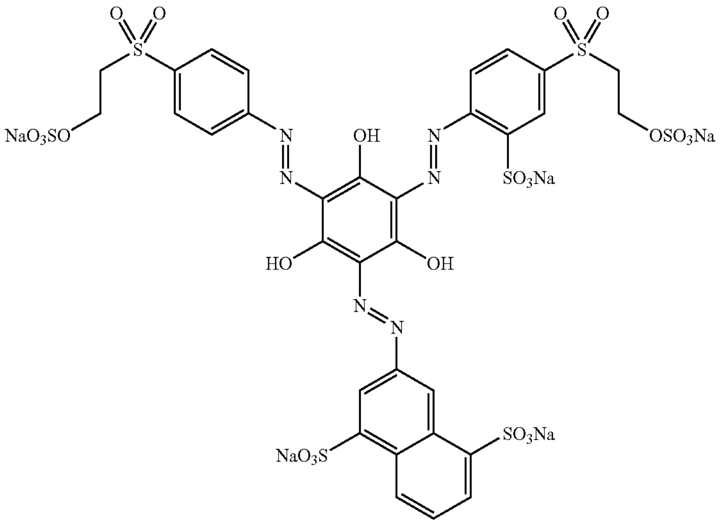 (II-48) | 70:30 |

-continued
| Example | Dye of formula (I) | Dye of formula (II) | Ratio (I):(II) |
|---|---|---|---|
| 192 | (I-1) | 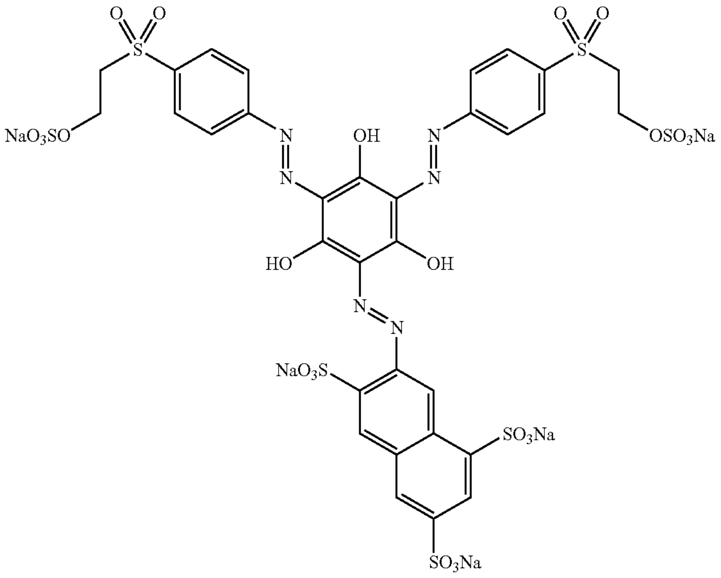 (II-49) | 65:35 |
| 193 | (I-1) | 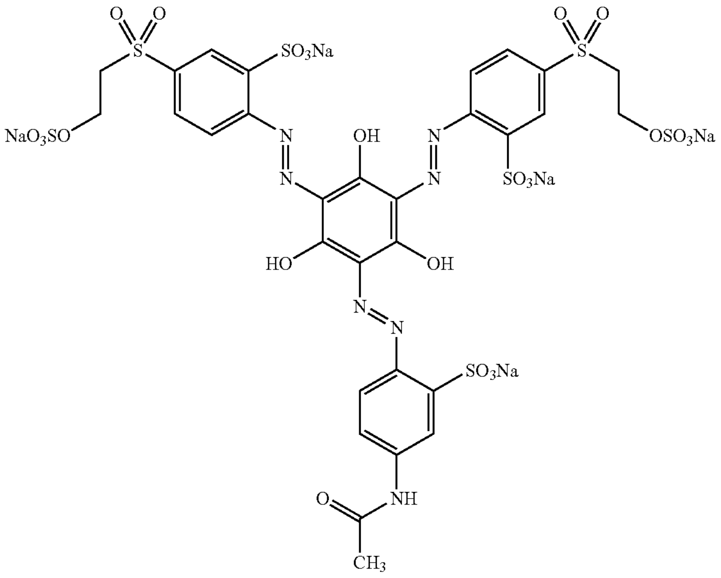 (II-50) | 64:36 |

-continued
| Example | Dye of formula (I) | Dye of formula (II) | Ratio (I):(II) |
|---|---|---|---|
| 194 | (I-1) | 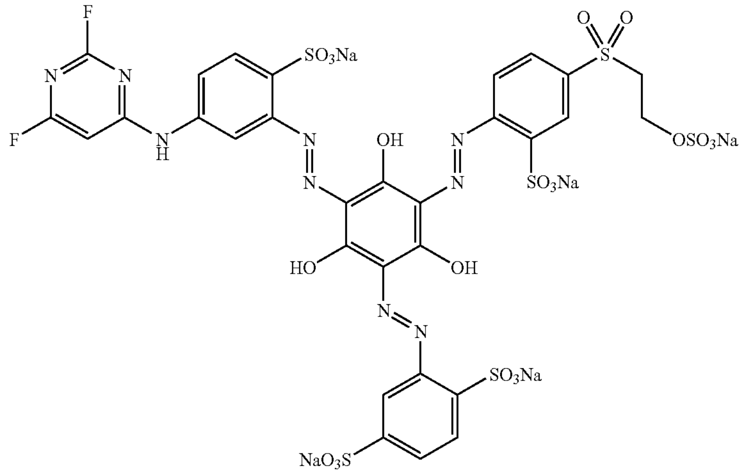 (II-51) | 69:31 |
| 195 | (I-1) | 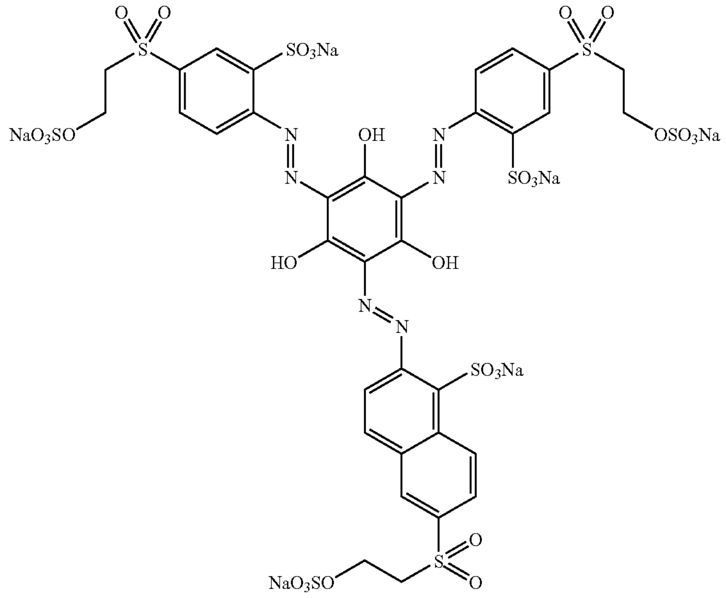 (II-52) | 73:27 |

-continued
| Example | Dye of formula (I) | Dye of formula (II) | Ratio (I):(II) |
|---|---|---|---|
| 196 | (I-1) | 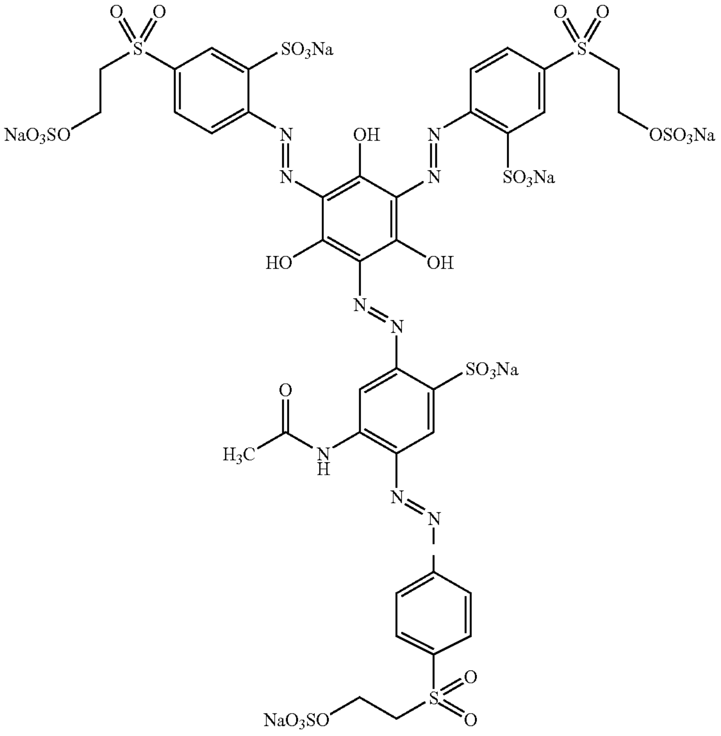 (II-53) | 71:29 |
| 197 | (I-1) | 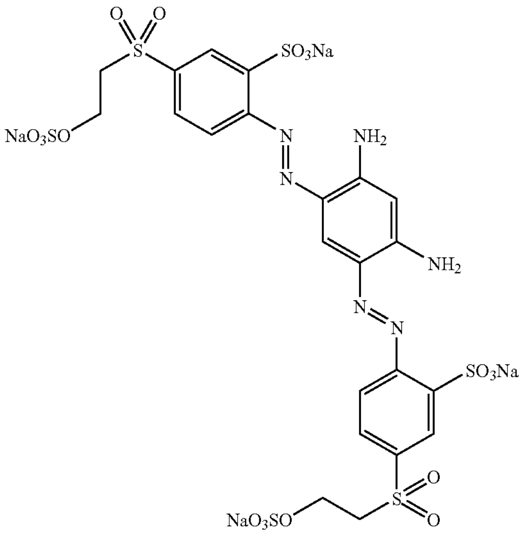 (II-54) | 65:35 |

-continued
| Example | Dye of formula (I) | Dye of formula (II) | Ratio (I):(II) |
|---|---|---|---|
| 198 | (I-1) | 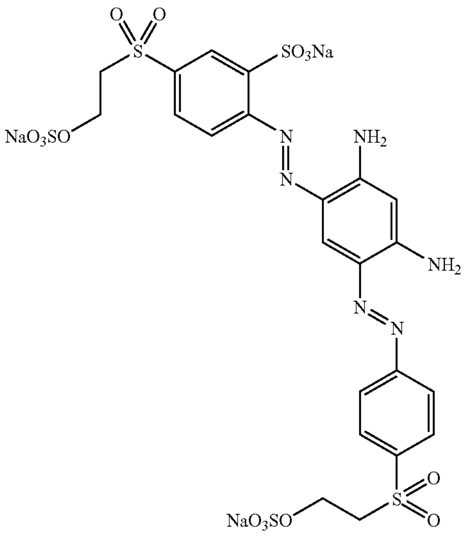 (II-55) | 70:30 |
| 199 | (I-1) | 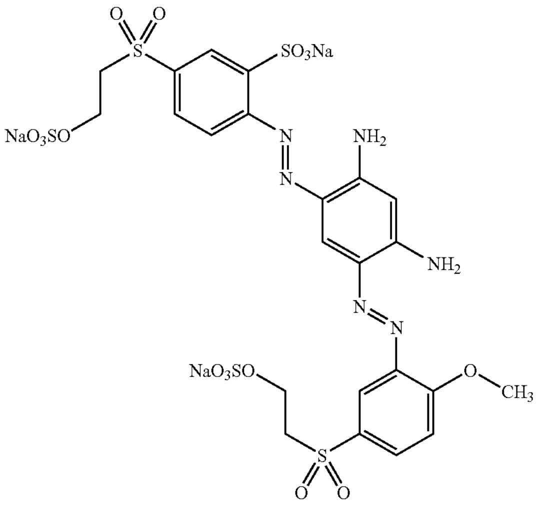 (II-56) | 67:33 |

-continued
| Example | Dye of formula (I) | Dye of formula (II) | Ratio (I):(II) |
|---|---|---|---|
| 200 | (I-1) | 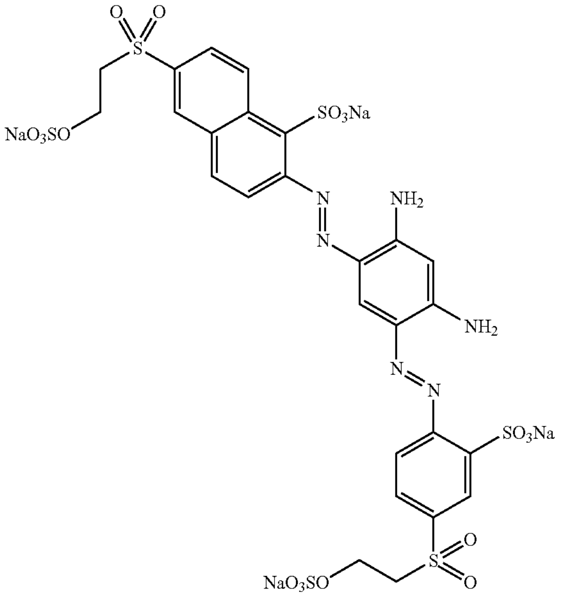 (II-57) | 72:28 |
| 201 | (I-1) | 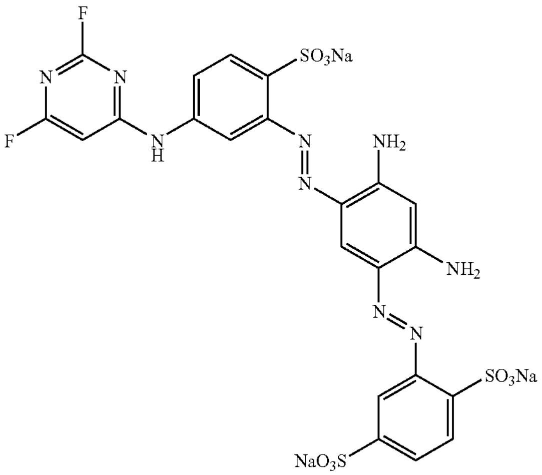 (II-58) | 67:33 |

-continued
| Example | Dye of formula (I) | Dye of formula (II) | Ratio (I):(II) |
|---|---|---|---|
| 202 | (I-1) | 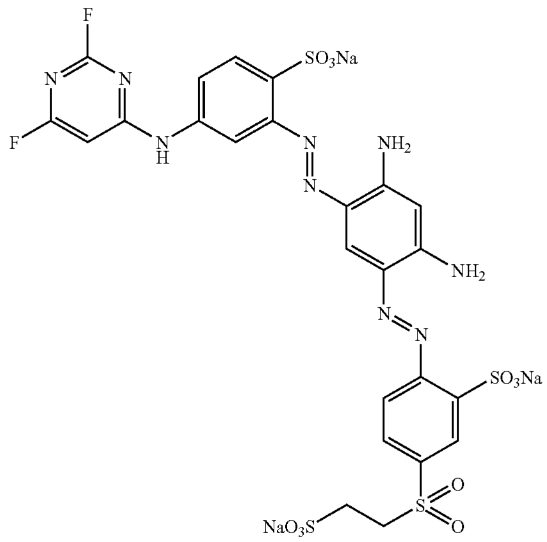 (II-59) | 67:33 |
| 203 | (I-1) | 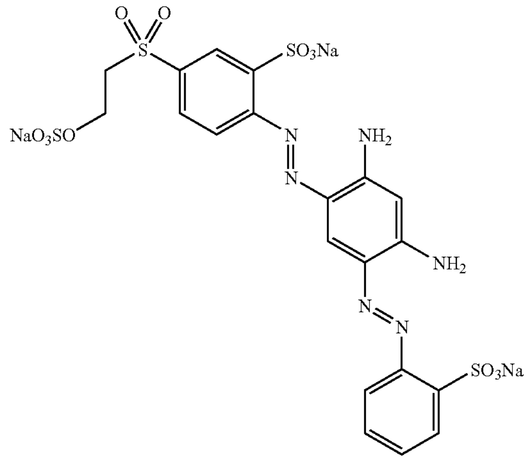 (II-60) | 65:35 |
| 204 | (I-1) | 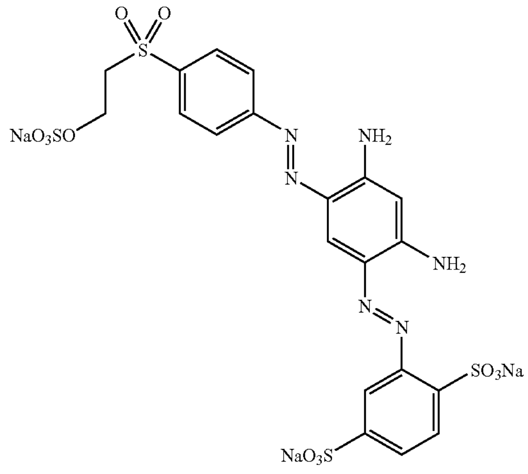 (II-61) | 68:32 |

-continued
| Example | Dye of formula (I) | Dye of formula (II) | Ratio (I):(II) |
|---|---|---|---|
| 205 | (I-1) | 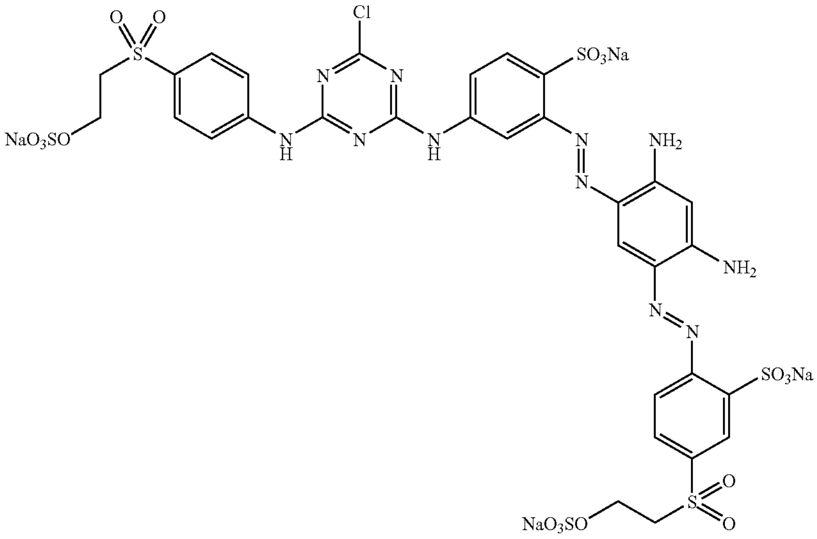 (II-62) | 60:40 |
| 206 | (I-1) | 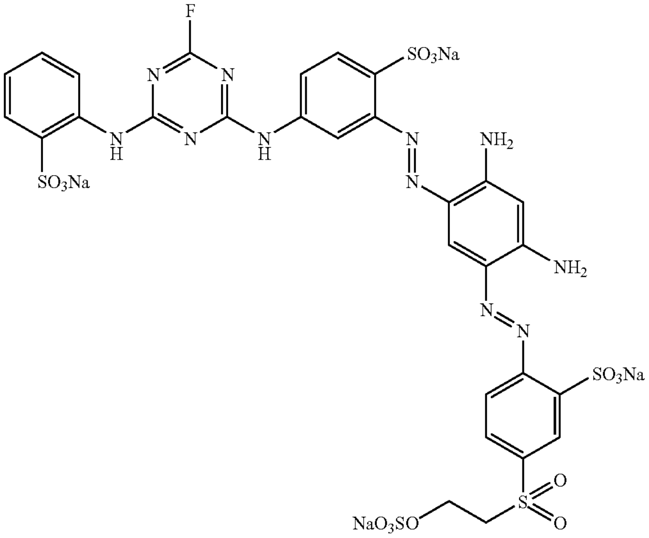 (II-63) | 65:35 |

-continued
| Example | Dye of formula (I) | Dye of formula (II) | Ratio (I):(II) |
|---|---|---|---|
| 207 | (I-1) | 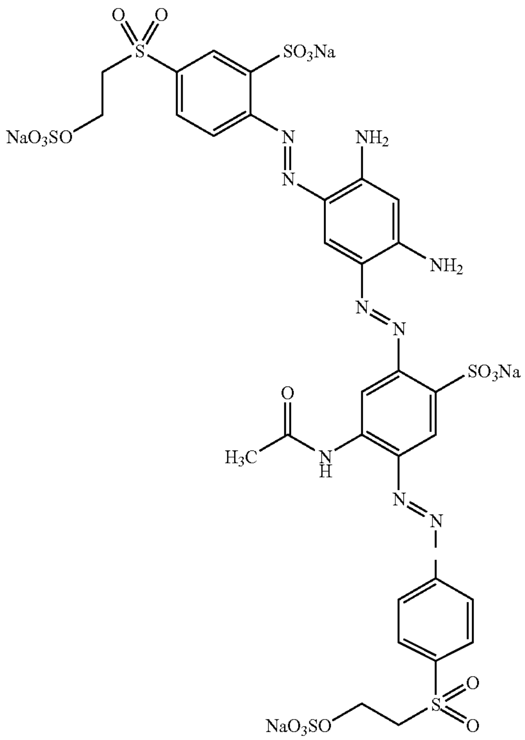 (II-64) | 68:32 |
| 208 | (I-1) | 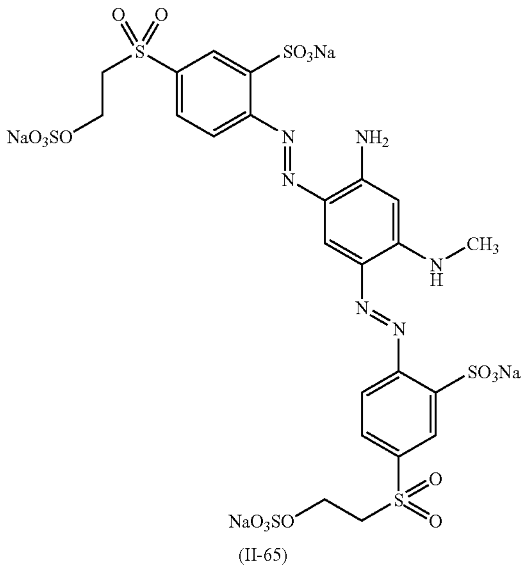 (II-65) | 63:37 |

-continued
| Example | Dye of formula (I) | Dye of formula (II) | Ratio (I):(II) |
|---|---|---|---|
| 209 | (I-1) | 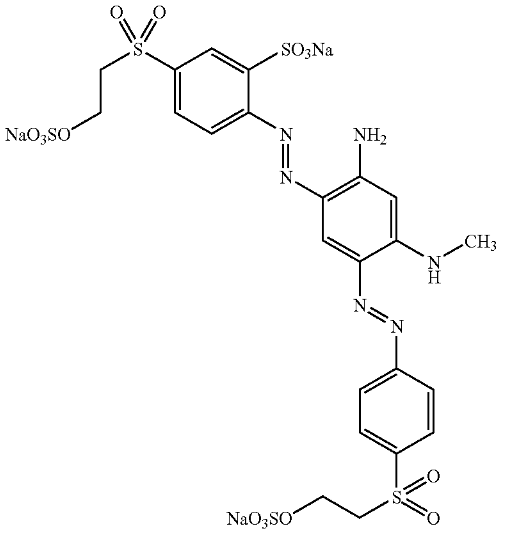 (II-66) | 67:33 |
| 210 | (I-1) | 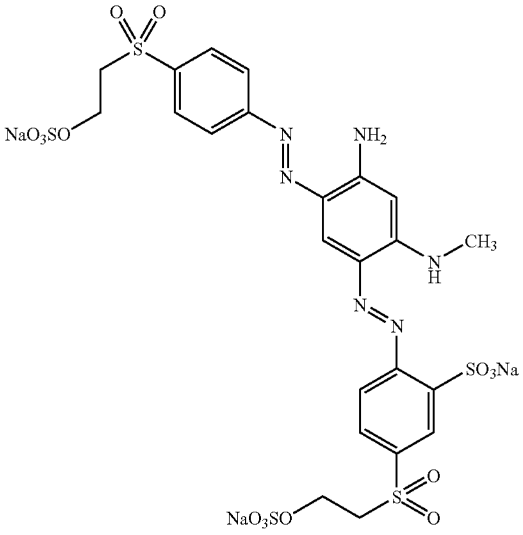 (II-67) | 67:33 |

-continued
| Example | Dye of formula (I) | Dye of formula (II) | Ratio (I):(II) |
|---|---|---|---|
| 211 | (I-1) | 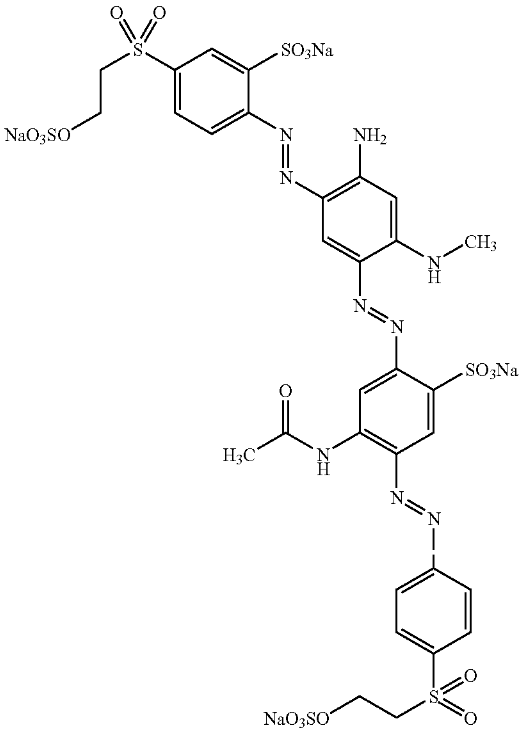 (II-68) | 70:30 |
| 212 | (I-1) | 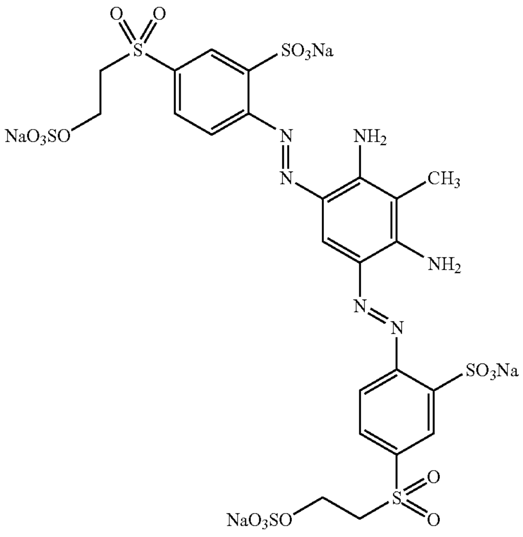 (II-69) | 65:35 |

-continued
| Example | Dye of formula (I) | Dye of formula (II) | Ratio (I):(II) |
|---|---|---|---|
| 213 | (I-1) | 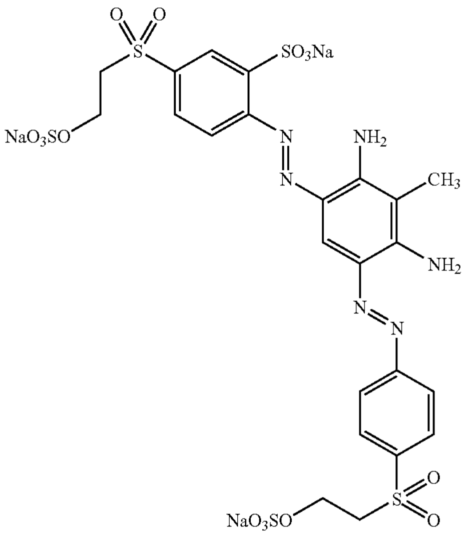 (II-70) | 67:33 |
| 214 | (I-1) | 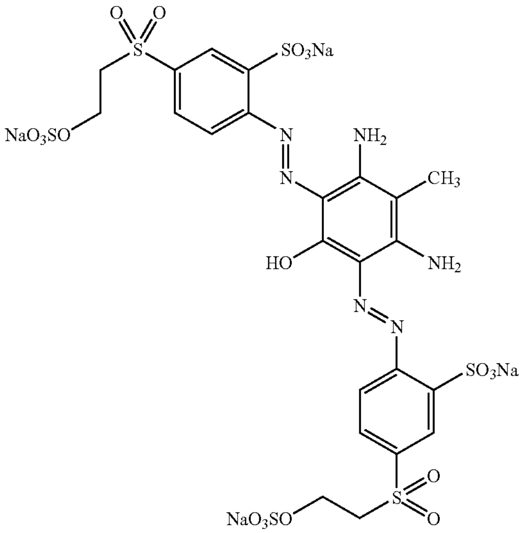 (II-71) | 72:28 |

-continued
| Example | Dye of formula (I) | Dye of formula (II) | Ratio (I):(II) |
|---|---|---|---|
| 215 | (I-1) | 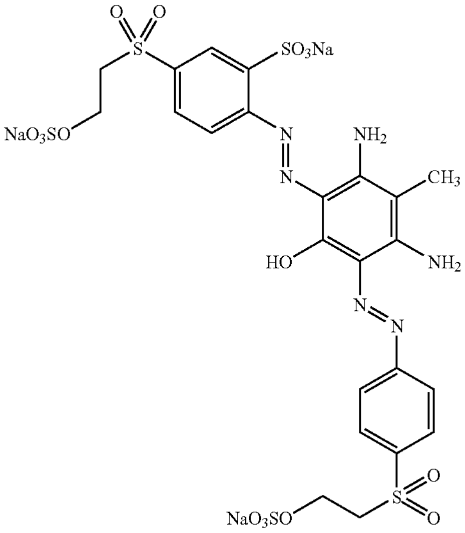 (II-72) | 74:26 |
| 216 | (I-1) | 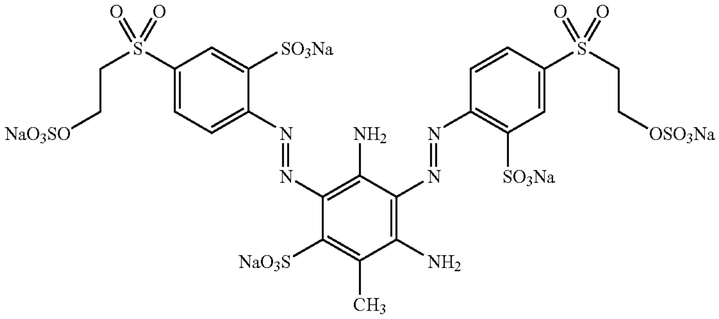 (II-73) | 66:34 |
| 217 | (I-1) | 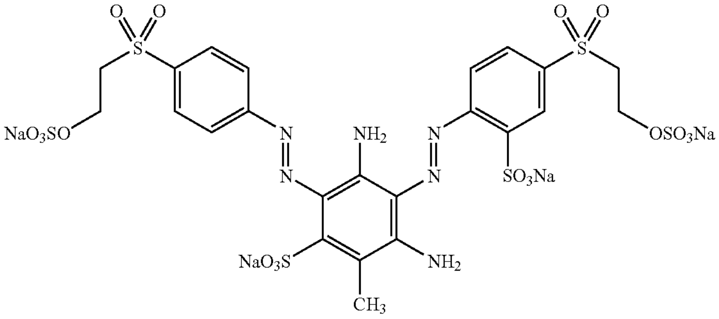 (II-74) | 67:33 |

-continued
| Example | Dye of formula (I) | Dye of formula (II) | Ratio (I):(II) |
|---|---|---|---|
| 218 | (I-1) | 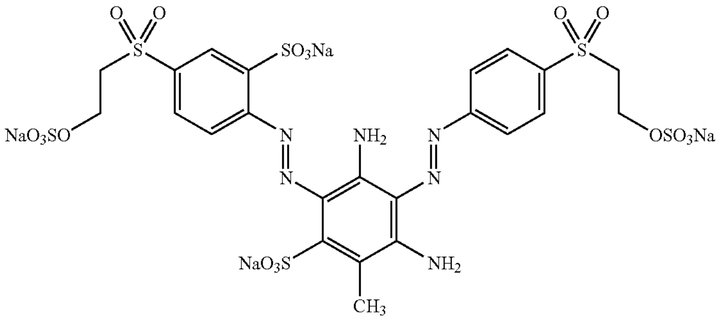 (II-75) | 67:33 |
| 219 | (I-1) | 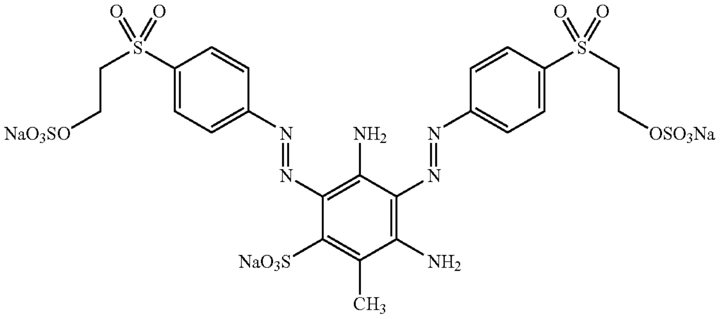 (II-76) | 70:30 |
| 220 | (I-1) | 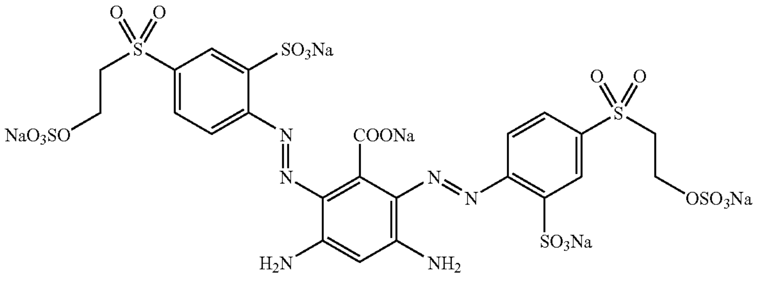 (II-77) | 70:30 |
| 221 | (I-1) | 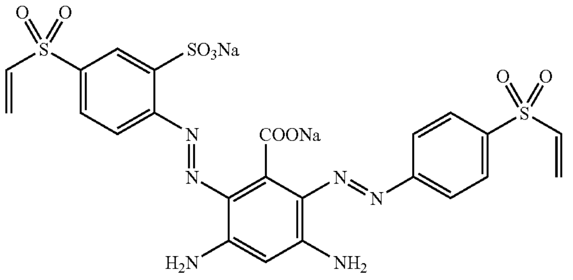 (II-78) | 73:27 |

-continued
| Example | Dye of formula (I) | Dye of formula (II) | Ratio (I):(II) |
|---|---|---|---|
| 222 | (I-1) | 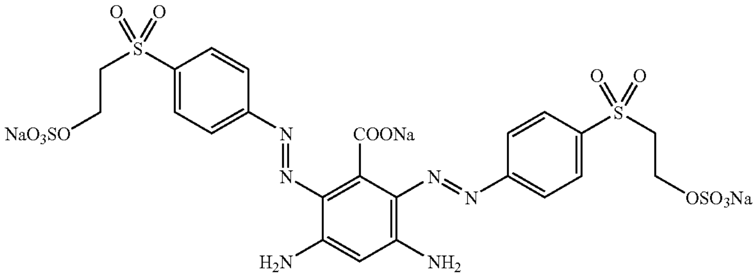 (II-79) | 75:25 |
| 223 | (I-1) | 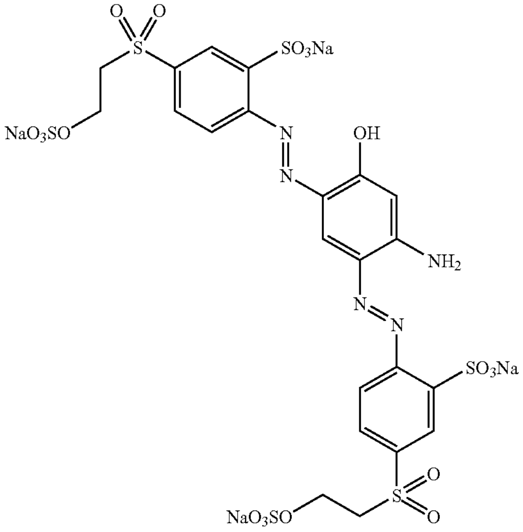 (II-80) | 65:35 |
| 224 | (I-1) | 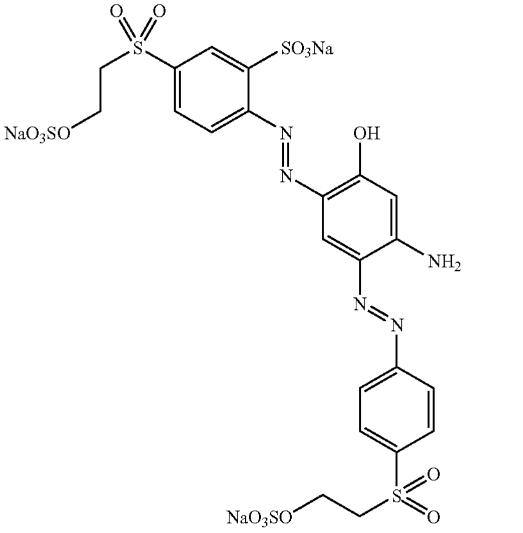 (II-81) | 60:40 |

-continued
| Example | Dye of formula (I) | Dye of formula (II) | Ratio (I):(II) |
|---|---|---|---|
| 225 | (I-1) | 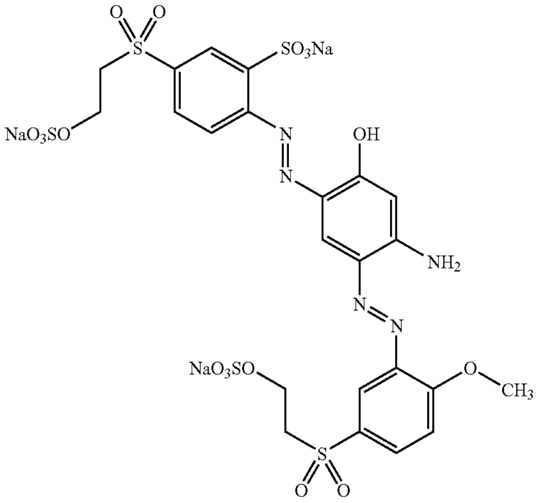 (II-82) | 65:35 |
| 226 | (I-1) | 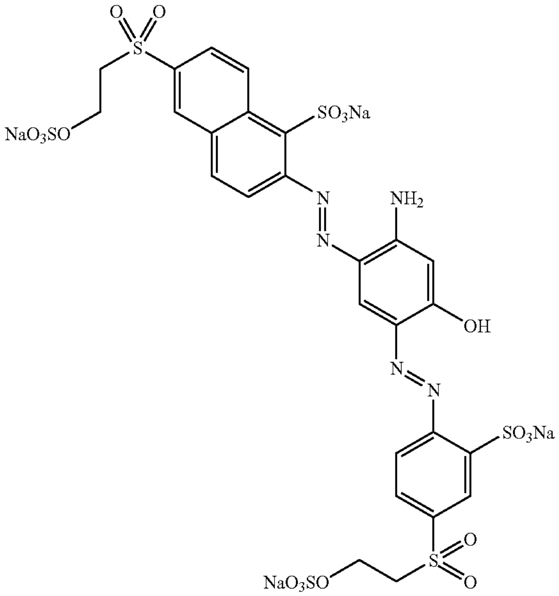 (II-83) | 72:28 |

-continued
| Example | Dye of formula (I) | Dye of formula (II) | Ratio (I):(II) |
|---|---|---|---|
| 227 | (I-1) | 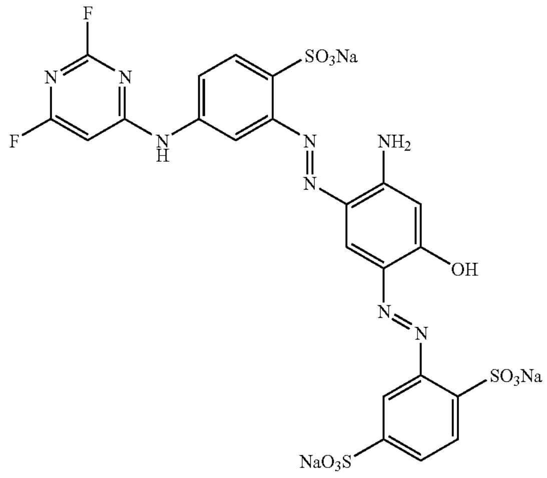 (II-84) | 67:33 |
| 228 | (I-1) | 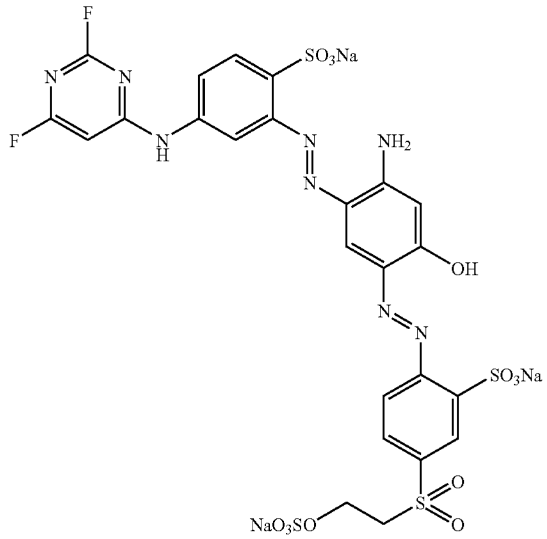 (II-85) | 70:30 |
| 229 | (I-1) | 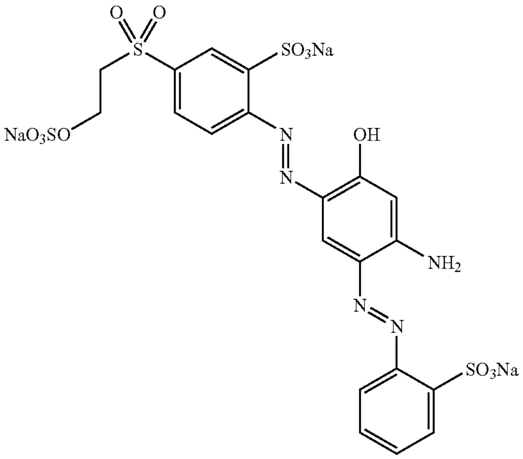 (II-86) | 65:35 |

-continued
| Example | Dye of formula (I) | Dye of formula (II) | Ratio (I):(II) |
|---|---|---|---|
| 230 | (I-1) | 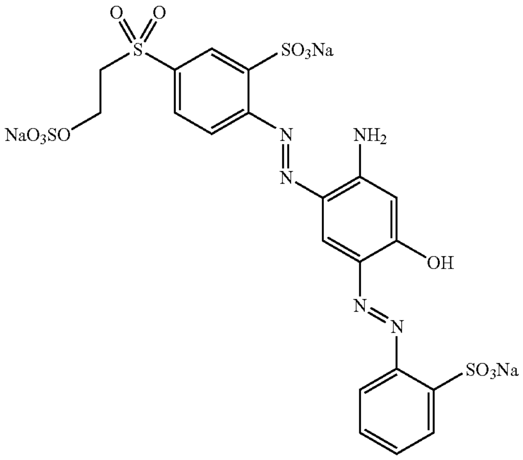 (II-87) | 65:35 |
| 231 | (I-1) | 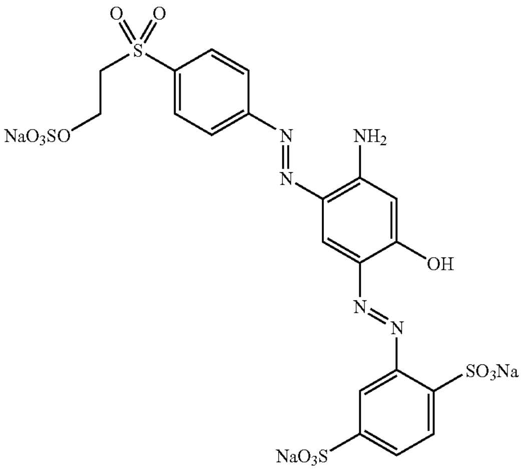 (II-88) | 68:32 |
| 232 | (I-1) | 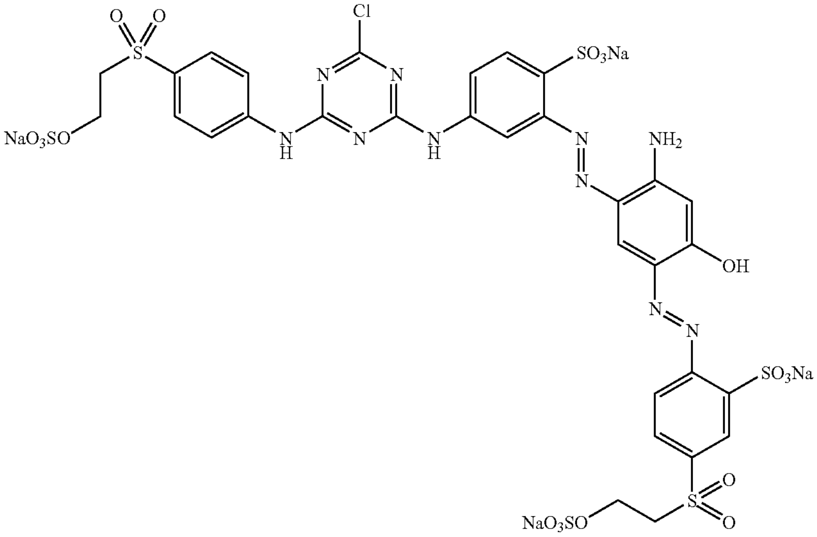 (II-89) | 60:40 |

-continued
| Example | Dye of formula (I) | Dye of formula (II) | Ratio (I):(II) |
|---|---|---|---|
| 233 | (I-1) | 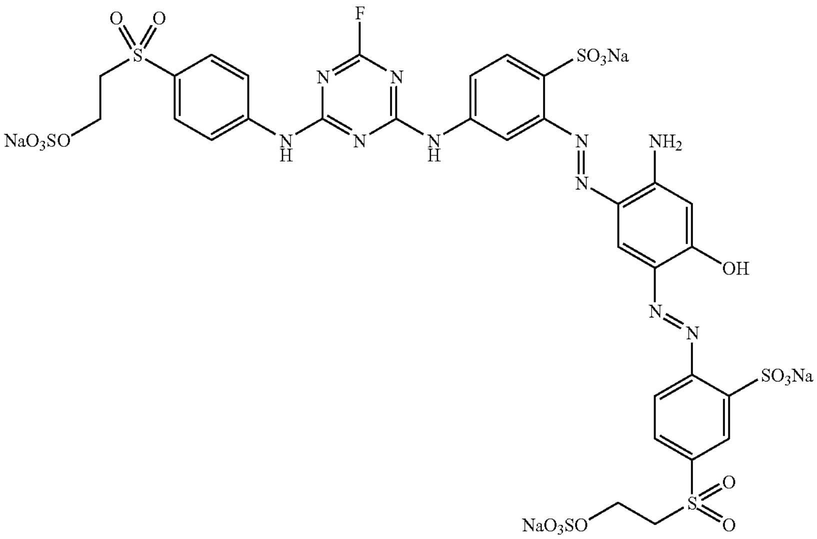 (II-90) | 65:35 |
| 234 | (I-1) | 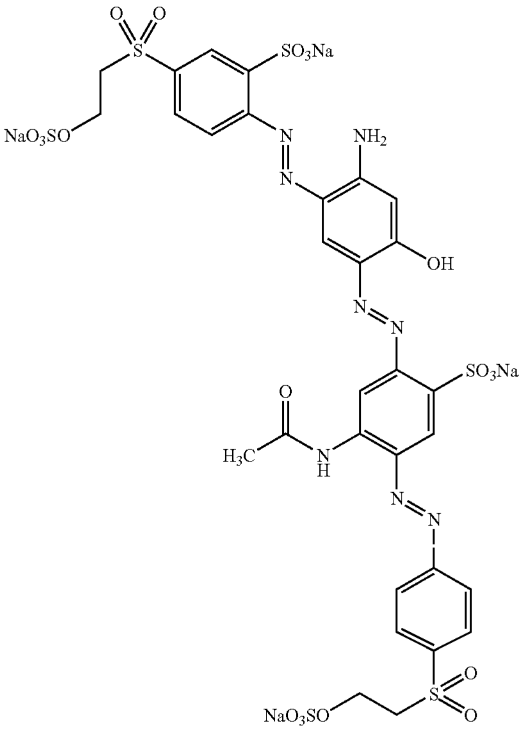 (II-91) | 70:30 |

-continued
| Example | Dye of formula (I) | Dye of formula (II) | Ratio (I):(II) |
|---|---|---|---|
| 235 | (I-1) | 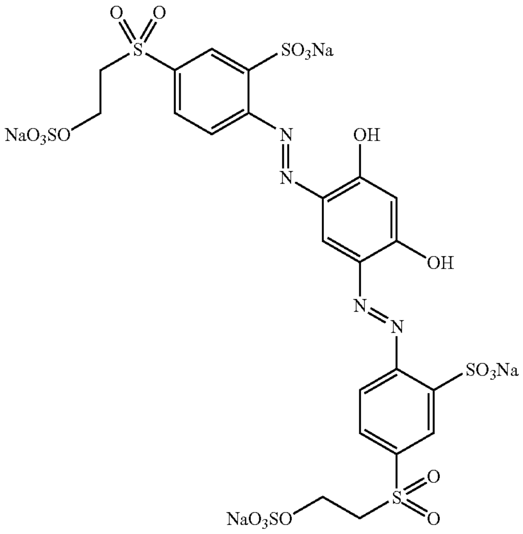 (II-92) | 65:35 |
| 236 | (I-1) | 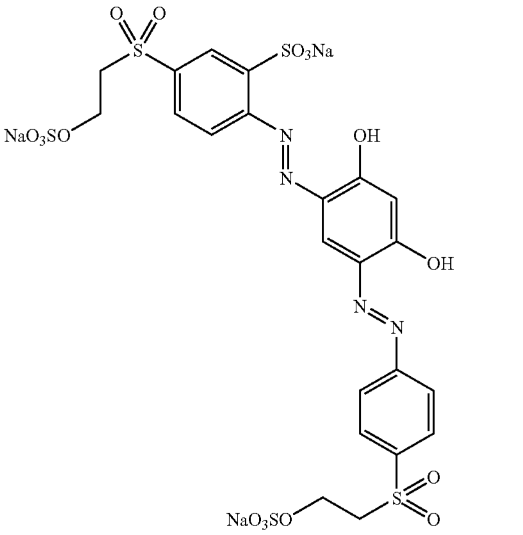 (II-93) | 70:30 |

-continued
| Example | Dye of formula (I) | Dye of formula (II) | Ratio (I):(II) |
|---|---|---|---|
| 237 | (I-1) | 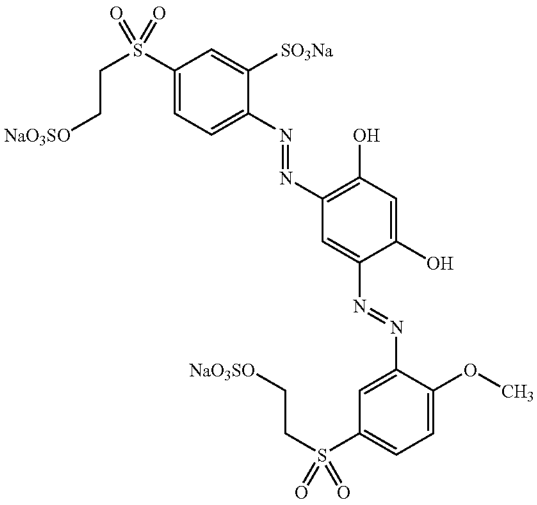 (II-94) | 65:35 |
| 238 | (I-1) | 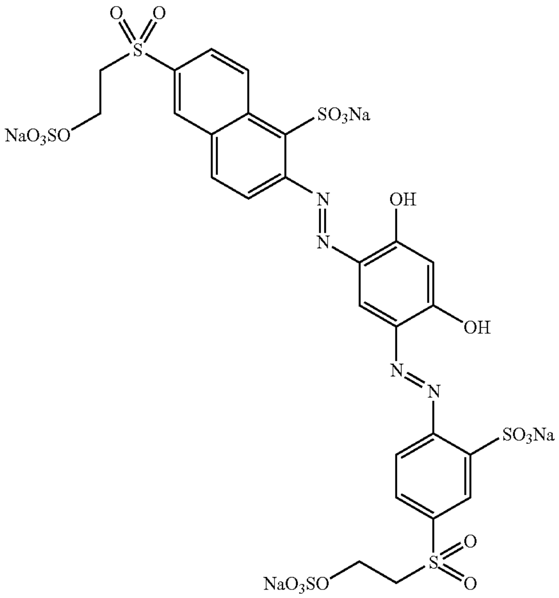 (II-95) | 72:28 |

-continued
| Example | Dye of formula (I) | Dye of formula (II) | Ratio (I):(II) |
|---|---|---|---|
| 239 | (I-1) | 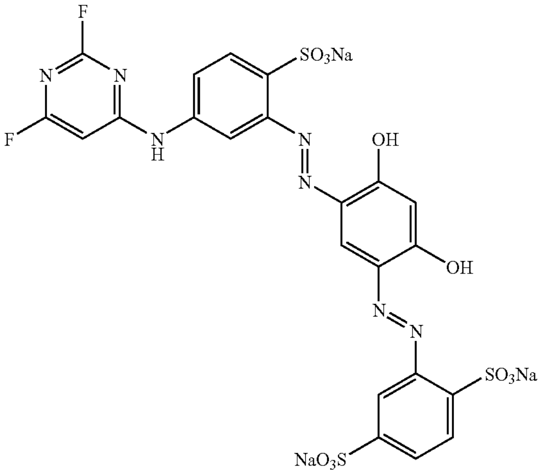 (II-96) | 67:33 |
| 240 | (I-1) | 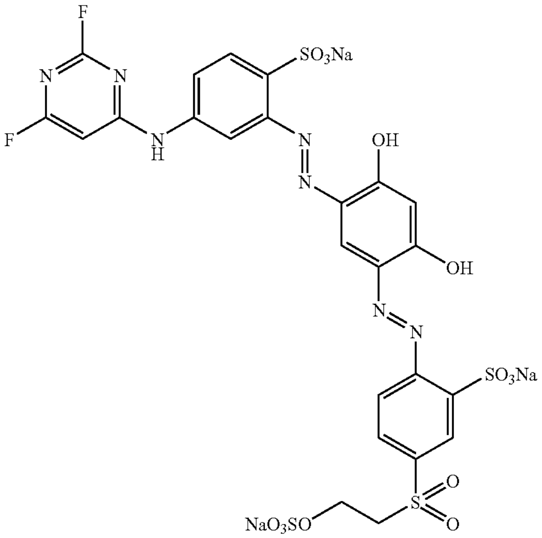 (II-97) | 67:33 |
| 241 | (I-1) | 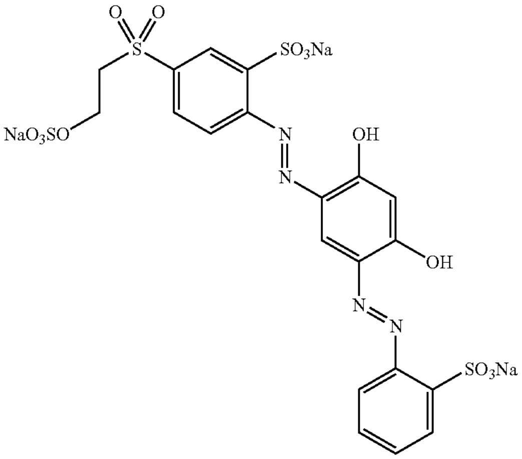 (II-98) | 65:35 |

-continued
| Example | Dye of formula (I) | Dye of formula (II) | Ratio (I):(II) |
|---|---|---|---|
| 242 | (I-1) | 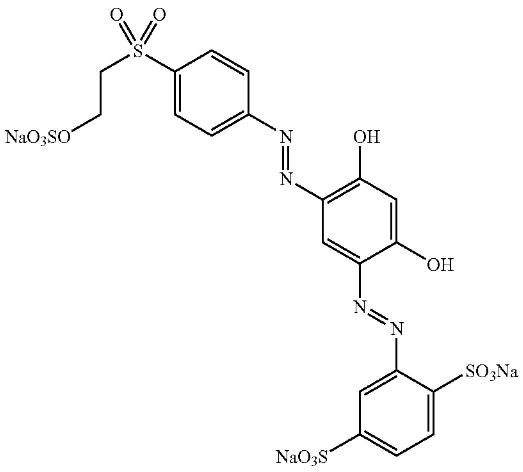 (II-99) | 68:32 |
| 243 | (I-1) | 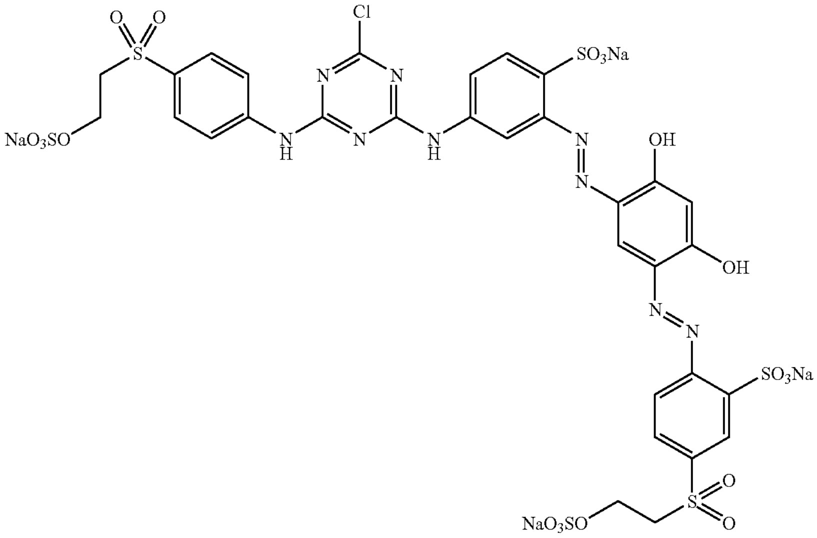 (II-100) | 60:40 |

-continued
| Example | Dye of formula (I) | Dye of formula (II) | Ratio (I):(II) |
|---|---|---|---|
| 244 | (I-1) | 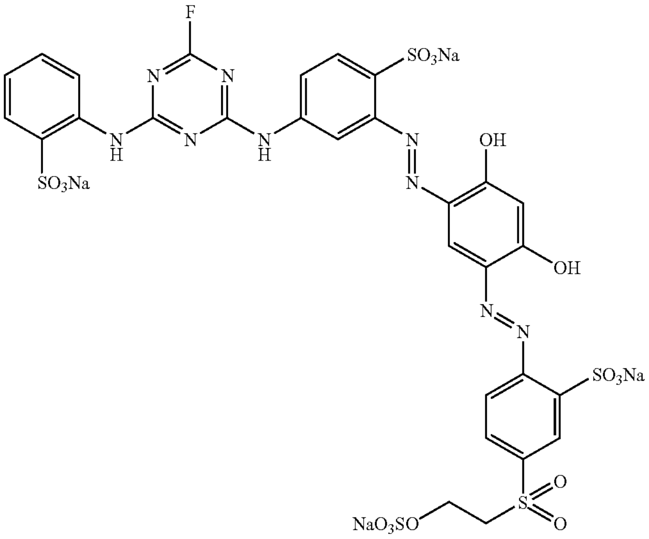 (II-101) | 65:35 |
| 245 | (I-1) | 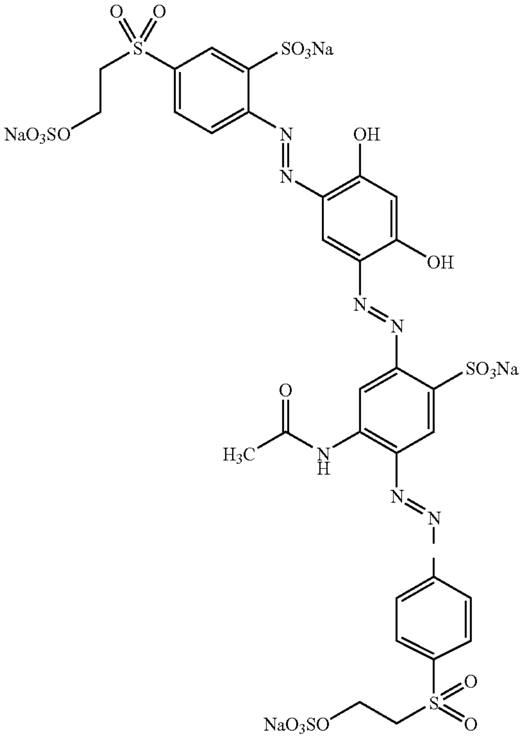 (II-102) | 70:30 |

-continued
| Example | Dye of formula (I) | Dye of formula (II) | Ratio (I):(II) |
|---|---|---|---|
| 246 | (I-1) | 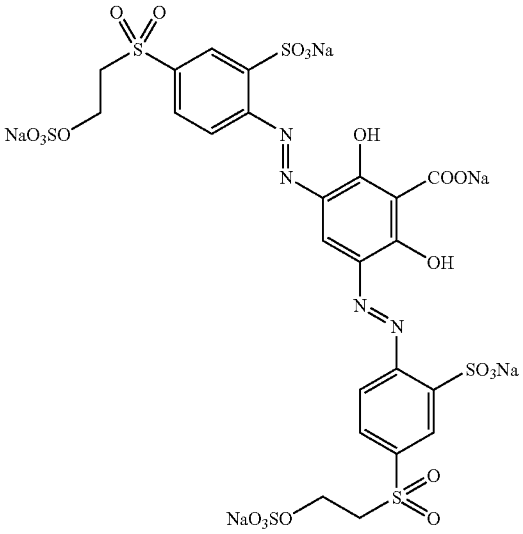 (II-103) | 66:34 |
| 247 | (I-1) | 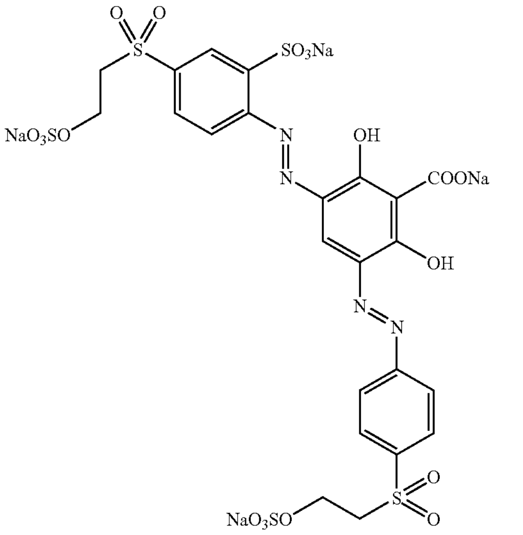 (II-104) | 67:33 |

-continued
| Example | Dye of formula (I) | Dye of formula (II) | Ratio (I):(II) |
|---|---|---|---|
| 248 | (I-1) | 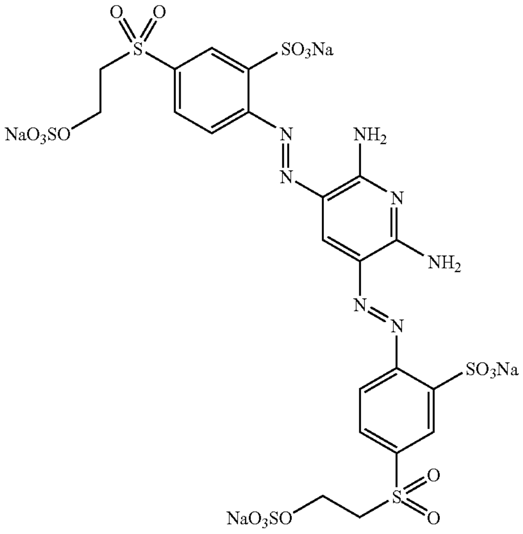 (II-105) | 65:35 |
| 249 | (I-1) | 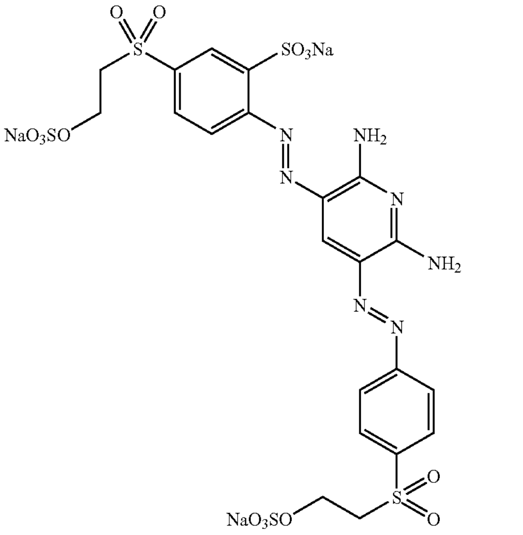 (II-106) | 70:30 |

-continued
| Example | Dye of formula (I) | Dye of formula (II) | Ratio (I):(II) |
|---|---|---|---|
| 250 | (I-1) | 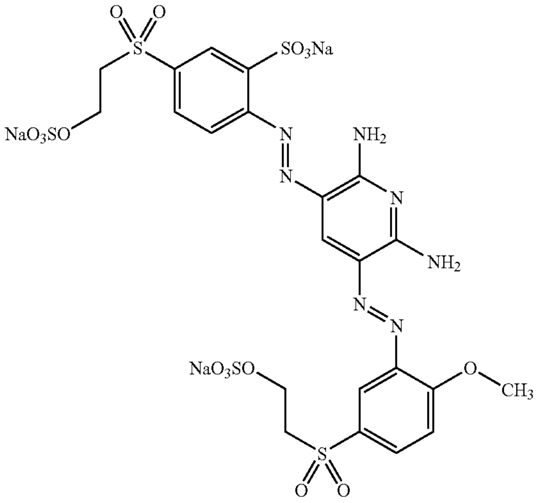 (II-107) | 65:35 |
| 251 | (I-1) | 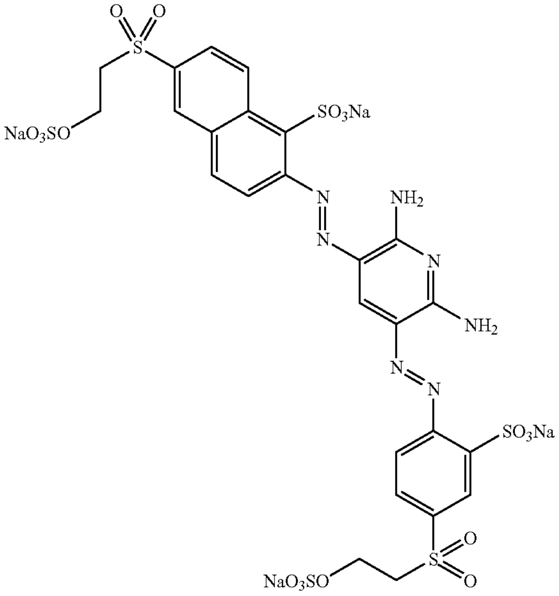 (II-108) | 72:28 |

-continued
| Example | Dye of formula (I) | Dye of formula (II) | Ratio (I):(II) |
|---|---|---|---|
| 252 | (I-1) | 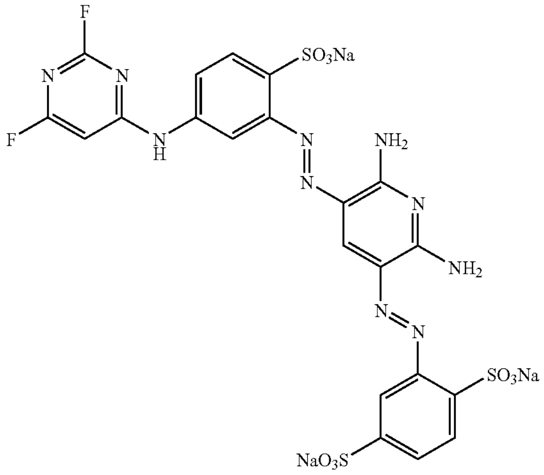 (II-109) | 67:33 |
| 253 | (I-1) | 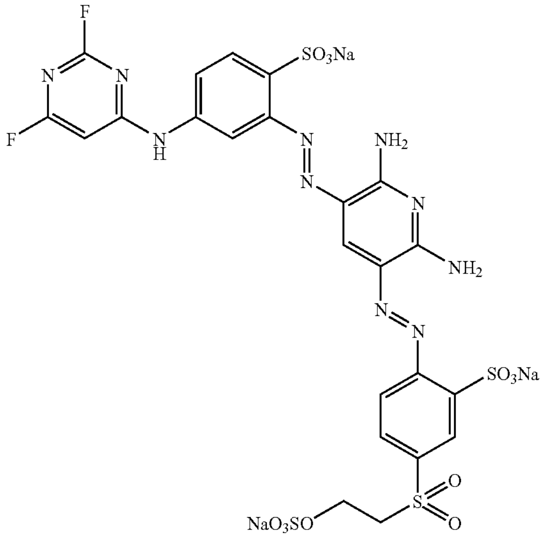 (II-110) | 67:33 |
| 254 | (I-1) | 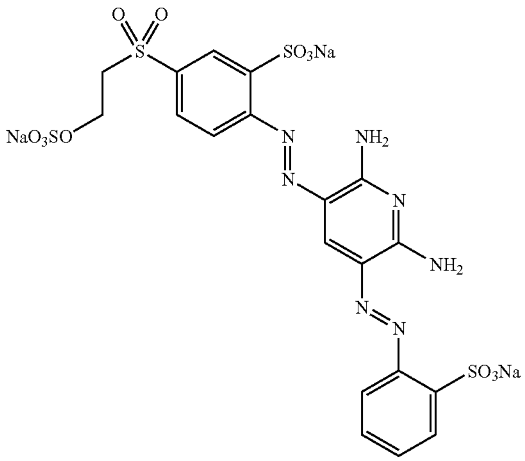 (II-111) | 65:35 |

-continued
| Example | Dye of formula (I) | Dye of formula (II) | Ratio (I):(II) |
|---|---|---|---|
| 255 | (I-1) | 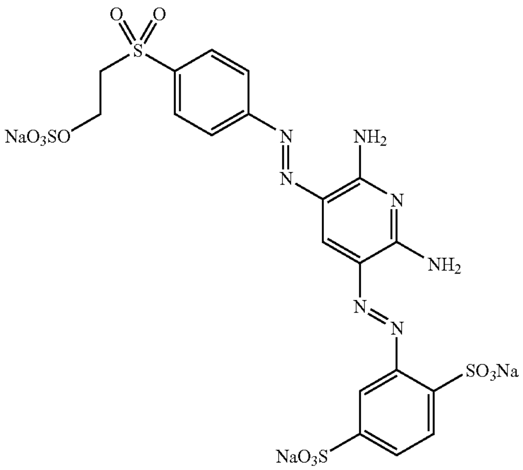 (II-112) | 68:32 |
| 256 | (I-1) | 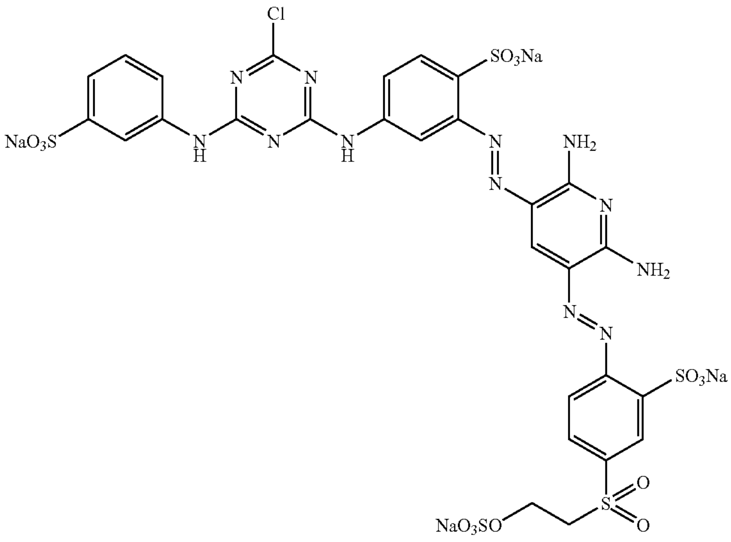 (II-113) | 60:40 |

-continued
| Example | Dye of formula (I) | Dye of formula (II) | Ratio (I):(II) |
|---|---|---|---|
| 257 | (I-1) | 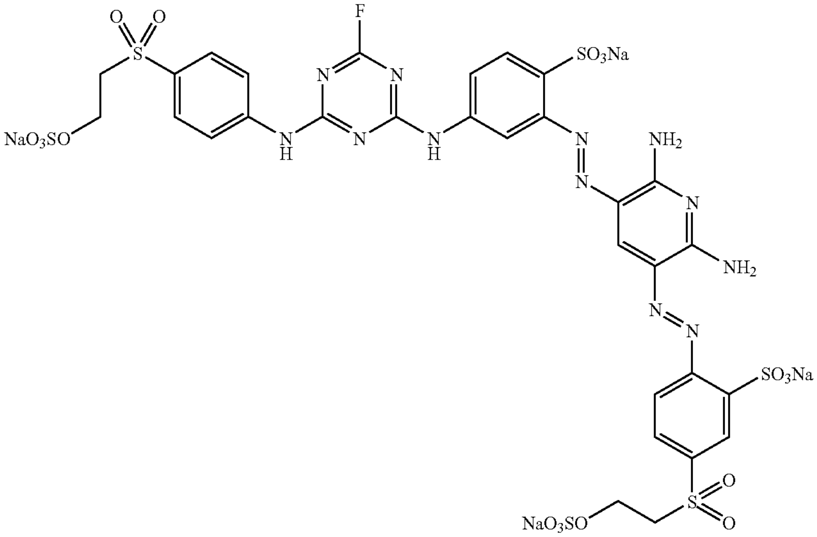 (II-114) | 65:35 |
| 258 | (I-1) | 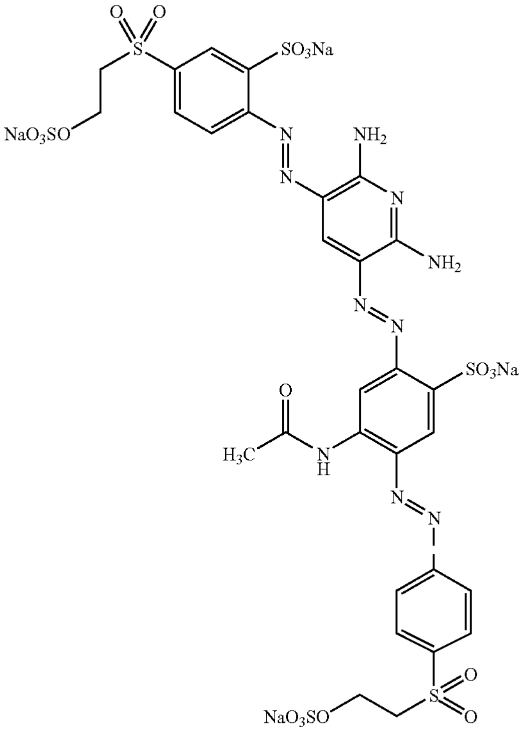 (II-115) | 70:30 |

-continued
| Example | Dye of formula (I) | Dye of formula (II) | Ratio (I):(II) |
|---|---|---|---|
| 259 | (I-1) | 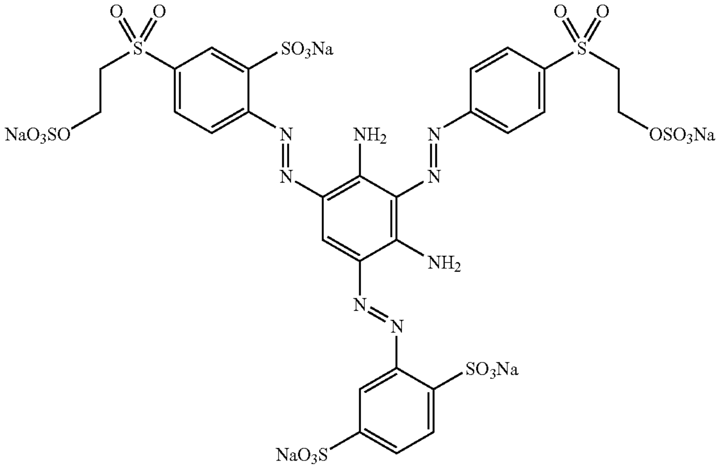 (II-116) | 68:32 |
| 260 | (I-1) | 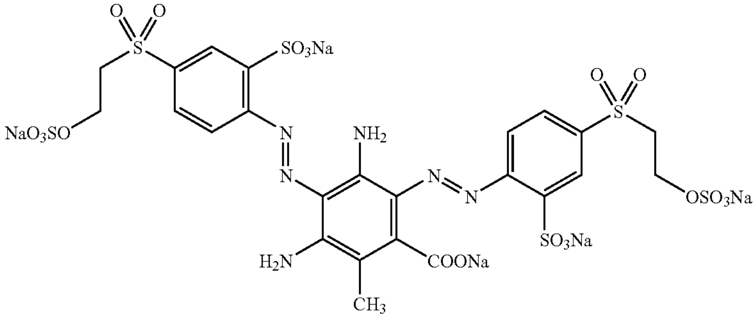 (II-117) | 64:36 |

-continued
| Example | Dye of formula (I) | Dye of formula (II) | Ratio (I):(II) |
|---|---|---|---|
| 261 | (I-1) | 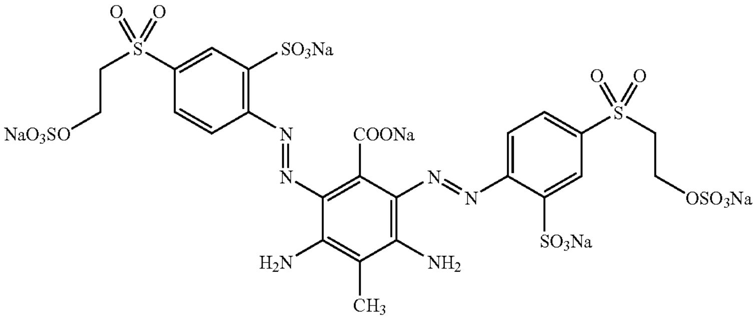 (II-118) | 66:34 |
| 262 | (I-1) | 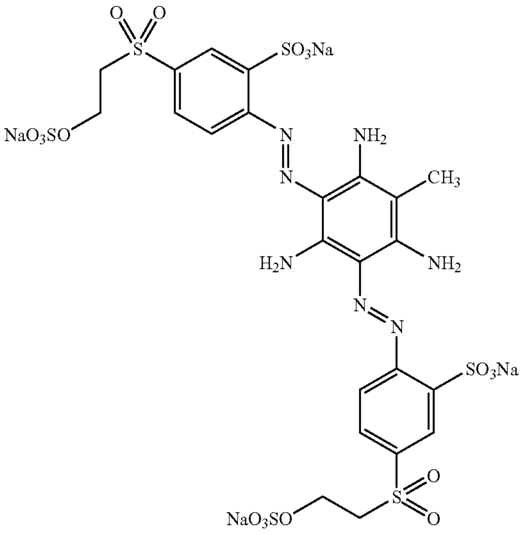 (II-119) | 70:30 |
| 263 | (I-1) | (II-9) | 67:33 |
| 264 | (I-1) | (II-15) | 65:35 |
| 265 | (I-1) | (II-17) | 66:34 |
| 266 | (I-1) | (II-35) | 68:32 |
| 267 | (I-1) | (II-47) | 65:35 |
| 268 | (I-1) | (II-49) | 60:40 |
| 269 | (I-1) | (II-55) | 68:32 |
| 270 | (I-1) | (II-61) | 65:35 |
| 271 | (I-1) | (II-70) | 70:30 |
| 272 | (I-1) | (II-72) | 67:33 |
| 273 | (I-1) | (II-78) | 66:34 |
| 274 | (I-1) | (II-88) | 62:38 |
| 275 | (I-1) | (II-93) | 67:33 |
| 276 | (I-1) | (II-99) | 60:40 |
| 277 | (I-1) | (II-104) | 68:32 |
| 278 | (I-1) | (II-106) | 66:34 |
| 279 | (I-1) | (II-112) | 65:35 |

Trimeric Mixtures of the Invention
| Example | Dye of formula (I) | Dye of formula (II) | Dye of formula (III) | Ratio (I):(II):(III) |
|---|---|---|---|---|
| 280 | (I-1) | (II-1) | 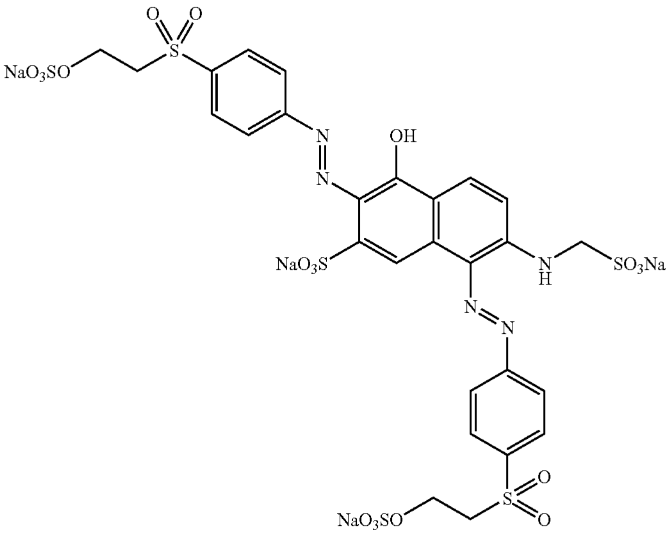 (III-1) | 66:22:12 |
| 281 | (I-1) | (II-2) | 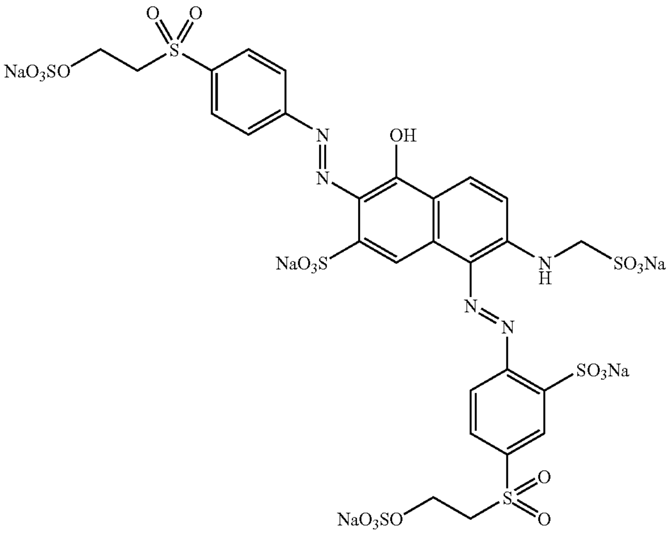 (III-2) | 65:23:12 |

-continued
| Example | Dye of formula (I) | Dye of formula (II) | Dye of formula (III) | Ratio (I):(II):(III) |
|---|---|---|---|---|
| 282 | (I-1) | (II-3) | 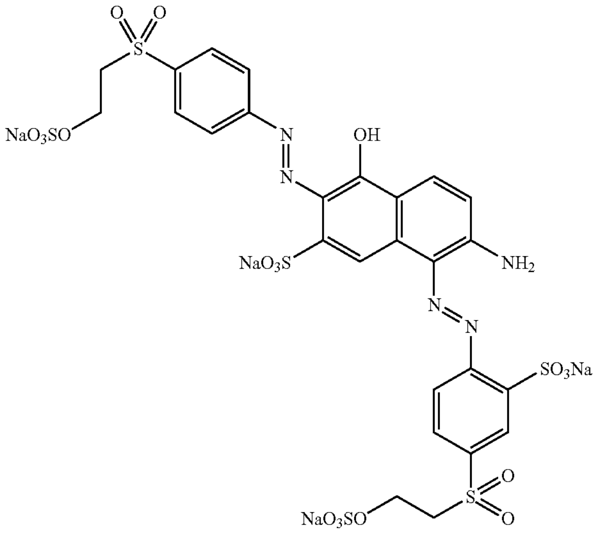 (III-3) | 67:21:12 |
| 283 | (I-1) | (II-5) | 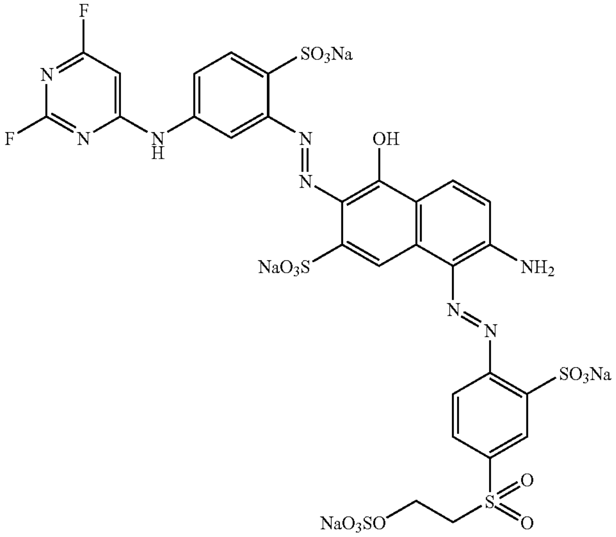 (III-4) | 67:23:10 |

-continued
| Example | Dye of formula (I) | Dye of formula (II) | Dye of formula (III) | Ratio (I):(II):(III) |
|---|---|---|---|---|
| 284 | (I-1) | (II-6) | 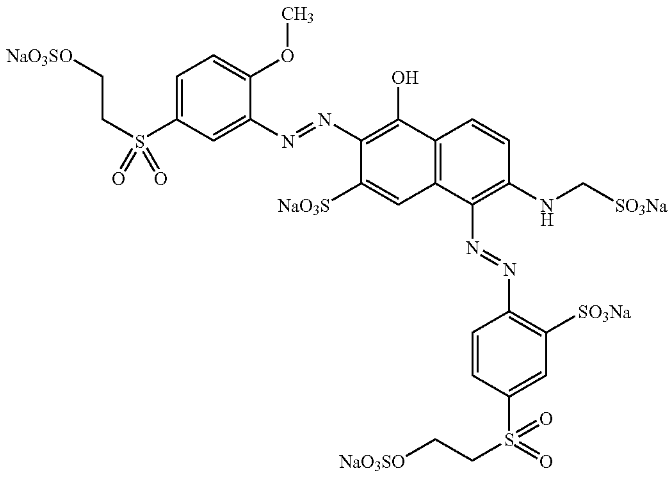 (III-5) | 65:25:10 |
| 285 | (I-1) | (II-13) | 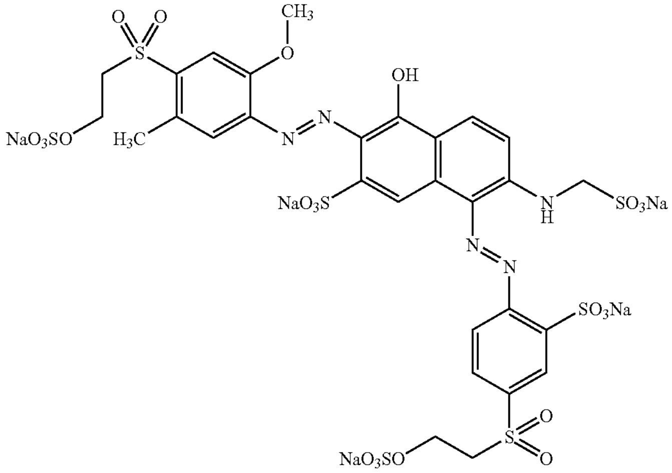 (III-6) | 70:22:8 |
| 286 | (I-1) | (II-24) | 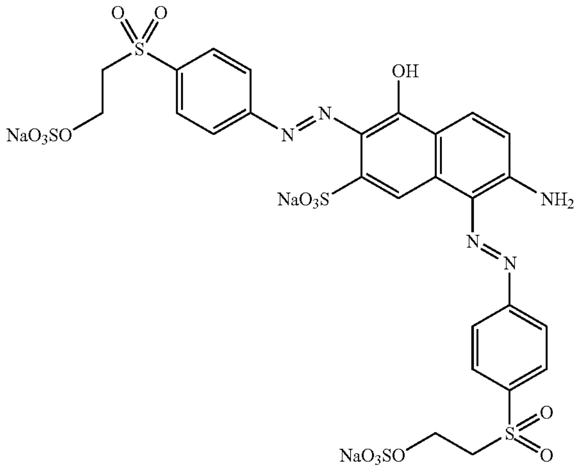 (III-7) | 70:20:8 |

-continued
| Example | Dye of formula (I) | Dye of formula (II) | Dye of formula (III) | Ratio (I):(II):(III) |
|---|---|---|---|---|
| 287 | (I-1) | (II-2) | 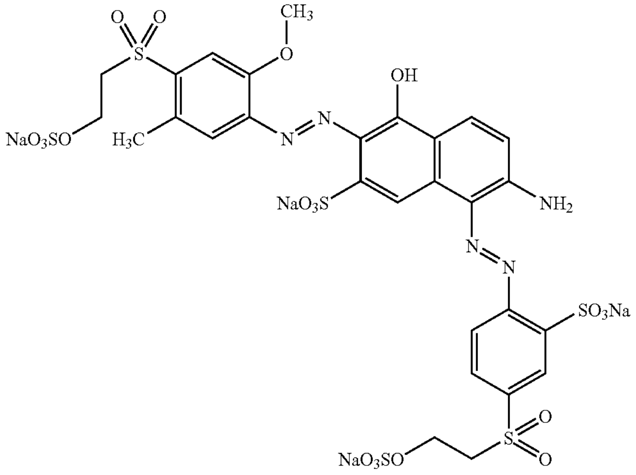 (III-8) | 70:23:7 |
| 288 | (I-1) | (II-25) | 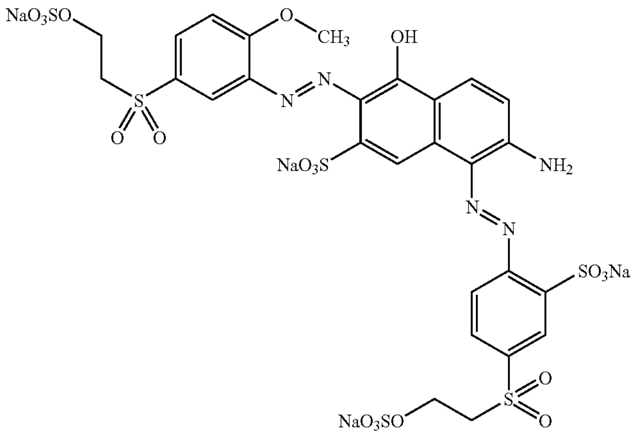 (III-9) | 67:22:11 |
| 289 | (I-1) | (II-26) | 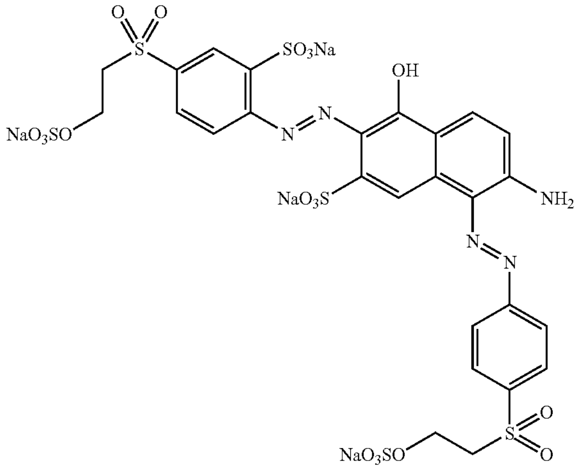 (III-10) | 65:20:15 |

-continued
| Example | Dye of formula (I) | Dye of formula (II) | Dye of formula (III) | Ratio (I):(II):(III) |
|---|---|---|---|---|
| 290 | (I-1) | (II-28) | 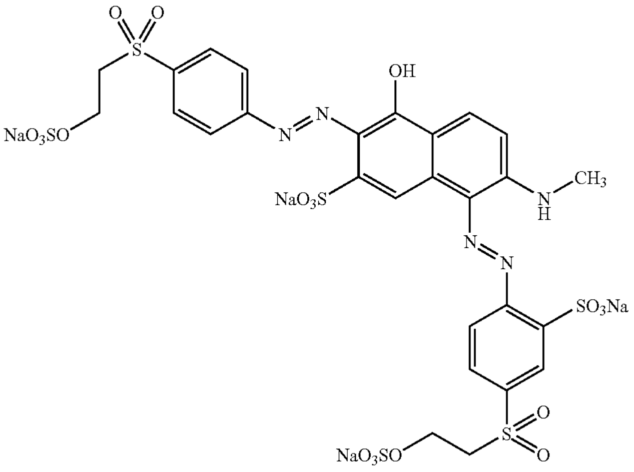 (III-11) | 69:23:8 |
| 291 | (I-1) | (II-31) | 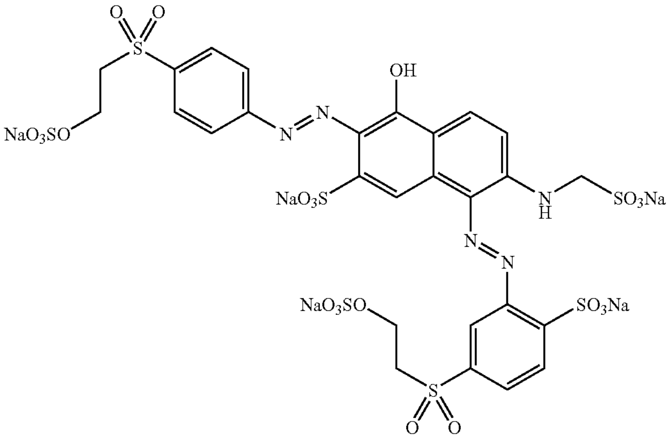 (III-12) | 66:24:10 |
| 292 | (I-1) | (II-35) | 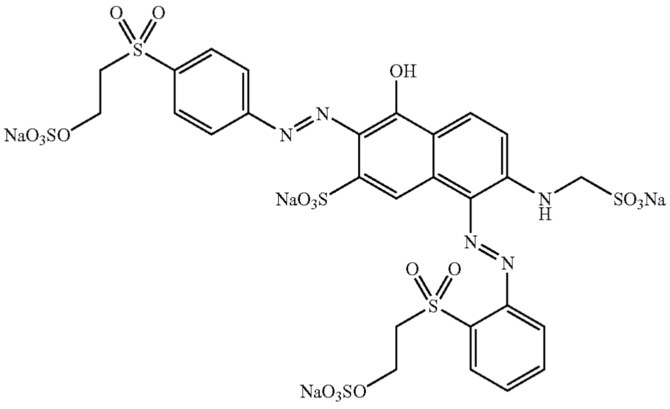 (III-13) | 68:20:12 |

-continued
| Example | Dye of formula (I) | Dye of formula (II) | Dye of formula (III) | Ratio (I):(II):(III) |
|---|---|---|---|---|
| 293 | (I-1) | (II-36) | 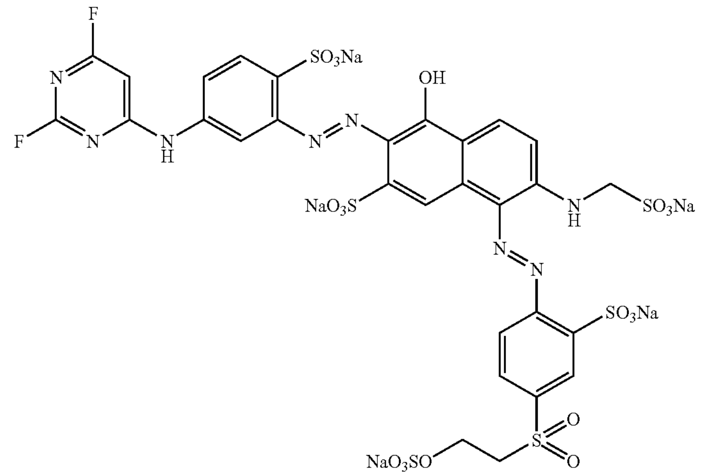 (III-14) | 70:18:12 |
| 294 | (I-1) | (II-37) | 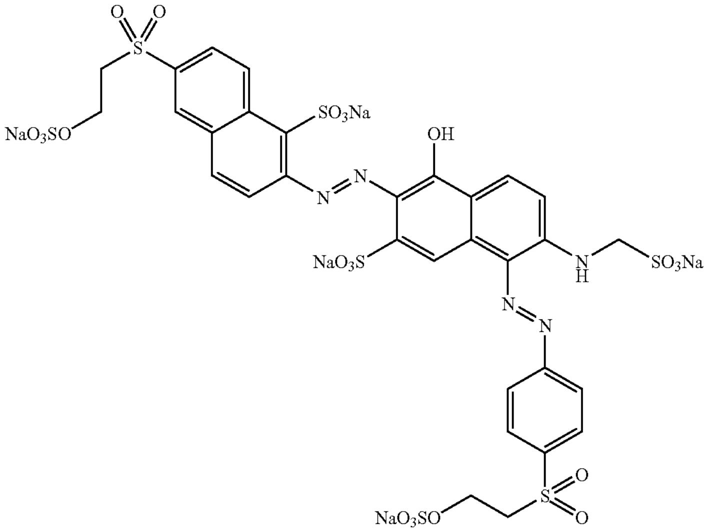 (III-15) | 69:23:8 |
| 295 | (I-1) | (II-40) | 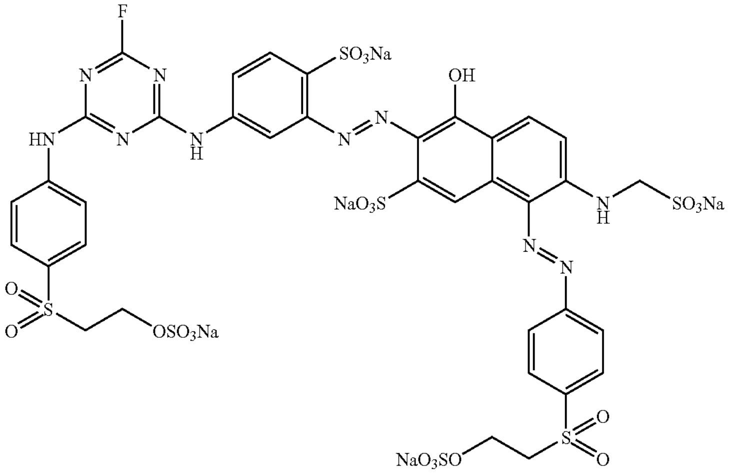 (III-16) | 66:22:12 |

-continued
| Example | Dye of formula (I) | Dye of formula (II) | Dye of formula (III) | Ratio (I):(II):(III) |
|---|---|---|---|---|
| 296 | (I-1) | (II-45) | 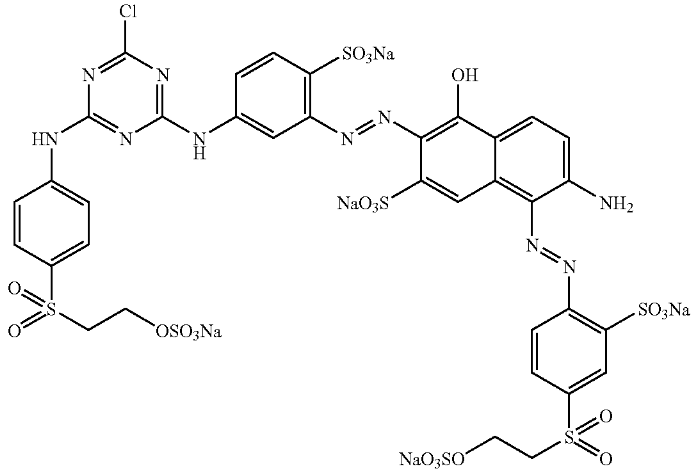 (III-17) | 66:22:12 |
| 297 | (I-1) | (II-53) | 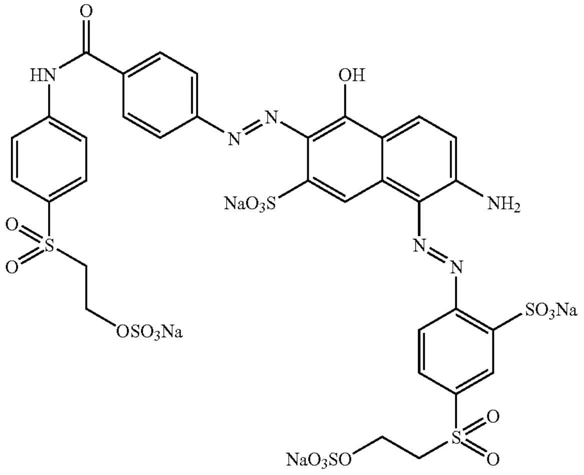 (III-18) | 70:20:10 |
| 298 | (I-1) | (II-1) | 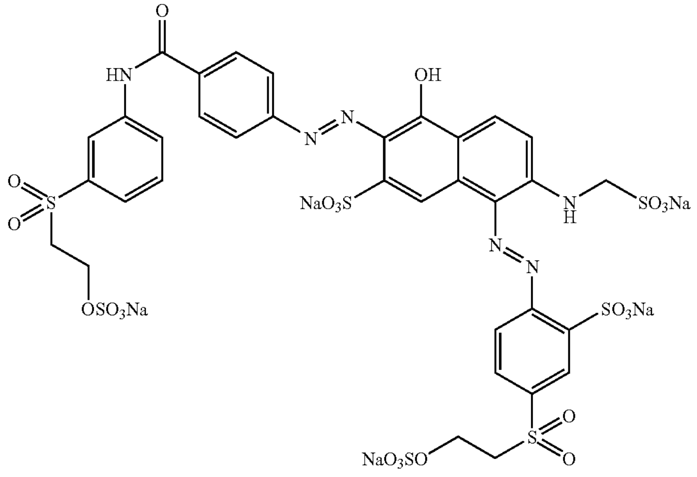 (III-19) | 65:24:11 |

-continued
| Example | Dye of formula (I) | Dye of formula (II) | Dye of formula (III) | Ratio (I):(II):(III) |
|---|---|---|---|---|
| 299 | (I-1) | (II-6) | 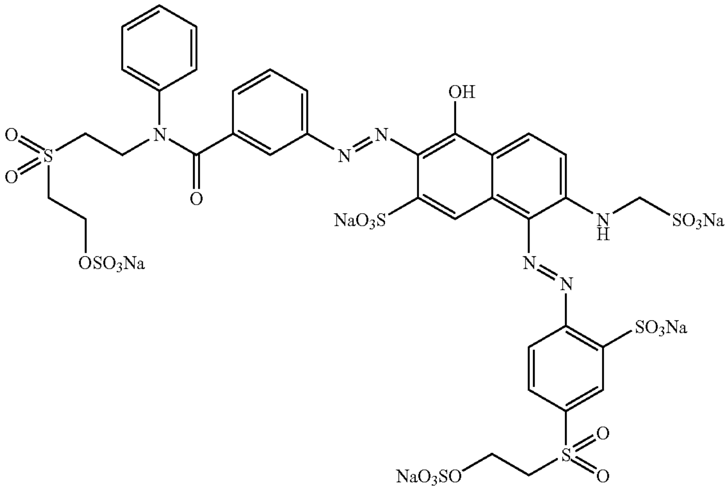 (III-20) | 66:23:11 |
| 300 | (I-1) | (II-13) | 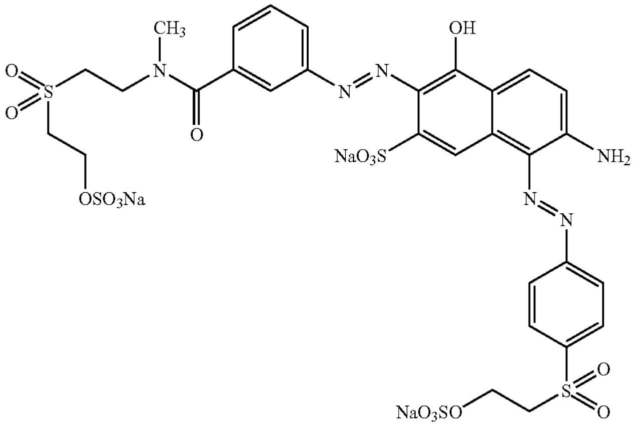 (III-21) | 66:20:14 |
| 301 | (I-1) | (II-54) | 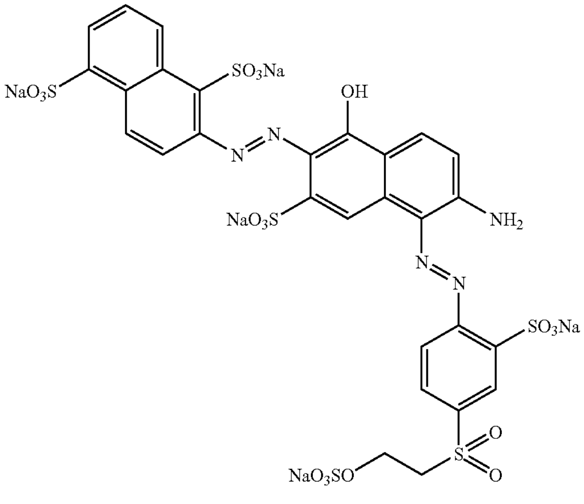 (III-22) | 65:22:13 |

-continued
| Example | Dye of formula (I) | Dye of formula (II) | Dye of formula (III) | Ratio (I):(II):(III) |
|---|---|---|---|---|
| 302 | (I-1) | (II-55) | 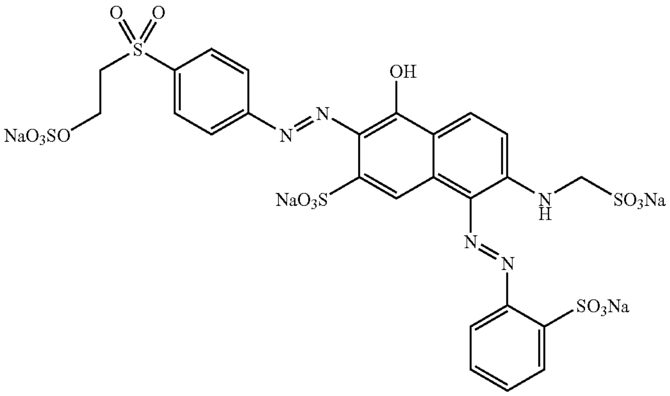 (III-23) | 64:21:15 |
| 303 | (I-1) | (II-64) | 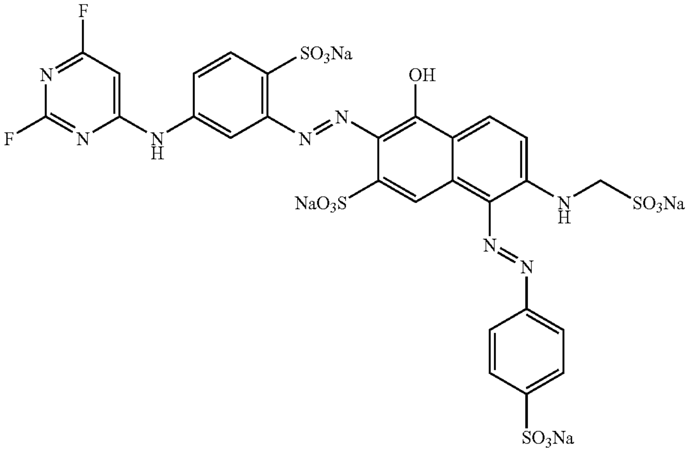 (III-24) | 68:18:14 |
| 304 | (I-1) | (II-65) | 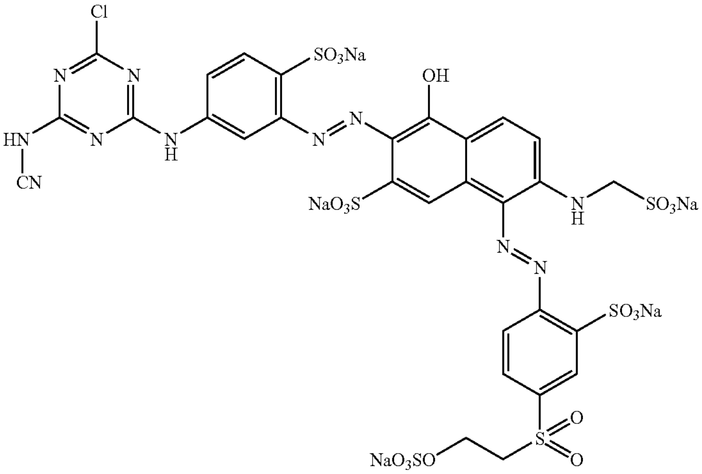 (III-25) | 67:21:12 |

-continued
| Example | Dye of formula (I) | Dye of formula (II) | Dye of formula (III) | Ratio (I):(II):(III) |
|---|---|---|---|---|
| 305 | (I-1) | (II-66) | 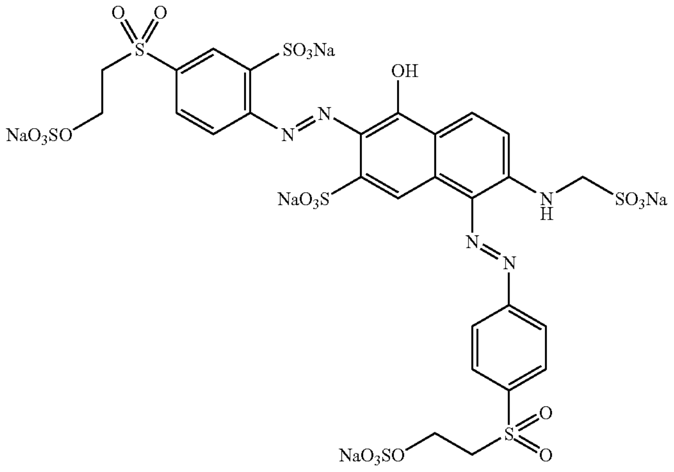 (III-26) | 68:22:10 |
| 306 | (I-1) | (II-69) | 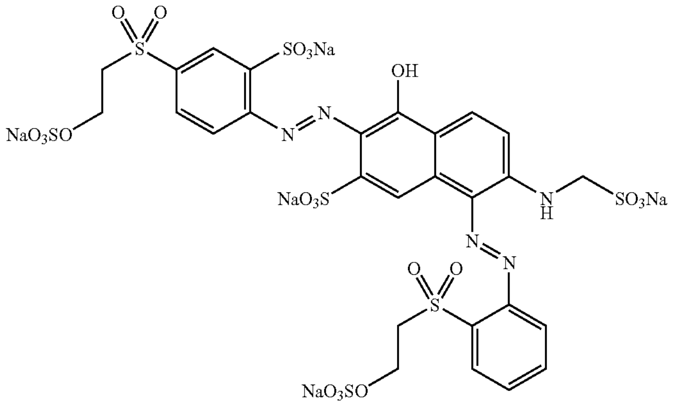 (III-27) | 68:24:8 |
| 307 | (I-1) | (II-71) | 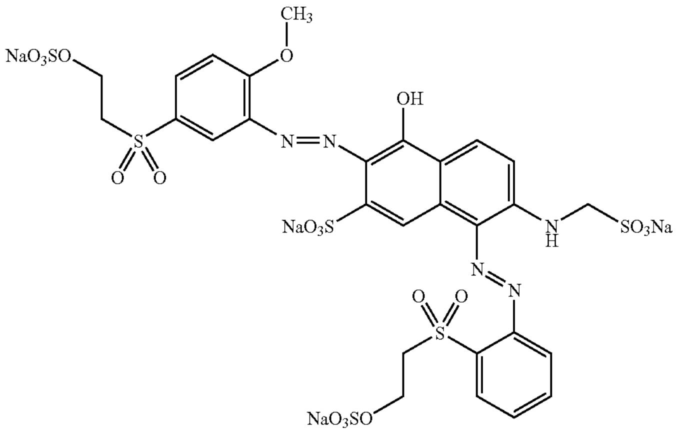 (III-28) | 67:23:10 |

-continued
| Example | Dye of formula (I) | Dye of formula (II) | Dye of formula (III) | Ratio (I):(II):(III) |
|---|---|---|---|---|
| 308 | (I-1) | (II-73) | 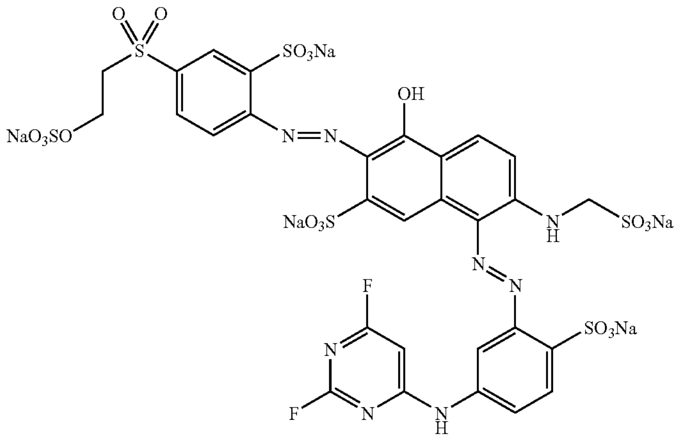 (III-29) | 64:23:13 |
| 309 | (I-1) | (II-76) | 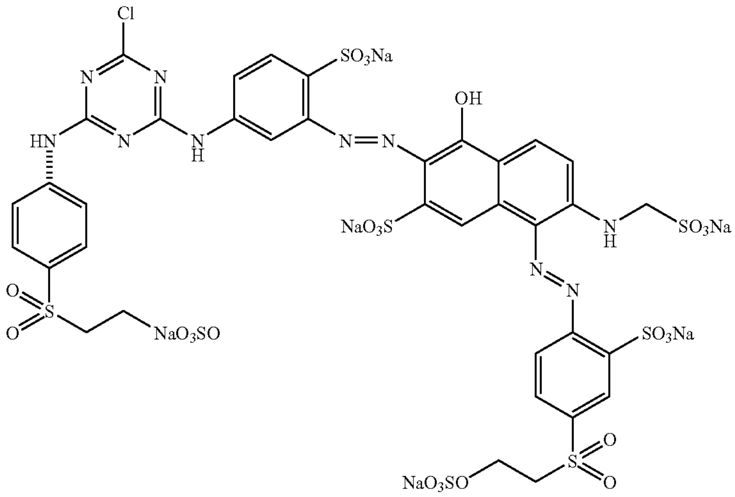 (III-30) | 65:22:13 |
| 310 | (I-1) | (II-77) | 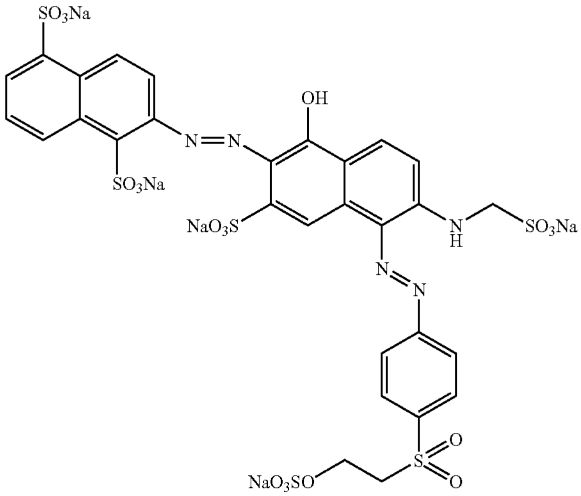 (III-31) | 67:22:11 |

-continued
| Example | Dye of formula (I) | Dye of formula (II) | Dye of formula (III) | Ratio (I):(II):(III) |
|---|---|---|---|---|
| 311 | (I-1) | (II-80) | 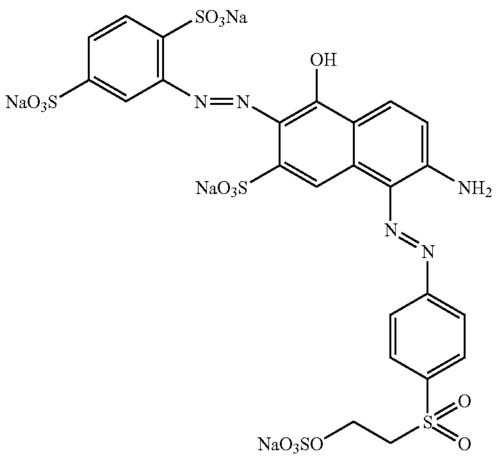 (III-32) | 65:22:13 |
| 312 | (I-1) | (II-81) | 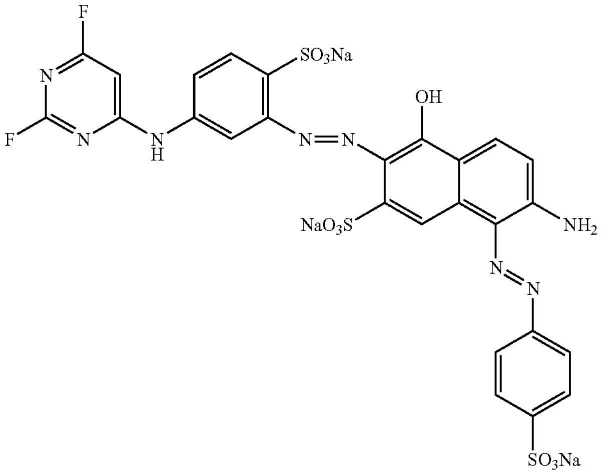 (III-33) | 68:20:12 |
| 313 | (I-1) | (II-91) | (III-6) | 66:22:12 |
| 314 | (I-1) | (II-92) | (III-2) | 66:24:10 |
| 315 | (I-1) | (II-93) | (III-5) | 68:22:10 |
| 316 | (I-1) | (II-103) | (III-8) | 68:24:8 |
| 317 | (I-1) | (II-104) | (III-32) | 65:20:15 |
| 318 | (I-1) | (II-105) | (III-2) | 70:25:5 |
| 319 | (I-1) | (II-106) | (III-5) | 72:24:4 |
| 320 | (I-1) | (II-108) | (III-3) | 72:24:4 |
| 321 | (I-1) | (II-115) | (III-31) | 67:22:11 |
| 322 | (I-1) | (II-119) | (III-2) | 68:20:12 |
| 323 | (I-1) | (II-1) | (III-2) | 68:20:12 |
| 324 | (I-1) | (II-2) | (III-5) | 68:22:10 |
| 325 | (I-1) | (II-3) | (III-6) | 70:22:8 |
| 326 | (I-1) | (II-5) | (III-31) | 66:20:14 |
| 327 | (I-1) | (II-6) | (III-2) | 66:24:10 |
| 328 | (I-1) | (II-13) | (III-2) | 67:20:13 |
| 329 | (I-1) | (II-24) | (III-2) | 67:21:12 |
| 330 | (I-1) | (II-25) | (III-5) | 67:22:11 |
| 331 | (I-1) | (II-26) | (III-2) | 68:20:12 |
| 332 | (I-1) | (II-28) | (III-15) | 70:22:8 |
| 333 | (I-1) | (II-31) | (III-3) | 68:24:8 |
| 334 | (I-1) | (II-35) | (III-5) | 68:21:11 |
| 335 | (I-1) | (II-36) | (III-2) | 70:20:10 |
| 336 | (I-1) | (II-37) | (III-8) | 73:20:7 |
| 337 | (I-1) | (II-40) | (III-5) | 67:21:12 |
| 338 | (I-1) | (II-45) | (III-2) | 67:23:10 |
| 339 | (I-1) | (II-53) | (III-2) | 69:20:11 |
| 340 | (I-1) | (II-54) | (III-5) | 67:21:12 |

-continued

| Example | Dye of formula (I) | Dye of formula (II) | Dye of formula (III) | Ratio (I):(II):(III) |
|---|---|---|---|---|
| 341 | (I-1) | (II-55) | (III-2) | 66:22:12 |
| 342 | (I-1) | (II-64) | (III-5) | 67:23:10 |
| 343 | (I-1) | (II-65) | (III-6) | 73:20:7 |
| 344 | (I-1) | (II-66) | (III-3) | 67:22:11 |
| 345 | (I-1) | (II-69) | (III-5) | 72:20:8 |
| 346 | (I-1) | (II-71) | (III-2) | 70:20:10 |
| 347 | (I-1) | (II-73) | (III-5) | 68:22:10 |
| 348 | (I-1) | (II-76) | (III-2) | 70:18:12 |
| 349 | (I-1) | (II-77) | (III-8) | 68:20:12 |
| 350 | (I-1) | (II-80) | (III-2) | 70:10:20 |
| 351 | (I-1) | (II-81) | (III-5) | 70:10:20 |
| 352 | (I-1) | (II-91) | (III-3) | 70:15:15 |
| 353 | (I-1) | (II-92) | (III-3) | 72:12:16 |
| 354 | (I-1) | (II-93) | (III-32) | 68:14:18 |
| 355 | (I-1) | (II-103) | (III-2) | 67:16:17 |
| 356 | (I-1) | (II-104) | (III-5) | 70:12:18 |
| 357 | (I-1) | (II-105) | (III-3) | 69:10:21 |
| 358 | (I-1) | (II-106) | (III-2) | 70:10:20 |
| 359 | (I-1) | (II-108) | (III-15) | 75:13:12 |
| 360 | (I-1) | (II-115) | (III-5) | 73:10:17 |
| 361 | (I-1) | (II-117) | (III-2) | 66:22:10 |
| 362 | (I-1) | (II-118) | (III-5) | 65:25:10 |
| 363 | (I-1) | (II-119) | (III-3) | 70:20:10 |

Further Trimeric Mixtures of the Invention

| Example | Dye of formula (I) | Dye of formula (II) | Dye of formula (IV) | Ratio (I):(II):(IV) |
|---|---|---|---|---|
| 364 | (I-1) | (II-2) | 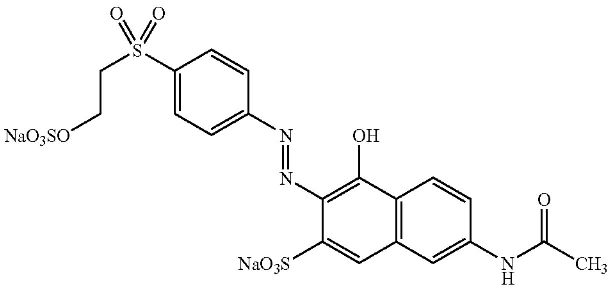 (IV-1) | 70:15:15 |
| 365 | (I-1) | (II-1) | 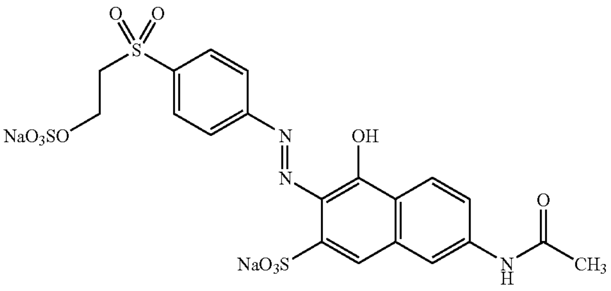 (IV-2) | 66:14:20 |

-continued
| Example | Dye of formula (I) | Dye of formula (II) | Dye of formula (IV) | Ratio (I):(II):(IV) |
|---|---|---|---|---|
| 366 | (I-1) | (II-3) | 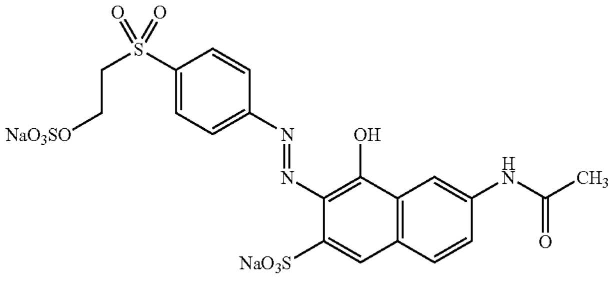 (IV-3) | 65:18:17 |
| 367 | (I-1) | (II-6) | 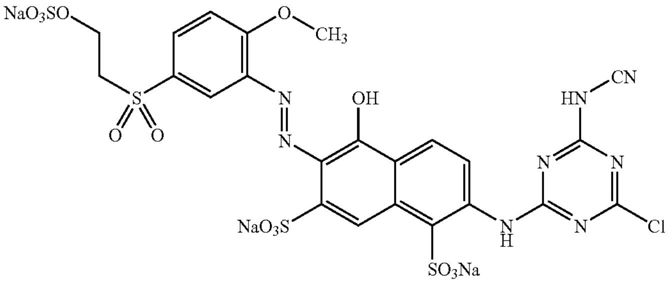 (IV-4) | 67:18:15 |
| 368 | (I-1) | (II-13) | 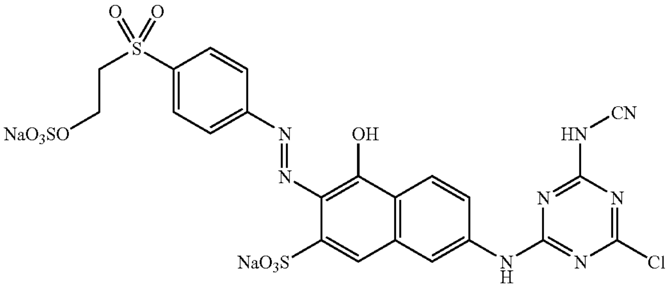 (IV-5) | 70:20:10 |
| 369 | (I-1) | (II-5) | 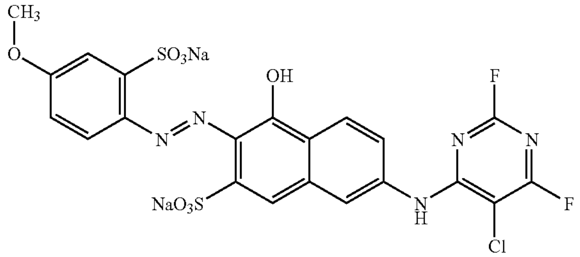 (IV-6) | 70:18:12 |
| 370 | (I-1) | (II-24) | 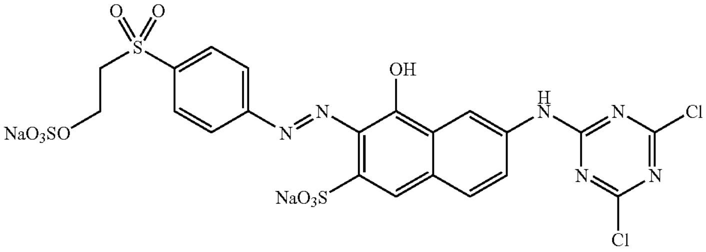 (IV-7) | 70:20:10 |

-continued
| Example | Dye of formula (I) | Dye of formula (II) | Dye of formula (IV) | Ratio (I):(II):(IV) |
|---|---|---|---|---|
| 371 | (I-1) | (II-35) | 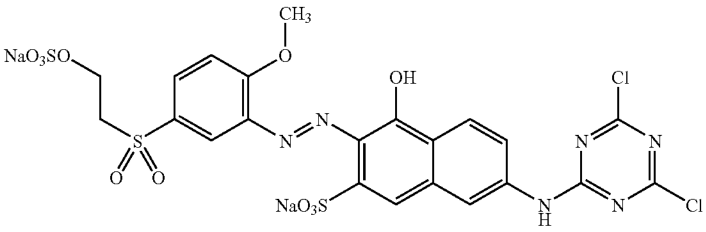 (IV-8) | 67:18:15 |
| 372 | (I-1) | (II-37) | 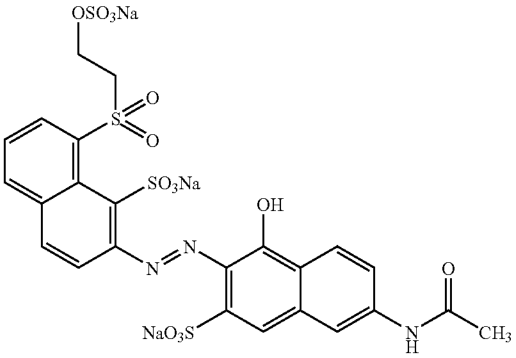 (IV-9) | 67:23:10 |
| 373 | (I-1) | (II-36) | 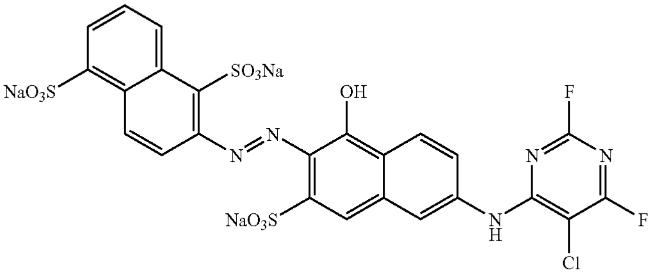 (IV-10) | 68:19:13 |
| 374 | (I-1) | (II-26) | 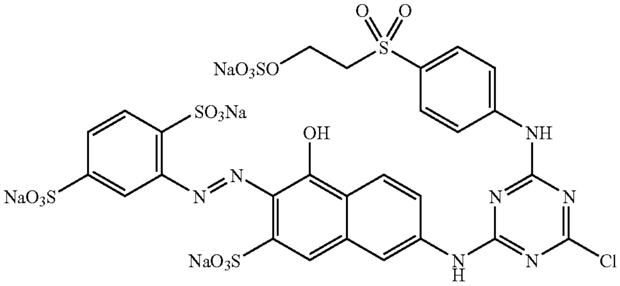 (IV-11) | 65:20:15 |

-continued
| Example | Dye of formula (I) | Dye of formula (II) | Dye of formula (IV) | Ratio (I):(II):(IV) |
|---|---|---|---|---|
| 375 | (I-1) | (II-25) | 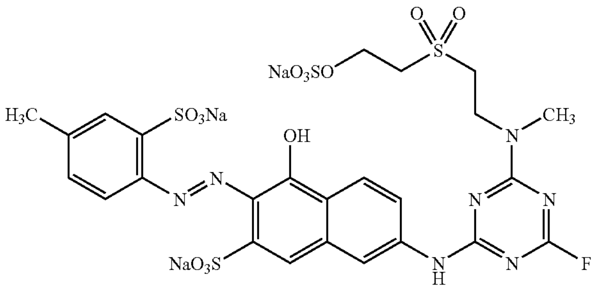 (IV-12) | 65:18:17 |
| 376 | (I-1) | (II-66) | 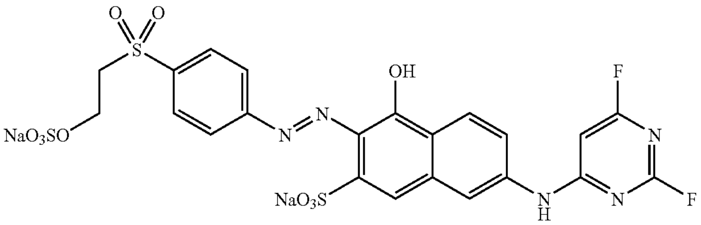 (IV-13) | 67:18:15 |
| 377 | (I-1) | (II-54) | 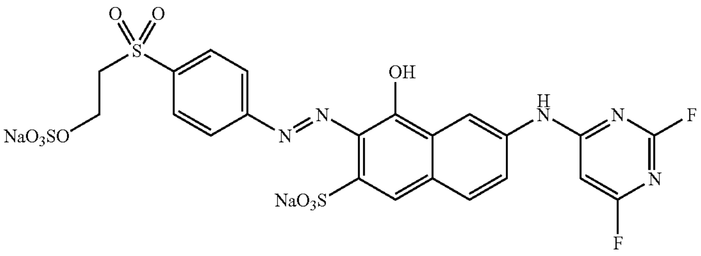 (IV-14) | 70:18:12 |
| 378 | (I-1) | (II-80) | 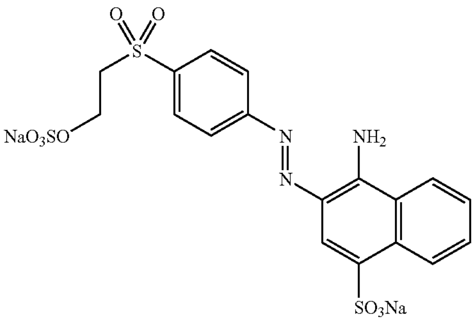 (IV-15) | 66:20:14 |

-continued
| Example | Dye of formula (I) | Dye of formula (II) | Dye of formula (IV) | Ratio (I):(II):(IV) |
|---|---|---|---|---|
| 379 | (I-1) | (II-69) | 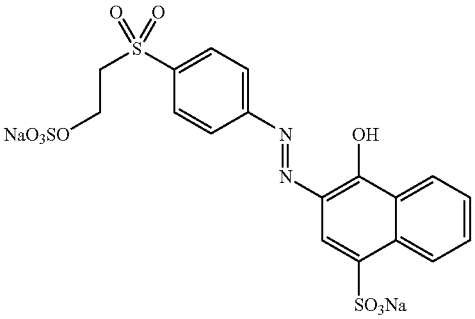 (IV-16) | 65:15:20 |
| 380 | (I-1) | (II-71) | 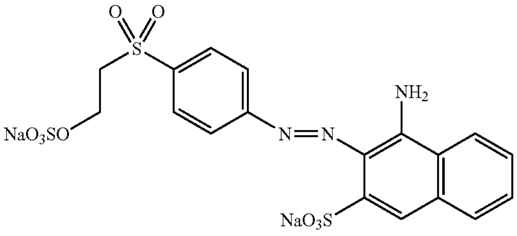 (IV-17) | 65:20:15 |
| 381 | (I-1) | (II-73) | 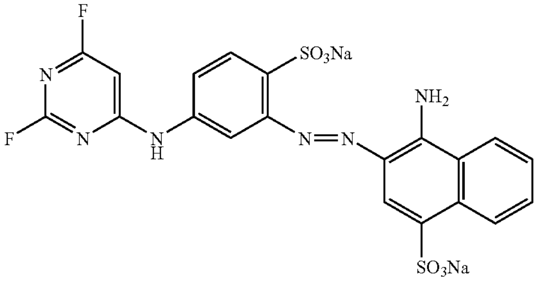 (IV-18) | 68:20:12 |
| 382 | (I-1) | (II-76) | 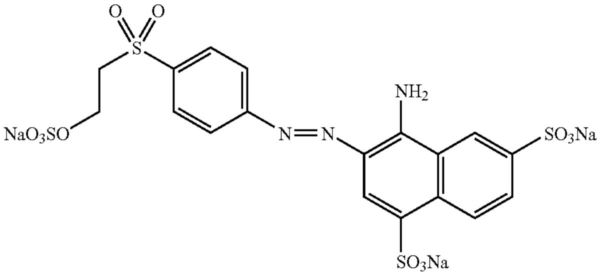 (IV-19) | 66:17:17 |
| 383 | (I-1) | (II-93) | 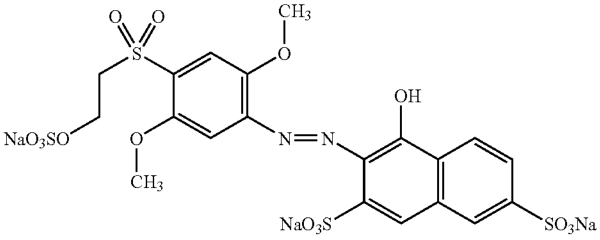 (IV-20) | 68:16:16 |

-continued
| Example | Dye of formula (I) | Dye of formula (II) | Dye of formula (IV) | Ratio (I):(II):(IV) |
| --- | --- | --- | --- | --- |
| 384 | (I-1) | (II-77) | 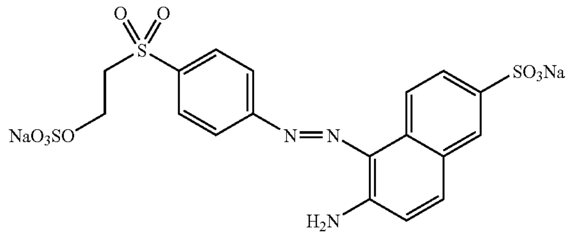 (IV-21) | 67:20:13 |
| 385 | (I-1) | (II-81) | 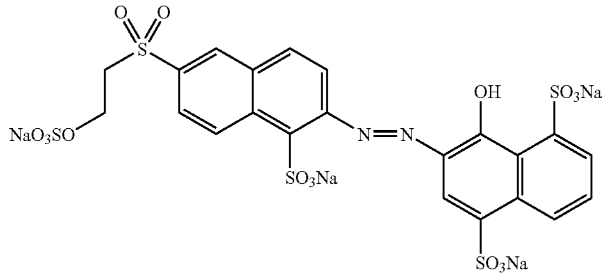 (IV-22) | 68:17:15 |
| 386 | (I-1) | (II-103) | 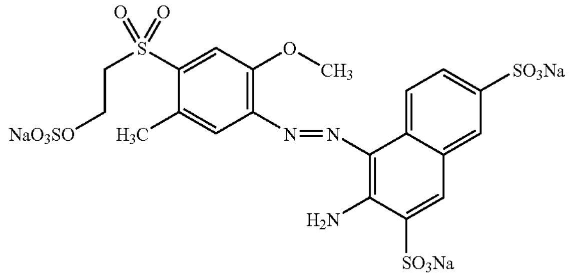 (IV-23) | 67:20:13 |
| 387 | (I-1) | (II-92) | 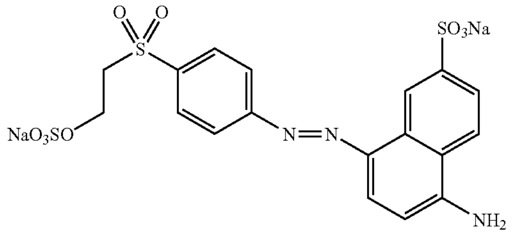 (IV-24) | 67:18:15 |
| 388 | (I-1) | (II-104) | 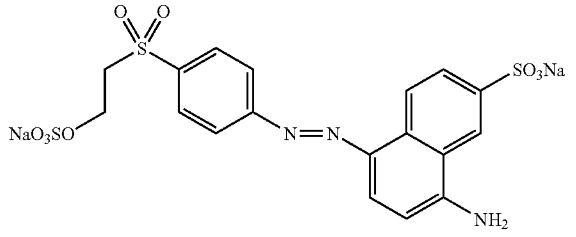 (IV-25) | 70:20:10 |

-continued
| Example | Dye of formula (I) | Dye of formula (II) | Dye of formula (IV) | Ratio (I):(II):(IV) |
|---|---|---|---|---|
| 389 | (I-1) | (II-108) | 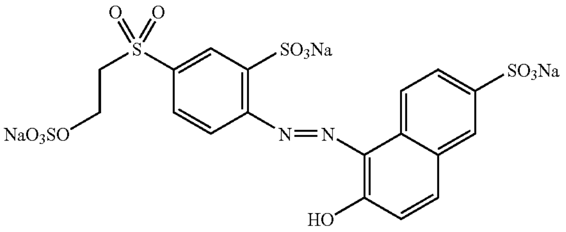 (IV-26) | 66:17:17 |
| 390 | (I-1) | (II-106) | 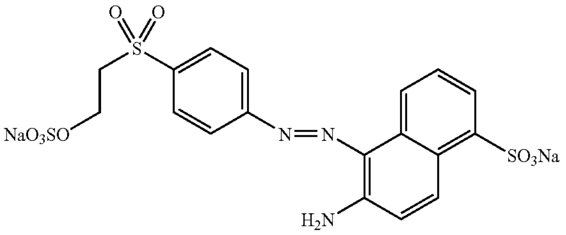 (IV-27) | 68:20:12 |
| 391 | (I-1) | (II-105) | 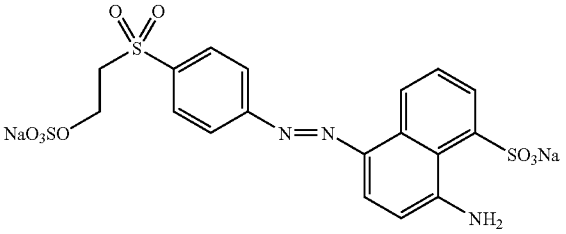 (IV-28) | 65:20:15 |
| 392 | (I-1) | (II-113) | 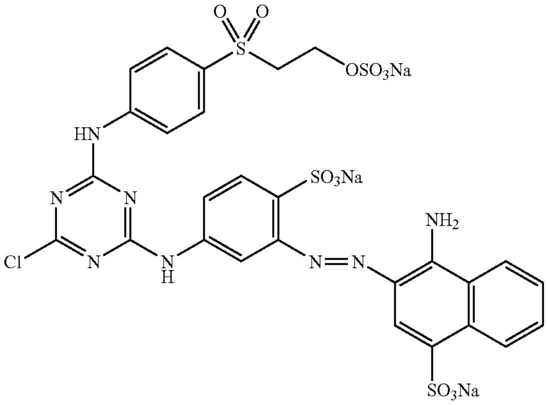 (IV-29) | 67:20:13 |
| 393 | (I-1) | (II-119) | (IV-1) | 70:22:8 |
| 394 | (I-1) | (II-1) | (IV-27) | 67:23:10 |
| 395 | (I-1) | (II-2) | (IV-15) | 70:20:10 |
| 396 | (I-1) | (II-3) | (IV-15) | 68:22:10 |
| 397 | (I-1) | (II-5) | (IV-27) | 66:17:17 |
| 398 | (I-1) | (II-6) | (IV-15) | 70:19:11 |
| 399 | (I-1) | (II-13) | (IV-15) | 70:20:10 |
| 400 | (I-1) | (II-24) | (IV-27) | 67:22:11 |
| 401 | (I-1) | (II-25) | (IV-25) | 70:20:10 |
| 402 | (I-1) | (II-26) | (IV-24) | 67:20:13 |
| 403 | (I-1) | (II-28) | (IV-2) | 66:22:12 |
| 404 | (I-1) | (II-31) | (IV-1) | 65:18:17 |
| 405 | (I-1) | (II-35) | (IV-15) | 70:20:10 |
| 406 | (I-1) | (II-36) | (IV-27) | 70:18:12 |

-continued

| Example | Dye of formula (I) | Dye of formula (II) | Dye of formula (IV) | Ratio (I):(II):(IV) |
|---|---|---|---|---|
| 407 | (I-1) | (II-37) | (IV-21) | 67:21:12 |
| 408 | (I-1) | (II-40) | (IV-1) | 68:16:16 |
| 409 | (I-1) | (II-45) | (IV-15) | 69:19:12 |
| 410 | (I-1) | (II-53) | (IV-1) | 68:22:10 |
| 411 | (I-1) | (II-54) | (IV-15) | 67:22:11 |
| 412 | (I-1) | (II-55) | (IV-2) | 67:18:15 |
| 413 | (I-1) | (II-64) | (IV-27) | 68:20:12 |
| 414 | (I-1) | (II-65) | (IV-1) | 70:15:15 |
| 415 | (I-1) | (II-66) | (IV-27) | 64:22:14 |
| 416 | (I-1) | (II-69) | (IV-1) | 68:20:12 |
| 417 | (I-1) | (II-71) | (IV-1) | 67:21:12 |
| 418 | (I-1) | (II-73) | (IV-1) | 66:22:12 |
| 419 | (I-1) | (II-76) | (IV-2) | 70:18:12 |
| 420 | (I-1) | (II-77) | (IV-1) | 67:23:10 |
| 421 | (I-1) | (II-80) | (IV-1) | 67:19:14 |
| 422 | (I-1) | (II-81) | (IV-2) | 68:19:13 |
| 423 | (I-1) | (II-91) | (IV-15) | 68:20:12 |
| 424 | (I-1) | (II-92) | (IV-2) | 67:16:17 |
| 425 | (I-1) | (II-93) | (IV-1) | 70:10:20 |
| 426 | (I-1) | (II-103) | (IV-1) | 67:13:20 |
| 427 | (I-1) | (II-104) | (IV-2) | 68:15:17 |
| 428 | (I-1) | (II-105) | (IV-1) | 70:20:10 |
| 429 | (I-1) | (II-106) | (IV-2) | 68:20:12 |
| 430 | (I-1) | (II-108) | (IV-1) | 68:22:10 |
| 431 | (I-1) | (II-115) | (IV-15) | 67:19:14 |
| 432 | (I-1) | (II-117) | (IV-1) | 68:16:16 |
| 433 | (I-1) | (II-118) | (IV-15) | 67:18:15 |
| 434 | (I-1) | (II-119) | (IV-27) | 70:20:10 |

Further Trimeric Mixtures of the Invention:

| Example | Dye of formula (I) | Dye of formula (II) | Dye of formula (G) | Ratio (I):(II):(G) |
|---|---|---|---|---|
| 435 | (I-1) | (II-106) | 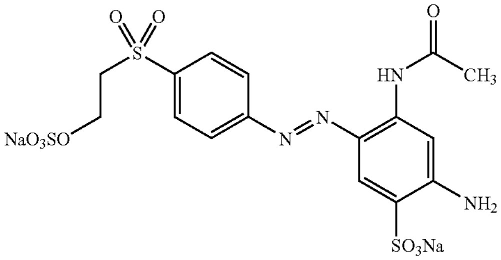 (Ga-1) | 66:20:14 |
| 436 | (I-1) | (II-105) | 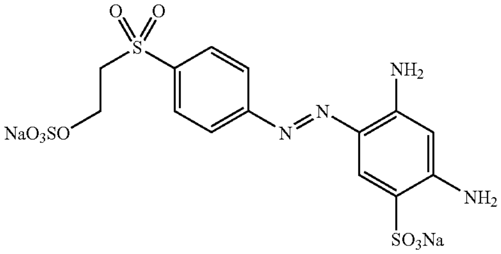 (Ga-2) | 67:22:11 |

-continued
| Example | Dye of formula (I) | Dye of formula (II) | Dye of formula (G) | Ratio (I):(II):(G) |
|---|---|---|---|---|
| 437 | (I-1) | (II-108) | 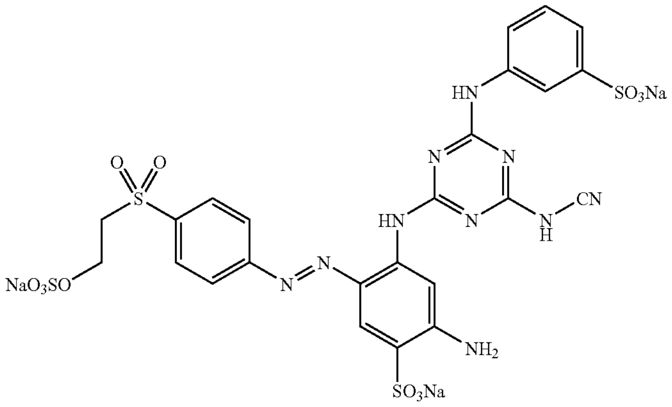 (Ga-3) | 66:17:17 |
| 438 | (I-1) | (II-107) | 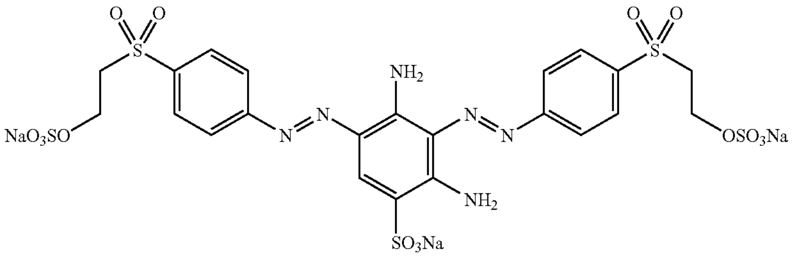 (Gb-1) | 68:22:10 |
| 439 | (I-1) | (II-119) | 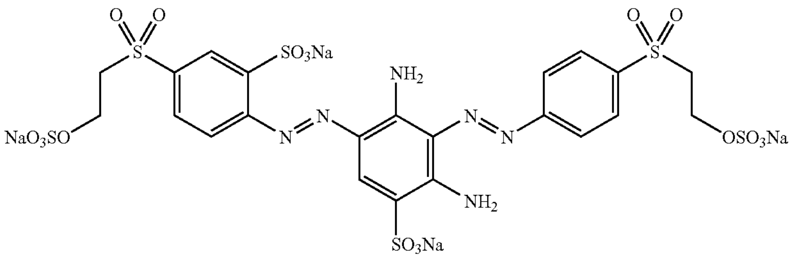 (Gb-2) | 67:20:13 |
| 440 | (I-1) | (II-115) | 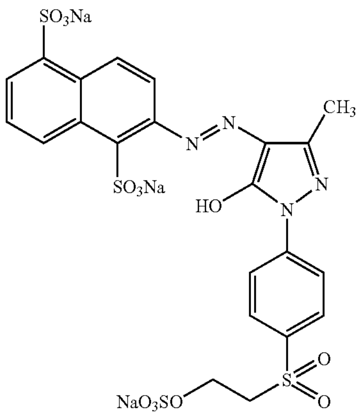 (Gc-1) | 68:14:18 |

-continued
| Example | Dye of formula (I) | Dye of formula (II) | Dye of formula (G) | Ratio (I):(II):(G) |
|---|---|---|---|---|
| 441 | (I-1) | (II-113) | 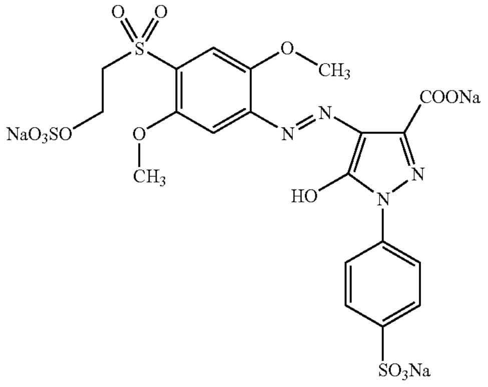 (Gc-2) | 67:18:15 |
| 442 | (I-1) | (II-106) | 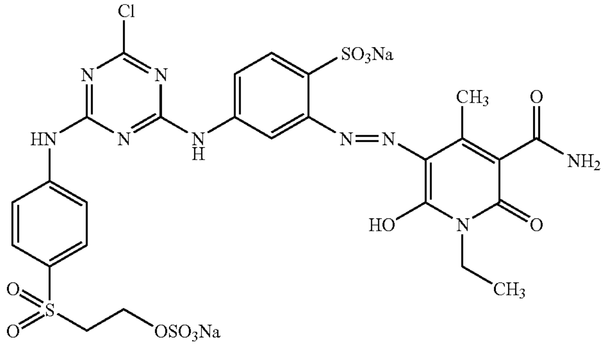 (Gd-1) | 65:20:15 |
| 443 | (I-1) | (II-105) | 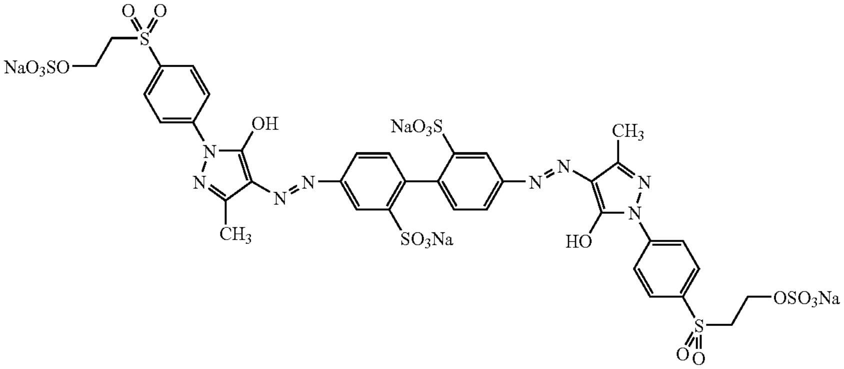 (Ge-1) | 70:15:15 |
| 444 | (I-1) | (II-105) | 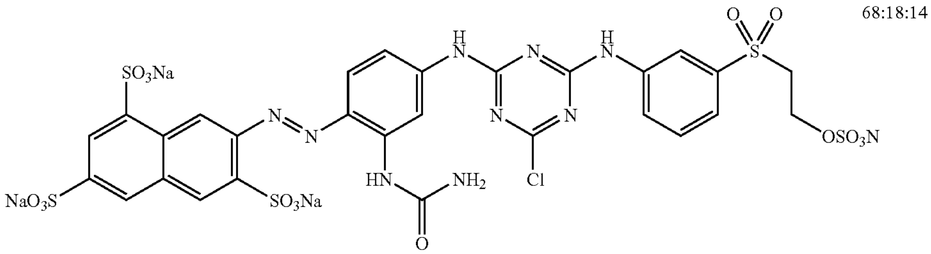 (Gf-1) | 68:18:14 |

-continued

| Example | Dye of formula (I) | Dye of formula (II) | Dye of formula (G) | Ratio (I):(II):(G) |
|---|---|---|---|---|
| 445 | (I-1) | (II-106) | 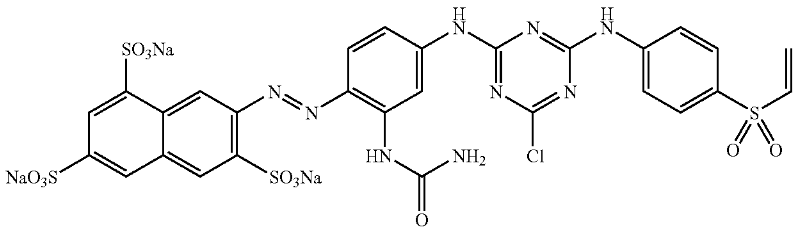 (Gf-2) | 67:20:13 |
| 446 | (I-1) | (II-108) | 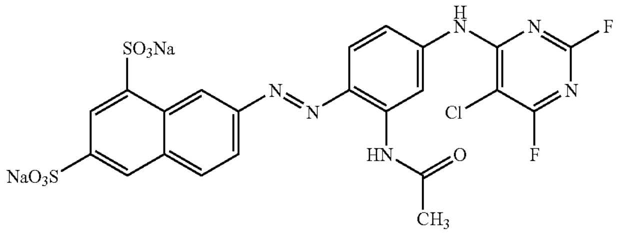 (Gf-3) | 67:18:15 |
| 447 | (I-1) | (II-119) | (Ga-1) | 70:20:10 |
| 448 | (I-1) | (II-119) | (Ga-2) | 68:18:14 |
| 449 | (I-1) | (II-119) | (Ge-1) | 72:20:8 |
| 450 | (I-1) | (II-119) | (Gf-2) | 70:15:15 |

EXAMPLE 451

67 parts of an electrolyte-containing dye powder containing the navy disazo dye of the formula (I-1) in a fraction of 75% and 33 parts of an electrolyte-containing brown dye powder prepared as per Example 4 are mixed mechanically with one another. The resulting dye mixture of the invention gives jet black dyeings and prints, on cotton, for example, under the dyeing conditions typical for reactive dyes.

EXAMPLE 452

70 parts of an electrolyte-containing dye powder containing the navy disazo dye of the formula (I-1) in a fraction of 75% and 30 parts of an electrolyte-containing brown dye powder consisting of 26 parts of the trisazo dye of the formula (II-6) and 4 parts of the disazo dye of the formula (II-200)

(II-200)

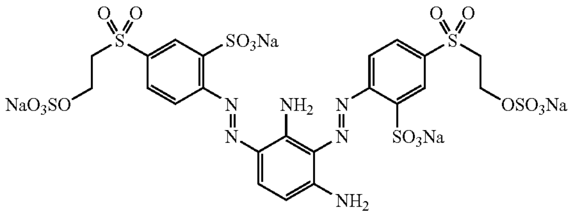

are dissolved in 500 parts of water and the resulting dye solution is adjusted to a pH of 5.5-6.5. Evaporating this dye solution produces a dye mixture which on cotton gives jet black dyeings and prints under the dyeing conditions typical for reactive dyes.

EXAMPLE 453

65 parts of an electrolyte-containing dye powder containing the navy disazo dye of the formula (I-1) in a fraction of 75%, 29 parts of an electrolyte-containing brown dye powder prepared as per Example 4, and 6 parts of an electrolyte-containing dye powder containing the red monoazo dye of the formula (15-1)

(15-1)

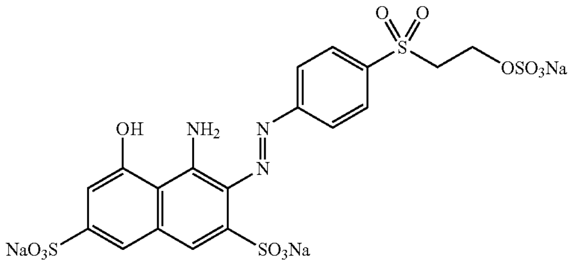

in a fraction of 75% are dissolved in 500 parts of water and the resulting dye solution is adjusted to a pH of 5.5-6.5. Evaporating this dye solution produces a dye mixture which on cotton gives jet black dyeings and prints under the dyeing conditions typical for reactive dyes.

EXAMPLE 454

66 parts of an electrolyte-containing dye powder containing the navy disazo dye of the formula (I-1) in a fraction of 75%, 29 parts of an electrolyte-containing brown dye powder consisting of 26 parts of the trisazo dye of the formula (II-6)

and 3 parts of the disazo dye of the formula (II-200) and 5 parts of an electrolyte-containing dye powder containing the red monoazo dye of the formula (15-1) in a fraction of 75% are mixed mechanically with one another.

The resulting dye mixture of the invention gives jet black dyeings and prints, on cotton, for example, under the dyeing conditions typical for reactive dyes.

EXAMPLE 455

65 parts of an electrolyte-containing dye powder containing the navy disazo dye of the formula (I-1) in a fraction of 75%, 26 parts of an electrolyte-containing dye powder containing the brown trisazo dye of the formula (II-5) in a fraction of 70%, 5 parts of an electrolyte-containing dye powder containing the yellow-brown disazo dye of the formula (II-54) in a fraction of 70%, and 4 parts of an electrolyte-containing dye powder containing the red monoazo dye of the formula (15-1) in a fraction of 75% are mixed mechanically with one another.

The resulting dye mixture gives jet black dyeings and prints, on cotton for example, under the dyeing conditions typical for reactive dyes.

EXAMPLE 456

65 parts of an electrolyte-containing dye powder containing the navy disazo dye of the formula (I-1) in a fraction of 75%, 29 parts of an electrolyte-containing brown dye powder prepared as per Example 4, and 6 parts of an electrolyte-containing dye powder containing the scarlet disazo dye of the formula (III-2) in a fraction of 75% are dissolved in 500 parts of water and the resulting dye solution is adjusted to a pH of 5.5-6.5. Evaporating this dye solution produces a dye mixture which on cotton gives jet black dyeings and prints under the dyeing conditions typical for reactive dyes.

EXAMPLE 457

64 parts of an electrolyte-containing dye powder containing the navy disazo dye of the formula (I-1) in a fraction of 75%, 29 parts of an electrolyte-containing brown dye powder consisting of 26 parts of the trisazo dye of the formula (II-6) and 3 parts of the disazo dye of the formula (II-200), 4 parts of an electrolyte-containing dye powder containing the red disazo dye of the formula (III-5) in a fraction of 75% and 3 parts of an electrolyte-containing dye powder containing the red monoazo dye of the formula (15-1) in a fraction of 75% are mixed mechanically with one another.

The resulting dye mixture of the invention gives jet black dyeings and prints, on cotton, for example, under the dyeing conditions typical for reactive dyes.

Similar mixtures of the invention, in which compound (I-1) is replaced by, for example, at least one of the compounds (I-2) to (I-20) below, lead to a comparably good outcome.

| Compound (I) | Structural formula |
|---|---|
| I-2 | 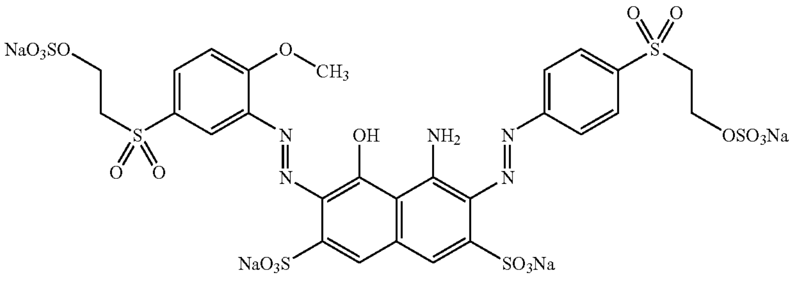 (I-2) |
| I-3 | 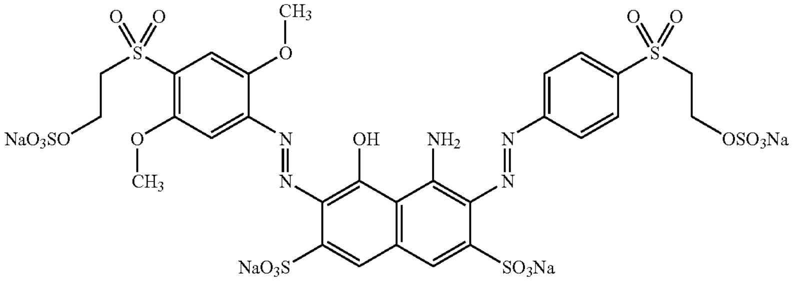 (I-3) |

-continued
| Compound (I) | Structural formula |
| --- | --- |
| I-4 | 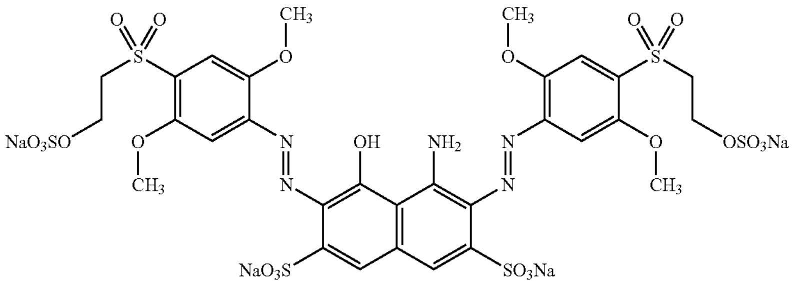 (I-4) |
| I-5 | 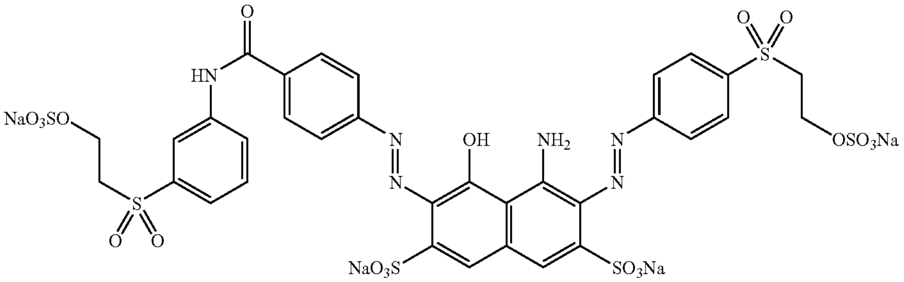 (I-5) |
| I-6 | 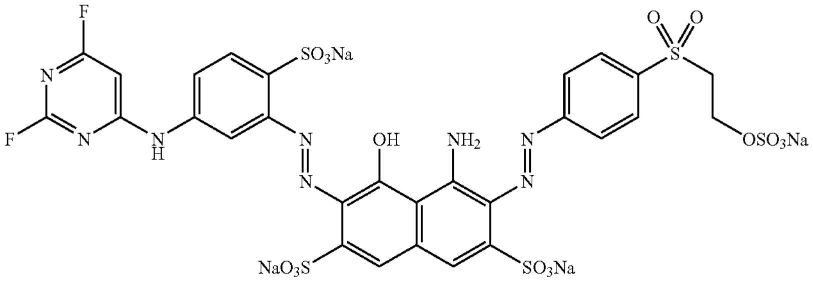 (I-6) |
| I-7 | 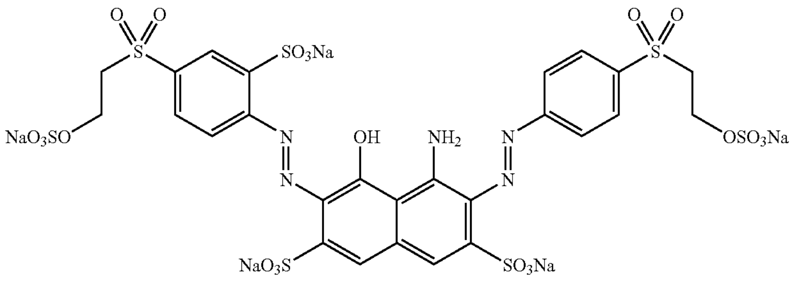 (I-7) |
| I-8 | 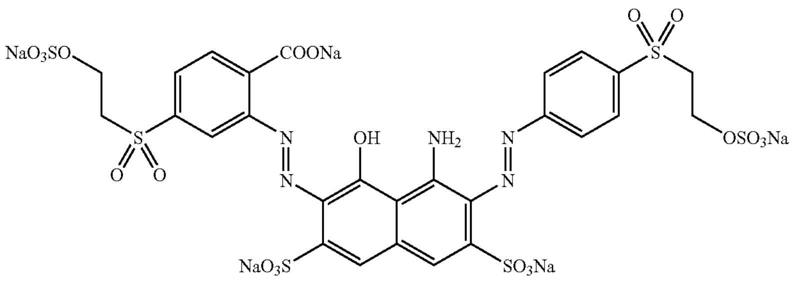 (I-8) |

-continued
| Compound (I) | Structural formula |
|---|---|
| I-9 | 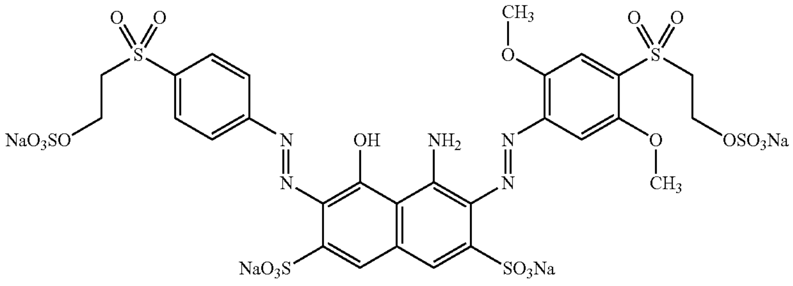 (I-9) |
| I-10 | 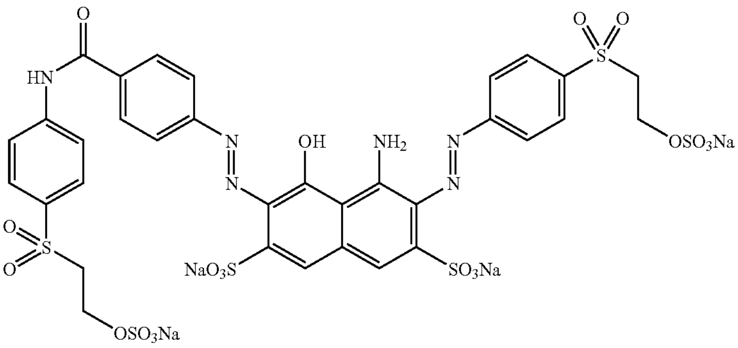 (I-10) |
| I-11 | 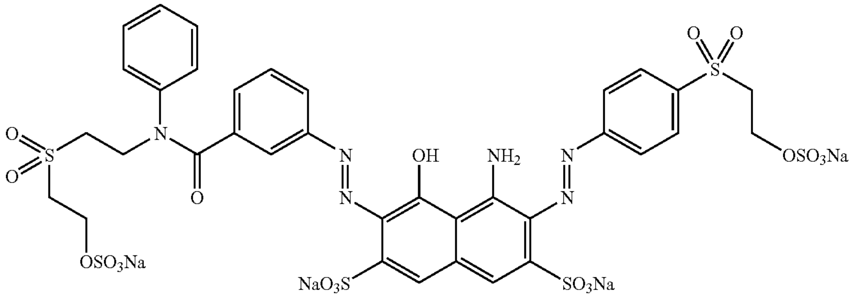 (I-11) |
| I-12 | 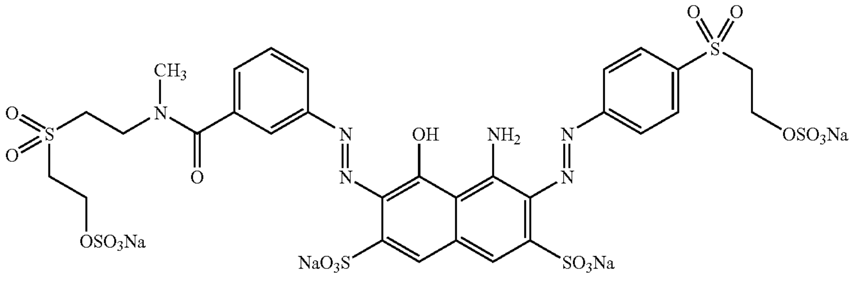 (I-12) |

-continued
| Compound (I) | Structural formula |
|---|---|
| I-13 | 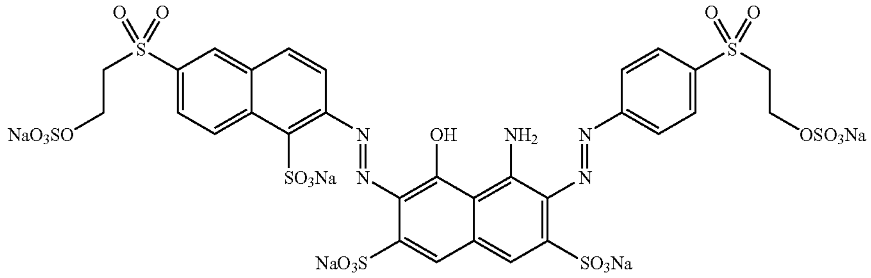 (I-13) |
| I-14 | 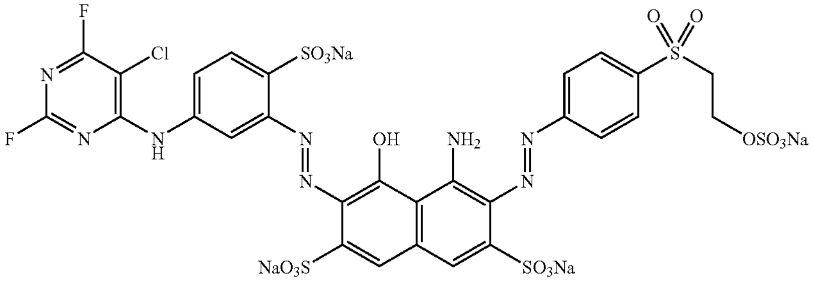 (I-14) |
| I-15 | 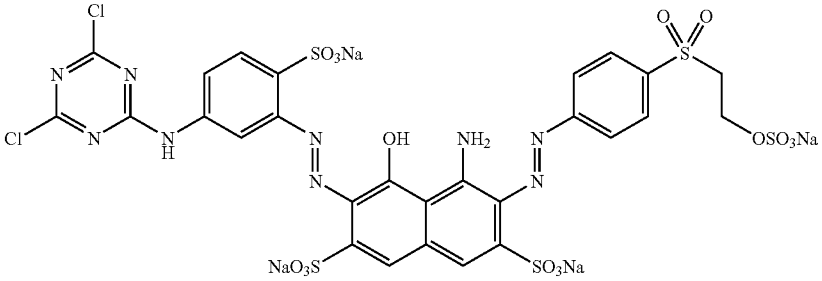 (I-15) |
| I-16 | 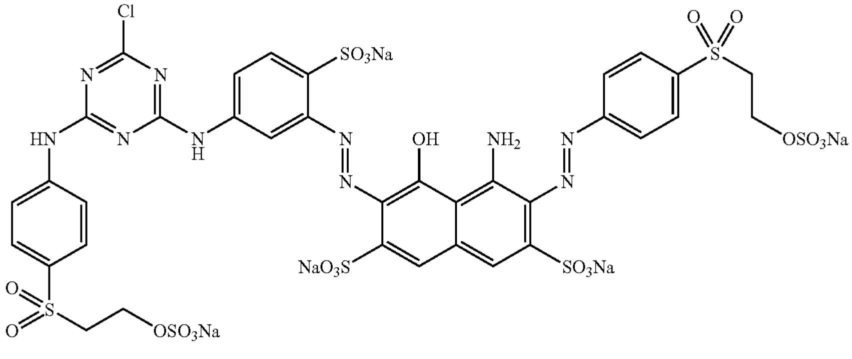 (I-16) |

-continued
| Compound (I) | Structural formula |
|---|---|
| I-17 | 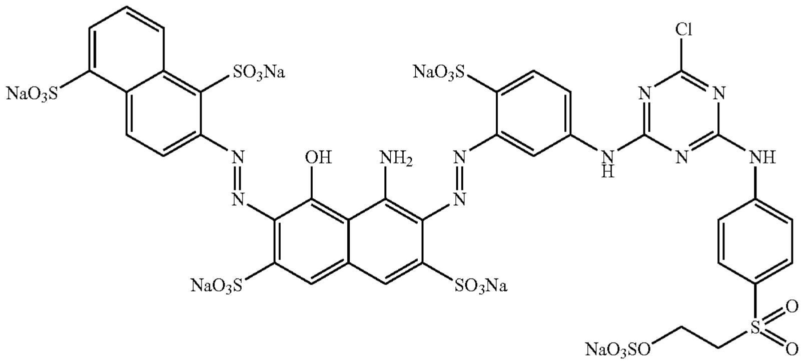 (I-17) |
| I-18 | 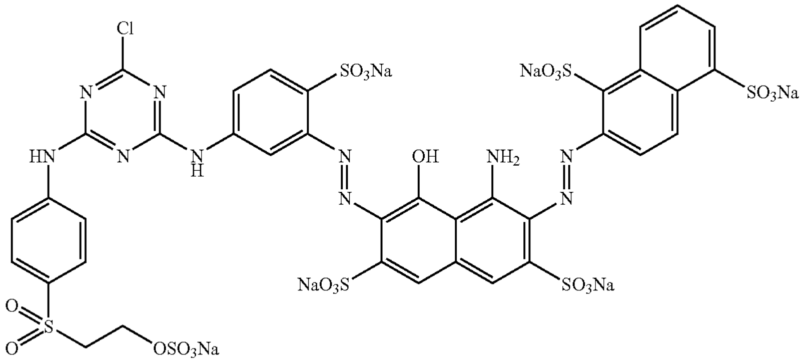 (I-18) |
| I-19 | 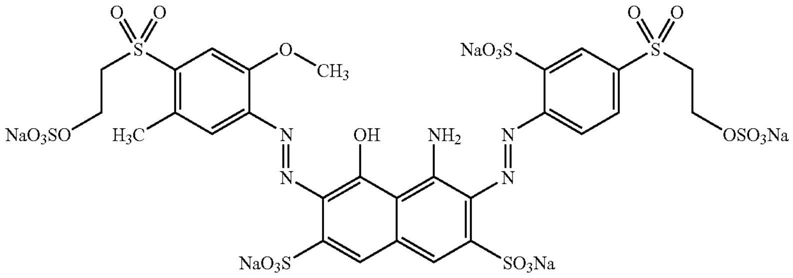 (I-19) |
| I-20 | 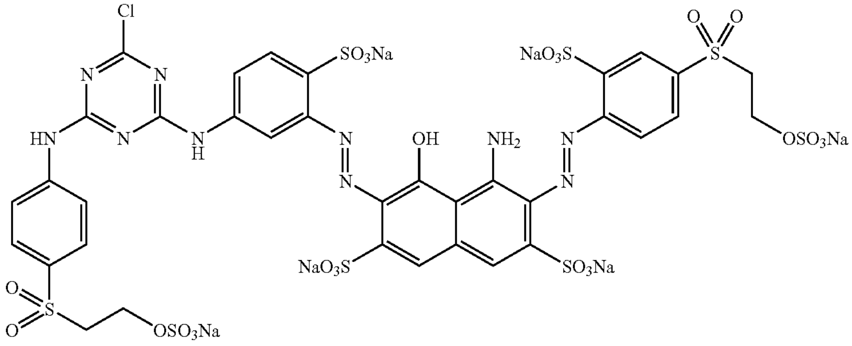 (I-20) |

USE EXAMPLE 1

2 parts of a dye mixture obtained as per example 1-119 and 50 parts of sodium chloride are dissolved in 999 parts of water and 5 parts of sodium carbonate, 0.7 part of sodium hydroxide (in the form of a 32.5% strength aqueous solution) and, where appropriate, 1 part of a wetting agent are added. This dye bath is entered with 100 g of a woven cotton fabric. The temperature of the dye bath is initially maintained at 25° C. for 10 minutes, then raised to the final temperature (40-80° C.) over 30 minutes and maintained at this temperature for a further 60-90 minutes. Thereafter the dyed fabric is initially rinsed with tap water for 2 minutes and then with deionized water for 5 minutes. The dyed fabric is neutralized at 40° C. in 1000 parts of an aqueous solution containing 1 part of 50% strength acetic acid for 10 minutes. It is rinsed again with deionized water at 70° C. and then soaped off at the boil with a laundry detergent for 15 minutes, rinsed once more and dried. This gives a strong orange-yellow to red-brown dyeing having good fastness properties.

USE EXAMPLE 2

2 parts of a dye mixture obtained as per example 120-457 and 50 parts of sodium chloride are dissolved in 999 parts of water and 5 parts of sodium carbonate, 0.7 part of sodium hydroxide (in the form of a 32.5% strength aqueous solution) and, where appropriate, 1 part of a wetting agent are added. This dye bath is entered with 100 g of a woven cotton fabric. The temperature of the dye bath is initially maintained at 25° C. for 10 minutes, then raised to the final temperature (40-80° C.) over 30 minutes and maintained at this temperature for a further 60-90 minutes. Thereafter the dyed fabric is initially rinsed with tap water for 2 minutes and then with deionized water for 5 minutes. The dyed fabric is neutralized at 40° C. in 1000 parts of an aqueous solution containing 1 part of 50% strength acetic acid for 10 minutes. It is rinsed again with deionized water at 70° C. and then soaped off at the boil with a laundry detergent for 15 minutes, rinsed once more and dried. This gives a strong navy to gray dyeing having very good fastness properties.

USE EXAMPLE 3

6 parts of a dye mixture obtained as per example 120-457 and 50 parts of sodium chloride are dissolved in 998 parts of water and 7 parts of sodium carbonate, 2 parts of sodium hydroxide (in the form of a 32.5% strength aqueous solution) and, where appropriate, 1 part of a wetting agent are added. This dye bath is entered with 100 g of a woven cotton fabric. Subsequent processing takes place as reported in use example 1. This gives a deep-black dyeing having very good fastness properties.

USE EXAMPLE 4

A textile fabric consisting of mercerized cotton is padded with a liquor containing 35 g/l of calcined sodium carbonate, 100 g/l of urea and 150 g/l of a low-viscosity sodium alginate solution (6%) and then dried. The liquor pickup is 70%.

The textile thus pretreated is printed with an aqueous ink containing

2% of the dye of one of examples 1 to 119

20% of sulfolane 0.01% of Mergal K9N and 77.99% of water using a drop-on-demand (bubble jet) ink jet print head. The print is fully dried. It is fixed by means of saturated steam at 102° C. for 8 minutes. Subsequently the print is rinsed warm, subjected to a fastness wash with hot water at 95° C., rinsed warm and then dried. This gives an orange-yellow to red-brown print having good service fastness properties.

USE EXAMPLE 5

A textile fabric consisting of mercerized cotton is padded with a liquor containing 35 g/l of calcined sodium carbonate, 50 g/l of urea and 150 g/l of a low-viscosity sodium alginate solution (6%) and then dried. The liquor pickup is 70%. The textile thus pretreated is printed with an aqueous ink containing 8% of the dye of one of examples 20 to 457

20% of 1,2-propanediol 0.01% of Mergal K9N and 71.99% of water using a drop-on-demand (bubble jet) ink jet print head. The print is fully dried. It is fixed by means of saturated steam at 102° C. for 8 minutes. Subsequently the print is rinsed warm, subjected to a fastness wash with hot water at 95° C., rinsed warm and then dried. This gives a black print having outstanding service fastness properties.

USE EXAMPLE 6

A textile fabric consisting of mercerized cotton is padded with a liquor containing 35 g/l of calcined sodium carbonate, 100 g/l of urea and 150 g/l of a low-viscosity sodium alginate solution (6%) and then dried. The liquor pickup is 70%. The textile thus pretreated is printed with an aqueous ink containing 8% of the dye of one of examples 120 to 457

15% of N-methylpyrrolidone 0.01% of Mergal K9N and 76.99% of water using a drop-on-demand (bubble jet) ink jet print head. The print is fully dried. It is fixed by means of saturated steam at 102° C. for 8 minutes. Subsequently the print is rinsed warm, subjected to a fastness wash with hot water at 95° C., rinsed warm and then dried. This gives a black print having outstanding service fastness properties.

What is claimed is:

1. A dye mixture which comprises at least one dye of the formula (I),

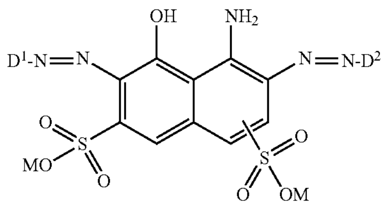

(I)

at least one dye of the formula (II-a), (II-b) or (II-c)

(II-a)

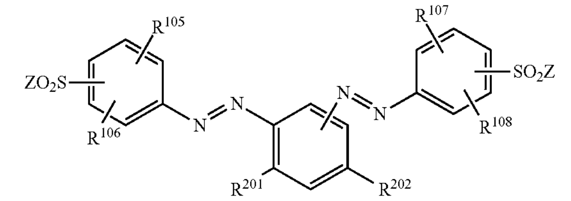

(II-b)

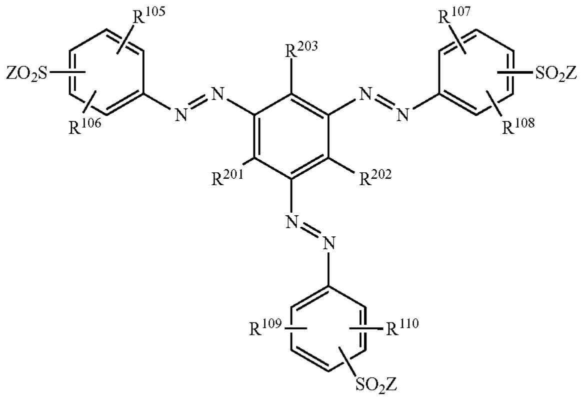

(II-c)

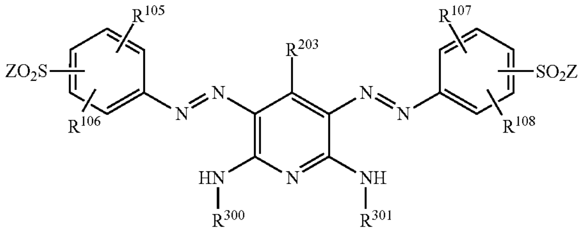

and optionally at least one dye of the formula (III)

(III)

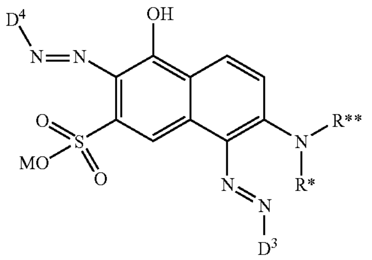

and optionally at least one dye of the formula (IV)

(IV)

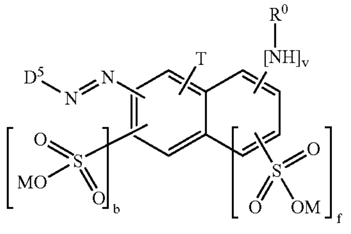

in which:

$D^1$, $D^2$, $D^3$, $D^4$, and $D^5$ are independently of one another a group of the formula (1)

(1)

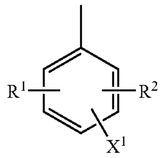

in which $R^1$ and $R^2$ independently of one another are hydrogen, $(C_1$-$C_4)$-alkyl, $(C_1$-$C_4)$-alkoxy, hydroxyl, sulfo, carboxyl, cyano, nitro, amido, ureido or halogen; and $X^1$ is hydrogen or a group of the formula —$SO_2$—Z, where Z is —CH═$CH_2$, —$CH_2CH_2Z^1$ or hydroxyl, in which $Z^1$ is hydroxyl or a group which can be eliminated under the action of alkali; or $D^1$, $D^2$, $D^3$, $D^4$ and $D^5$ are independently of one another a naphthyl group of the formula (2)

(2)

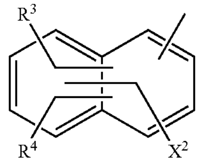

in which $R^3$ and $R^4$ independently of one another are hydrogen, $(C_1$-$C_4)$-alkyl, $(C_1$-$C_4)$-alkoxy, hydroxyl, sulfo, carboxyl, cyano, nitro, amido, ureido or halogen; and $X^2$ has one of the definitions of $X^1$; or $D^1$, $D^2$, $D^3$, $D^4$, and $D^5$ are independently of one another a group of the formula (3)

(3)

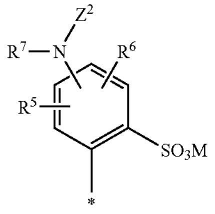

in which $R^5$ and $R^6$ independently of one another have one of the definitions of $R^1$ and $R^2$;

$R^7$ is hydrogen, $(C_1$-$C_4)$-alkyl, or phenyl which is unsubstituted or substituted by $(C_1$-$C_4)$-alkyl, $(C_1$-$C_4)$-alkoxy, sulfo, halogen or carboxyl; and $Z^2$ is a group of the formula (4) or (5) or (6)

(4)

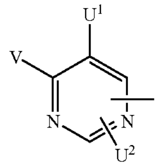

-continued (5)

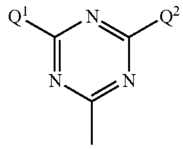

(6)

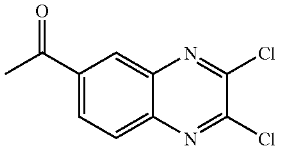

in which

V is fluorine or chlorine;

$U^1$ and $U^2$ independently of one another are fluorine, chlorine or hydrogen; and $Q^1$ and $Q^2$ independently of one another are chlorine, fluorine, cyanamido, hydroxyl, $(C_1-C_6)$-alkoxy, phenoxy, sulfophenoxy, mercapto, $(C_1-C_6)$-alkylmercapto, pyridino, carboxypyridino, carbamoylpyridino or a group of the formula (7) or (8)

(7)

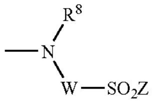

(8)

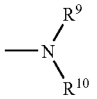

in which $R^8$ is hydrogen or $(C_1-C_6)$-alkyl, sulfo-$(C_1-C_6)$-alkyl or phenyl which is unsubstituted or substituted by $(C_1-C_4)$-alkyl, $(C_1-C_4)$-alkoxy, sulfo, halogen, carboxyl, acetamido or ureido;

$R^9$ and $R^{10}$ have independently of one another one of the definitions of $R^8$, or form a cyclic ring system of the formula $-(CH_2)_j-$ where j is 4 or 5, or alternatively $-(CH_2)_2-E-(CH_2)_2-$, where E is oxygen, sulfur, sulfonyl or $-NR^{11}$ with $R^{11}=(C_1-C_6)$-alkyl;

W is phenylene which is unsubstituted or substituted by 1 or 2 substituents, wherein said substituents $(C_1-C_4)$-alkoxy, carboxyl, sulfo, chlorine or bromine, or is $(C_1-C_4)$-alkylene-arylene or $(C_2-C_6)$-alkylene which is interrupted by oxygen, sulfur, sulfonyl, amino, carbonyl or carboxamido, or is phenylene-CONH-phenylene which is unsubstituted or substituted by $(C_1-C_4)$-alkyl, $(C_1-C_4)$-alkoxy, hydroxyl, sulfo, carboxyl, amido, ureido or halogen, or is naphthylene which is unsubstituted or substituted by one or two sulfo groups; and Z is as defined above; or $D^1$, $D^2$, $D^3$, $D^4$, and $D^5$ are independently of one another a group of the formula (9)

(9)

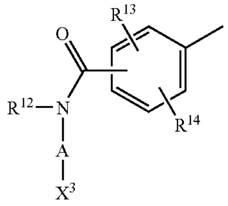

in which $R^{12}$ is hydrogen, $(C_1-C_4)$-alkyl, aryl or a substituted aryl radical;

$R^{13}$ and $R^{14}$ independently of one another are hydrogen, $(C_1-C_4)$-alkyl, $(C_1-C_4)$-alkoxy, hydroxyl, sulfo, carboxyl, cyano, nitro, amido, ureido or halogen; and A is a phenylene group of the formula (10)

(10)

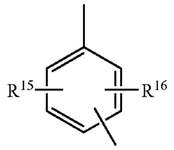

in which $R^{15}$ and $R^{16}$ independently of one another are hydrogen, $(C_1-C_4)$-alkyl, $(C_1-C_4)$-alkoxy, hydroxyl, sulfo, carboxyl, cyano, nitro, amido, ureido or halogen; or A is a naphthylene group of the formula (11)

(11)

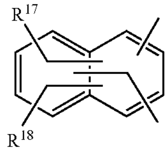

in which $R^{17}$ and $R^{18}$ independently of one another are hydrogen, $(C_1-C_4)$-alkyl, $(C_1-C_4)$-alkoxy, hydroxyl, sulfo, carboxyl, cyano, nitro, amido, ureido or halogen; or A is a polymethylene group of the formula (12)

$$-(CR^{19}R^{20})_k- \quad (12)$$

in which k is an integer greater than 1; and $R^{19}$ and $R^{20}$ independently of one another are hydrogen, $(C_1-C_4)$-alkyl, $(C_1-C_4)$-alkoxy, hydroxyl, cyano, amido, halogen or aryl; and $X^3$ has one of the definitions of $X^1$; and $R^0$ is a group of the formula (4) or (5) or is a group of the formula (13)

(13)

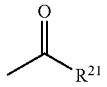

in which $R^{21}$ is $(C_1\text{-}C_6)$-alkyl, sulfo-$(C_1\text{-}C_6)$-alkyl, carboxy-$(C_1\text{-}C_6)$-alkyl or phenyl which is unsubstituted or substituted $(C_1\text{-}C_4)$-alkyl, $(C_1\text{-}C_4)$-alkoxy, sulfo, halogen, carboxyl, acetamido or ureido;

G is C—$R^{200}$ or N, in which $R^{200}$ is hydrogen, $C_1\text{-}C_6$-alkyl, which is unsubstituted or substituted by amino, $(C_1\text{-}C_4)$-alkylamino, hydroxyl, $(C_1\text{-}C_4)$-alkoxy, sulfo, halogen, carboxyl, acetamido or ureido, or is phenyl which is unsubstituted or substituted by $(C_1\text{-}C_4)$-alkyl, $(C_1\text{-}C_4)$-alkoxy, sulfo, halogen, carboxyl, acetamido or ureido, or is sulfo, carboxyl, cyano or halogen, or is a group of the formula (100);

—N═N-$D^8$ (100)

in which $D^8$ possesses one of the definitions of $D^1$ or is a group of the formula (101)

(101)

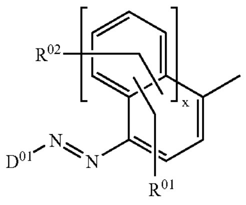

in which $D^{01}$ possesses one of the definitions of $D^1$;

$R^{01}$ and $R^{02}$ independently of one another are hydrogen, $C_1\text{-}C_6$-alkyl, amino, $(C_1\text{-}C_4)$-alkylamino, hydroxyl, $(C_1\text{-}C_4)$-alkoxy, acetamido, ureido, sulfo or carboxyl;

x is 0 or 1;

$R^{201}$ and $R^{202}$ independently of one another are amino, hydroxyl, $(C_1\text{-}C_4)$-alkylamino, $(C_1\text{-}C_4)$-alkoxy or mercapto; or one of the radicals $R^{201}$ and $R^{202}$ is hydrogen and the other has one of the aforementioned definitions;

$R^{203}$ is hydrogen, $C_1\text{-}C_6$-alkyl, which is unsubstituted or substituted by amino, $(C_1\text{-}C_4)$-alkylamino, hydroxyl, $(C_1\text{-}C_4)$-alkoxy, sulfo, halogen, carboxyl, acetamido or ureido, or is phenyl which is unsubstituted or substituted by $(C_1\text{-}C_4)$-alkyl, $(C_1\text{-}C_4)$-alkoxy, sulfo, halogen, carboxyl, acetamido or ureido, or is amino, $(C_1\text{-}C_4)$-alkylamino, hydroxyl, $(C_1\text{-}C_4)$-alkoxy, sulfo, carboxyl, cyano, halogen, nitro, amido or ureido;

b, f and v independently of one another are 0 or 1;

R* and R** independently of one another are hydrogen, $(C_1\text{-}C_4)$-alkyl or a group of the formula (14)

$—CH_2—SO_3M$ (14);

$R^{105}$ to $R^{110}$ independently of one another are hydrogen, $C_1\text{-}C_4$-alkyl, $C_1\text{-}C_4$-alkoxy, sulfo, carboxyl or halogen;

$R^{300}$ and $R^{301}$ independently of one another are hydrogen, $(C_1\text{-}C_4)$-alkyl, hydroxyl-, alkoxy-, amino-, alkylamino-, sulfo-, sulfato- or carboxyl-substituted $(C_1\text{-}C_4)$-alkyl or aryl;

Z is vinyl, β-sulfatoethyl or hydroxyl;

T is hydroxyl or $—NH_2$, and if T is $NH_2$ and v is 0; and

M is hydrogen, an alkali metal or one equivalent of an alkaline earth metal.

2. The dye mixture as claimed in claim 1, which comprises at least one dye of the formula (I)

and at least one dye of the formula (II-b) or (II-c)

but no dyes of the formula (III) and (IV).

3. The dye mixture as claimed in claim 1, which comprises one or more dyes of the formula (I)

one or more dyes of the formula (II-b) or (II-c)

and one or more dyes of the formula (III-a)

(III-a)

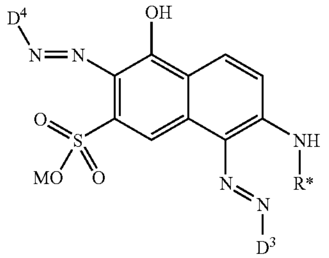

in which $D^1$, $D^2$, $D^3$, $D^4$, G, $R^{201}$, $R^{202}$, $R^{203}$, R* and M are as defined in claim 1.

4. The dye mixture as claimed in claim 1, which comprises one or more dyes of the formula (I)

one or more dyes of the formula (II-b) or (II-c)

and one or more dyes of the formula (IV-a)

(IV-a)

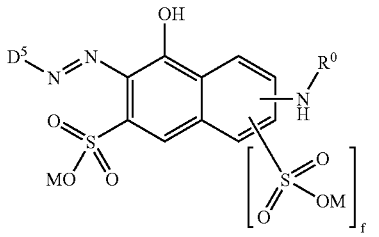

in which $D^5$, $R^0$, f and M are as defined in claim 1.

5. The dye mixture as claimed in claim 1, which comprises one or more dyes of the formula (I)

one to three dyes of the formula (II-b) or (II-c) or both formulas (II-a) or (II-b)

and one or more dyes of the formula (III-b)

(III-b)

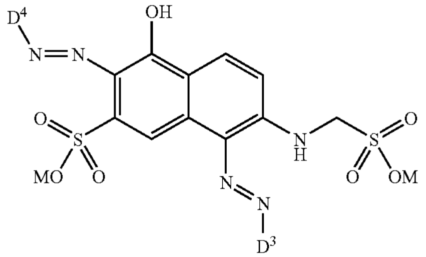

in which $D^1$, $D^2$, $D^3$, $D^4$, G, $R^{201}$, $R^{202}$, $R^{203}$ and M are as defined in claim 1.

6. The dye mixture as claimed in claim 1, which comprises one or more dyes of the formula (I-a)

(I-a)

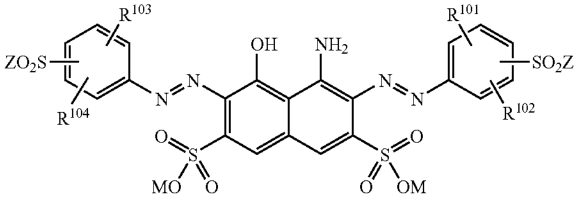

and at least one dye of the formula (II-a)

(II-a)

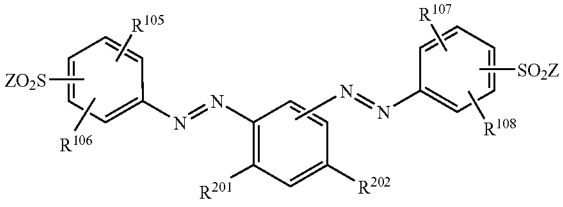

and optionally a dye of the formula (III-c)

(II)

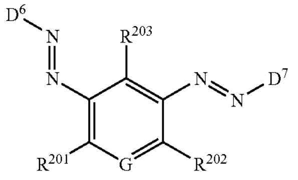

in which $R^{101}$ to $R^{112}$ independently of one another are hydrogen, $C_1$-$C_4$-alkyl, $C_1$-$C_4$-alkoxy, sulfo, carboxyl or halogen;

$R^{201}$ and $R^{202}$ independently of one another are amino or hydroxyl;

Z is vinyl, β-sulfatoethyl or hydroxyl; and

M is hydrogen, an alkali metal or one equivalent of an alkaline earth metal.

7. The dye mixture as claimed in claim 1, which comprises at least one dye of the formula (I-a), (I-a)

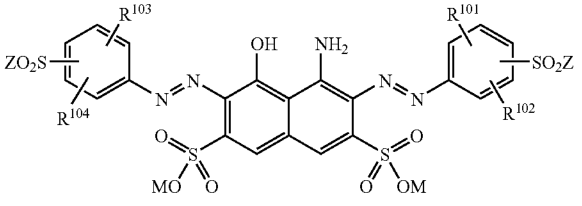

and at least one dye of the formula (II-b)

(II-b)

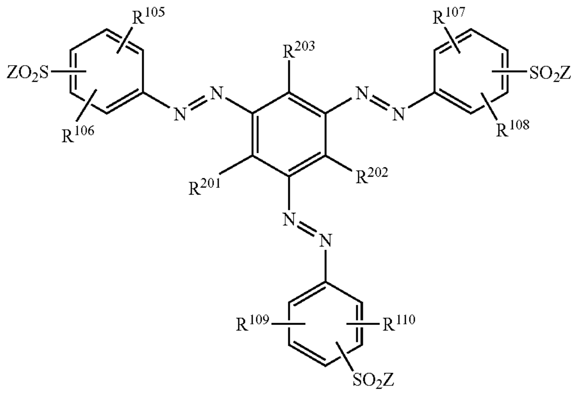

and optionally a dye of the formula (III-c), (III-c)

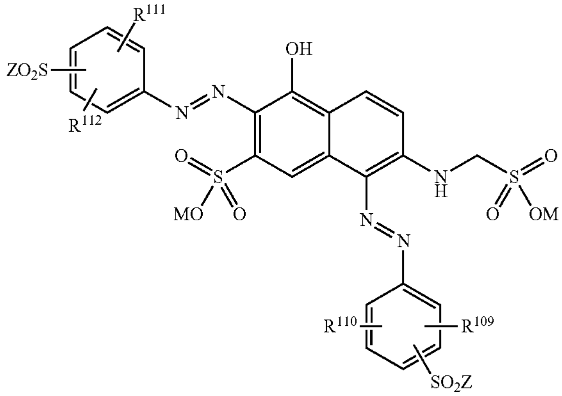

where $R^{101}$ to $R^{112}$ independently of one another are hydrogen, $C_1$-$C_4$-alkyl, $C_1$-$C_4$-alkoxy, sulfo, carboxyl or halogen;

$R^{201}$ and $R^{202}$ independently of one another are amino or hydroxyl;

$R^{203}$ is hydrogen, amino or hydroxyl;

Z is vinyl, β-sulfatoethyl or hydroxyl; and

M is hydrogen, an alkali metal or one equivalent of an alkaline earth metal.

8. The dye mixture as claimed in claim 1, which comprises at least one dye of the formula (I-a), (I-a)

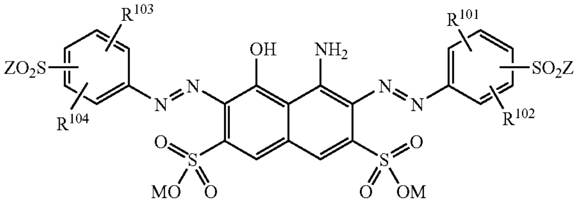

and at least one dye of the formula (II-c)

(II-c)

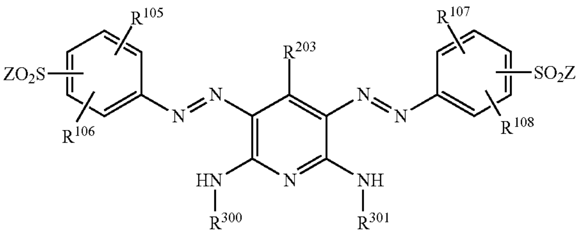

in which $R^{101}$ to $R^{108}$ independently of one another are hydrogen, $C_1$-$C_4$-alkyl, $C_1$-$C_4$-alkoxy, sulfo, carboxyl or halogen;

$R^{203}$, $R^{300}$ and $R^{301}$ independently of one another are hydrogen, ($C_1$-$C_4$)-alkyl, hydroxyl-, alkoxy-, amino-, alkylamino-, sulfo-, sulfato- or carboxyl-substituted ($C_1$-$C_4$)-alkyl or aryl;

Z is vinyl, β-sulfatoethyl or hydroxyl; and

M is hydrogen, an alkali metal or one equivalent of an alkaline earth metal.

9. The dye mixture as claimed in claim 1, which contains at least one dye of the formula (I) in an amount of 30% to 95% by weight, at least one dye of the formula (II-b) or (II-c) in an amount of 70% to 5% by weight, and dyes of the formula (III) and (IV) independently of one another in each case in an amount of 0 to 65% by weight.

10. The dye mixture as claimed in claim 1, which further contains one or more monoazo dyes of the formulae (15) to (18)

(15)

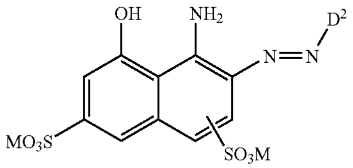

-continued (16)

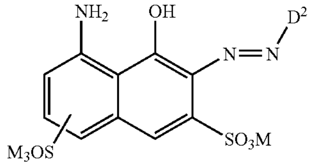

(17)

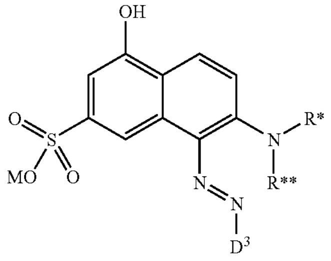

(18)

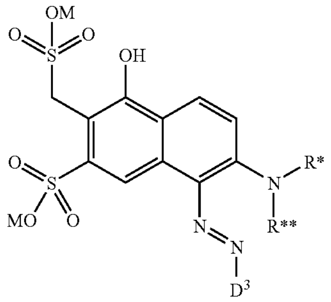

in which $D^2$, $D^3$, M, R* and R are as defined in claim 1** in an amount up to 10% by weight.

11. The dye mixture as claimed in claim 10, wherein said one or more monoazo dyes of the formulae (15) to (18) are in an amount up to 5% by weight.

12. The dye mixture as claimed in claim 1, which further comprises one or more dyes of the formulae (Ga)-(Gf)

(Ga)

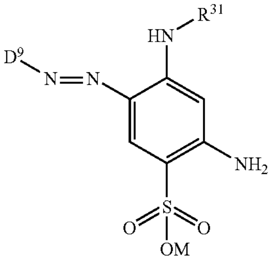

(Gb)

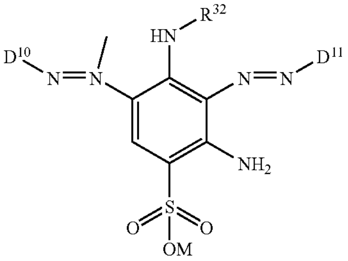

(Gc)

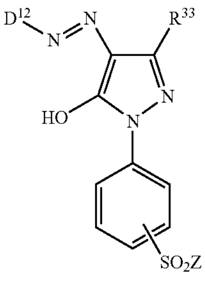

(Gd)

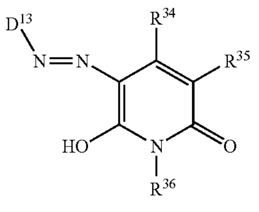

-continued (Ge)

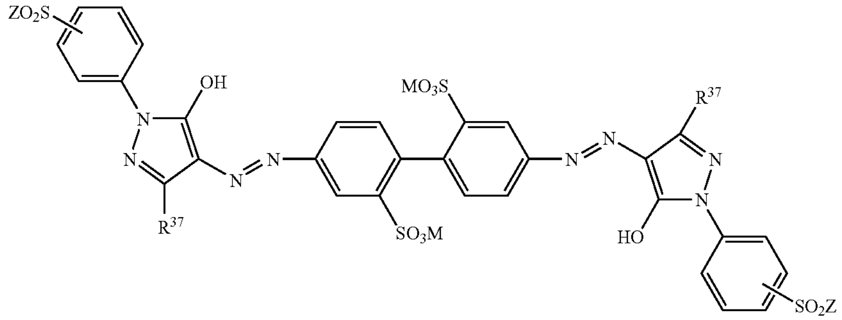

(Gf)

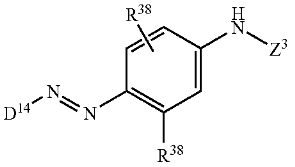

in which $D^9$, $D^{10}$, $D^{11}$, $D^{12}$, $D^{13}$ and $D^{14}$ possess one of the definitions of $D^1$, and $D^9$, if $R^{31}$ is not a group of the formula (4-1) or (5-1), and also $D^{10}$ or $D^{11}$ and $D^{13}$ contain at least one fiber-reactive group of the formula —$SO_2Z$ or $Z^2$;

$R^{31}$ is hydrogen, acetyl, carbamoyl or sulfomethyl or is a group of the formula (4-1) or (5-1), (4-1)

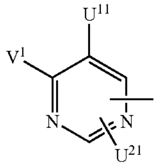

(5-1)

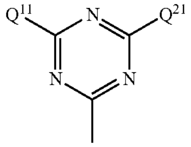

in which $V^1$ is fluorine or chlorine;

$U^{11}$ and $U^{21}$ independently of one another are fluorine, chlorine or hydrogen;

$Q^{11}$ and $Q^{21}$ independently of one another are chlorine, fluorine, cyanamido, hydroxyl, $(C_1-C_6)$-alkoxy, phenoxy, sulfophenoxy, mercapto, $(C_1-C_6)$-alkylmercapto, pyridino, carboxypyridino, carbamoylpyridino or a group of the formula (7-1) or (8-1)

(7-1)

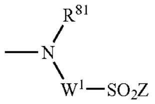

-continued (8-1)

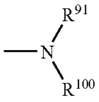

in which $R^{81}$ is hydrogen, $(C_1-C_6)$-alkyl, sulfo-$(C_1-C_6)$-alkyl or phenyl which is unsubstituted or substituted by $(C_1-C_4)$-alkyl, $(C_1-C_4)$-alkoxy, sulfo, halogen, carboxyl, acetamido or ureido;

$R^{91}$ and $R^{100}$ independently of one another have one of the definitions of $R^{81}$ or form a cyclic ring system of the formula —$(CH_2)_j$—, in which j is 4 or 5, or —$(CH_2)_2$-E-$(CH_2)_2$—, in which E is oxygen, sulfur, sulfonyl or —$NR^{11}$ and $R^{11}$ is $(C_1-C_6)$-alkyl;

$W^1$ is phenylene; phenylene substituted by 1 or 2 substituents, such as $(C_1-C_4)$-alkyl, $(C_1-C_4)$-alkoxy, carboxyl, sulfo, chlorine or bromine; $(C_1-C_4)$-alkylene-arylene; $(C_2-C_6)$-alkylene; $(C_2-C_6)$-alkylene which is interrupted by oxygen, sulfur, sulfonyl, amino, carbonyl or carboxamido; phenylene-CONH-phenylene; phenylene-CONH-phenylene substituted by $(C_1-C_4)$-alkyl, $(C_1-C_4)$-alkoxy, hydroxyl, sulfo, carboxyl, amido, ureido or halogen; naphthylene; or naphthylene substituted by one or two sulfo groups;

$R^{32}$ is hydrogen or sulfomethyl;

$R^{33}$ is methyl, carboxyl or carboxy-$(C_1-C_4)$-alkyl;

$R^{34}$ is hydrogen or methyl;

$R^{35}$ is hydrogen, cyano, carbamoyl, carboxyl or sulfomethyl;

$R^{36}$ is methyl, ethyl or β-sulfoethyl;

$R^{37}$ is methyl, carboxyl or carboxy-$(C_1-C_4)$-alkyl;

$R^{38}$ is acetamido, ureido or methyl;

$R^{39}$ is hydrogen, methyl or methoxy;

$Z^3$ has one of the definitions of $Z^2$; and

M and Z have one of the definitions stated in claim 1, as further co-components and/or shading components.

13. A process for preparing a dye mixture as claimed in claim 1, which comprises mechanically mixing the individual dyes of the formulas (I) and (II-a) (II-b) and/or (II-c), and also optionally, of the formulas (III) and/or (IV).

14. A process for preparing a dye of the formula (II),

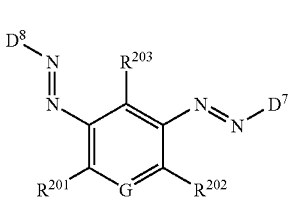

(II)

which comprises diazotizing an amine of the formula (19)

$D^7$-$NH_2$ (19), in which $D^7$ and $D^6$ are identical or different and are a group of the formula (9)

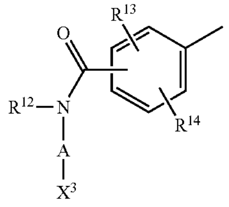

(9)

in which $R^{12}$ is hydrogen, ($C_1$-$C_4$)-alkyl, aryl or a substituted aryl radical;

$R^{13}$ and $R^{14}$ independently of one another are hydrogen, ($C_1$-$C_4$)-alkyl, ($C_1$-$C_4$)-alkoxy, hydroxyl, sulfo, carboxyl, cyano, nitro, amido, ureido or halogen; and A is a phenylene group of the formula (10)

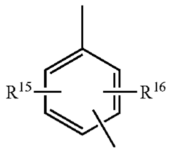

(10)

in which $R^{15}$ and $R^{16}$ independently of one another are hydrogen, ($C_1$-$C_4$)-alkyl, ($C_1$-$C_4$)-alkoxy, hydroxyl, sulfo, carboxyl, cyano, nitro, amido, ureido or halogen; or A is a naphthylene group of the formula (11)

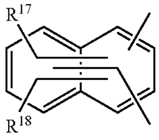

(11)

in which $R^{17}$ and $R^{18}$ independently of one another are hydrogen, ($C_1$-$C_4$)-alkyl, ($C_1$-$C_4$)-alkoxy, hydroxyl, sulfo, carboxyl, cyano, nitro, amido, ureido or halogen; or A is a polymethylene group of the formula (12)

$—(CR^{19}R^{20})k$- (12)

in which k is an integer greater than 1; and $R^{19}$ and $R^{20}$ independently of one another are hydrogen, ($C_1$-$C_4$)-alkyl, ($C_1$-$C_4$)-alkoxy, hydroxyl, cyano, amido, halogen or aryl; and $X^3$ has one of the definitions of $X^1$;

$X^1$ is hydrogen or a group of the formula —$SO_2$—Z, where Z is —CH═$CH_2$, —$CH_2CH_2Z^1$ or hydroxyl, in which $Z^1$ is hydroxyl or a group which can be eliminated under the action of alkali;

and coupling the resulting diazonium compound onto a compound of the formula (24)

(24)

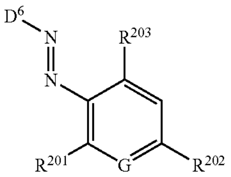

in which $D^6$ is defined above, $R^{201}$ and $R^{202}$ independently of one another are amino or hydroxyl;

$R^{203}$ is hydrogen, $C_1$-$C_6$-alkyl, which is unsubstituted or substituted by amino, ($C_1$-$C_4$)-alkylamino, hydroxyl, ($C_1$-$C_4$)-alkoxy, sulfo, halogen, carboxyl, acetamido or ureido, or is phenyl which is unsubstituted or substituted by ($C_1$-$C_4$)-alkyl, ($C_1$-$C_4$)-alkoxy, sulfo, halogen, carboxyl, acetamido or ureido, or is amino, ($C_1$-$C_4$)-alkylamino, hydroxyl, ($C_1$-$C_4$)-alkoxy, sulfo, carboxyl, cyano, halogen, nitro, amido or ureido;

G is C—$R^{200}$ or N, in which $R^{200}$ is hydrogen, $C_1$-$C_6$-alkyl, which is unsubstituted or substituted by amino, ($C_1$-$C_4$)-alkylamino, hydroxyl, ($C_1$-$C_4$)-alkoxy, sulfo, halogen, carboxyl, acetamido or ureido, or is phenyl which is unsubstituted or substituted by ($C_1$-$C_4$)-alkyl, ($C_1$-$C_4$)-alkoxy, sulfo, halogen, carboxyl, acetamido or ureido, or is sulfo, carboxyl, cyano or halogen, or is a group of the formula (100);

—N═N-$D^8$ (100)

in which $D^8$ possesses one of the definitions of $D^1$ or is a group of the formula (101)

(101)

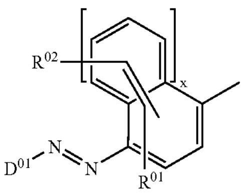

in which $D^{01}$ possesses one of the definitions of $D^1$;

$D^1$ is a naphthyl group of the formula (2)

(2)

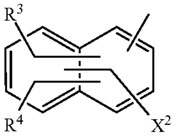

in which $R^3$ and $R^4$ independently of one another are hydrogen, ($C_1$-$C_4$)-alkyl, ($C_1$-$C_4$) alkoxy, hydroxyl, sulfo, carboxyl, cyano, nitro, amido, ureido or halogen; and $X^2$ has one of the definitions of $X^1$; or $D^1$ is a group of the formula (3)

(3)

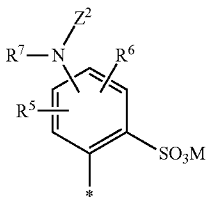

in which $R^5$ and $R^6$ independently of one another have one of the definitions of $R^1$ and $R^2$; $R^1$ and $R^2$ independently of one another are hydrogen, ($C_1$-$C_4$)-alkyl, ($C_1$-$C_4$)-alkoxy, hydroxyl, sulfo, carboxyl, cyano, nitro, amido, ureido or halogen; M is hydrogen, an alkali metal or one equivalent of an alkaline earth metal;

$R^7$ is hydrogen, ($C_1$-$C_4$)-alkyl, or phenyl which is unsubstituted or substituted by ($C_1$-$C_4$)-alkyl, ($C_1$-$C_4$)-alkoxy, sulfo, halogen or carboxyl; and $Z^2$ is a group of the formula (4) or (5) or (6)

(4)

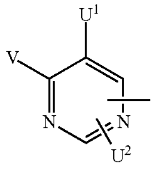

(5)

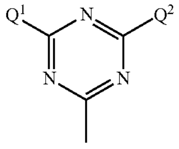

(6)

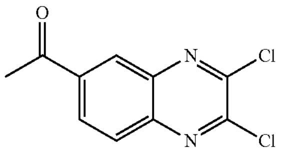

in which

V is fluorine or chlorine;

$U^1$ and $U^2$ independently of one another are fluorine, chlorine or hydrogen; and $Q^1$ and $Q^2$ independently of one another are chlorine, fluorine, cyanamido, hydroxyl, ($C_1$-$C_6$)-alkoxy, phenoxy, sulfophenoxy, mercapto, ($C_1$-$C_6$) alkylmercapto, pyridino, carboxypyridino, carbamoylpyridino or a group of the formula (7) or (8)

(7)

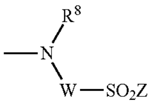

(8)

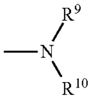

in which $R^8$ is hydrogen or ($C_1$-$C_6$)-alkyl, sulfo-($C_1$-$C_6$)-alkyl or phenyl which is unsubstituted or substituted by ($C_1$-$C_4$)-alkyl, ($C_1$-$C_4$)-alkoxy, sulfo, halogen, carboxyl, acetamido or ureido;

$R^9$ and $R^{10}$ have independently of one another one of the definitions of $R^8$, or form a cyclic ring system of the formula $-(CH_2)_j-$ where j is 4 or 5, or alternatively $-(CH_2)_2$-E-$(CH_2)_2-$, where E is oxygen, sulfur, sulfonyl or $-NR^{11}$ with $R^{11}=(C_1$-$C_6)$-alkyl;

W is phenylene which is unsubstituted or substituted by 1 or 2 substituents, wherein said substituents ($C_1$-$C_4$)-alkyl, ($C_1$-$C_4$)-alkoxy, carboxyl, sulfo, chlorine or bromine, or is ($C_1$-$C_4$)-alkylene-arylene or ($C_2$-$C_6$)-alkylene which is interrupted by oxygen, sulfur, sulfonyl, amino, carbonyl or carboxamido, or is phenylene-CONH-phenylene which is unsubstituted or substituted by ($C_1$-$C_4$)-alkyl, ($C_1$-$C_4$)-alkoxy, hydroxyl, sulfo, carboxyl, amido, ureido or halogen, or is naphthylene which is unsubstituted or substituted by one or two sulfo groups; and Z is as defined above; or $D^1$ is a group of the formula (9)

(9)

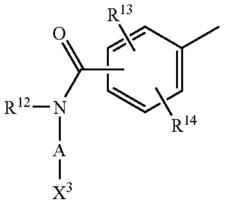

in which $R^{12}$ is hydrogen, ($C_1$-$C_4$)-alkyl, aryl or a substituted aryl radical;

$R^{13}$ and $R^{14}$ independently of one another are hydrogen, ($C_1$-$C_4$)-alkyl, ($C_1$-$C_4$) alkoxy, hydroxyl, sulfo, carboxyl, cyano, nitro, amido, ureido or halogen; and A is a phenylene group of the formula (10)

(10)

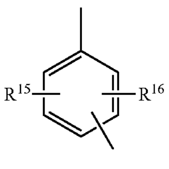

in which $R^{15}$ and $R^{16}$ independently of one another are hydrogen, ($C_1$-$C_4$)-alkyl, ($C_1$-$C_4$)-alkoxy, hydroxyl, sulfo, carboxyl, cyano, nitro, amido, ureido or halogen; or A is a naphthylene group of the formula (11)

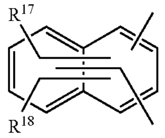

(11)

in which $R^{17}$ and $R^{18}$ independently of one another are hydrogen, $(C_1-C_4)$-alkyl, $(C_1-C_4)$ alkoxy, hydroxyl, sulfo, carboxyl, cyano, nitro, amido, ureido or halogen; or A is a polymethylene group of the formula (12)

$$—(CR^{19}R^{20})k- \quad (12)$$

in which k is an integer greater than 1; and $R^{19}$ and $R^{20}$ independently of one another are hydrogen, $(C_1-C_4)$-alkyl, $(C_1-C_4)$-alkoxy, hydroxyl, cyano, amido, halogen or aryl; and $X^3$ has one of the definitions of $X^1$; and $R^{01}$ and $R^{02}$ independently of one another are hydrogen, $C_1-C_6$-alkyl, amino, $(C_1-C_4)$-alkylamino, hydroxyl, $(C_1-C_4)$-alkoxy, acetamido, ureido, sulfo or carboxyl;

x is 0 or 1.

15. A process for dying or printing a hydroxyl- and/or carboxamido-containing material which comprises contacting the dye mixture as claimed in claim 1 with the material.

16. A dye comprising the formula (II-b) or the formula (II-c)

(II-b)

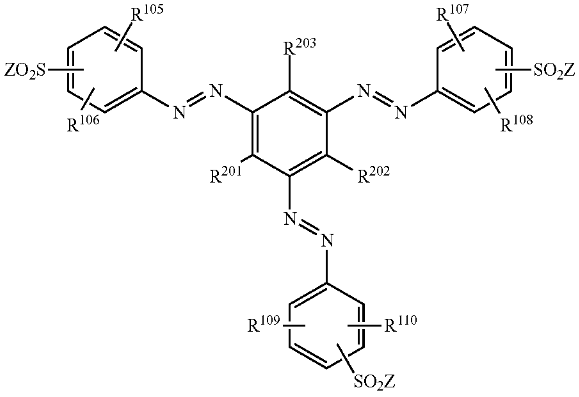

-continued (II-c)

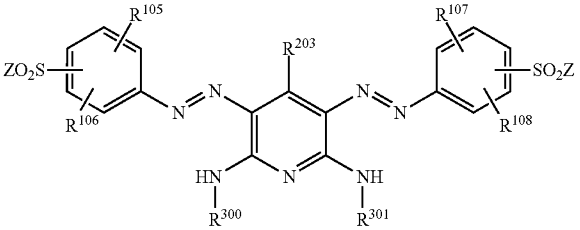

wherein $R^{105}$ to $R^{110}$ independently of one another are hydrogen, $C_1-C_4$-alkyl, $C_1-C_4$-alkoxy, sulfo, carboxyl or halogen;

$R^{201}$ and $R^{202}$ independently of one another are amino or hydroxyl;

$R^{203}$ is hydrogen, $C_1-C_6$-alkyl, which is unsubstituted or substituted by amino, $(C_1-C_4)$-alkylamino, hydroxyl, $(C_1-C_4)$-alkoxy, sulfo, halogen, carboxyl, acetamido or ureido, or is phenyl which is unsubstituted or substituted by $(C_1-C_4)$-alkyl, $(C_1-C_4)$-alkoxy, sulfo, halogen, carboxyl, acetamido or ureido, or is amino, $(C_1-C_4)$-alkylamino, hydroxyl, $(C_1-C_4)$-alkoxy, sulfo, carboxyl, cyano, halogen, nitro, amido or ureido;

$R^{300}$ and $R^{301}$ independently of one another are hydrogen, $(C_1-C_4)$-alkyl, hydroxyl-, alkoxy-, amino-, alkylamino-, sulfo-, sulfato- or carboxyl-substituted $(C_1-C_4)$-alkyl or aryl; and Z is vinyl, β-sulfatoethyl or hydroxyl.

17. A process for dying or printing a hydroxyl- and/or carboxamido-containing material which comprises contacting the dye as claimed in claim 16 with the material.

18. An ink for digital textile printing by the inkjet process, which comprises the dye of the formula (II-b) or (II-c) as claimed in claim 16.

19. The dye as claimed in claim 16, wherein the dye is of the formula (II-b) and $R^{203}$ is hydrogen, amino or hydroxyl.

20. The dye as claimed in claim 16, wherein the dye is of the formula (II-c) and $R^{203}$ is hydrogen, $(C_1-C_4)$-alkyl, hydroxyl-, alkoxy-, amino-, alkylamino-, sulfo-, sulfato- or carboxyl-substituted $(C_1-C_4)$-alkyl or aryl.

* * * * *